(12) United States Patent
Moriya et al.

(10) Patent No.: US 11,194,135 B2
(45) Date of Patent: Dec. 7, 2021

(54) LENS ATTACHED SUBSTRATE, LAYERED LENS STRUCTURE, CAMERA MODULE, MANUFACTURING APPARATUS, AND MANUFACTURING METHOD

(71) Applicant: SONY SEMICONDUCTOR SOLUTIONS CORPORATION, Kanagawa (JP)

(72) Inventors: Yusuke Moriya, Kanagawa (JP); Masanori Iwasaki, Kanagawa (JP); Takashi Oinoue, Tokyo (JP); Yoshiya Hagimoto, Kanagawa (JP); Hiroyasu Matsugai, Kanagawa (JP); Hiroyuki Itou, Kanagawa (JP); Suguru Saito, Kanagawa (JP); Keiji Ohshima, Tokyo (JP); Nobutoshi Fujii, Kanagawa (JP); Hiroshi Tazawa, Kanagawa (JP); Toshiaki Shiraiwa, Kanagawa (JP); Minoru Ishida, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/507,984

(22) Filed: Jul. 10, 2019

(65) Prior Publication Data

US 2020/0049959 A1 Feb. 13, 2020

Related U.S. Application Data

(63) Continuation of application No. 15/559,489, filed as application No. PCT/JP2016/003349 on Jul. 15, 2016, now Pat. No. 10,379,323.

(30) Foreign Application Priority Data

Jul. 31, 2015 (JP) ................................. 2015-152920

(51) Int. Cl.
*G02B 13/00* (2006.01)
*B29D 11/00* (2006.01)
(Continued)

(52) U.S. Cl.
CPC .... *G02B 13/0085* (2013.01); *B29D 11/00298* (2013.01); *B29D 11/00375* (2013.01);
(Continued)

(58) Field of Classification Search
CPC .. G02B 13/0085; G02B 3/0056; G02B 5/003; G02B 27/0018; G02B 3/0012;
(Continued)

(56) References Cited

U.S. PATENT DOCUMENTS

| 2011/0013063 A1* | 1/2011 | Yamamoto | H04N 5/2257 348/294 |
| 2012/0134028 A1* | 5/2012 | Maruyama | H01L 27/14627 359/601 |
| 2013/0222918 A1* | 8/2013 | Nemoto | G02B 3/0075 359/622 |

FOREIGN PATENT DOCUMENTS

JP H05-027104 2/1993
JP 2009-229749 10/2009
(Continued)

OTHER PUBLICATIONS

Official Action (with English translation) for Japanese Patent Application No. 2015-152920, dated Oct. 15, 2019, 6 pages.
(Continued)

*Primary Examiner* — Yogesh K Aggarwal
(74) *Attorney, Agent, or Firm* — Sheridan Ross P.C.

(57) ABSTRACT

The present technology relates to, for example, a lens attached substrate including a substrate which has a through-hole formed therein and a light shielding film formed on a side wall of the through-hole and a lens resin portion which is formed inside the through-hole of the substrate. The present technology can be applied to, for example, a lens attached substrate, a layered lens structure, a camera module, a manufacturing apparatus, a manufacturing method, an
(Continued)

electronic device, a computer, a program, a storage medium, a system, and the like.

8 Claims, 94 Drawing Sheets

(51) Int. Cl.
*G02B 3/00* (2006.01)
*G02B 5/00* (2006.01)
*G02B 27/00* (2006.01)

(52) U.S. Cl.
CPC ........... *G02B 3/0056* (2013.01); *G02B 5/003* (2013.01); *G02B 27/0018* (2013.01)

(58) Field of Classification Search
CPC ............ G02B 3/0062; B29D 11/00375; B29D 11/00298; B29D 11/00307
See application file for complete search history.

(56) References Cited

FOREIGN PATENT DOCUMENTS

| JP | 2009-251366 | | 10/2009 |
|---|---|---|---|
| JP | 2010-204635 | | 9/2010 |
| JP | 2010204635 A | * | 9/2010 |
| JP | 2011-141512 | | 7/2011 |
| JP | 2012-185239 | | 9/2012 |
| WO | WO 2010/071073 | | 6/2010 |

OTHER PUBLICATIONS

Official Action for European Patent Application No. 16751016.3, dated Nov. 14, 2019, 3 pages.
Official Action (with English translation) for Japanese Patent Application No. 2015-152920, dated Jul. 23, 2019, 18 pages.

* cited by examiner

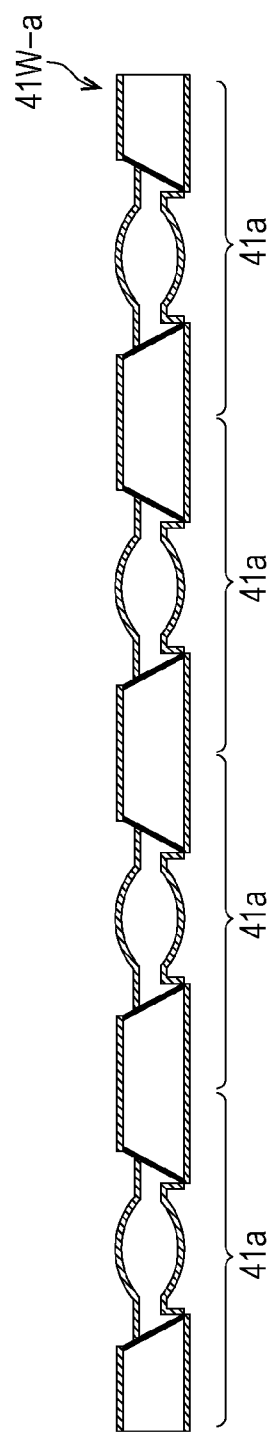
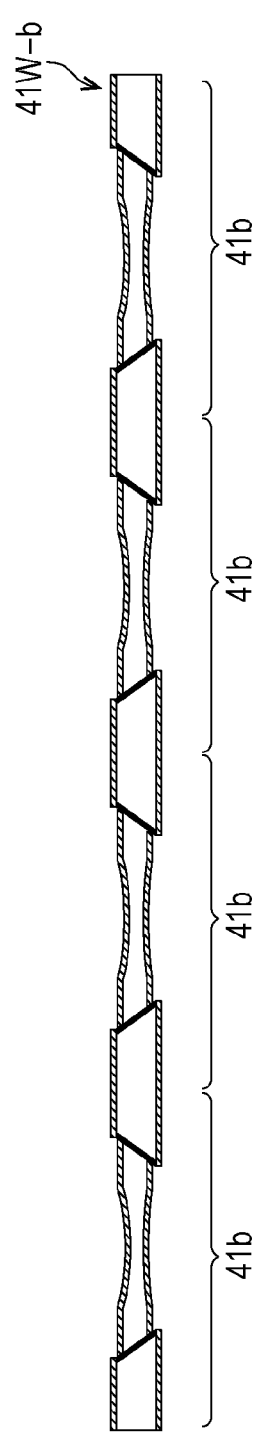
FIG. 30A
FIG. 30B

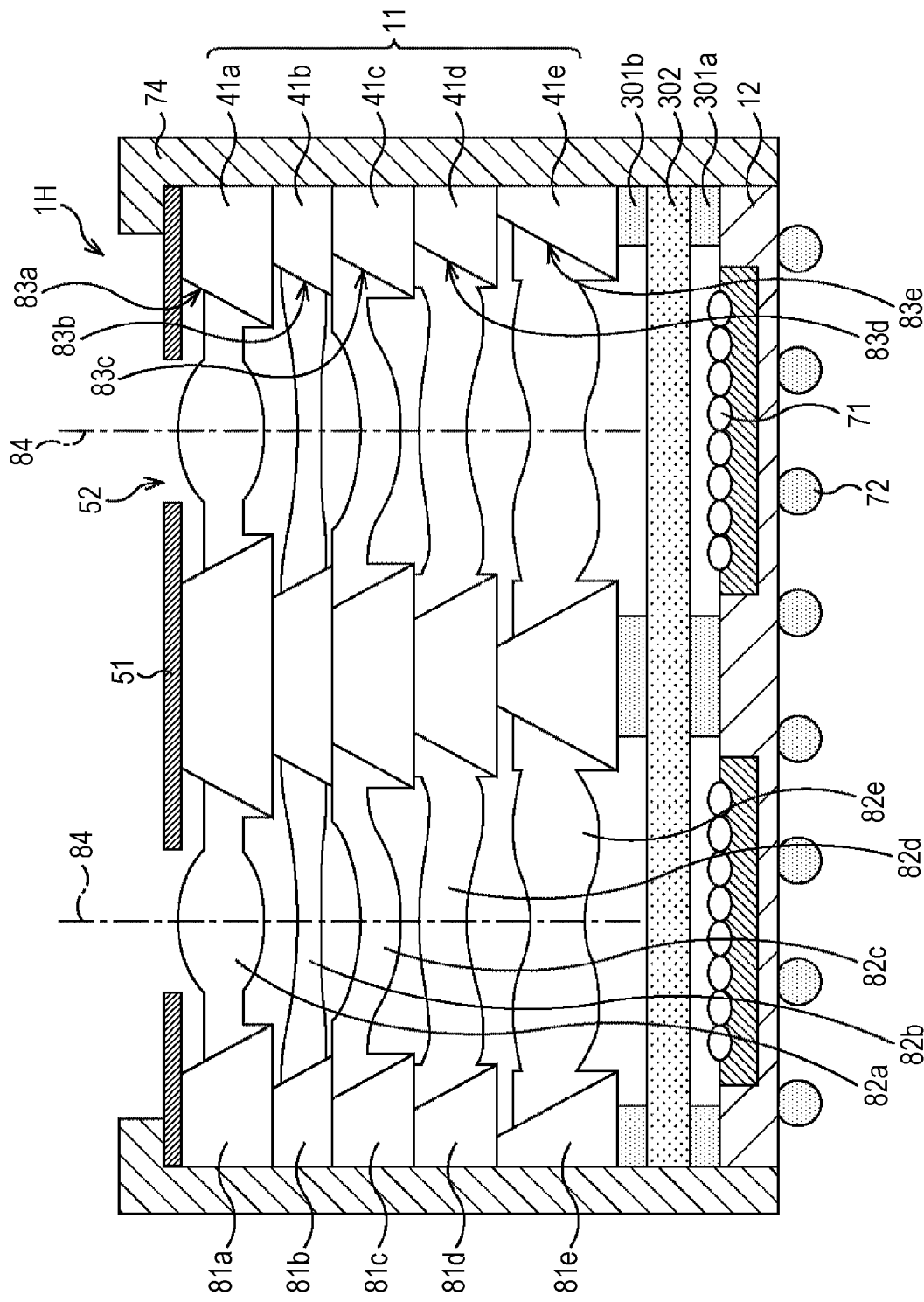

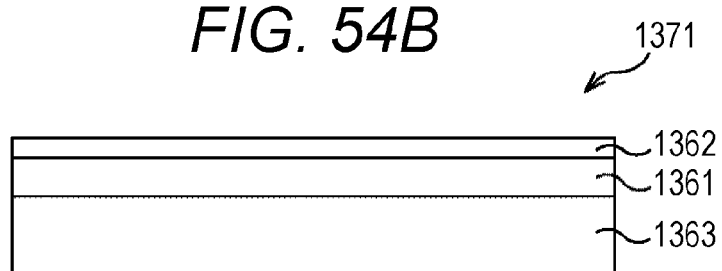

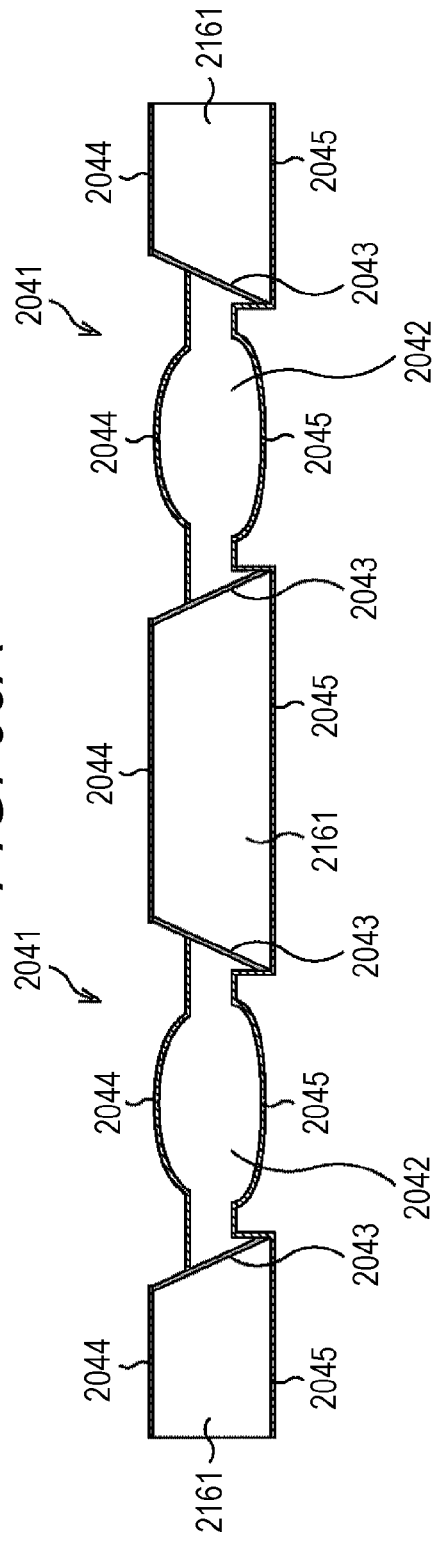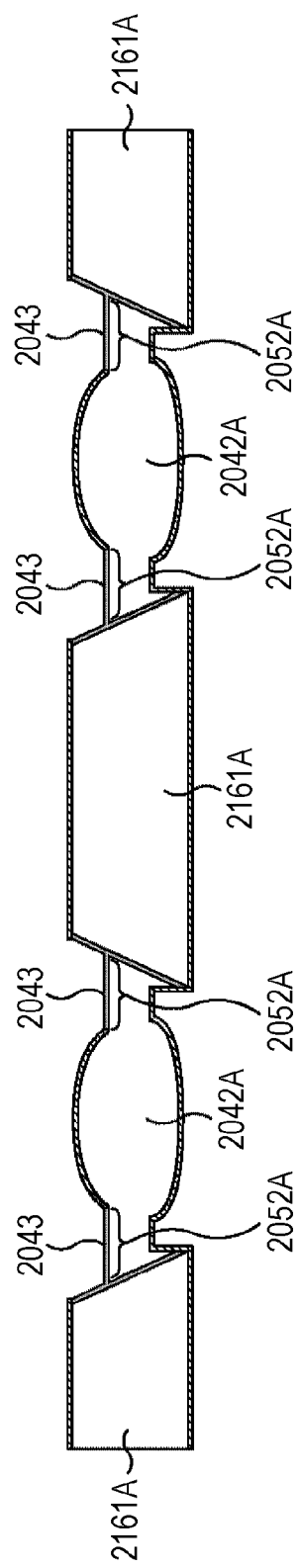

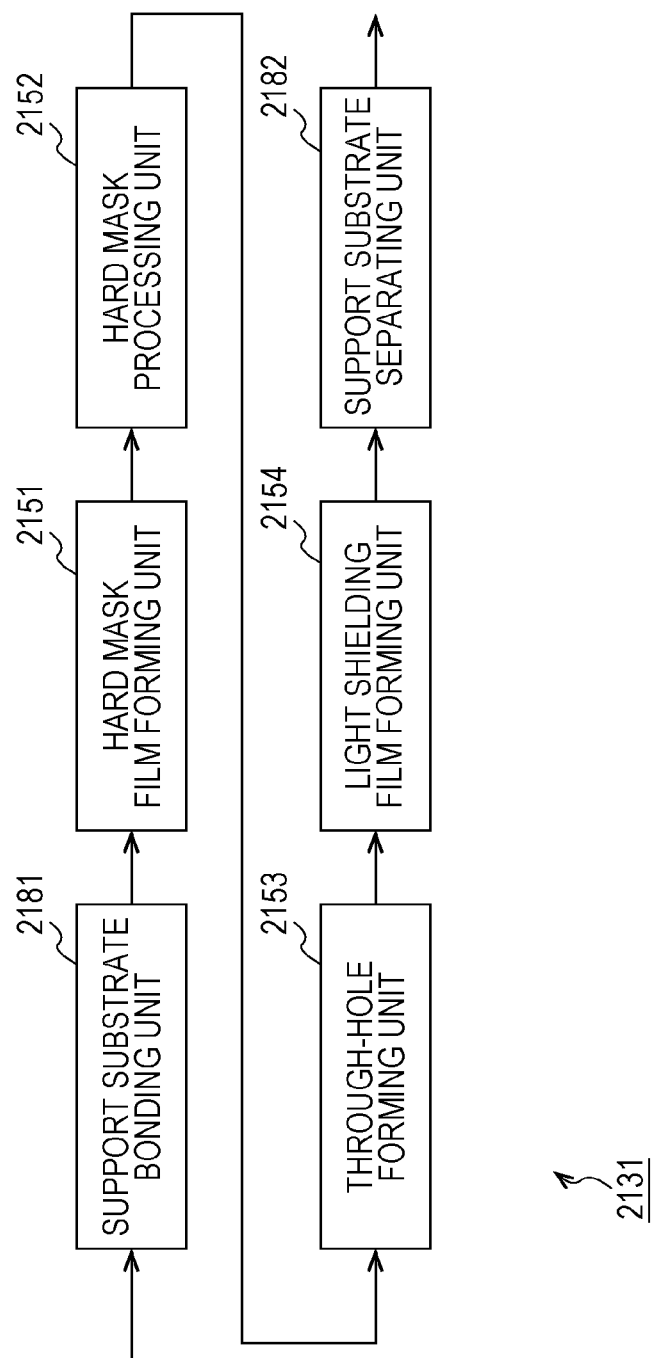

LENS ATTACHED SUBSTRATE, LAYERED LENS STRUCTURE, CAMERA MODULE, MANUFACTURING APPARATUS, AND MANUFACTURING METHOD

CROSS REFERENCE TO RELATED APPLICATIONS

This application is a continuation of U.S. patent application Ser. No. 15/559,489, filed Sep. 19, 2017, which is a national stage application under 35 U.S.C. 371 and claims the benefit of PCT Application No. PCT/JP2016/003349 having an international filing date of Jul. 15, 2016, which designated the United States, which PCT application claimed the benefit of Japanese Priority Patent Application JP 2015-152920 filed on Jul. 31, 2015, the entire contents of each of which are incorporated herein by reference.

TECHNICAL FIELD

The present technology relates to a lens attached substrate, a layered lens structure, a camera module, a manufacturing apparatus, and a manufacturing method. Particularly, the present technology relates to a lens attached substrate, a layered lens structure, a camera module, a manufacturing apparatus, and a manufacturing method that form a lens in a substrate which may be used to manufacture an electronic device such as a semiconductor device or a flat panel display device.

In a wafer level lens process in which a plurality of lenses is disposed on a wafer substrate in the planar direction, it is difficult to obtain the shape accuracy or the position accuracy when the lenses are formed. Particularly, a high level may be needed in a process of laminating the wafer substrates so as to manufacture a layered lens structure. Thus, it is difficult to laminate three layers or more in a mass-production level.

Various technologies have been contrived and proposed in the wafer level lens process. For example, as the related art, there are proposed a hybrid type lens in which a lens is formed on a glass substrate and a monolithic type wafer lens which is formed only by a resin material. Further, PTL 1 proposes a method of forming a lens in a through-hole of a substrate. Further, in order to sufficiently obtain the lens holding stability, an opening cross-sectional shape is defined so as to widen a contact area between resin and a substrate (other than a tapered shape). Alternatively, there is proposed a method of forming unevenness by blasting a side wall surface as a countermeasure for ghost or flare.

CITATION LIST

Patent Literature

PTL 1: JP 2011-180292 A

SUMMARY OF INVENTION

Technical Problem

However, there is a concern that a reflection is not sufficiently suppressed even when the unevenness is formed on the side wall surface of the through-hole by the blasting. Thus, there is a concern that the occurrence of the ghost or flare is not sufficiently suppressed and the image quality is degraded.

The present technology is made in view of such circumstances, and it is desirable to suppress degradation in image quality due to a wafer level lens.

Solution to Problem

A lens attached substrate of the present technology is a lens substrate including: a light-shielding film disposed on a side wall of the through-hole; and a lens portion disposed inside the through-hole of the substrate.

A method of manufacturing of the present technology includes: forming a through-hole in a substrate; forming a light-shielding film on a sidewall of the through-hole; and forming a lens portion within the through-hole such that the lens portion contacts the light-shielding film formed on the sidewall of the through-hole.

An electronic apparatus of the present technology includes: a plurality of lens substrates, each lens substrate of the plurality of substrates including: a substrate including a through-hole, a light-shielding film disposed on a sidewall of the through-hole, and a lens portion disposed inside the through-hole of the substrate; and a sensor substrate that includes an optical sensor.

Advantageous Effects of Invention

According to an embodiment of the present technology, degradation in image quality can be suppressed. Further, the present disclosure is not limited to the advantage described herein and any advantage described in the present disclosure may be used.

BRIEF DESCRIPTION OF DRAWINGS

FIGS. 30A and 30B are diagrams illustrating a state where substrate-like lens attached substrates are bonded to each other.

FIG. 34 is a diagram illustrating an eighth embodiment of a camera module that uses a layered lens structure according to an embodiment of the present technology.

FIG. 54A-54C are schematic diagrams illustrating the layered lens structure of FIG. 53.

FIGS. 66A and 66B are cross-sectional views illustrating an example of a lens attached substrate manufacturing state.

FIG. 69 is a block diagram illustrating a main configuration example of a carrier substrate processing unit.

DESCRIPTION OF EMBODIMENTS

Hereinafter, modes for carrying out the present technology (hereinafter, referred to as embodiments) will be described. Further, a description will be made according to the following sequence.

1. First Embodiment of Camera Module
2. Second Embodiment of Camera Module
3. Third Embodiment of Camera Module
4. Fourth Embodiment of Camera Module
5. Fifth Embodiment of Camera Module
6. Detailed Configuration of Camera Module of Fourth Embodiment
7. Sixth Embodiment of Camera Module
8. Seventh Embodiment of Camera Module
9. Detailed Configuration of Lens Attached Substrate
10. Lens Attached Substrate Manufacturing Method
11. Bonding of Lens Attached Substrates
12. Eighth and Ninth Embodiments of Camera Module
13. Tenth Embodiment of Camera Module
14. Eleventh Embodiment of Camera Module
15. Effect of Present Structure compared with Other Structure
16. Other Embodiment 1
17. Other Embodiment 2
18. Other Embodiment 3
19. Other Embodiment 4
20. Application Example to Electronic Device
21. Usage Example of Image Sensor
22. Software
23. Others 1. First Embodiment of Camera Module FIG. 1 are diagrams illustrating a first embodiment of a camera module that uses a layered lens structure according to an embodiment of the present technology.

Figure 1A:
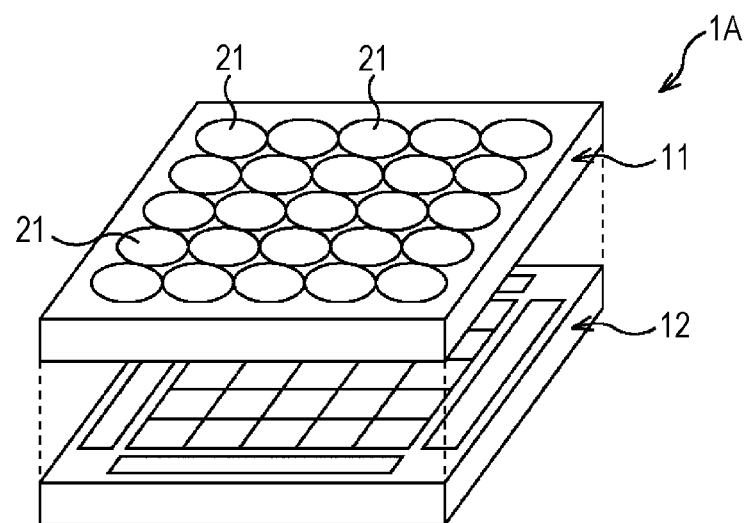
FIGS. 1A and 1B are diagrams illustrating a first embodiment of a camera module that uses a layered lens structure according to an embodiment of the present technology.
Figure 1B:
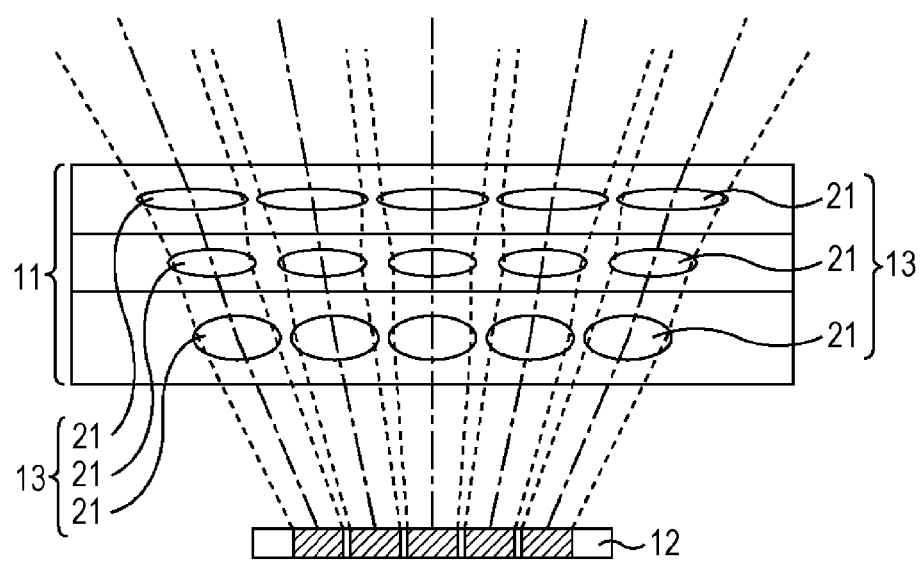

FIG. 1A is a schematic diagram illustrating the configuration of a camera module 1A as a first embodiment of a camera module 1. FIG. 1B is a schematic cross-sectional view of the camera module 1A.

The camera module 1A includes a layered lens structure 11 and a light receiving element 12. The layered lens structure 11 includes twenty five optical units 13 in total in which five optical units are provided in each of the lengthwise and widthwise directions. The optical unit 13 includes a plurality of lenses 21 in one optical axis direction. The camera module 1A is a compound-eye camera module with the optical units 13.

As illustrated in FIG. 1B, the optical axes of the plurality of optical units 13 of the camera module 1A are disposed so as to be widened toward the outside of the module and hence an image can be captured in a wide angle.

In FIG. 1B, the layered lens structure 11 is obtained by laminating three layers of the lenses 21 in order to simplify the drawings. However, it is needless to mention that more lenses 21 can be laminated.

The camera module 1A of FIG. 1 is able to produce one wide-angle image by matching a plurality of images captured by the plurality of optical units 13. Since the plurality of images matches, high accuracy is demanded in the formation and the arrangement of the optical units 13 capturing the images. Further, since particularly the wide-angle-side optical unit 13 has a small light incident angle toward the lens 21, high accuracy is demanded even in the positional relation and the arrangement of the lenses 21 in the optical unit 13.

Figure 2:
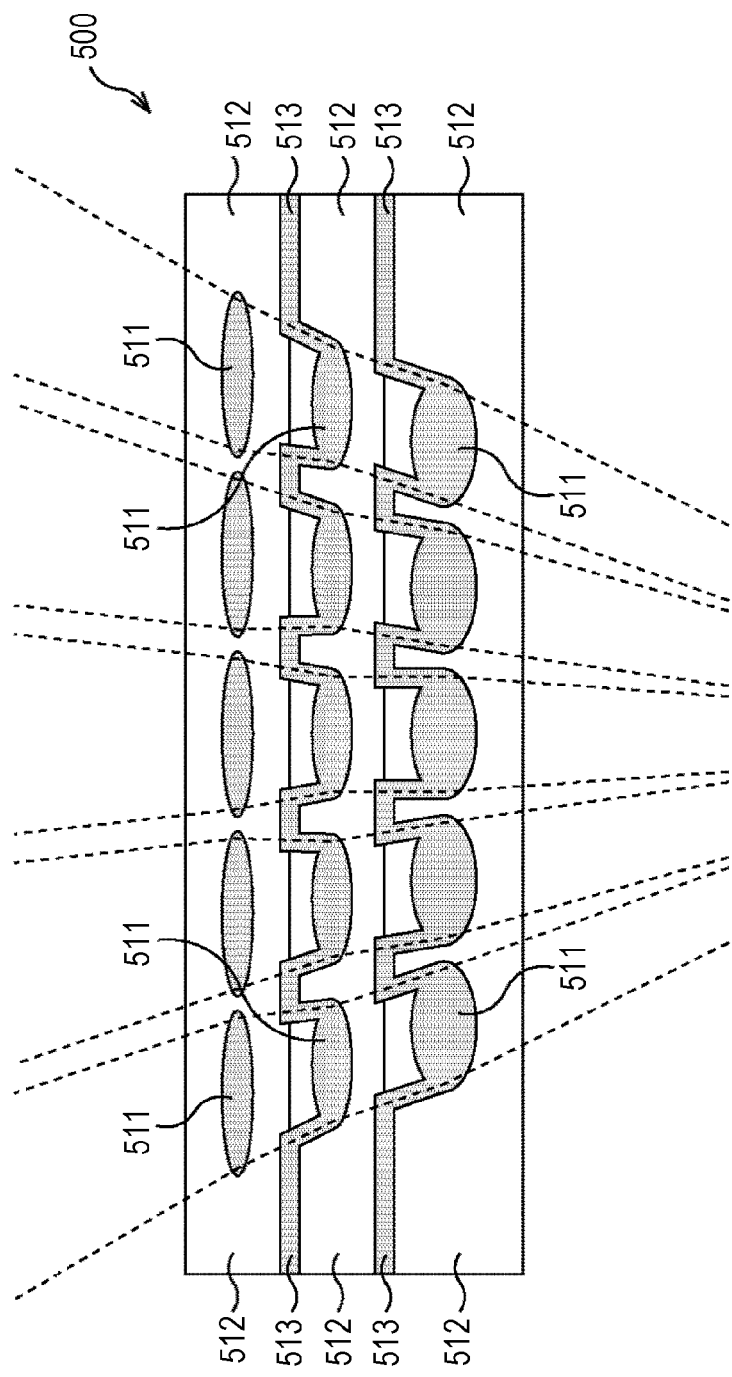
FIG. 2 is a cross-sectional structure diagram of a layered lens structure disclosed in PTL 1

FIG. 2 is a cross-sectional structure diagram of a layered lens structure that uses a fixing technology using resin of PTL 1.

In a layered lens structure 500 illustrated in FIG. 2, resin 513 is used to fix substrates 512 each including lenses 511. The resin 513 is energy curable resin such as UV curable resin.

Before the substrates 512 are bonded to each other, a layer of the resin 513 is formed on the entire surface of each substrate 512. Subsequently, the substrates 512 are bonded to each other and the resin 513 is cured therebetween. Accordingly, the substrates 512 bonded to each other are fixed.

However, the resin 513 is cured and contracted when the resin 513 is cured. In the case of the structure illustrated in FIG. 2, since the resin 513 is cured after the layer of the resin 513 is formed on the entire surface of each substrate 512, the displacement amount of the resin 513 increases.

Further, even when the layered lens structure 500 formed by bonding the substrates 512 to each other is divided and imaging elements are combined with each other so as to form a camera module, the layered lens structure 500 provided in the camera module has a configuration in which the resin 513 exists entirely between the substrates 512 including the lenses 511 as illustrated in FIG. 2. For this reason, when the camera module is mounted in a camera casing and is used for an actual purpose, there is a concern that the resin between the substrates of the layered lens structure 500 may be thermally expanded in accordance with an increase in temperature due to the heating of the apparatus.

Figure 3:
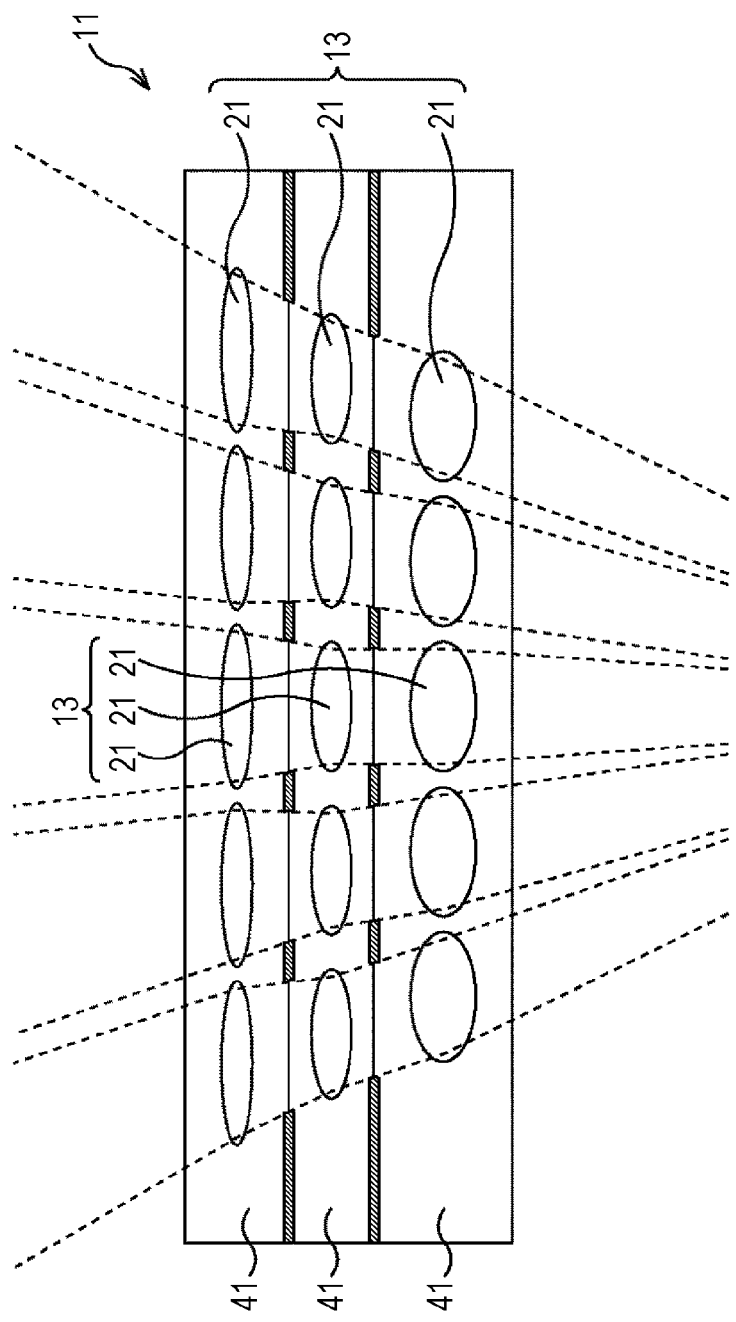
FIG. 3 is a cross-sectional structure diagram of the layered lens structure of the camera module of FIG. 1.

FIG. 3 is a cross-sectional structure diagram only illustrating the layered lens structure 11 of the camera module 1A of FIG. 1.

The layered lens structure 11 of the camera module 1A is also formed by laminating the lens attached substrates 41 each including the lenses 21.

In the layered lens structure 11 of the camera module 1A, the lens attached substrates 41 each including the lenses 21 are fixed to each other in a manner completely different from the layered lens structure 500 of FIG. 2 or the other related art.

Figure 4:
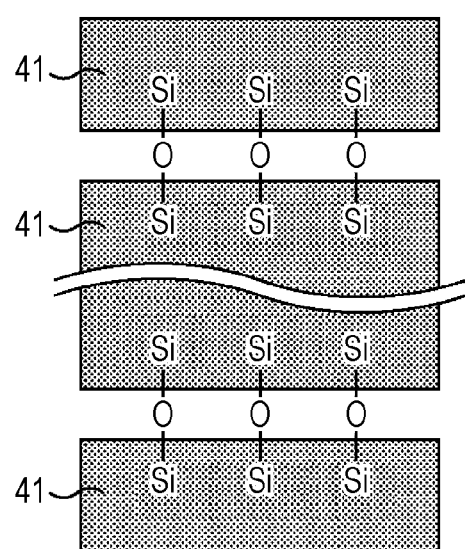
FIG. 4 is a diagram illustrating a state where lens attached substrates are directly bonded to each other.

That is, two lens attached substrates 41 to be laminated are directly bonded to each other by covalent binding between a surface layer of oxides or nitrides formed on one substrate surface and a surface layer of oxides or nitrides formed on the other substrate surface. As a detailed example, as illustrated in FIG. 4, a silicon oxide film or a silicon nitride film as a surface layer is formed on each surface of two lens attached substrates 41 to be laminated, a hydroxyl group is bound thereto, and hence two lens attached substrates 41 are bonded to each other. Then, a dehydration condensation occurs with an increase in temperature. As a result, silicon-oxygen covalent binding is formed between the surface layers of two lens attached substrates 41. Accordingly, two lens attached substrates 41 are directly bonded to each other. As a result of the condensation, the elements contained in two surface layers may directly cause covalent binding.

In the specification, the direct bonding method indicates a method of fixing two lens attached substrates 41 to each other through an inorganic layer disposed between two lens attached substrates 41, a method of fixing two lens attached substrates 41 to each other by the chemical bonding of inorganic layers respectively disposed on the surfaces of two lens attached substrates 41, a method of fixing two lens attached substrates 41 to each other by forming bonding by a dehydration condensation between inorganic layers respectively disposed on the surfaces of two lens attached substrates 41, a method of fixing two lens attached substrates 41 to each other by forming covalent binding through oxygen or covalent binding of elements contained in inorganic layers between inorganic layers respectively disposed on the surfaces of two lens attached substrates 41, or a method of fixing two lens attached substrates 41 to each other by forming silicon-oxygen covalent binding or silicon-silicon covalent binding between silicon oxide layers or silicon nitride layers respectively disposed on the surfaces of two lens attached substrates 41.

To perform the bonding and dehydration condensation in accordance with an increase in temperature, in the embodiment, a substrate used to manufacture a semiconductor device or a flat display device is used, a lens is formed in the form of a substrate, a dehydration condensation occurs in accordance with an increase in temperature due to the bonding in the form of the substrate, and hence bonding is performed according to covalent binding in the form of the substrate. A structure in which the inorganic layers formed on the surfaces of two lens attached substrates 41 are bonded to each other by covalent binding has an effect or an advantage of suppressing the deformation caused by the curing contraction of the resin 513 across the entire substrate or the deformation caused by the thermal expansion of the resin 513 in the actual usage state, which is a concern when the technology described in FIG. 2 and disclosed in PTL 1 is used.

Figure 5:
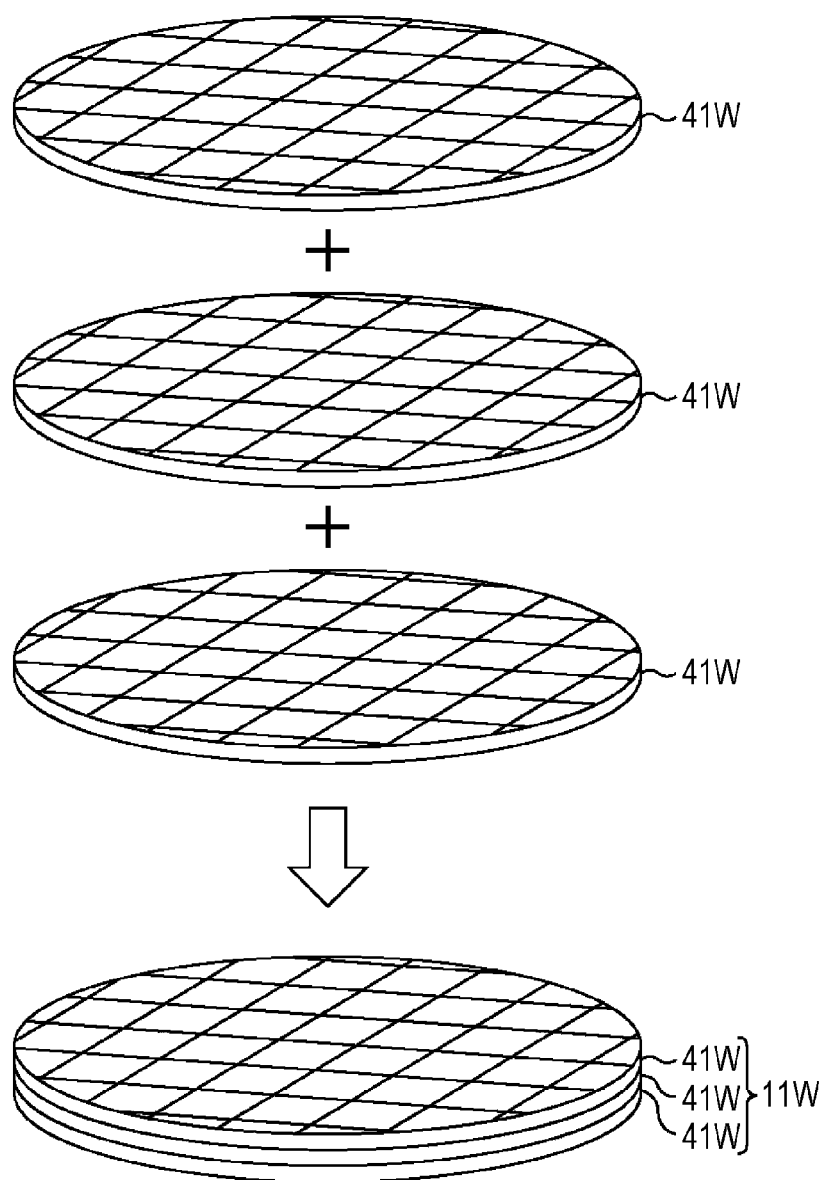
FIG. 5 is a diagram illustrating a step of forming the camera module of FIG. 1.
Figure 6:
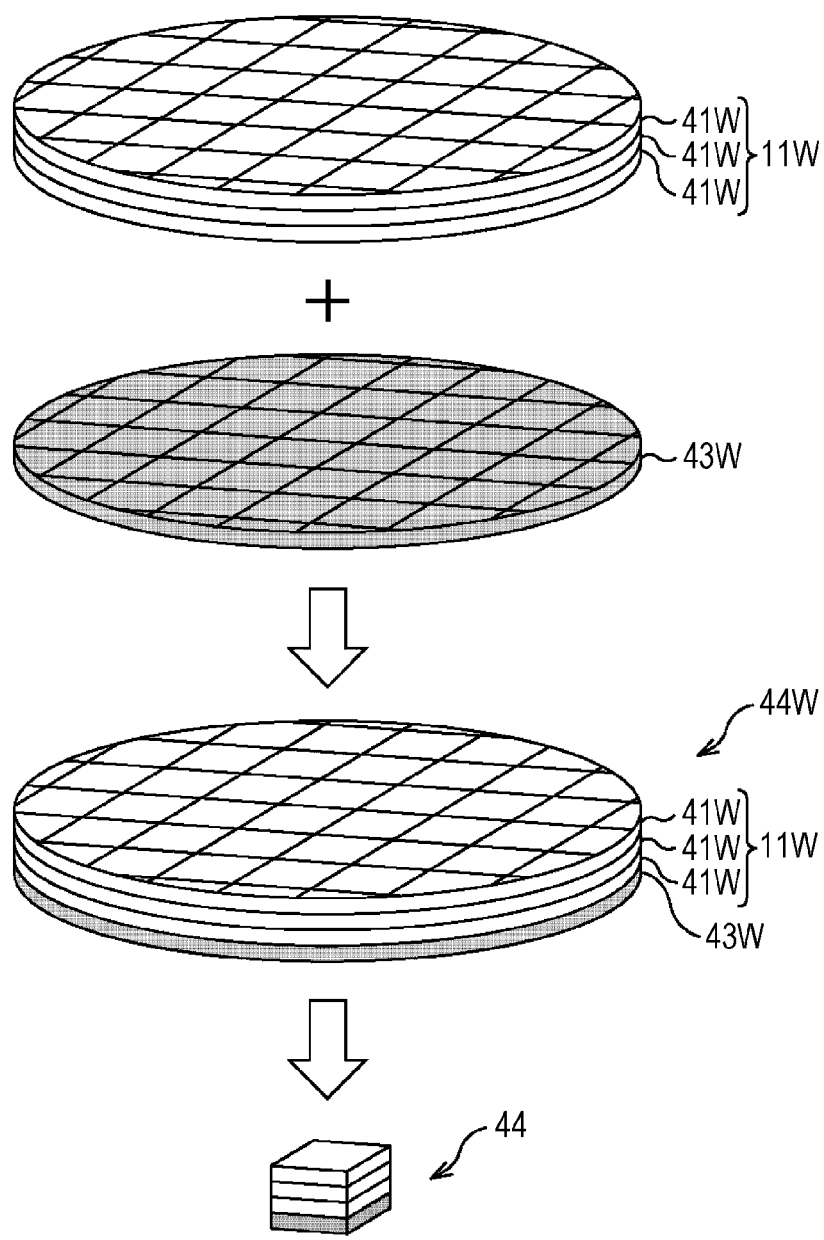
FIG. 6 is a diagram illustrating a state of forming the camera module of FIG. 1.

FIGS. 5 and 6 are diagrams illustrating a step of forming the camera module 1A of FIG. 1 obtained by the combination of the layered lens structure 11 and the light receiving element 12.

First, as illustrated in FIG. 5, a plurality of lens attached substrates 41W having the lenses 21 (not illustrated) formed in the planar direction is prepared and laminated. Accordingly, it is possible to obtain a substrate-like layered lens structure 11W in which the substrate-like lens attached substrates 41W are laminated.

Next, as illustrated in FIG. 6, a substrate-like sensor substrate 43W having the light receiving elements 12 formed in the planar direction is prepared while being manufactured separately from the substrate-like layered lens structure 11W illustrated in FIG. 5.

Then, a substrate-like camera module 44W is obtained in a manner such that an external terminal is brought into contact with each module of a substrate obtained by laminating and bonding the substrate-like sensor substrate 43W and the substrate-like layered lens structure 11W to each other.

Finally, the substrate-like camera module 44W is divided into the unit of a module or a chip. The divided camera module 44 is enclosed in a separately prepared casing (not illustrated), thereby obtaining the final camera module 44.

In addition, in the specification and the drawings, for example, a component denoted by the reference numeral with "W" as in the lens attached substrate 41W indicates a state where the lens attached substrate is prepared in the form of a substrate (a wafer) and a component denoted by the reference numeral without "W" as in the lens attached substrate 41 indicates a state where the lens attached substrate is divided into the unit of a module or a chip. In addition, the same applies to the sensor substrate 43W, the camera module 44W, and the like.

Figure 7:
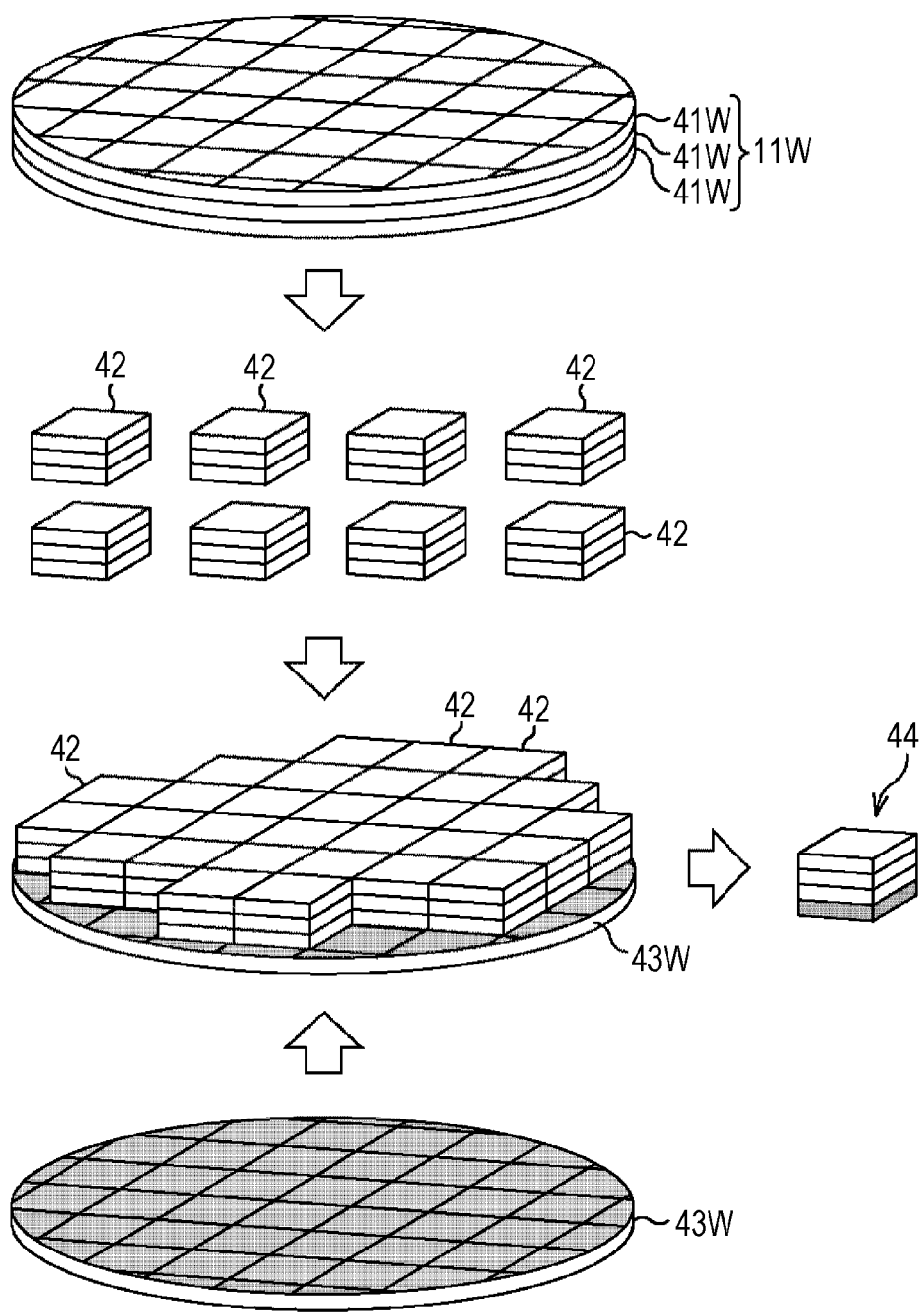
FIG. 7 is a diagram illustrating a different step of forming the camera module of FIG. 1.

FIG. 7 is a diagram illustrating a different step of forming the camera module 1A of FIG. 1 obtained by the combination of the layered lens structure 11 and the light receiving element 12.

First, the substrate-like layered lens structure 11W obtained by laminating the substrate-like lens attached substrates 41W is manufactured similarly to the above-described steps.

Next, the substrate-like layered lens structure 11W is divided.

Further, the substrate-like sensor substrate 43W is prepared while being manufactured separately from the substrate-like layered lens structure 11W.

Then, one divided layered lens structure 11 is mounted on each light receiving element 12 of the substrate-like sensor substrate 43W.

Finally, the substrate-like sensor substrate 43W having the divided layered lens structures 11 mounted thereon is divided into the unit of a module or a chip. The divided sensor substrate 43 having the layered lens structure 11 mounted thereon is enclosed in a separately prepared casing (not illustrated) and is brought into contact with an external terminal, thereby obtaining the final camera module 44.

In addition, as an example of a different step of forming the camera module 1A of FIG. 1 obtained by combining the layered lens structure 11 and the light receiving element 12, the divided camera module 44 can be obtained in a manner such that the substrate-like sensor substrate 43W illustrated in FIG. 7 is divided and each of the divided layered lens structures 11 is mounted on each light receiving element 12 obtained as a result of the division.

FIGS. 8A to 8H are diagrams illustrating the configuration of the lens attached substrate 41 of the camera module 1A.

Figure 8A:
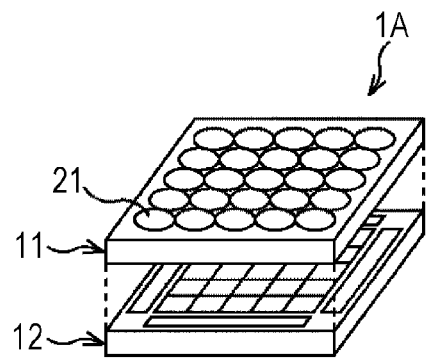
FIG. 8A-8H are diagrams illustrating the configuration of the lens attached substrate.

FIG. 8A is a schematic diagram illustrating the configuration of the camera module 1A similar to that of FIG. 1A.

Figure 8B:
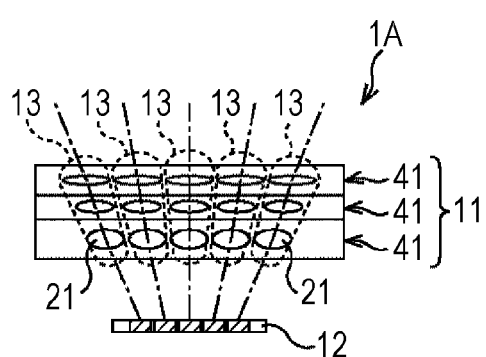

FIG. 8B is a schematic cross-sectional view of the camera module 1A similar to that of FIG. 1B.

As illustrated in FIG. 8B, the camera module 1A is a compound-eye camera module which includes the plurality of optical units 13 each having one optical axis and formed by the combination of the plurality of lenses 21. The layered lens structure 11 includes twenty-five optical units 13 in total so that five optical units are disposed in each of the lengthwise and widthwise directions.

In the camera module 1A, the optical axes of the plurality of optical units 13 are disposed so as to be widened toward the outside of the module. Accordingly, an image can be captured in a wide angle. In FIG. 8B, the layered lens structure 11 has a structure in which the lens attached substrate 41 is laminated only as three layers in order to simplify the drawings. However, it is needless to mention that the lens attached substrates 41 may be laminated as more layers.

Figure 8C:
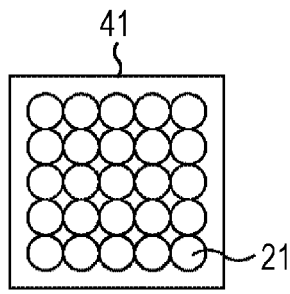
Figure 8D:
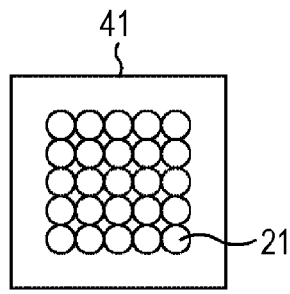
Figure 8E:
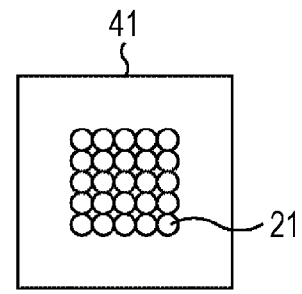

FIGS. 8C to 8E are diagrams illustrating the planar shapes of three layers of the lens attached substrates 41 constituting the layered lens structure 11.

FIG. 8C is a top view of the uppermost lens attached substrate 41 among three layers, FIG. 8D is a top view of the lens attached substrate 41 of the middle layer, and FIG. 8E is a top view of the lowermost lens attached substrate 41. Since the camera module 1 is the wide-angle compound-eye camera module, the diameter of the lens 21 increases and the pitch between the lenses increases as it goes toward the upper layer.

Figure 8F:
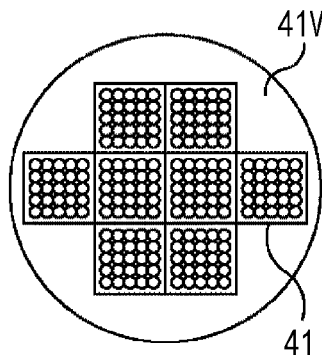
Figure 8G:
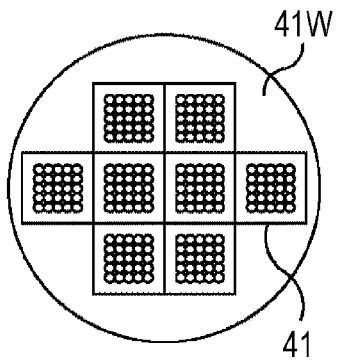
Figure 8H:
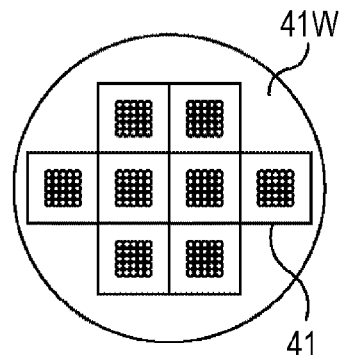

FIGS. 8F to 8H are top views of the substrate-like lens attached substrates 41W used to obtain the lens attached substrates 41 illustrated in FIGS. 8C to 8E.

The lens attached substrate 41W illustrated in FIG. 8F indicates a substrate state corresponding to the lens attached substrate 41 of FIG. 8C, the lens attached substrate 41W illustrated in FIG. 8G indicates a substrate state corresponding to the lens attached substrate 41 of FIG. 8D, and the lens attached substrate 41W illustrated in FIG. 8H indicates a substrate state corresponding to the lens attached substrate 41 of FIG. 8E.

The substrate-like lens attached substrates 41W illustrated in FIGS. 8F to 8H have a configuration in which eight camera modules 1A illustrated in FIG. 8A are obtained in each substrate.

In the lens attached substrates 41W of FIGS. 8F to 8H, the pitch between the lenses inside the lens attached substrate 41 as the unit of the module is different in the upper lens attached substrate 41W and the lower lens attached substrate 41W. Meanwhile, in the lens attached substrates 41W, the arrangement pitch of the lens attached substrate 41 as the unit of the module is uniform from the upper lens attached substrate 41W to the lower lens attached substrate 41W.

2. Second Embodiment of Camera Module

FIGS. 9A to 9H are diagrams illustrating a second embodiment of a camera module that uses a layered lens structure according to an embodiment of the present technology.

Figure 9A:
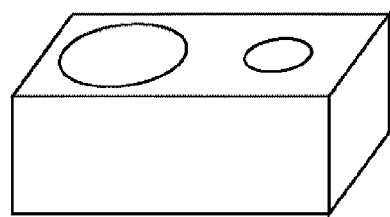
FIG. 9A-9H are diagrams illustrating a second embodiment of a camera module that uses a layered lens structure according to an embodiment of the present technology.
Figure 9B:
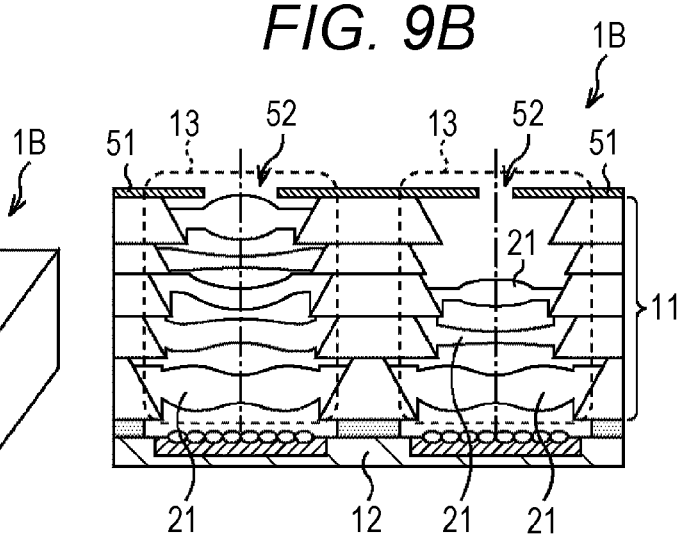

FIG. 9A is a schematic diagram illustrating the appearance of a camera module 1B as the second embodiment of the camera module 1. FIG. 9B is a schematic cross-sectional view of the camera module 1B.

The camera module 1B includes two optical units 13. Two optical units 13 have a configuration in which a diaphragm plate 51 is provided at the uppermost layer of the layered lens structure 11. The diaphragm plate 51 is provided with an opening portion 52.

The camera module 1B includes two optical units 13, but the optical parameters of two optical units 13 are different from each other. That is, the camera module 1B includes two kinds of optical units 13 having different optical performance. Two kinds of optical units 13 can include, for example, the optical unit 13 which has a short focal distance for capturing an image in a near distance and the optical unit 13 which has a long focal distance for capturing an image in a far distance.

Figure 9C:
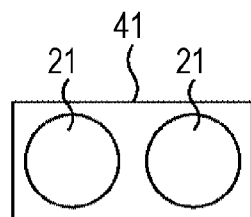
Figure 9D:
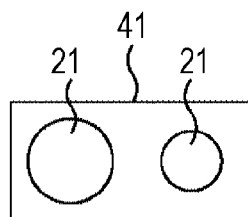
Figure 9E:
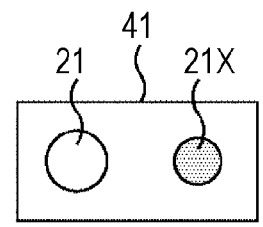

In the camera module 1B, since the optical parameters of two optical units 13 are different from each other, for example, the number of the lenses 21 of two optical units 13 is different as illustrated in FIG. 9B. Further, the diameter, the thickness, the surface shape, the volume, or the distance between the adjacent lenses may be different in the lenses 21 at the same layers of the layered lens structures 11 of two optical units 13. For this reason, as for the planar shape of the lens 21 of the camera module 1B, for example, as illustrated in FIG. 9C, two optical units 13 may have the same diameter of the lens 21. As illustrated in FIG. 9D, the lenses 21 may have different shapes. As illustrated in FIG. 9E, a void 21X may be formed so that the lens 21 is not provided at one side.

Figure 9F:
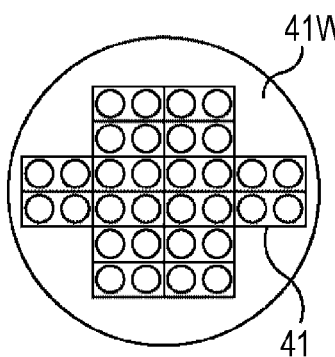
Figure 9G:
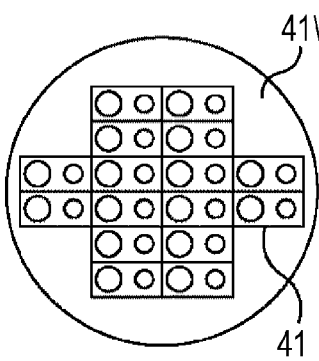
Figure 9H:
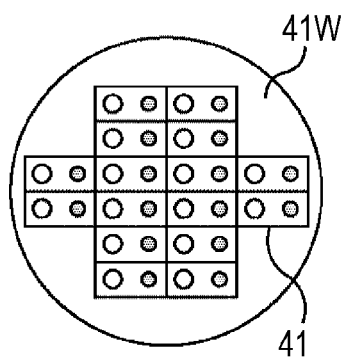

FIGS. 9F to 9H are top views of the substrate-like lens attached substrates 41W used to obtain the lens attached substrates 41 illustrated in FIGS. 9C to 9E.

The lens attached substrate 41W illustrated in FIG. 9F indicates a substrate state corresponding to the lens attached substrate 41 of FIG. 9C, the lens attached substrate 41W illustrated in FIG. 9G indicates a substrate state corresponding to the lens attached substrate 41 of FIG. 9D, and the lens attached substrate 41W illustrated in FIG. 9H indicates a substrate state corresponding to the lens attached substrate 41 of FIG. 9E.

The substrate-like lens attached substrates 41W illustrated in FIGS. 9F to 9H have a configuration in which sixteen camera modules 1B illustrated in FIG. 9A are obtained in each substrate.

As illustrated in FIGS. 9F to 9H, a lens having the same shape may be formed on the entire surface of the substrate-like lens attached substrate 41W, a lens having a different shape may be formed thereon, or a lens may be formed or may not be formed thereon in order to form the camera module 1B.

3. Third Embodiment of Camera Module

FIGS. 10A to 10F are diagrams illustrating a third embodiment of a camera module that uses a layered lens structure according to an embodiment of the present technology.

Figure 10A:
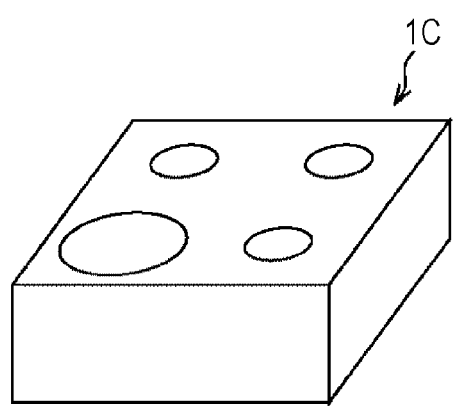
FIG. 10A-10F are diagrams is a diagram illustrating a third embodiment of a camera module that uses a layered lens structure according to an embodiment of the present technology.
Figure 10B:
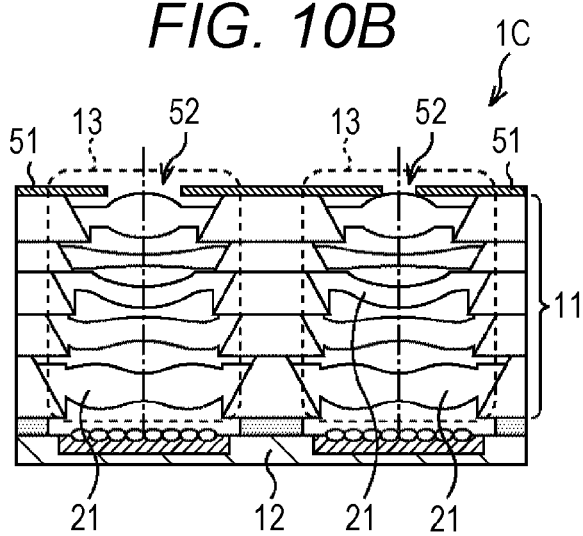

FIG. 10A is a schematic diagram illustrating the appearance of a camera module 1C as the third embodiment of the camera module 1. FIG. 10B is a schematic cross-sectional view of the camera module 1C.

The camera module 1C includes four optical units 13 in total in which two optical units are provided in each of the lengthwise and widthwise directions of the light incident surface. Four optical units 13 are formed so that the lens 21 has the same shape.

Figure 10C:
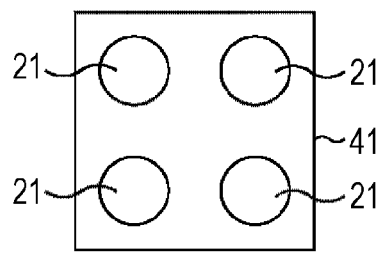
Figure 10D:
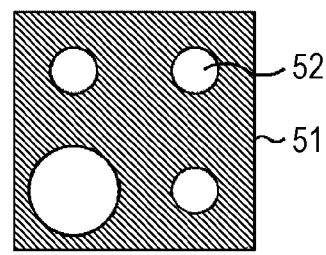

Four optical units 13 are formed so that the diaphragm plate 51 is provided at the uppermost layer of the layered lens structure 11, but the size of the opening portion 52 of the diaphragm plate 51 is different in four optical units 13. Accordingly, the camera module 1C can realize, for example, the camera module 1C as below. That is, for example, an anti-crime monitoring camera can increase an aperture stop only in a pixel for capturing a monochrome image in the nighttime having low illumination in the camera module 1C that uses the light receiving element 12 including a light receiving pixel used to monitor a color image in the daytime and receiving three kinds of RGB light by the use of three kinds of RGB color filters and including a light receiving pixel used to monitor a monochrome image in the nighttime without using the RGB color filters. For this reason, for example, the lens 21 of each camera module 1C has a planar shape in which the diameters of the lenses 21 of four optical units 13 are equal to one another as illustrated in FIG. 10C. Further, the size of the opening portion 52 of the diaphragm plate 51 is different in accordance with the optical unit 13 as illustrated in FIG. 10D.

Figure 10E:
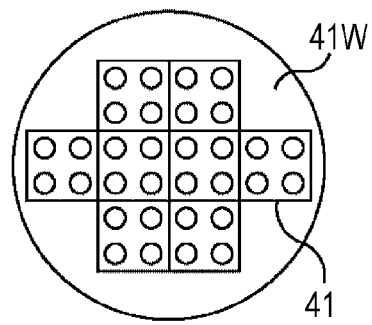
Figure 10F:
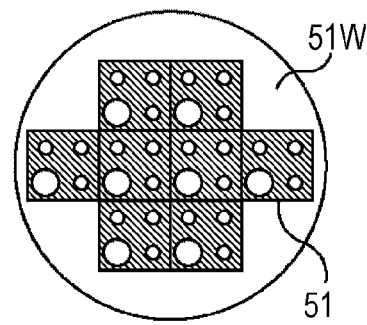

FIG. 10E is a top view of the substrate-like lens attached substrate 41W used to obtain the lens attached substrate 41 illustrated in FIG. 10C. FIG. 10F is a top view illustrating a diaphragm plate 51W provided in the form of a substrate in order to obtain the diaphragm plate 51 illustrated in FIG. 10D.

The substrate-like lens attached substrate 41W of FIG. 10E and the substrate-like diaphragm plate 51W of FIG. 10F have a configuration in which eight camera modules 1C illustrated in FIG. 10A are obtained in each substrate.

As illustrated in FIG. 10F, in the diaphragm plate 51W provided in the form of a substrate, the opening portion 52 having a different size can be set in each optical unit 13 of the camera module 1C in order to form the camera module 1C.

4. Fourth Embodiment of Camera Module

FIGS. 11A to 11D are diagrams illustrating a fourth embodiment of a camera module that uses a layered lens structure according to an embodiment of the present technology.

Figure 11A:
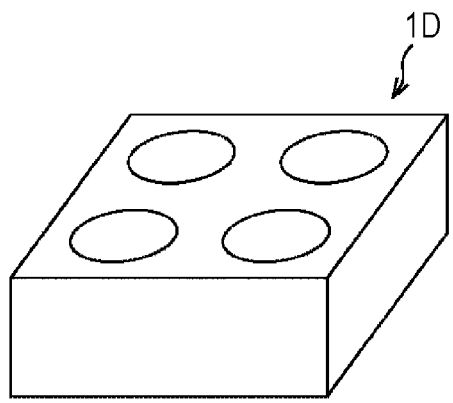
FIG. 11A-11D are diagrams is a diagram illustrating a fourth embodiment of a camera module that uses a layered lens structure according to an embodiment of the present technology.
Figure 11B:
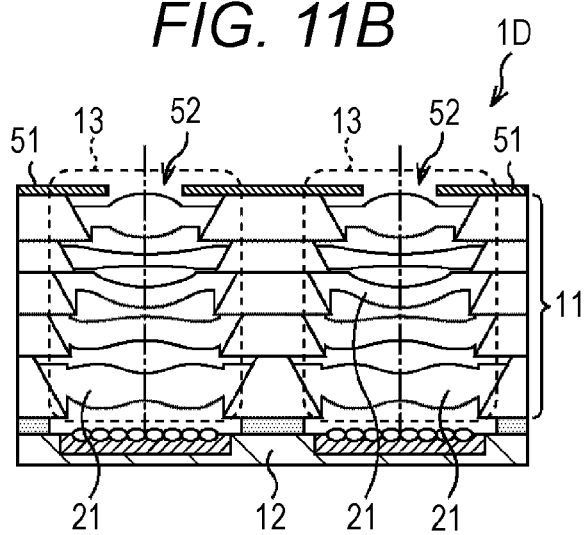

FIG. 11A is a schematic diagram illustrating the appearance of a camera module 1D as the fourth embodiment of the camera module 1. FIG. 11B is a schematic cross-sectional view of the camera module 1D.

The camera module 1D includes four optical units 13 in total in which two optical units are provided in the lengthwise and widthwise directions of the light incident surface similarly to the camera module 1C. Four optical units 13 are formed so as to have the same shape of the lens 21 and the same size of the opening portion 52 of the diaphragm plate 51.

In the camera module 1D, the optical axes of two optical units 13 provided in each of the lengthwise and widthwise directions on the light incident surface extend in the same direction. The one-dotted chain line illustrated in FIG. 11B indicates each of the optical axes of the optical units 13. Since the camera module 1D with such a configuration uses a super-resolution technology, the camera module 1D is suitably used to capture a high-resolution image compared with the case where an image is captured by one optical unit 13.

In the camera module 1D, since an image is captured by the plurality of light receiving elements 12 disposed at different positions while the optical axes of each of the lengthwise and widthwise directions are aligned in the same direction or an image is captured by the light receiving pixel in a different area within one light receiving element 12, it is possible to obtain a plurality of images which may be different from one another while the optical axes are aligned in the same direction. Thus, it is possible to obtain a high-resolution image by combining the image data according to places of the plurality of different images. For this reason, it is desirable to form the planar shape of the lens 21 of one camera module 1D so that four optical units 13 are similar to one another as illustrated in FIG. 11C.

Figure 11C:
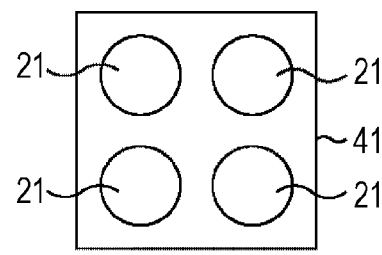
Figure 11D:
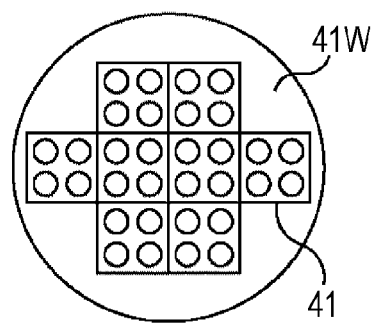

FIG. 11D is a top view of the substrate-like lens attached substrate 41W used to obtain the lens attached substrate 41 illustrated in FIG. 11C. The substrate-like lens attached substrate 41W has a configuration in which eight camera modules 1D illustrated in FIG. 1A are obtained in each substrate.

As illustrated in FIG. 11D, in the substrate-like lens attached substrate 41W, the camera module 1D includes the plurality of lenses 21 in order to form the camera module 1D and a plurality of lens groups for one module is disposed on the substrate at the same pitch.

5. Fifth Embodiment of Camera Module

FIGS. 12A to 12D are diagrams illustrating a fifth embodiment of a camera module that uses a layered lens structure according to an embodiment of the present technology.

Figure 12A:
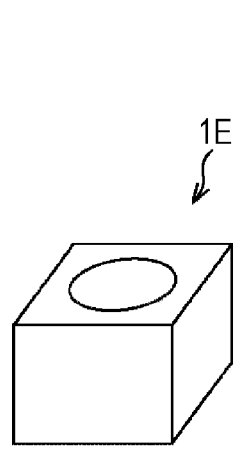
FIG. 12A-12D are diagrams is a diagram illustrating a fifth embodiment of a camera module that uses a layered lens structure according to an embodiment of the present technology.
Figure 12B:
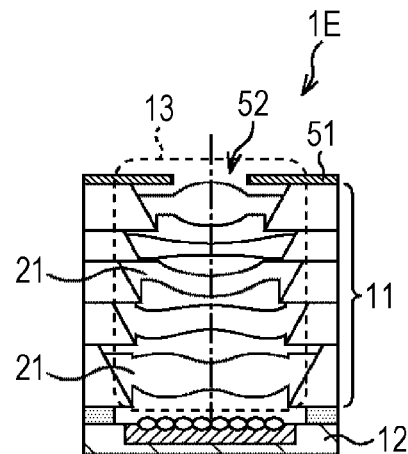

FIG. 12A is a schematic diagram illustrating the appearance of a camera module 1E as the fifth embodiment of the camera module 1. FIG. 12B is a schematic cross-sectional view of the camera module 1E.

The camera module 1E is a single-eye camera module in which the optical unit 13 having one optical axis is provided in the camera module 1E.

Figure 12C:
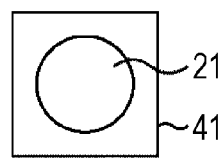

FIG. 12C is a top view of the lens attached substrate 41 showing the planar shape of the lens 21 of the camera module 1E. The camera module 1E includes one optical unit 13.

Figure 12D:
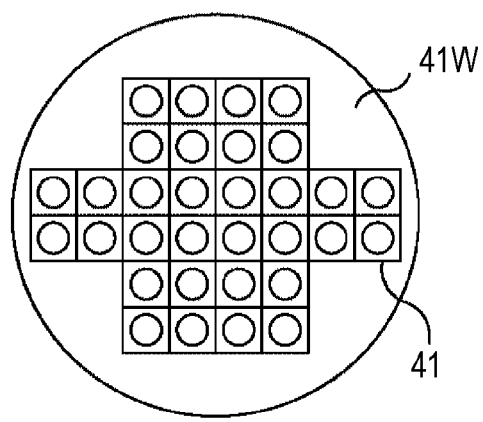

FIG. 12D is a top view of the substrate-like lens attached substrate 41W used to obtain the lens attached substrate 41 illustrated in FIG. 12C. The substrate-like lens attached substrate 41W has a configuration in which thirty two camera modules 1E illustrated in FIG. 12A are obtained in each substrate.

As illustrated in FIG. 12D, in the substrate-like lens attached substrate 41W, the plurality of lenses 21 for the camera module 1E is disposed on the substrate at the same pitch.

6. Detailed Configuration of Camera Module of Fourth Embodiment

Next, the detailed configuration of the camera module 1D according to the fourth embodiment illustrated in FIGS. 11A to 11D will be described with reference to FIG. 13.

Figure 13:
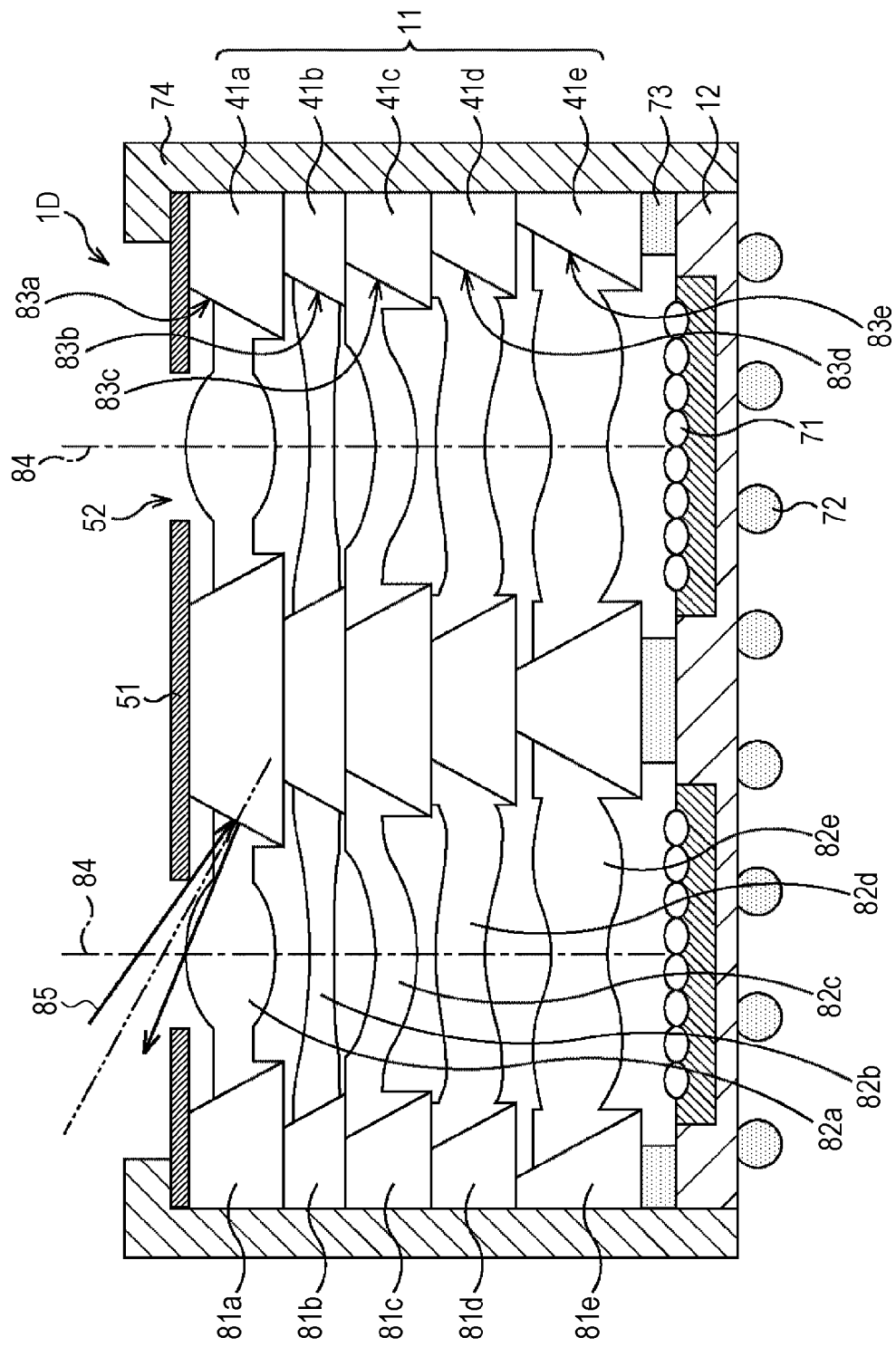
FIG. 13 is a diagram illustrating the detailed configuration of the camera module according to the fourth embodiment.

FIG. 13 is a cross-sectional view of the camera module 1D illustrated in FIG. 11B.

The camera module 1D includes the layered lens structure 11 obtained by laminating the plurality of lens attached substrates 41a to 41e and the light receiving element 12. The layered lens structure 11 includes the plurality of optical units 13. A one-dotted chain line 84 indicates the optical axis of each of the optical units 13. The light receiving element 12 is disposed at the lower side of the layered lens structure 11. In the camera module 1D, light which is incident to the camera module 1D from the upside is transmitted through the layered lens structure 11 and is received by the light receiving element 12 disposed at the lower side of the layered lens structure 11.

The layered lens structure 11 includes five lens attached substrates 41a to 41e provided in a lamination state. If there is no need to particularly distinguish five lens attached substrates 41a to 41e, these lens attached substrates will be simply described as the lens attached substrate 41.

Each through-hole 83 of the lens attached substrates 41 constituting the layered lens structure 11 is formed in a so-called downward narrowed shape in which an opening width decreases as it goes downward (toward the light receiving element 12).

The diaphragm plate 51 is disposed on the layered lens structure 11. The diaphragm plate 51 includes, for example, a layer formed of a material having a light absorbing property or a light shielding property. The diaphragm plate 51 is provided with the opening portion 52.

The light receiving element 12 is configured as, for example, a front surface irradiation type or a rear surface irradiation type complementary metal oxide semiconductor (CMOS) image sensor. An on-chip lens 71 is formed on the upper surface of the light receiving element 12 near the layered lens structure 11 and an external terminal 72 used to input and output a signal is formed on the lower surface of the light receiving element 12.

The layered lens structure 11, the light receiving element 12, the diaphragm plate 51, and the like are received in a lens barrel 74.

A structure material 73 is disposed on the light receiving element 12. The layered lens structure 11 and the light receiving element 12 are fixed to each other through the structure material 73. The structure material 73 is formed of, for example, an epoxy resin.

In the embodiment, the layered lens structure 11 includes five lens attached substrates 41a to 41e provided in a lamination state, but the number of the laminated lens attached substrates 41 is not particularly limited as long as two or more lens attached substrates are laminated.

Each of the lens attached substrates 41 constituting the layered lens structure 11 has a configuration in which a lens resin portion 82 is added to a carrier substrate 81. The carrier substrate 81 includes the through-hole 83 and the lens resin portion 82 is formed inside the through-hole 83. The lens resin portion 82 indicates a portion integrated by the material forming the lens 21 together with a portion which includes the lens 21 and extends to the carrier substrate 81 so as to carry the lens 21.

In addition, when there is a need to distinguish the carrier substrate 81, the lens resin portion 82, or the through-hole 83 of each of the lens attached substrates 41a to 41e, a description will be made on the assumption that carrier substrates 81a to 81e, lens resin portions 82a to 82e, and through-holes 83a to 83e respectively correspond to the lens attached substrates 41a to 41e as illustrated in FIG. 13.

<Detailed Description of Lens Resin Portion>

Next, the shape of the lens resin portion 82 will be described by exemplifying the lens resin portion 82a of the lens attached substrate 41a.

Figure 14:
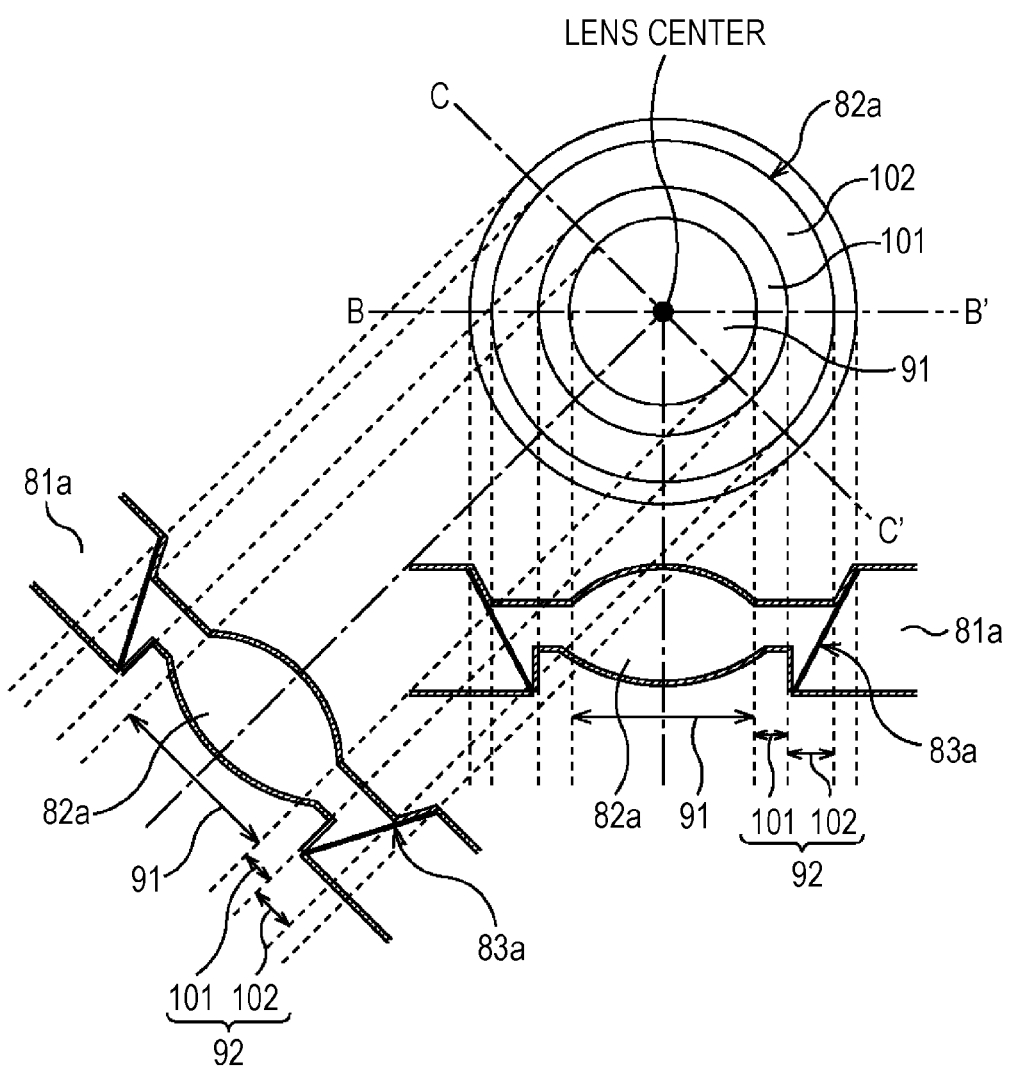
FIG. 14 illustrates a top view and cross-sectional views of a carrier substrate and a lens resin portion.

FIG. 14 illustrates a top view and cross-sectional views of the carrier substrate 81a and the lens resin portion 82a constituting the lens attached substrate 41a.

The cross-sectional views of the carrier substrate 81a and the lens resin portion 82a illustrated in FIG. 14 correspond to the cross-sectional views taken along the lines B-B' and C-C' of the top view.

The lens resin portion 82a is a portion which is integrated by the material forming the lens 21 and includes a lens portion 91 and a carrying portion 92. In the description above, the lens 21 corresponds to the entire lens portion 91 or the entire lens resin portion 82a.

The lens portion 91 is a portion which serves as a lens. In other words, the lens portion is a "portion which collects or scatters light by deflecting light", a "portion including a non-spherical curved surface such as a convex surface or a concave surface", or a "portion in which a plurality of polygonal shapes used as lenses in terms of Fresnel screen or diffraction grating is sequentially disposed".

The carrying portion 92 is a portion which extends from the lens portion 91 to the carrier substrate 81a so as to carry the lens portion 91. The carrying portion 92 includes an arm portion 101 and a leg portion 102 and is located at the outer periphery of the lens portion 91.

The arm portion 101 is a portion which disposed at the outside of the lens portion 91 so as to contact the lens portion 91 and extends outward with a uniform film thickness from the lens portion 91. The leg portion 102 is a portion not included in the arm portion 101 in the carrying portion 92 and includes a portion contacting the side wall of the through-hole 83a. It is desirable that the film thickness of the resin of the leg portion 102 be thicker than that of the arm portion 101.

The through-hole 83a of the carrier substrate 81a has a circular planar shape and the cross-sectional shape thereof is naturally the same regardless of the diametrical direction. Even in the shape of the lens resin portion 82a as the shape determined by the shapes of the upper die and the lower die during the lens forming process, the cross-sectional shape is the same regardless of the diametrical direction.

Figure 15:
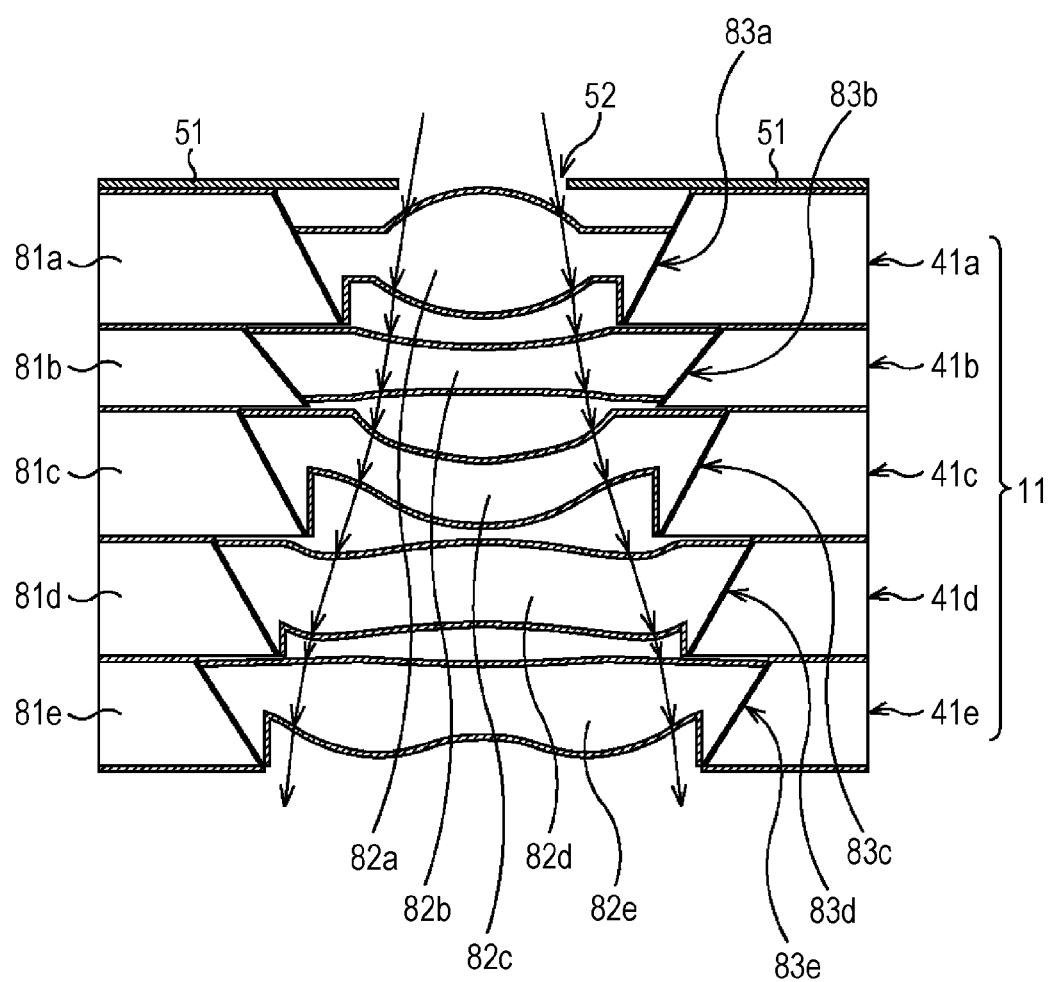
FIG. 15 is a cross-sectional view illustrating a layered lens structure and a diaphragm plate.

FIG. 15 is a cross-sectional view illustrating the layered lens structure 11 and the diaphragm plate 51 as a part of the camera module 1D of FIG. 13.

In the camera module 1D, light which is incident to the module is narrowed by the diaphragm plate 51, is widened inside the layered lens structure 11, and is incident to the light receiving element 12 (which is not illustrated in FIG. 15) disposed at the lower side of the layered lens structure 11. That is, according to the overall survey of the layered lens structure 11, the light which is incident to the module travels so as to be substantially widened downward from the opening portion 52 of the diaphragm plate 51. For this reason, as an example of the size of the lens resin portion 82 of the layered lens structure 11, in the layered lens structure 11 of FIG. 15, the lens resin portion 82a provided in the lens attached substrate 41a disposed directly below the diaphragm plate 51 is the smallest and the lens resin portion 82e provided in the lens attached substrate 41e disposed on the lowermost layer of the layered lens structure 11 is the largest.

If the thickness of the lens resin portion 82 of the lens attached substrate 41 is uniform, it is difficult to manufacture a large lens compared with a small lens. This is because of, for example, a reason in which the lens is easily deformed by a load applied to the lens when the lens is manufactured and the strength of the large lens is not easily maintained. For this reason, it is desirable that a large lens be thicker than a small lens. For this reason, in the layered lens structure 11 of FIG. 15, the thickness of the lens resin portion 82 is such that the lens resin portion 82e provided in the lens attached substrate 41e disposed on the lowermost layer is the thickest.

The layered lens structure 11 of FIG. 15 has at least one of the following characteristics in order to improve the degree of freedom in the design of the lens.

(1) The thickness of the carrier substrate 81 is different in at least the plurality of lens attached substrates 41 constituting the layered lens structure 11. For example, the thickness of the carrier substrate 81 is large in the lower lens attached substrate 41.

(2) The opening width of the through-hole 83 of the lens attached substrate 41 is different in at least the plurality of lens attached substrates 41 constituting the layered lens structure 11. For example, the opening width of the through-hole 83 is large in the lower lens attached substrate 41.

(3) The diameter of the lens portion 91 provided in the lens attached substrate 41 is different in at least the plurality of lens attached substrates 41 constituting the layered lens structure 11. For example, the diameter of the lens portion 91 is large in the lens portion 91 of the lower lens attached substrate 41.

(4) The thickness of the lens portion 91 provided in the lens attached substrate 41 is different in at least the plurality of lens attached substrates 41 constituting the layered lens structure 11. For example, the thickness of the lens portion 91 is large in the lens portion 91 of the lower lens attached substrate 41.

(5) The distance between the lenses provided in the lens attached substrate 41 is different in at least the plurality of lens attached substrates 41 constituting the layered lens structure 11.

(6) The volume of the lens resin portion 82 provided in the lens attached substrate 41 is different in at least the plurality of lens attached substrates 41 constituting the layered lens structure 11. For example, the volume of the lens resin portion 82 is large in the lens resin portion 82 of the lower lens attached substrate 41.

(7) The material of the lens resin portion 82 provided in the lens attached substrate 41 is different in at least the plurality of lens attached substrates 41 constituting the layered lens structure 11.

Generally, the light which is incident to the camera module includes vertical incident light and entering incident light. Most of the entering incident light contacts the diaphragm plate 51 so that the light is absorbed or is reflected toward the outside of the camera module 1D. There is a possibility that the entering incident light which is not narrowed by the diaphragm plate 51 may be reflected while contacting the side wall of the through-hole 83 according to the incident angle.

The traveling direction of the reflected light of the entering incident light is determined by the incident angle of the entering incident light 85 and the angle of the side wall of the through-hole 83 illustrated in FIG. 13. In the case of a so-called downward widened shape in which the opening width of the through-hole 83 increases from the light incident side toward the light receiving element 12, when the entering incident light 85 having a specific incident angle and not narrowed by the diaphragm plate 51 contacts the side wall of the through-hole 83, the light is reflected in the direction of the light receiving element 12 and the light may become stray light or noise light.

However, in the layered lens structure 11 illustrated in FIG. 13, as illustrated in FIG. 15, the through-hole 83 has a so-called downward narrowed shape in which the opening width decreases downward (toward the light receiving element 12). In the case of this shape, the entering incident light 85 contacting the side wall of the through-hole 83 is reflected in the upward direction, that is, the incident direction instead of the downward direction, that is, the direction of the light receiving element 12. Accordingly, it is possible to obtain an operation or effect of suppressing the occurrence of stray light or noise light.

It is desirable that a light absorbing material be disposed on the side wall of the through-hole 83 of the lens attached substrate 41 in order to reduce the amount of the light reflected while contacting the side wall.

As an example, if light (for example, visible light) having a wavelength to be received when the camera module 1D is used as the camera is set as first light and light (for example, UV light) having a wavelength different from the first light is set as second light, a layer of a material having a light absorbing property with respect to the first light (visible light) may be formed on the side wall of the through-hole 83 in a manner such that a material obtained by dispersing carbon particles as a material of absorbing the first light (visible light) in the resin cured by the second light (UV light) is applied or sprayed onto the surface of the carrier substrate 81, only the resin of the side wall of the through-hole 83 is cured by the irradiation with the second light (UV light), and the resin of the other area is removed.

The layered lens structure 11 illustrated in FIG. 15 is an example of a structure in which the diaphragm plate 51 is disposed on the uppermost substrate of the plurality of laminated lens attached substrates 41. The diaphragm plate 51 may be disposed while being inserted into any one of the intermediate lens attached substrates 41 instead of the uppermost substrate of the plurality of laminated lens attached substrates 41.

As another example, a layer of a material having a light absorbing property may be formed on the surface of the lens attached substrate 41 so as to be served as a diaphragm instead of the plate-like diaphragm plate 51 formed separately from the lens attached substrate 41. For example, the diaphragm may be formed on the surface of the lens attached substrate 41 in a manner such that a material obtained by dispersing carbon particles as a material of absorbing the first light (visible light) in the resin cured by the second light (UV light) is applied or sprayed onto the surface of the lens attached substrate 41, the resin of an area except for a desired light transmissive area so as to be served as a diaphragm is irradiated with the second light (UV light) to cure the resin so as to remain, and the resin of a non-cured area, that is, a desired light transmissive area so as to be served as a diaphragm is removed.

In addition, the lens attached substrate 41 having the diaphragm formed on the surface thereof may be the lens attached substrate 41 disposed on the uppermost layer of the layered lens structure 11 or the lens attached substrate 41 as the inner layer of the layered lens structures 11.

The layered lens structure 11 illustrated in FIG. 15 has a structure in which the lens attached substrates 41 are laminated.

As another embodiment, the layered lens structure 11 may include the plurality of lens attached substrates 41 and at least one carrier substrate 81 without the lens resin portion 82. In this structure, the carrier substrate 81 without the lens resin portion 82 may be disposed on the lowermost layer or the uppermost layer of the layered lens structure 11 or may be disposed as the inner layer of the layered lens structure 11. For example, this structure has an operation or effect in which the distance among the plurality of lenses of the layered lens structure 11 or the distance between the lowermost lens resin portion 82 of the layered lens structure 11 and the light receiving element 12 disposed at the lower side of the layered lens structure 11 can be arbitrarily set.

Alternatively, this structure has an operation or effect in which the opening width of the carrier substrate 81 without the lens resin portion 82 can be appropriately set and a light absorbing material can be disposed in an area excluding the opening portion so as to be served as a diaphragm plate.

7. Sixth Embodiment of Camera Module

Figure 16:
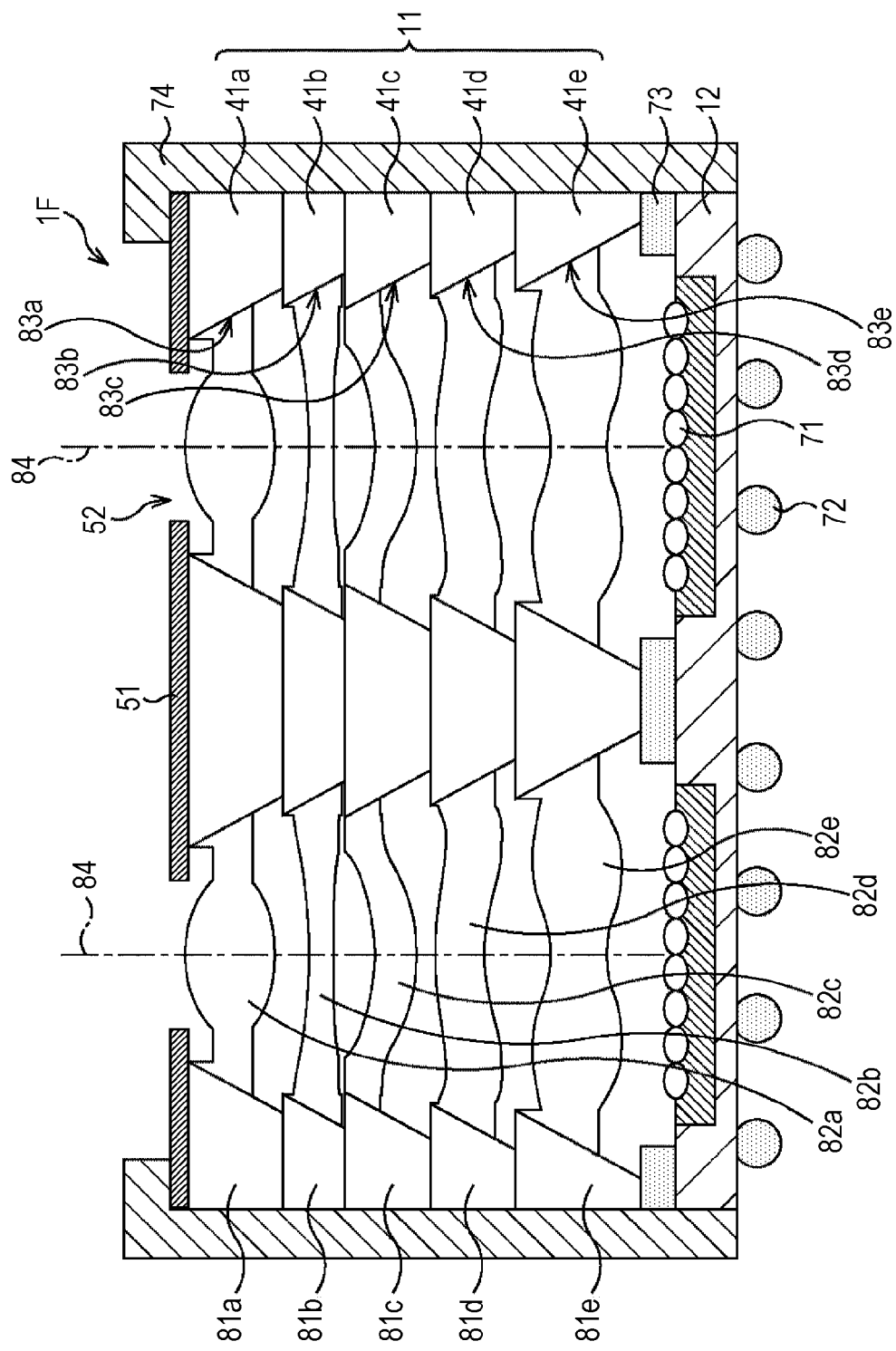
FIG. 16 is a diagram illustrating a sixth embodiment of a camera module that uses a layered lens structure according to an embodiment of the present technology.

FIG. 16 is a diagram illustrating a sixth embodiment of a camera module that uses a layered lens structure according to an embodiment of the present technology.

In FIG. 16, the same reference numeral will be given to the component corresponding to the fourth embodiment illustrated in FIG. 13 and only the difference from the camera module 1D of FIG. 13 will be mainly described.

Even in a camera module 1F illustrated in FIG. 16, the incident light after being narrowed by the diaphragm plate 51 is widened inside the layered lens structure 11 and is incident to the light receiving element 12 disposed at the lower side of the layered lens structure 11 similarly to the camera module 1D illustrated in FIG. 13. That is, according to the overall survey of the layered lens structure 11, the light travels while being widened in a downward widened shape in the downward direction from the opening portion 52 of the diaphragm plate 51.

The camera module 1F of FIG. 16 is different from the camera module 1D illustrated in FIG. 13 in that the cross-sectional shape of the through-hole 83 of each of the lens attached substrates 41 constituting the layered lens structure 11 has a so-called downward widened shape in which the opening width increases downward (toward the light receiving element 12).

Since the layered lens structure 11 of the camera module 1F has a structure in which the incident light travels while being widened in a downward widened shape in the downward direction from the opening portion 52 of the diaphragm plate 51, for example, the carrier substrate 81 rarely disturbs the optical path in the downward widened shape in which the opening width of the through-hole 83 is widened downward compared with the downward narrowed shape in which the opening width of the through-hole 83 is narrowed downward. Accordingly, there is an effect that the degree of freedom in the design of the lens is high.

Further, in the case of the downward narrowed shape in which the opening width of the through-hole 83 decreases downward, the cross-sectional area of the lens resin portion 82 including the carrying portion 92 in the substrate plane direction has a specific size in order to allow the transmission of the light incident to the lens 21 at the lower surface of the lens resin portion 82 and the cross-sectional area increases from the lower surface of the lens resin portion 82 toward the upper surface thereof.

On the contrary, in the case of the downward widened shape in which the opening width of the through-hole 83 increases downward, the cross-sectional area of the lower surface of the lens resin portion 82 is substantially similar to that of the downward narrowed shape, but the cross-sectional area decreases from the lower surface of the lens resin portion 82 toward the upper surface thereof.

Accordingly, the structure in which the opening width of the through-hole 83 increases downward has an operation or effect in which the size of the lens resin portion 82 including the carrying portion 92 can be suppressed to be small. Accordingly, there is an operation or effect in which the above-described difficulty in the lens forming process for a large lens can be reduced.

8. Seventh Embodiment of Camera Module

Figure 17:
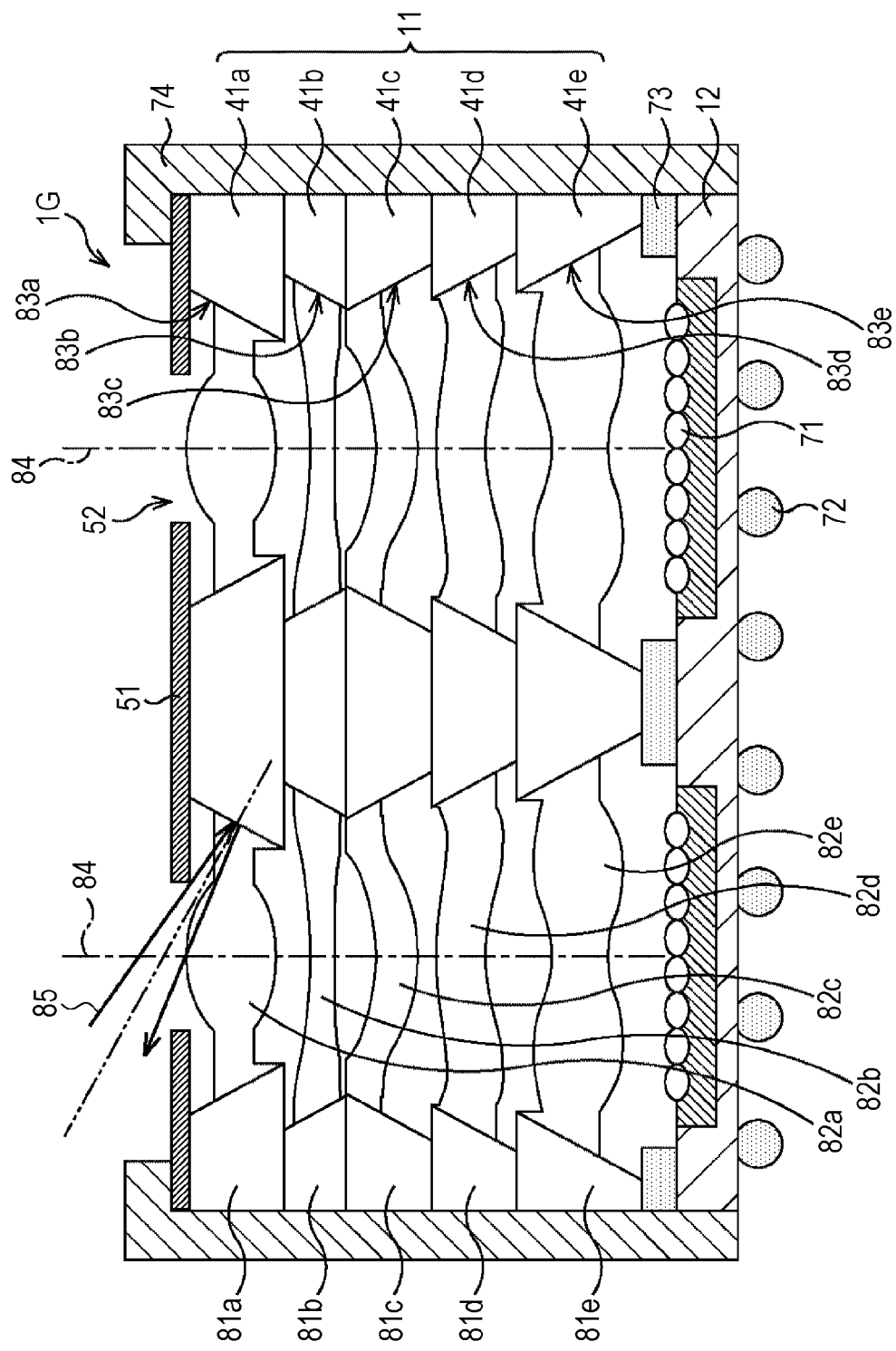
FIG. 17 is a diagram illustrating a seventh embodiment of a camera module that uses a layered lens structure according to an embodiment of the present technology.

FIG. 17 is a diagram illustrating a seventh embodiment of a camera module that uses a layered lens structure according to an embodiment of the present technology.

Even in FIG. 17, the same reference numeral will be given to the component corresponding to FIG. 13 and only the difference from the camera module 1D of FIG. 13 will be mainly described.

In a camera module 1G of FIG. 17, the shapes of the lens resin portion 82 and the through-hole 83 of each of the lens attached substrates 41 constituting the layered lens structure 11 are also different from those of the camera module 1D illustrated in FIG. 13.

The layered lens structure 11 of the camera module 1G includes both the lens attached substrate 41 with the through-hole 83 having a so-called downward narrowed shape in which the opening width thereof decreases downward (toward the light receiving element 12) and the lens attached substrate 41 with the through-hole 83 having a so-called downward widened shape in which the opening width thereof increases upward.

In the lens attached substrate 41 of which the through-hole 83 is formed in a so-called downward narrowed shape of which the opening width decreases downward, the entering incident light 85 contacting the side wall of the through-hole 83 is reflected in the upward direction, that is, the light incident direction as described above. Accordingly, there is an operation or effect in which the occurrence of stray light or noise light is suppressed.

Here, in the layered lens structure 11 of FIG. 17, the lens attached substrates 41 including the through-hole 83 having a so-called downward narrowed shape of which the opening width decreases downward and particularly disposed at the upper side (the light incident side) are used among the plurality of lens attached substrates 41 constituting the layered lens structure 11.

As described above, in the lens attached substrate 41 of which the through-hole 83 is formed in a so-called downward widened shape in which the opening width increases downward, the carrier substrate 81 provided in the lens attached substrate 41 rarely disturbs the optical path. Accordingly, there is an operation or effect in which the degree of freedom in the design of the lens is improved or the size of the lens resin portion 82 including the carrying portion 92 provided in the lens attached substrate 41 is suppressed to be small.

In the layered lens structure 11 of FIG. 17, since the light travels downward from the diaphragm while being widened in a downward widened shape, the lens resin portions 82 provided in the lower lens attached substrates 41 are large among the plurality of lens attached substrates 41 constituting the layered lens structure 11. When the through-hole 83 having a downward widened shape is used in the large lens resin portion 82, there is a significant effect in which the size of the lens resin portion 82 is suppressed.

Here, in the layered lens structure 11 of FIG. 17, particularly the lower lens attached substrates among the plurality of lens attached substrates 41 constituting the layered lens structure 11 are formed as the lens attached substrate 41 with the through-hole 83 having a so-called downward widened shape in which the opening width increases downward.

9. Detailed Configuration of Lens Attached Substrate

Next, the detailed configuration of the lens attached substrate 41 will be described.

Figure 18A:
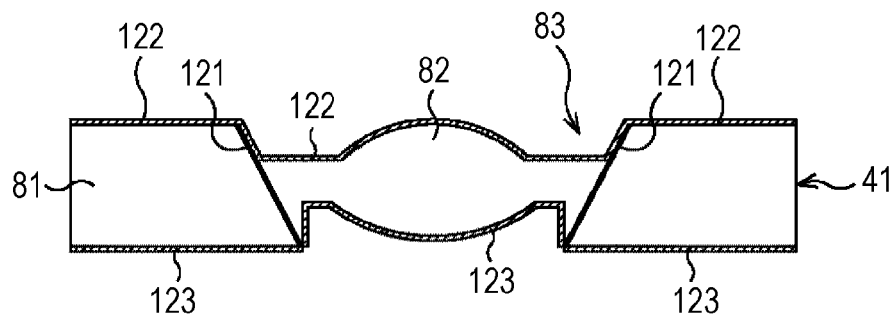
FIG. 18A-18C are cross-sectional views illustrating the detailed configuration of the lens attached substrate.
Figure 18B:
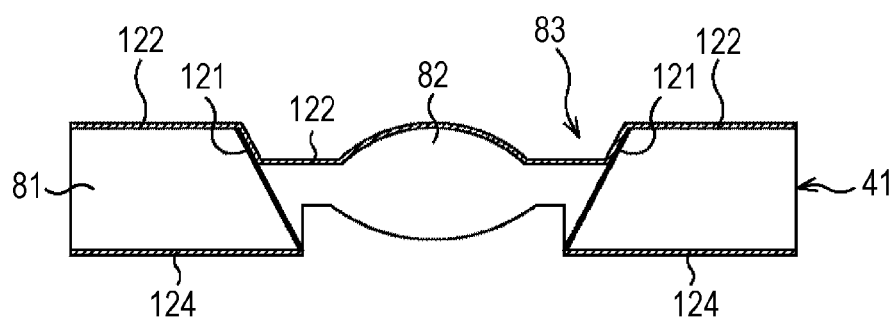
Figure 18C:
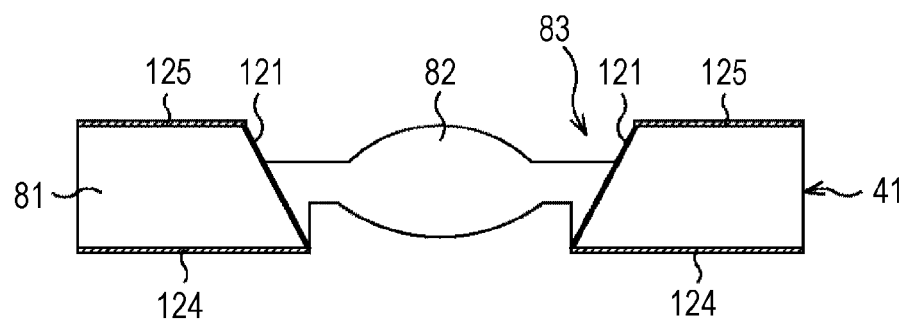

FIGS. 18A to 18C are cross-sectional views illustrating the detailed configuration of the lens attached substrate 41.

In addition, the uppermost lens attached substrate 41a of five lens attached substrates 41a to 41e is illustrated in FIGS. 18A to 18C, but the other lens attached substrates 41 are also formed in this way.

As the configuration of the lens attached substrate 41, any one of the configurations of FIGS. 18A to 18C can be employed.

In the lens attached substrate 41 illustrated in FIG. 18A, the lens resin portion 82 is formed in the through-hole 83 provided in the carrier substrate 81 so as to block the through-hole 83 when viewed from the upper surface. As described above by referring to FIG. 14, the lens resin portion 82 includes the center lens portion 91 (not illustrated) and the peripheral carrying portion 92 (not illustrated).

The side wall of the through-hole 83 of the lens attached substrate 41 is provided with a film 121 which has a light absorbing property or a light shielding property in order to prevent the ghost or flare caused by the reflection of the light. The film 121 will be conveniently referred to as the light shielding film 121.

An upper surface layer 122 including oxides or nitrides or other insulation materials is formed on the upper surfaces of the carrier substrate 81 and the lens resin portion 82, and a lower surface layer 123 including oxides or nitrides or other insulation materials is formed on the lower surfaces of the carrier substrate 81 and the lens resin portion 82.

As an example, the upper surface layer 122 is formed as a reflection preventing film in which a plurality of low refractive index films and a plurality of high refractive index films are alternately laminated. For example, the reflection preventing film can be formed so that the low refractive index films and the high refractive index films are alternately laminated as four layers in total. The low refractive index film is formed as, for example, an oxide film of SiOx ($1 \le x \le 2$), SiOC, SiOF, or the like and the high refractive index film is formed as, for example, a metallic oxide film of TiO, TaO, $Nb_2O_5$, or the like.

In addition, the upper surface layer 122 may be designed to obtain a desired reflection preventing performance by using, for example, an optical simulation. Then, the materials of the low refractive index film and the high refractive index film, the film thickness, the number of laminated films, and the like are not particularly limited. In the embodiment, the outermost surface of the upper surface layer 122 is formed as the low refractive index film. Here, the film thickness is, for example, 20 to 1000 nm, the density is, for example, 2.2 to 2.5 $g/cm^3$, and the flatness is, for example, about 1 nm or less. In this way, the root mean square surface roughness Rq (RMS) is set. Further, although it will be described later in detail, the upper surface layer 122 is formed as a bonding film to be bonded to the other lens attached substrate 41.

As an example, the upper surface layer 122 is the reflection preventing film in which a plurality of low refractive index films and a plurality of high refractive index films are alternately laminated. Among these, an inorganic reflection preventing film is desirable. As another example, the upper surface layer 122 may be a single layer film including oxides or nitrides or other insulation materials. Among these, an inorganic film is desirable.

As an example, the lower surface layer 123 may be a reflection preventing film in which a plurality of low refractive index films and a plurality of high refractive index films are alternately laminated. Among these, an inorganic reflection preventing film is desirable. As another example, the lower surface layer 123 may be a single layer film including oxides or nitrides or other insulation materials. Among these, an inorganic film is desirable.

In the lens attached substrates 41 illustrated in FIGS. 18B and 18C, only the difference from the lens attached substrate 41 illustrated in FIG. 18A will be described.

In the lens attached substrate 41 illustrated in FIG. 18B, the film formed on the lower surfaces of the carrier substrate 81 and the lens resin portion 82 is different from that of the lens attached substrate 41 illustrated in FIG. 18A.

In the lens attached substrate 41 of FIG. 18B, a lower surface layer 124 including oxides or nitrides or other insulation materials is formed on the lower surface of the carrier substrate 81 and the lower surface layer 124 is not formed on the lower surface of the lens resin portion 82. The lower surface layer 124 and the upper surface layer 122 may be formed of the same material or a different material.

Such a structure can be formed by, for example, a manufacturing method in which the lower surface layer 124 is formed on the lower surface of the carrier substrate 81 before the formation of the lens resin portion 82 and then the lens resin portion 82 is formed. Alternatively, such a structure can be formed in a manner such that the lens resin portion 82 is formed and a film forming the lower surface layer 124 is laminated on the lower surface of the carrier substrate 81 by, for example, PVD while a mask is formed on the lens resin portion 82 and a mask is not formed on the carrier substrate 81.

In the lens attached substrate 41 of FIG. 18C, the upper surface layer 125 including oxides or nitrides or other insulation materials is formed on the upper surface of the carrier substrate 81 and the upper surface layer 125 is not formed on the upper surface of the lens resin portion 82.

Similarly, even in the lower surface of the lens attached substrate 41, the lower surface layer 124 including oxides or nitrides or other insulation materials is formed on the lower surface of the carrier substrate 81 and the lower surface layer 124 is not formed on the lower surface of the lens resin portion 82.

Such a structure can be formed by, for example, a manufacturing method in which the upper surface layer 125 and the lower surface layer 124 are formed on the carrier substrate 81 before the formation of the lens resin portion 82 and then the lens resin portion 82 is formed. Alternatively, such a structure can be formed in a manner such that the lens resin portion 82 is formed and a film forming the upper surface layer 125 and the lower surface layer 124 is laminated on the surface of the carrier substrate 81 by, for example, PVD while a mask is formed on the lens resin portion 82 and a mask is not formed on the carrier substrate 81. The lower surface layer 124 and the upper surface layer 125 may be formed of the same material or a different material.

The lens attached substrate 41 can have the above-described configuration.

10. Lens Attached Substrate Manufacturing Method

Next, a method of manufacturing the lens attached substrate 41 will be described with reference to FIGS. 19A and 19B to 29.

First, a substrate-like carrier substrate 81W provided with the plurality of through-holes 83 is prepared. As the carrier substrate 81W, for example, a silicon substrate used in a general semiconductor device can be used. The carrier substrate 81W is formed in, for example, a circular shape illustrated in FIG. 19A and the diameter thereof is set to, for example, 200 mm or 300 mm. The carrier substrate 81W may be, for example, a glass substrate, a resinous substrate, or a metallic substrate instead of a silicon substrate.

Figure 19A:
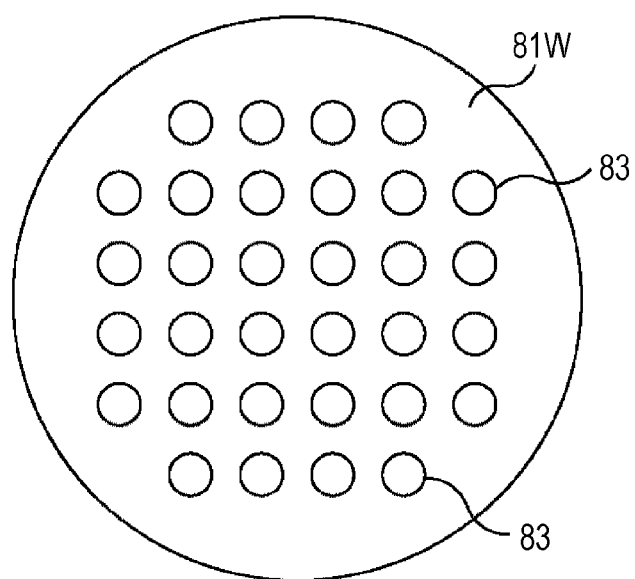
FIG. 19A-19B are diagrams illustrating a lens attached substrate manufacturing method.
Figure 19B:
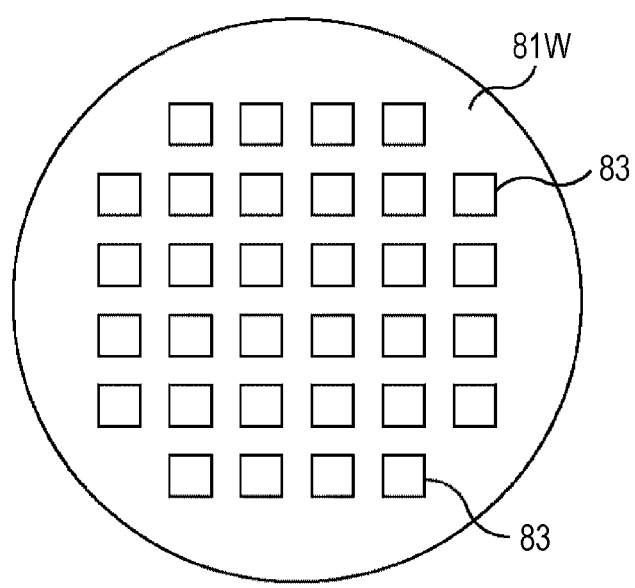

Further, in the embodiment, the planar shape of the through-hole 83 is a circular shape as illustrated in FIG. 19A, but as illustrated in FIG. 19B, the planar shape of the through-hole 83 may be, for example, a polygonal shape such as a square shape.

The opening width of the through-hole 83 can be set to, for example, about 100 μm to about 20 mm. In this case, for example, about one hundred to five million through-holes can be disposed in the carrier substrate 81W.

In the specification, the size of the through-hole 83 in the planar direction of the lens attached substrate 41 will be referred to as the opening width. Unless otherwise specified, the opening width indicates the length of one side when the planar shape of the through-hole 83 is a square shape and indicates the diameter when the planar shape of the through-hole 83 is a circular shape.

Figure 20A:
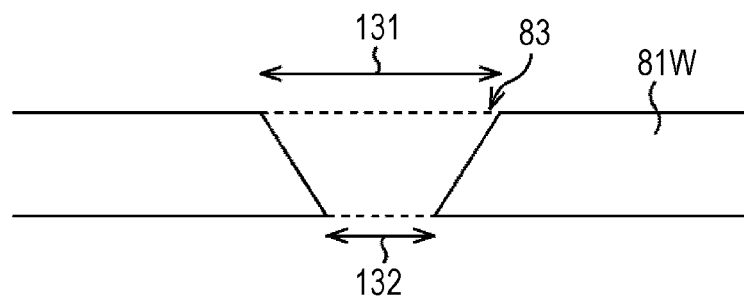
FIG. 20A-20C are diagrams illustrating the lens attached substrate manufacturing method.
Figure 20B:
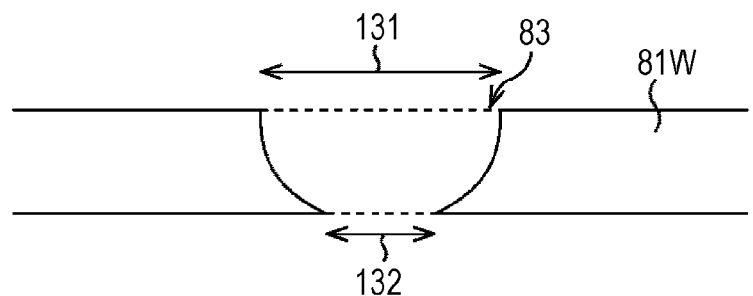
Figure 20C:
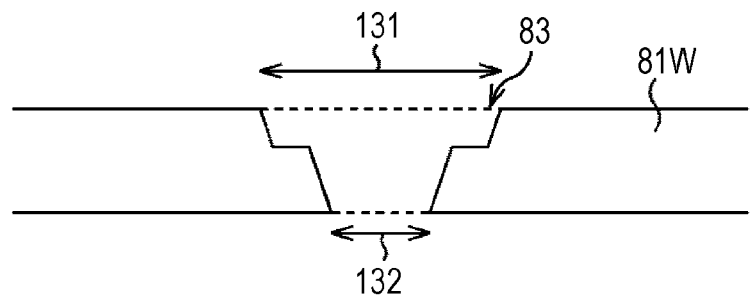

As illustrated in FIGS. 20A to 20C, in the through-hole 83, the second opening width 132 of the second surface facing the first surface is smaller than the first opening width 131 of the first surface of the carrier substrate 81W.

As an example of the three-dimensional shape of the through-hole 83 in which the second opening width 132 is smaller than the first opening width 131, the through-hole 83 may be formed in a truncated conical shape or a polygonal truncated pyramid shape as illustrated in FIG. 20A. The cross-sectional shape of the side wall of the through-hole 83 may be linear as illustrated in FIG. 20A or may be curved as illustrated in FIG. 20B. Alternatively, as illustrated in FIG. 20C, a step may be formed.

In the through-hole 83 having a shape in which the second opening width 132 is smaller than the first opening width 131, when the lens resin portion 82 is formed in a manner such that resin is supplied into the through-hole 83 and the resin is pressed by a mold member in the directions respectively facing the first and second surfaces, the resin formed as the lens resin portion 82 receives a force from two facing mold members so as to be pressed toward the side wall of the through-hole 83. Accordingly, there is an effect in which the adhesion strength between the carrier substrate and the resin formed as the lens resin portion 82 increases.

In addition, as another embodiment of the through-hole 83, the first opening width 131 and the second opening width 132 may have the same shape. That is, the cross-sectional shape of the side wall of the through-hole 83 may be perpendicular.

<Through-Hole Forming Method Using Wet Etching>

The through-hole 83 of the carrier substrate 81W can be formed by etching the carrier substrate 81W according to wet etching. Specifically, an etching mask for preventing the etching of the non-opening area of the carrier substrate 81W is formed on the surface of the carrier substrate 81W before the etching of the carrier substrate 81W. As the material of the etching mask, for example, an insulation film such as a silicon oxide film or a silicon nitride film is used. The etching mask is formed in a manner such that a layer of an etching mask material is formed on the surface of the carrier substrate 81W and a pattern as the planar shape of the through-hole 83 is opened in the layer. The through-hole 83 is formed in the carrier substrate 81W by etching the carrier substrate 81W after the etching mask is formed.

For example, when single crystal silicon having a substrate surface orientation of (100) is used as the carrier substrate 81W, anisotropic crystalline wet etching using an alkaline solution of KOH can be used to form the through-hole 83.

When anisotropic crystalline wet etching using an alkaline solution of KOH is performed on the carrier substrate 81W of single crystal silicon having a substrate surface orientation of (100), etching is performed so that a surface (111) appears on the opening side wall. As a result, even when the planar shape of the opening portion of the etching mask is formed as a circular shape or a square shape, it is possible to obtain the through-hole 83 of which the planar shape is a square shape, the opening width of the through-hole 83 is small in the second opening width 132 compared with the first opening width 131, and the three-dimensional shape of the through-hole 83 is a truncated pyramid shape or a shape similar thereto. The angle of the side wall of the through-hole 83 formed in a truncated pyramid shape is about 55° with respect to the substrate plane.

As the etching for forming the through-hole, wet etching using a chemical liquid capable of etching silicon in an arbitrary shape regardless of the limitation of the crystalline orientation and disclosed in WO 2011/010739 A may be used as another example. As the chemical liquid, for example, a chemical liquid obtained by adding at least one of polyoxyethylene alkyl phenyl ether, polyoxyalkylene alkyl ether, and polyethylene glycol as a surface active agent to a tetramethyl ammonium hydroxide (TMAH) solution or a chemical liquid obtained by adding isopropyl alcohol to a KOH solution may be used.

When etching is performed on the carrier substrate 81W of single crystal silicon having a substrate surface orientation of (100) by using the above-described chemical liquid in order to form the through-hole 83, it is possible to obtain the through-hole 83 of which the planar shape is a circular shape, the second opening width 132 is smaller than the first opening width 131, and the three-dimensional shape is formed in a truncated conical shape or a shape similar thereto in a case where the planar shape of the opening portion of the etching mask is a circular shape.

When the planar shape of the opening portion of the etching mask is a square shape, it is possible to obtain the through-hole 83 of which the planar shape is a square shape, the opening width is small in the second opening width 132 compared with the first opening width 131, and the three-dimensional shape is formed in a truncated pyramid shape or a shape similar thereto. The angle of the side wall of the through-hole 83 having the truncated conical shape or the truncated pyramid shape is about 45° with respect to the substrate plane.

<Through-Hole Forming Method Using Dry Etching>

Further, dry etching can be used to form the through-hole 83 instead of the above-described wet etching.

Referring to FIGS. 21A to 21F, a method of forming the through-hole 83 by dry etching will be described.

Figure 21A:
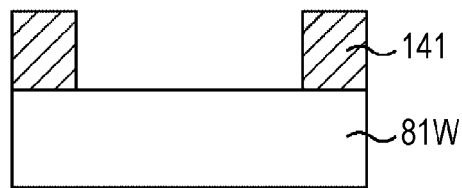
FIG. 21A-21F are diagrams illustrating the lens attached substrate manufacturing method.

As illustrated in FIG. 21A, an etching mask 141 is formed on one surface of the carrier substrate 81W. The etching mask 141 has a mask pattern in which a portion forming the through-hole 83 is opened.

Figure 21B:
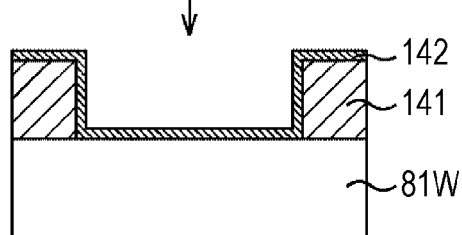
Figure 21C:
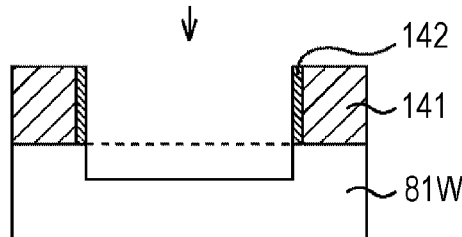

Next, as illustrated in FIG. 21B, a protection film 142 is formed so as to protect the side wall of the etching mask 141 and then as illustrated in FIG. 21C, the carrier substrate 81W is etched by a predetermined depth through dry etching. Although the protection film 142 on the surfaces of the carrier substrate 81W and the etching mask 141 is removed by dry etching step, the protection film 142 of the side surface of the etching mask 141 remains and hence the side wall of the etching mask 141 is protected. After the etching, as illustrated in FIG. 21D, the protection film 142 of the side wall is removed and hence the etching mask 141 is retracted in a direction in which the opening pattern size increases.

Figure 21D:
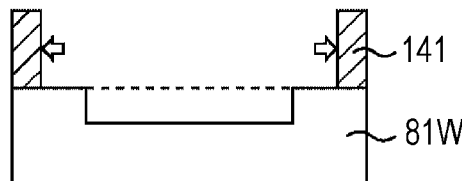
Figure 21E:

Then, the protection film forming step, the dry etching step, and the etching mask retracting step illustrated in FIGS. 21B to 21D are repeated again plural times. Accordingly, as illustrated in FIG. 21E, the carrier substrate 81W is etched so as to have a periodical step shape (an unevenness shape).

Figure 21F:
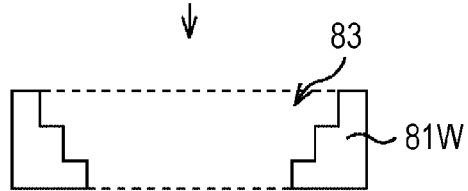

Finally, when the etching mask 141 is removed, as illustrated in FIG. 21F, the through-hole 83 having a stepped side wall is formed in the carrier substrate 81W. The width (the width of each step) of the through-hole 83 in the stepped planar direction is set to, for example, about 400 nm to 1 μm.

When the through-hole 83 is formed by dry etching as described above, the protection film forming step, the dry etching step, and the etching mask retracting step are repeatedly performed.

Since the side wall of the through-hole 83 is formed in a periodical step shape (an unevenness shape), the reflection of the incident light can be suppressed. Further, if the side wall of the through-hole 83 is formed in an unevenness shape having a random size, a void (a gap) is formed in the adhesive layer between the side wall and the lens formed inside the through-hole 83. Thus, there is a case in which the adhesiveness with respect to the lens is degraded due to the void. However, according to the above-described forming method, since the side wall of the through-hole 83 is formed in a periodical unevenness shape, the adhesiveness is improved and hence a change in optical characteristic due to the displacement of the lens can be suppressed.

As an example of the materials used in the steps, for example, the carrier substrate 81W is formed as single crystal silicon, the etching mask 141 is formed as photo resist, and the protection film 142 is formed as fluorocarbon polymer formed by using gas plasma of $C_4F_8$ or $CHF_3$. Here, the etching process can be performed by plasma etching using a gas including F such as $SF_6/O_2$, $C_4F_8/SF_6$ and the mask retracting step can be performed by plasma etching including $O_2$ such as an $O_2$ gas and $CF_4/O_2$.

Alternatively, the carrier substrate 81W may be formed as single crystal silicon, the etching mask 141 may be formed as $SiO_2$, the etching may be performed by plasma etching including $Cl_2$, the protection film 142 may be formed as an oxide film obtained by oxidizing an etching target material using $O_2$ plasma, the etching process may be performed by plasma including a gas of $Cl_2$, and the etching mask retracting step may be performed by plasma etching using a gas including F such as $CF_4/O_2$.

Figure 22A:
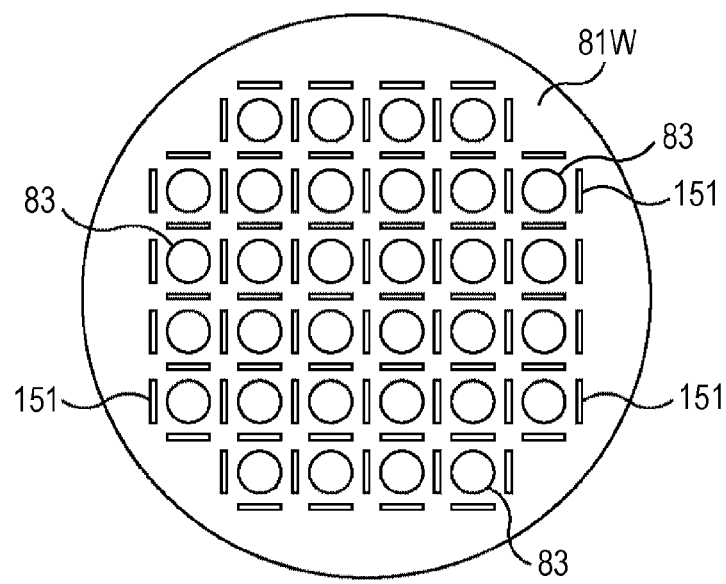
FIGS. 22A and 22B are diagrams illustrating the lens attached substrate manufacturing method.

As described above, the plurality of through-holes 83 can be simultaneously formed in the carrier substrate 81W by wet etching or dry etching, but a penetration groove 151 may be formed in an area without the through-hole 83 in the carrier substrate 81W as illustrated in FIG. 22A.

FIG. 22A is a top view of the carrier substrate 81W provided with the penetration groove 151 in addition to the through-hole 83.

For example, as illustrated in FIG. 22A, the penetration groove 151 is disposed in a part between the through-holes 83 in the row direction and the column direction so as to avoid the plurality of through-holes 83 disposed in a matrix shape.

Further, the penetration groove 151 of the carrier substrate 81W can be disposed at the same position in the lens attached substrates 41 constituting the layered lens structure 11. In this case, in a state where the plurality of carrier substrates 81W is laminated as the layered lens structure 11, a structure is formed in which the penetration grooves 151 of the plurality of carrier substrates 81W penetrate the plurality of carrier substrates 81W as illustrated in the cross-sectional view of FIG. 22B.

The penetration groove 151 of the carrier substrate 81W as a part of the lens attached substrate 41 can have an operation or effect in which the deformation of the lens attached substrate 41 caused by the stress is relieved, for example, when a stress deforming the lens attached substrate 41 is applied from the outside of the lens attached substrate 41.

Alternatively, the penetration groove 151 can have an operation or effect in which the deformation of the lens attached substrate 41 caused by the stress is relieved, for example, when a stress deforming the lens attached substrate 41 is generated from the inside of the lens attached substrate 41.

<Lens Attached Substrate Manufacturing Method>

Next, a method of manufacturing the substrate-like lens attached substrate 41W will be described with reference to FIGS. 23A to 23G.

Figure 23A:
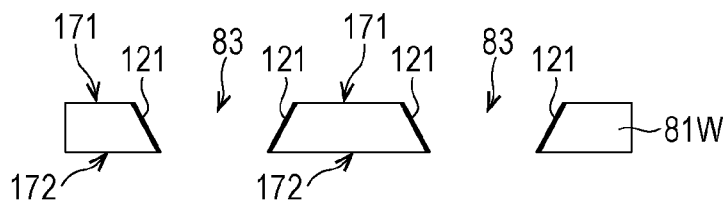
FIG. 23A-23G are diagrams illustrating the lens attached substrate manufacturing method.

First, as illustrated in FIG. 23A, the carrier substrate 81W provided with the plurality of through-holes 83 is prepared. The light shielding film 121 is formed on the side wall of the through-hole 83. In FIGS. 23A to 23G, only two through-holes 83 are illustrated due to the limited area of the drawing paper. However, in fact, the plurality of through-holes 83 is formed in the planar direction of the carrier substrate 81W as illustrated in FIGS. 19A and 19B. Further, an alignment mark (not illustrated) for matching the positions is formed in an area near the outer periphery of the carrier substrate 81W.

An upper front surface flat portion 171 and a lower rear surface flat portion 172 of the carrier substrate 81W are formed as flat surfaces which are flattened as the plasma bonding performed in the subsequent step can be performed. The thickness of the carrier substrate 81W is used as a spacer for determining the distance between the lenses when the lens attached substrate 41 is divided so as to overlap the other lens attached substrate 41.

It is desirable to use a low-thermal-expansion base material of which a thermal expansion coefficient is 10 ppm/° C. or less as the carrier substrate 81W.

Figure 23B:
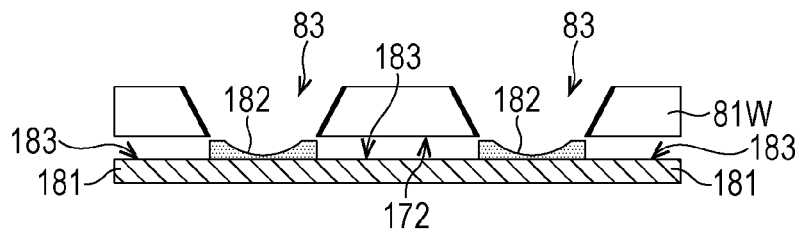

Next, as illustrated in FIG. 23B, the carrier substrate 81W is disposed on a lower die 181 in which a plurality of concave optical transfer surfaces 182 is disposed at the same interval. More specifically, the rear surface flat portion 172 of the carrier substrate 81W overlaps the flat surface 183 of the lower die 181 so that the concave optical transfer surface 182 is located at the inside of the through-hole 83 of the carrier substrate 81W. The optical transfer surface 182 of the lower die 181 is formed so as to correspond to the through-hole 83 of the carrier substrate 81W as one to one and the positions of the carrier substrate 81W and the lower die 181 in the planar direction are adjusted so that the corresponding center points of the optical transfer surface 182 and the through-hole 83 match each other in the optical axis direction. The lower die 181 is formed as a hard mold member and is formed of, for example, metal, silicon, quartz, or glass.

Figure 23C:
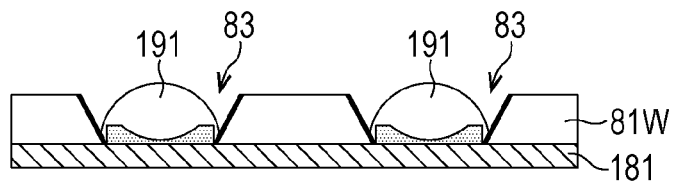

Next, as illustrated in FIG. 23C, an energy curable resin 191 is charged (loaded) at the inside of the lower die 181 and the through-hole 83 of the carrier substrate 81W overlapping each other. The lens resin portion 82 is formed by the energy curable resin 191. For that reason, it is desirable to defoam the energy curable resin 191 in advance so that bubbles are not included therein. As the defoaming process, a vacuum defoaming process or a defoaming process using a centrifugal force is desirable. Further, it is desirable to perform the vacuum defoaming process after the charging process. When the defoaming process is performed, the lens resin portion 82 can be molded without holding bubbles.

Figure 23D:
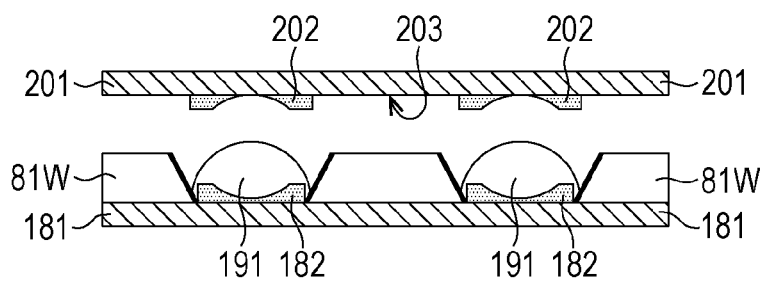

Next, as illustrated in FIG. 23D, an upper die 201 is disposed on the lower die 181 and the carrier substrate 81W overlapping each other. The plurality of concave optical transfer surfaces 202 is disposed on the upper die 201 at the same interval. Then, similarly to the case where the lower die 181 is disposed, the center points of the through-hole 83 and the optical transfer surface 202 are positioned so as to match each other with high accuracy in the optical axis direction and then the upper die 201 is disposed.

In the height direction as the lengthwise direction on the drawing paper, the position of the upper die 201 is fixed so that a gap between the upper die 201 and the lower die 181 becomes a predetermined distance by a control device controlling a gap between the upper die 201 and the lower die 181. At this time, a space interposed between the optical transfer surface 202 of the upper die 201 and the optical transfer surface 182 of the lower die 181 is equal to the thickness of the lens resin portion 82 (the lens 21) calculated by the optical design.

Figure 23E:
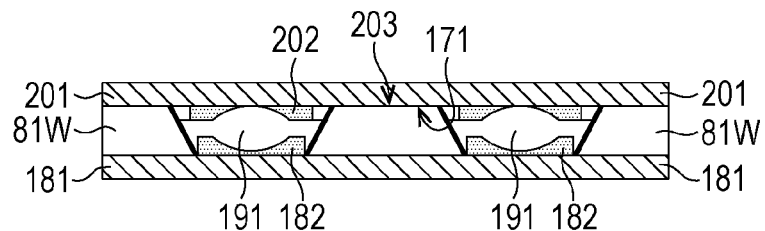

Alternatively, as illustrated in FIG. 23E, the flat surface 203 of the upper die 201 and the front surface flat portion 171 of the carrier substrate 81W may overlap each other similarly to the case where the lower die 181 is disposed. In this case, a distance between the upper die 201 and the lower die 181 is equal in value to the thickness of the carrier substrate 81W and hence both dies can be positioned with high accuracy in the planar direction and the height direction.

When a gap between the upper die 201 and the lower die 181 is controlled at a predetermined distance, the amount of the energy curable resin 191 charged dropwise into the through-hole 83 of the carrier substrate 81W is controlled so that the resin does not flow out of the through-hole 83 of the carrier substrate 81W, and the space surrounded by the upper die 201, and the lower die 181 disposed on the upper and lower sides of the carrier substrate 81W by the step of FIG. 23C. Accordingly, it is possible to decrease the manufacturing cost without meaninglessly using the energy curable resin 191.

Subsequently, the energy curable resin 191 is cured in the state illustrated in FIG. 23E. For example, the energy curable resin 191 is cured in a manner such that heat or UV light is applied thereto as energy and the resin is left for a predetermined time. When the upper die 201 is pressed downward or the alignment thereof is performed in the curing state, the deformation caused by the shrinkage of the energy curable resin 191 can be suppressed to the minimum.

Thermoplastic resin may be used instead of the energy curable resin 191. In that case, when the temperature of each of the upper die 201 and the lower die 181 increases in the state illustrated in FIG. 23E, the energy curable resin 191 is molded in a lens shape and is cooled so as to be cured.

Figure 23F:
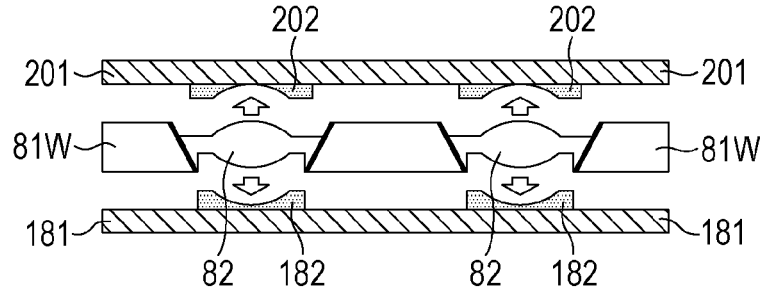

Next, as illustrated in FIG. 23F, the control device controlling the positions of the upper die 201 and the lower die 181 moves the upper die 201 upward and moves the lower die 181 downward so that the upper die 201 and the lower die 181 are separated from the carrier substrate 81W. When the upper die 201 and the lower die 181 are separated from the carrier substrate 81W, the lens resin portion 82 including the lens 21 is formed at the inside of the through-hole 83 of the carrier substrate 81W.

In addition, the surfaces of the upper die 201 and the lower die 181 contacting the carrier substrate 81W may be coated with a fluorine or silicon mold releasing agent. In this way, the carrier substrate 81W can be easily separated from the upper die 201 and the lower die 181. Further, various coatings including fluorine containing diamond like carbon (DLC) may be performed as a method of easily separating the dies from the contact surface with respect to the carrier substrate 81W.

Figure 23G:
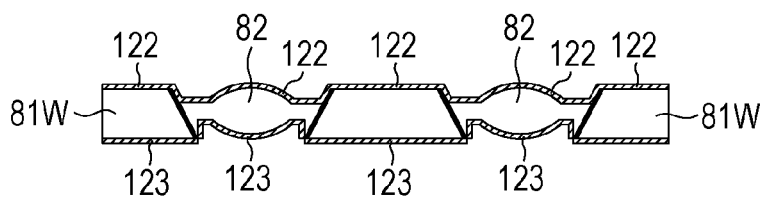

Next, as illustrated in FIG. 23G, the upper surface layer 122 is formed on the front surfaces of the carrier substrate 81W and the lens resin portion 82 and the lower surface layer 123 is formed on the rear surfaces of the carrier substrate 81W and the lens resin portion 82. The front surface flat portion 171 and the rear surface flat portion 172 of the carrier substrate 81W may be flattened by performing chemical mechanical polishing (CMP) if necessary before and after the formation of the upper surface layer 122 and the lower surface layer 123.

As described above, the lens attached substrate 41 can be manufactured by forming the lens resin portion 82 in a manner such that the energy curable resin 191 is press-molded (imprinted) against the through-hole 83 formed in the carrier substrate 81W by the use of the upper die 201 and the lower die 181.

The shapes of the optical transfer surface 182 and the optical transfer surface 202 are not limited to the above-described concave shape and are appropriately determined in response to the shape of the lens resin portion 82. As illustrated in FIG. 15, the lens attached substrates 41a to 41e can have various lens shapes derived by the optical design. For example, various shapes may include a biconvex shape, a biconcave shape, a plane convex shape, a plane concave shape, a convex meniscus shape, a concave meniscus shape, and a high-order non-spherical shape.

Further, the optical transfer surface 182 and the optical transfer surface 202 can be formed in a shape in which the formed lens shape has a moth eye structure.

According to the above-described manufacturing method, since a change in distance in the lens resin portions 82 due to the cured shrinkage of the energy curable resin 191 in the planar direction can be broken by the interposed carrier substrate 81W, it is possible to control the accuracy in the distance between the lenses with high accuracy. Further, there is an effect in which the weak energy curable resin 191 is reinforced by the strong carrier substrate 81W. Accordingly, there is an effect in which a lens array substrate having a plurality of easily handled lenses can be provided and the curved state of the lens array substrate can be suppressed.

<Example of Polygonal Through-Hole>

As illustrated in FIG. 19B, the planar shape of the through-hole 83 may be, for example, a polygonal shape such as a square shape.

Figure 24:
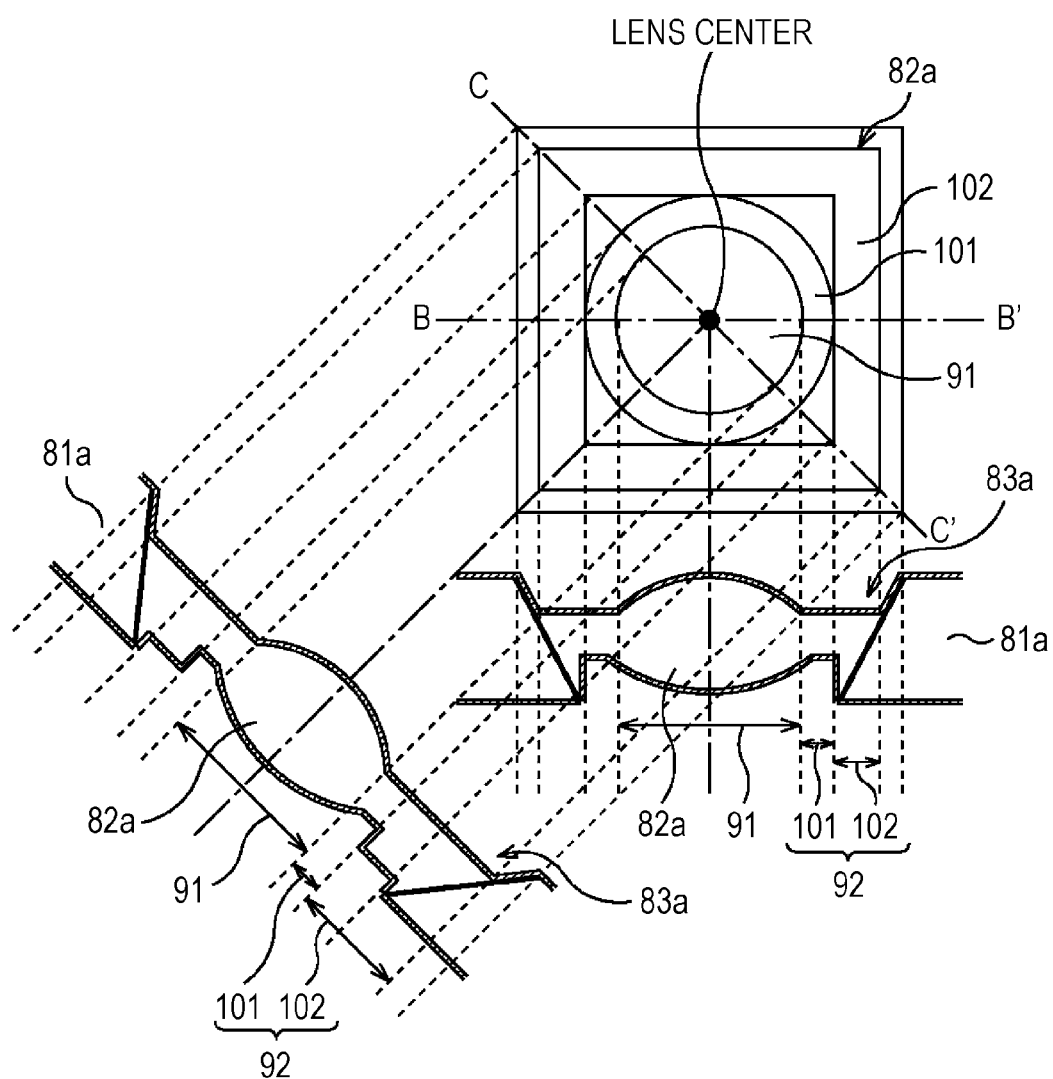
FIG. 24 is a diagram illustrating the lens attached substrate manufacturing method.

FIG. 24 illustrates a top view and cross-sectional views of the carrier substrate 81a and the lens resin portion 82a of the lens attached substrate 41a when the planar shape of the through-hole 83 is a square shape.

The cross-sectional views of the lens attached substrate 41a of FIG. 24 indicate the cross-sectional views taken along the lines B-B' and C-C' of the top view.

As understood from comparison between the cross-sectional view taken along the line B-B' and the cross-sectional view taken along the line C-C', when the through-hole 83a has a square shape, a distance from the center point of the through-hole 83a to the upper outer edge of the through-hole 83a and a distance from the center point of the through-hole 83a to the lower outer edge of the through-hole 83a are different in the side direction and the diagonal direction of the square through-hole 83a and are large in the diagonal direction. For this reason, when the lens portion 91 is formed in a circular shape in the case of the square planar shape of the through-hole 83a, a distance from the outer periphery of the lens portion 91 to the side wall of the through-hole 83a, that is, the length of the carrying portion 92 needs to be a different length in the side direction and the diagonal direction of the square shape.

Here, the lens resin portion 82a illustrated in FIG. 24 has the following structure.

(1) The length of the arm portion 101 disposed in the outer periphery of the lens portion 91 is the same in the side direction and the diagonal direction of the square.

(2) The length of the leg portion 102 disposed at the outside of the arm portion 101 and extending to the side wall of the through-hole 83a is set so that the length of the leg portion 102 in the diagonal direction of the square is longer than the length of the leg portion 102 in the side direction of the square.

As illustrated in FIG. 24, the leg portion 102 does not directly contact the lens portion 91 and the arm portion 101 directly contacts the lens portion 91.

The lens resin portion 82a of FIG. 24 can have an operation or effect in which the entire lens portion 91 is uniformly supported by a constant force while the length and the thickness of the arm portion 101 directly contacting the lens portion 91 are the same in the entire outer periphery of the lens portion 91.

In addition, since the entire lens portion 91 is uniformly supported by a constant force, it is possible to obtain an operation or effect in which a biased stress is suppressed from being non-uniformly applied to a specific part of the lens portion 91 in a manner such that a stress is uniformly transmitted to the entire lens portion 91, for example, when the stress is applied from the carrier substrate 81a surrounding the through-hole 83a to the entire outer periphery of the through-hole 83a.

Figure 25:
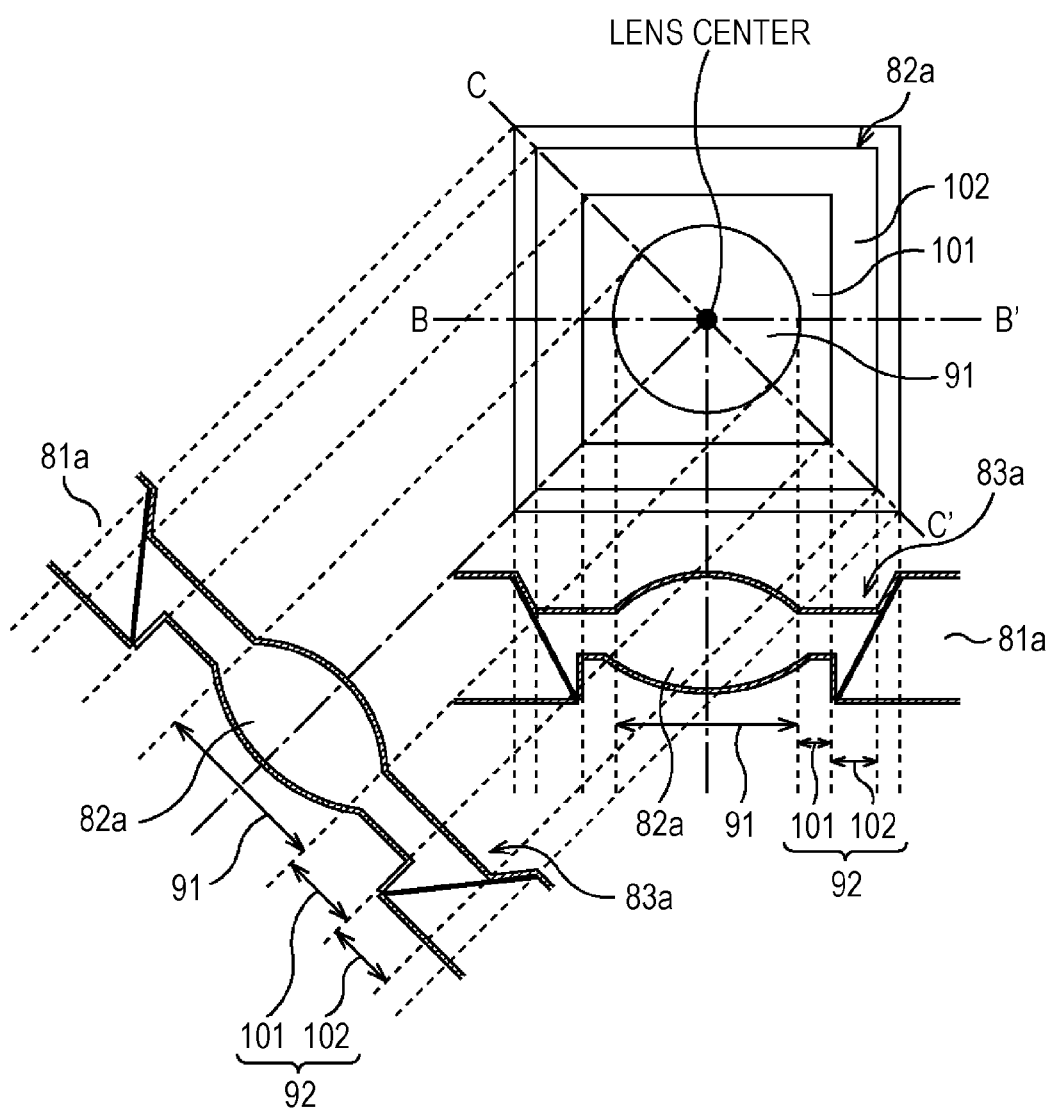
FIG. 25 is a diagram illustrating the lens attached substrate manufacturing method.

FIG. 25 illustrates a top view and cross-sectional views of the carrier substrate 81a and the lens resin portion 82a of the lens attached substrate 41a as the other example of the through-hole 83 having a square planar shape.

The cross-sectional views of the lens attached substrate 41a of FIG. 25 indicate the cross-sectional views taken along the lines B-B' and C-C' of the top view.

Figure 22B:
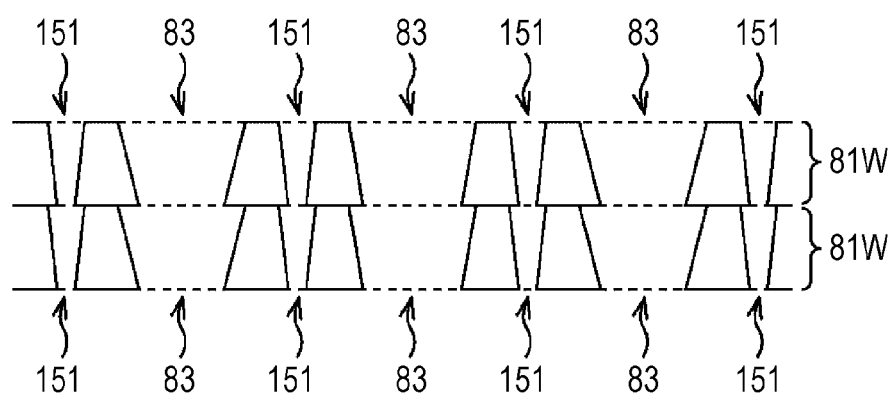

Even in FIG. 25, a distance from the center point of the through-hole 83a to the upper outer edge of the through-hole 83a and a distance from the center point of the through-hole 83a to the lower outer edge of the through-hole 83a are different in the side direction and the diagonal direction of the square through-hole 83a and are large in the diagonal direction similarly to FIGS. 22A and 22B. For this reason, when the lens portion 91 is formed in a circular shape in the case of the square planar shape of the through-hole 83a, a distance from the outer periphery of the lens portion 91 to the side wall of the through-hole 83a, that is, the length of the carrying portion 92 needs to be a different length in the side direction and the diagonal direction of the square.

Here, the lens resin portion 82a illustrated in FIG. 25 has the following structure.

(1) The length of the leg portion 102 disposed in the outer periphery of the lens portion 91 is set to be constant along four sides of the square through-hole 83a.

(2) In order to realize the structure of (1), the length of the arm portion 101 is set so that the length of the arm portion in the diagonal direction is longer than the length of the arm portion of the side direction of the square.

As illustrated in FIG. 25, the film thickness of the resin of the leg portion 102 is thicker than that of the arm portion 101. For this reason, the volume per unit area of the lens attached substrate 41a in the planar direction is large in the leg portion 102 compared with the arm portion 101.

In the embodiment of FIG. 25, since the volume of the leg portion 102 is set to be small as much as possible and is set to be constant along four sides of the square through-hole 83a, it is possible to obtain an operation or effect in which when the resin is deformed so as to be swollen, a change in volume due to the deformation is suppressed as much as possible and the change in volume does not occur non-uniformly in the entire outer periphery of the lens portion 91 as much as possible, for example.

Figure 26:
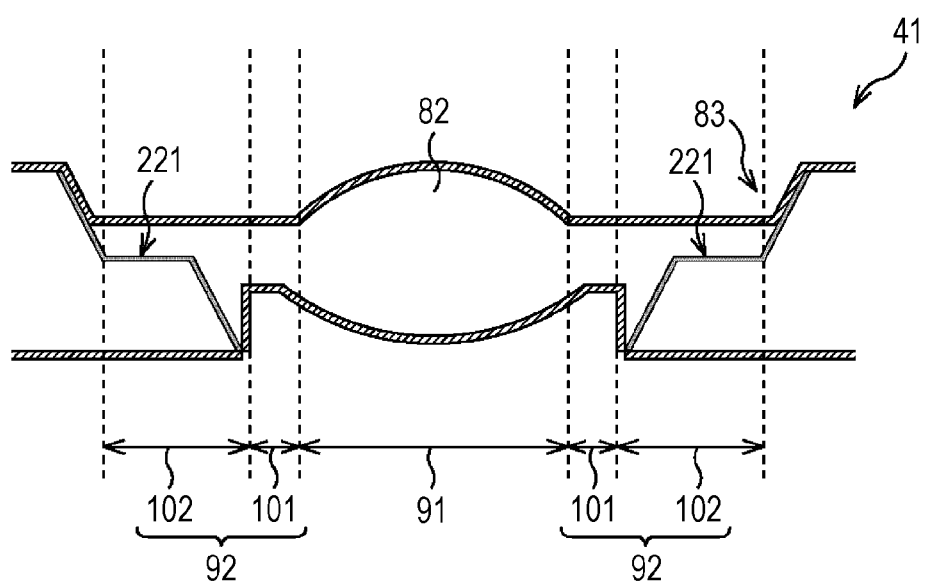
FIG. 26 is a diagram illustrating the lens attached substrate manufacturing method.

FIG. 26 is a cross-sectional view illustrating another embodiment of the lens resin portion 82 and the through-hole 83 of the lens attached substrate 41.

Each of the lens resin portion 82 and the through-hole 83 illustrated in FIG. 26 has the following structure.

(1) The side wall of the through-hole 83 is formed in a step shape with a step portion 221.

(2) The leg portion 102 of the carrying portion 92 of the lens resin portion 82 is disposed above the side wall of the through-hole 83 and extends in the planar direction of the lens attached substrate 41 on the step portion 221 provided in the through-hole 83.

Referring to FIGS. 27A to 27F, a method of forming the stepped through-hole 83 illustrated in FIG. 26 will be described.

Figure 27D:
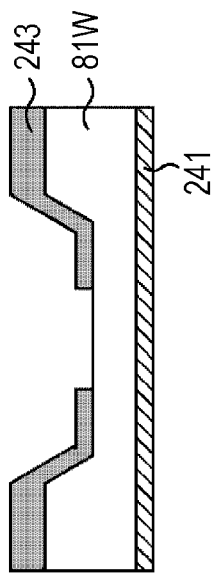
FIG. 27A-27F are diagrams illustrating the lens attached substrate manufacturing method.
Figure 27E:
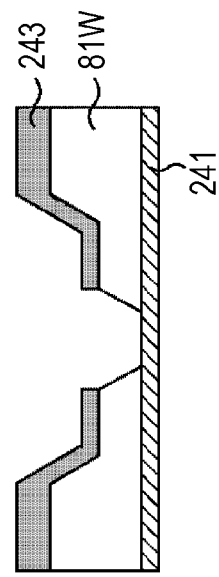
Figure 27F:
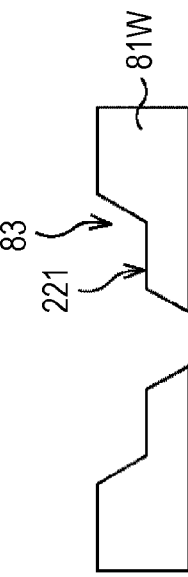
Figure 27A:
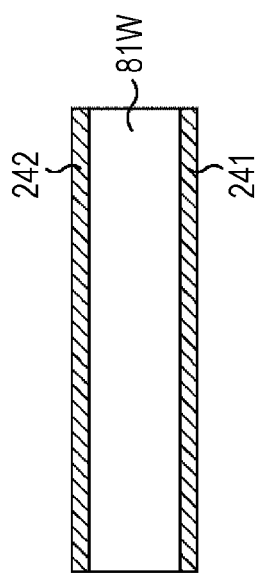

First, as illustrated in FIG. 27A, an etching stop film 241 which has a resistance for the wet etching used to open the through-hole is formed on one surface of the carrier substrate 81W. The etching stop film 241 can be formed as, for example, a silicon nitride film.

Next, a hard mask 242 which has a resistance for the wet etching used to open the through-hole is formed on the other surface of the carrier substrate 81W. The hard mask 242 can be also formed as, for example, a silicon nitride film.

Figure 27B:
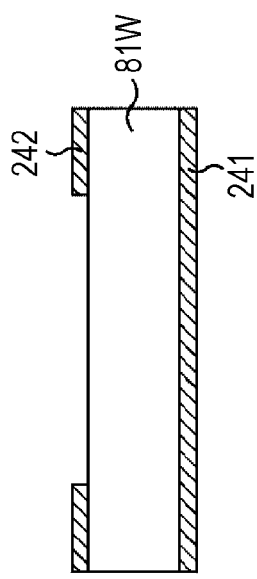

Next, as illustrated in FIG. 27B, a predetermined area of the hard mask 242 is opened for the first etching. In the first etching, a portion as the upper stage of the step portion 221 of the through-hole 83 is etched. For this reason, the opening portion of the hard mask 242 for the first etching becomes an area corresponding to the opening of the upper substrate surface of the lens attached substrate 41 of FIG. 26.

Figure 27C:
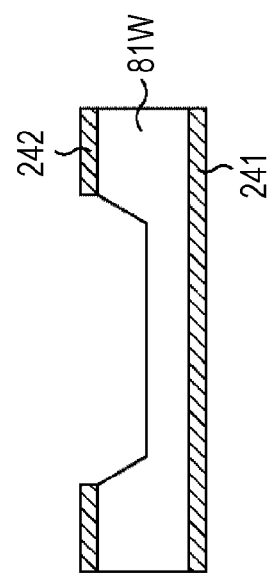

Next, as illustrated in FIG. 27C, the carrier substrate 81W is etched by a predetermined depth in response to the opening portion of the hard mask 242 by the wet etching.

Next, as illustrated in FIG. 27D, a hard mask 243 is also formed on the surface of the etched carrier substrate 81W and the hard mask 243 is opened so as to correspond to the lower portion of the step portion 221 of the through-hole 83. The second hard mask 243 can be also formed as, for example, a silicon nitride film.

Next, as illustrated in FIG. 27E, the carrier substrate 81W is etched to a portion reaching the etching stop film 241 in response to the opening portion of the hard mask 243 by the wet etching.

Finally, as illustrated in FIG. 27F, the hard mask 243 of the upper surface of the carrier substrate 81W and the etching stop film 241 of the lower surface thereof are removed.

As described above, when the etching for the carrier substrate 81W used to form the through-hole is performed separately two times by the wet etching, the stepped through-hole 83 illustrated in FIG. 26 is obtained.

Figure 28:
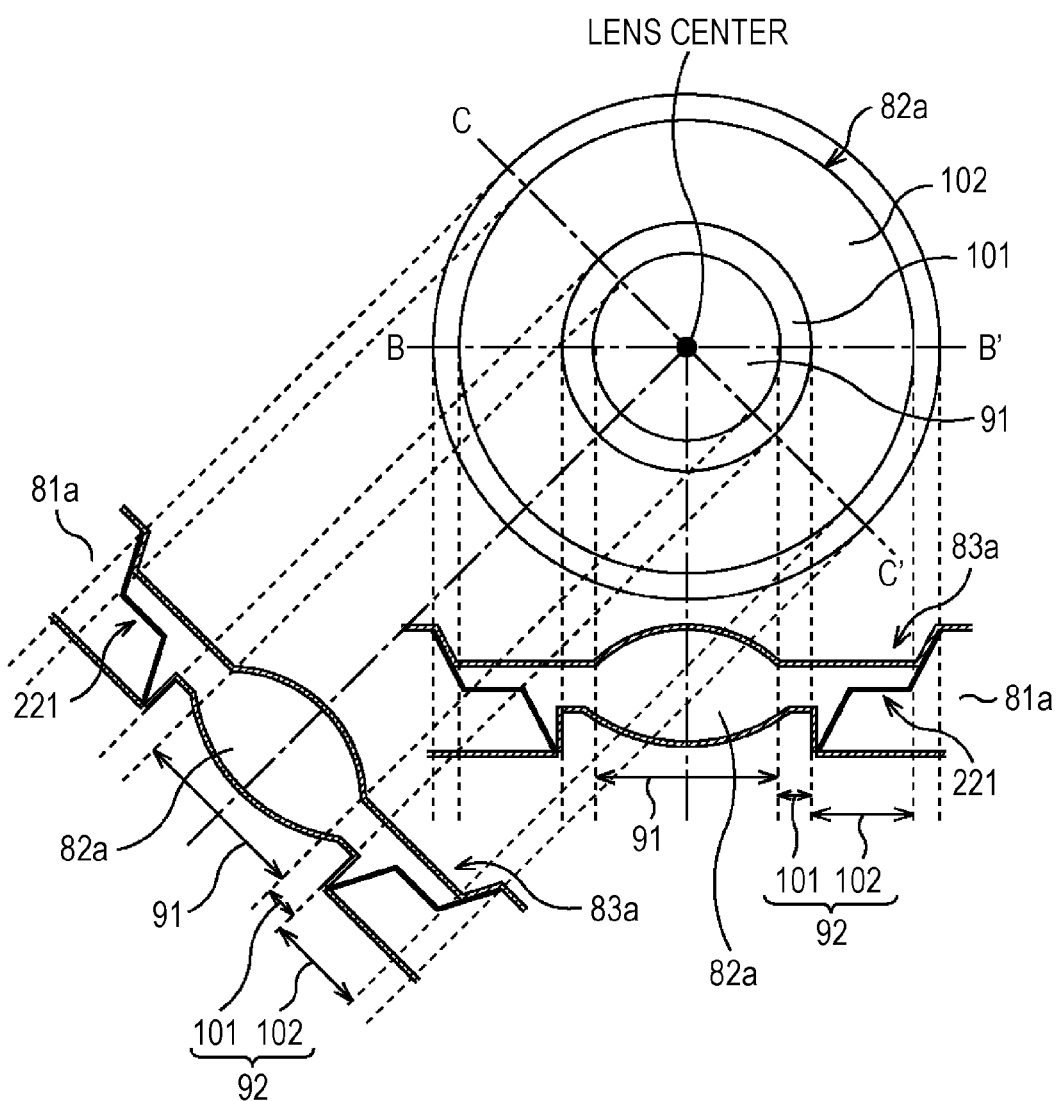
FIG. 28 is a diagram illustrating the lens attached substrate manufacturing method.

FIG. 28 illustrates a top view and cross-sectional views of the carrier substrate 81a and the lens resin portion 82a of the lens attached substrate 41a in a state where the through-hole 83a includes the step portion 221 and the through-hole 83a has a circular planar shape.

The cross-sectional views of the lens attached substrate 41a of FIG. 28 indicate the cross-sectional views taken along the lines B-B' and C-C' of the top view.

When the through-hole 83a has a circular planar shape, the cross-sectional shape of the through-hole 83a is naturally the same regardless of the diametrical direction. In addition, the cross-sectional shapes of the outer edge of the lens resin portion 82a, the arm portion 101, and the leg portion 102 are the same regardless of the diametrical direction.

The through-hole 83a having a step shape of FIG. 28 has an operation or effect in which a contact area between the leg portion 102 of the carrying portion 92 of the lens resin portion 82 and the side wall of the through-hole 83a can be increased compared with the through-hole 83a of FIG. 14 that does not include the step portion 221 inside the through-hole 83a. Accordingly, there is an operation or effect in which the adhesion strength between the lens resin portion 82 and the side wall of the through-hole 83a, that is, the adhesion strength between the lens resin portion 82a and the carrier substrate 81W is increased.

Figure 29:
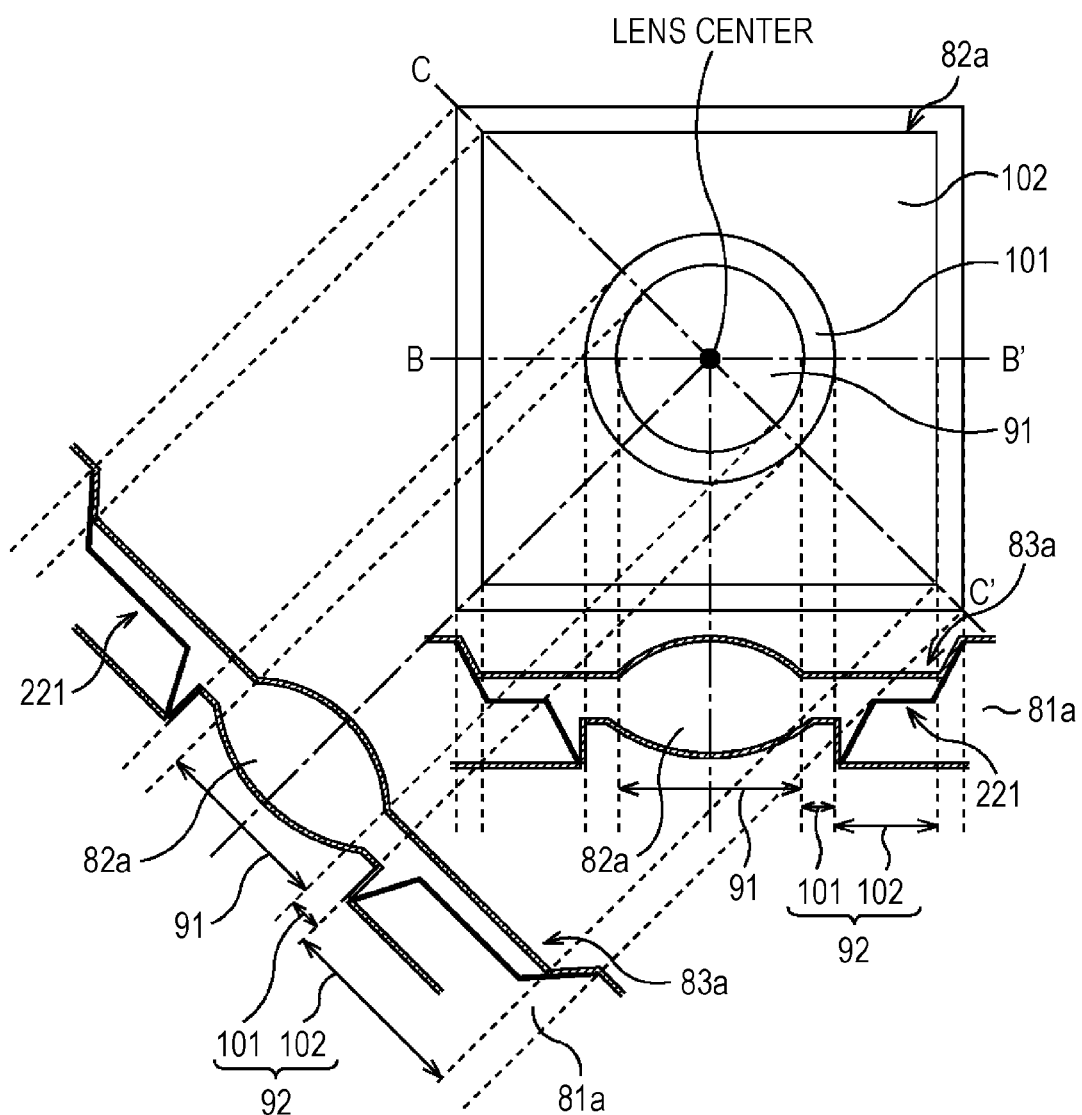
FIG. 29 is a diagram illustrating the lens attached substrate manufacturing method.

FIG. 29 illustrates a top view and cross-sectional views of the carrier substrate 81a and the lens resin portion 82a of the lens attached substrate 41a in a state where the through-hole 83a includes the step portion 221 and the through-hole 83a has a square planar shape.

The cross-sectional views of the lens attached substrate 41a of FIG. 29 indicate the cross-sectional views take along the lines B-B' and C-C' of the top view.

Each of the lens resin portion 82 and the through-hole 83 illustrated in FIG. 29 has the following structure.

(1) The length of the arm portion 101 disposed in the outer periphery of the lens portion 91 is the same in the side direction and the diagonal direction of the square.

(2) The length of the leg portion 102 disposed at the outside of the arm portion 101 and extending to the side wall of the through-hole 83a is set so that the length of the leg portion 102 in the diagonal direction of the square is longer than the length of the leg portion 102 in the side direction of the square.

As illustrated in FIG. 29, the leg portion 102 does not directly contact the lens portion 91 and the arm portion 101 directly contacts the lens portion 91.

The lens resin portion 82a of FIG. 29 can have an operation or effect in which the entire lens portion 91 is uniformly supported by a constant force while the length and the thickness of the arm portion 101 directly contacting the lens portion 91 are the same in the entire outer periphery of the lens portion 91 similarly to the lens resin portion 82a of FIG. 24.

In addition, since the entire lens portion 91 is uniformly supported by a constant force, it is possible to obtain an operation or effect in which a biased stress is suppressed from being non-uniformly applied to a specific part of the lens portion 91 in a manner such that a stress is uniformly transmitted to the entire lens portion 91, for example, when the stress is applied from the carrier substrate 81a surrounding the through-hole 83a to the entire outer periphery of the through-hole 83a.

In addition, the structure of the through-hole 83a of FIG. 29 has an operation or effect in which a contact area between the leg portion 102 of the carrying portion 92 of the lens resin portion 82a and the side wall of the through-hole 83a can be increased compared with the through-hole 83a of FIG. 24 or the like that does not include the step portion 221 inside the through-hole 83a. Accordingly, there is an operation or effect in which the adhesion strength between the lens resin portion 82a and the side wall of the through-hole 83a, that is, the adhesion strength between the lens resin portion 82a and the carrier substrate 81a increases.

11. Direct Bonding Between Lens Attached Substrates

Next, the direct bonding between the substrate-like lens attached substrates 41W provided with the plurality of lens attached substrates 41 will be described.

In the description below, as illustrated in FIGS. 30A and 30B, the substrate-like lens attached substrate 41W provided with the plurality of lens attached substrates 41a will be referred to as a lens attached substrate 41W-a and the substrate-like lens attached substrate 41W provided with the plurality of lens attached substrates 41b will be referred to as a lens attached substrate 41W-b. The same also applies to the other lens attached substrates 41c to 41e.

Figure 31A:
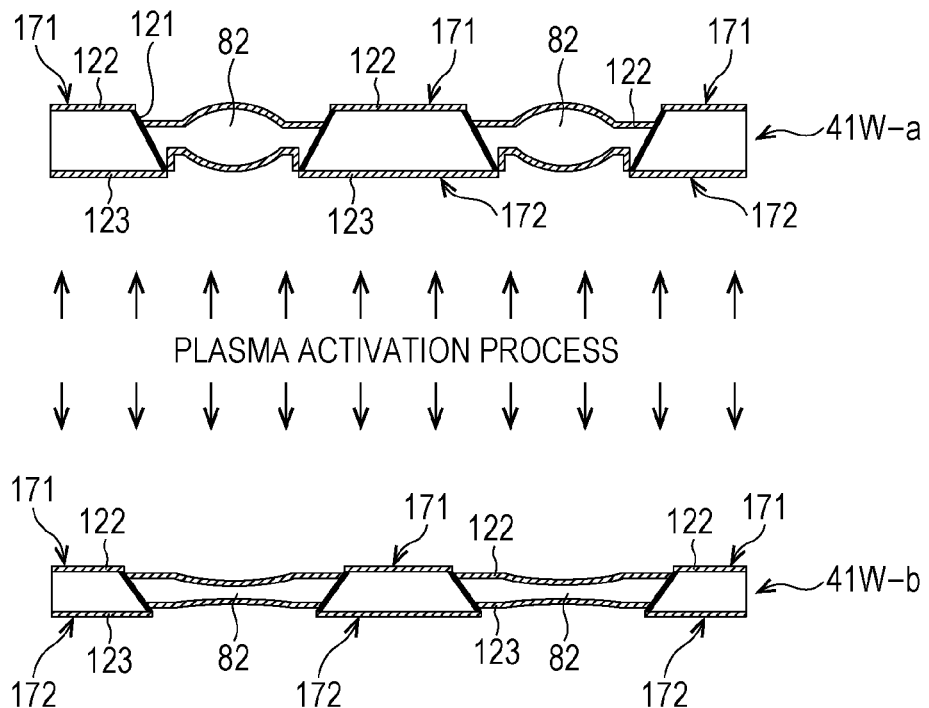
FIGS. 31A and 31B are diagrams illustrating a state where substrate-like lens attached substrates are bonded to each other.
Figure 31B:
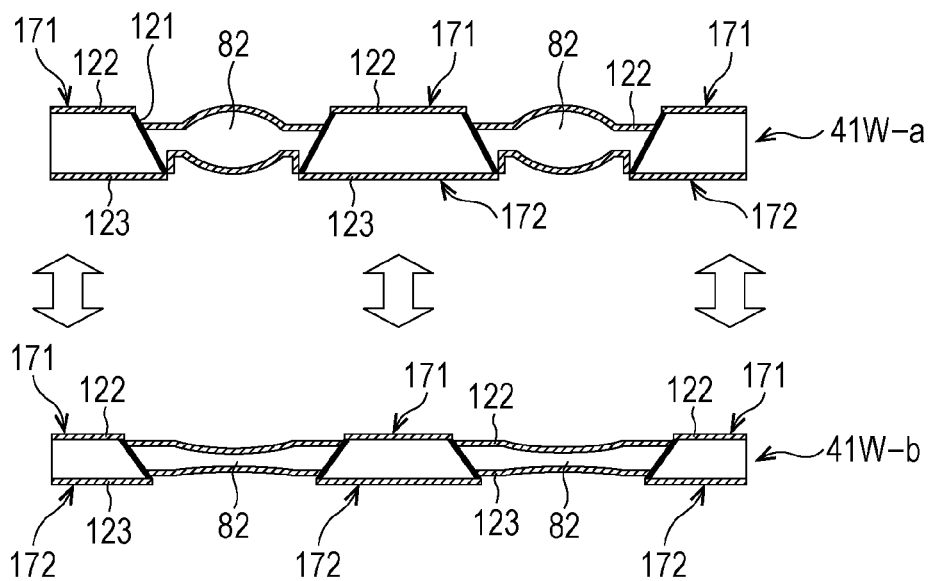

Referring to FIGS. 31A and 31B, a method of directly bonding the substrate-like lens attached substrate 41W-a and the substrate-like lens attached substrate 41W-b to each other will be described.

In addition, in FIGS. 31A and 31B, a portion of the lens attached substrate 41W-b corresponding to the portion of the lens attached substrate 41W-a will be described by giving the same reference numeral as the lens attached substrate 41W-a thereto.

The upper surface layer 122 or 125 is formed on the upper surfaces of the lens attached substrate 41W-a and the lens attached substrate 41W-b. The lower surface layer 123 or 124 is formed on the lower surfaces of the lens attached substrate 41W-a and the lens attached substrate 41W-b. Then, as illustrated in FIG. 31A, a plasma activation process is performed on the entire lower surface including the rear surface flat portion 172 of the lens attached substrate 41W-a and the entire upper surface including the front surface flat portion 171 of the lens attached substrate 41W-b as the bonding surfaces of the lens attached substrates 41W-a and 41W-b. A gas used in the plasma activation process may be $O_2$, $N_2$, He, Ar, or $H_2$ as long as the plasma process can be performed. Here, when a gas having the same element as the upper surface layer 122 and the lower surface layer 123 is used as the gas used in the plasma activation process, a change in quality of the films of the upper surface layer 122 and the lower surface layer 123 can be desirably suppressed.

Then, as illustrated in FIG. 31B, the rear surface flat portion 172 of the lens attached substrate 41W-a is bonded to the front surface flat portion 171 of the lens attached substrate 41W-b while the surfaces are activated.

By the bonding process between the lens attached substrates, hydrogen binding occurs between the hydrogen of the OH group of the surface of the lower surface layer 123 or 124 of the lens attached substrate 41W-a and the hydrogen of the OH group of the surface of the upper surface layer 122 or 125 of the lens attached substrate 41W-b. Accordingly, the lens attached substrate 41W-a and the lens attached substrate 41W-b are fixed. A process of bonding the lens attached substrates to each other can be performed under the atmospheric pressure.

An annealing process is performed on the lens attached substrate 41W-a and the lens attached substrate 41W-b subjected to the bonding process. Accordingly, the dehydration condensation occurs in the binding state of the hydrogen of the OH group and covalent binding is formed through oxygen between the lower surface layer 123 or 124 of the lens attached substrate 41W-a and the upper surface layer 122 or 125 of the lens attached substrate 41W-b. Alternatively, covalent binding occurs between the element included in the lower surface layer 123 or 124 of the lens attached substrate 41W-a and the element included in the upper surface layer 122 or 125 of the lens attached substrate 41W-b. Due to the binding, two lens attached substrates are strongly fixed to each other. In this way, the covalent binding is formed between the lower surface layer 123 or 124 of the upper lens attached substrate 41W and the upper surface layer 122 or 125 of the lower lens attached substrate 41W so that two lens attached substrates 41W are fixed to each other. In the present specification, this will be referred to as the direct bonding. In the method of fixing the plurality of lens attached substrates in the entire substrates by the resin disclosed in PTL 1, there is a concern that the resin may be curably shrunk or thermally expanded and hence the lens may be deformed. On the contrary, since the direct bonding of the present technology does not use the resin when the plurality of lens attached substrates 41W is fixed, there is an operation or effect in which the plurality of lens attached substrates 41W can be fixed without causing curable shrinkage or thermal expansion.

The annealing process can be also performed in the atmospheric pressure. The annealing process can be performed at the temperature equal to or higher than 100° C., 150° C., or 200° C. due to the dehydration condensation. Meanwhile, the annealing process can be performed at a temperature equal to or lower than 400° C., 350° C., or 300° C. from the viewpoint of protecting the energy curable resin 191 forming the lens resin portion 82 from heat or suppressing the degassing from the energy curable resin 191.

When the lens attached substrate 41W-a and the lens attached substrate 41W-b bonded to each other are returned to the environment of the atmospheric pressure in a state where the bonding process between the lens attached substrates 41W or the direct bonding process between the lens attached substrates 41W is performed in the condition other than the atmospheric pressure, a pressure difference occurs with respect to a space between the lens resin portion 82 and the lens resin portion 82 and the outside of the lens resin portion 82. Due to the pressure difference, a pressure is applied to the lens resin portion 82. Thus, there is a concern that the lens resin portion 82 is deformed.

When the bonding process between the lens attached substrates 41W or the direct bonding process between the lens attached substrates is performed in the condition of the atmospheric pressure, there is an operation or effect in which the deformation of the lens resin portion 82 which may be caused by the bonding performed in the condition other than the atmospheric pressure can be prevented.

Since it is possible to suppress the fluidity and the thermal expansion obtained, for example, when resin is used as an adhesive by performing the direct bonding, that is, the plasma bonding of the substrates subjected to a plasma activation process, it is possible to improve the positional accuracy when the lens attached substrate 41W-a and the lens attached substrate 41W-b are bonded to each other.

As described above, the upper surface layer 122 or the lower surface layer 123 is formed on the rear surface flat portion 172 of the lens attached substrate 41W-a and the front surface flat portion 171 of the lens attached substrate 41W-b. The upper surface layer 122 and the lower surface layer 123 can be easily directly bonded to each other due to the plasma activation process performed in advance. That is, the lower surface layer 123 formed on the rear surface flat portion 172 of the lens attached substrate 41W-a and the upper surface layer 122 formed on the front surface flat portion 171 of the lens attached substrate 41W-b are also used to improve the bonding strength.

Further, when the upper surface layer 122 or the lower surface layer 123 is formed as an oxide film, an influence of a change in quality of the film due to plasma ($O_2$) does not occur. For this reason, there is an effect in which a corrosion caused by the plasma is suppressed in the lens resin portion 82.

As described above, the substrate-like lens attached substrate 41W-a provided with the plurality of lens attached substrates 41a and the substrate-like lens attached substrate 41W-b provided with the plurality of lens attached substrates 41b are directly bonded after the surface activation process using plasma. That is, both substrates are bonded to each other by plasma bonding.

FIGS. 32A to 32F illustrate a first laminating method of laminating five lens attached substrates 41a to 41e corresponding to the layered lens structure 11 of FIG. 13 in the form of a substrate by using the method of bonding the substrate-like lens attached substrates 41W described by referring to FIGS. 31A and 31B.

Figure 32A:
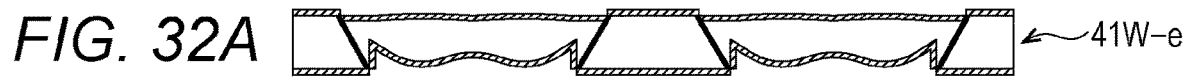
FIG. 32A-32F are diagrams illustrating a first laminating method of laminating five lens attached substrates in the form of a substrate.

First, as illustrated in FIG. 32A, a substrate-like lens attached substrate 41W-e located at the lowermost layer of the layered lens structure 11 is prepared.

Figure 32B:
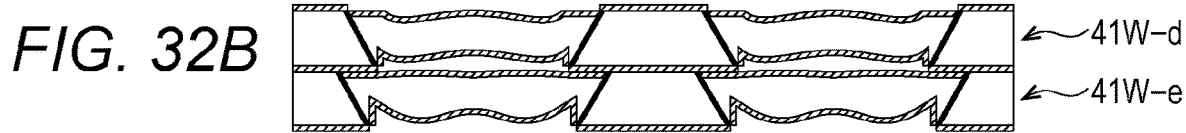

Next, as illustrated in FIG. 32B, a substrate-like lens attached substrate 41W-d located at the second layer position of the layered lens structure 11 from the downside is bonded onto the substrate-like lens attached substrate 41W-e.

Figure 32C:
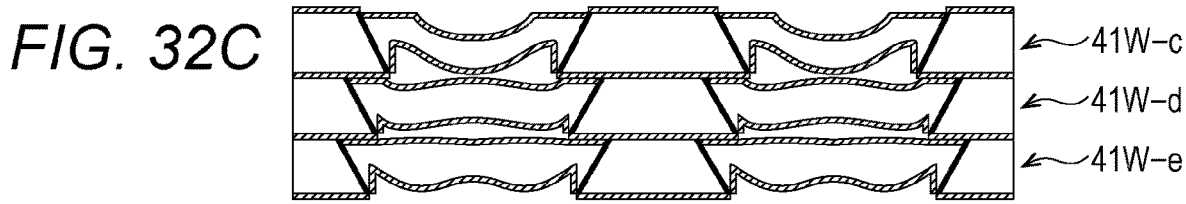

Next, as illustrated in FIG. 32C, a substrate-like lens attached substrate 41W-c located at the third layer position of the layered lens structure 11 from the downside is bonded onto the substrate-like lens attached substrate 41W-d.

Figure 32D:
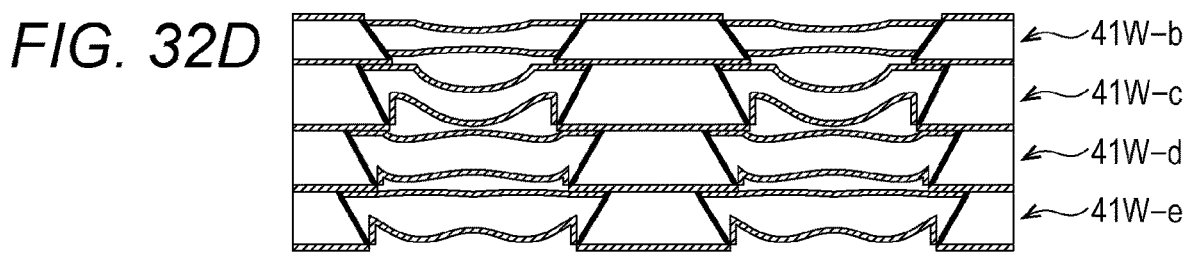

Next, as illustrated in FIG. 32D, the substrate-like lens attached substrate 41W-b located at the fourth layer position of the layered lens structure 11 from the downside is bonded onto the substrate-like lens attached substrate 41W-c.

Figure 32E:
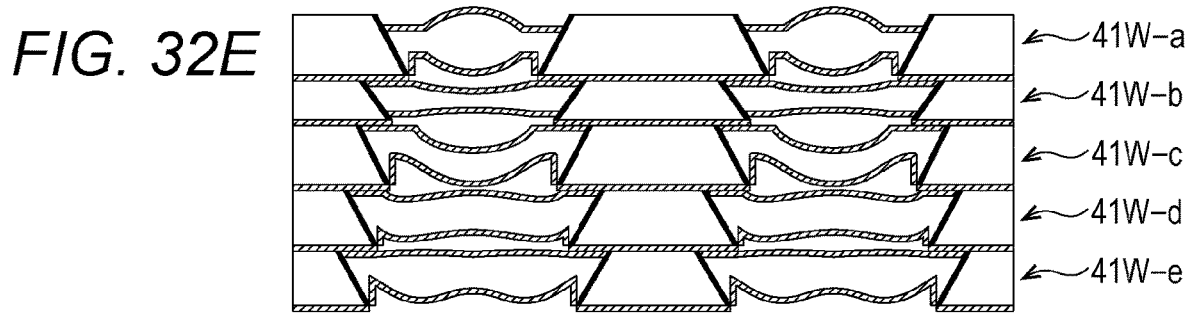

Next, as illustrated in FIG. 32E, the substrate-like lens attached substrate 41W-a located at the fifth layer position of the layered lens structure 11 from the downside is bonded onto the substrate-like lens attached substrate 41W-b.

Figure 32F:
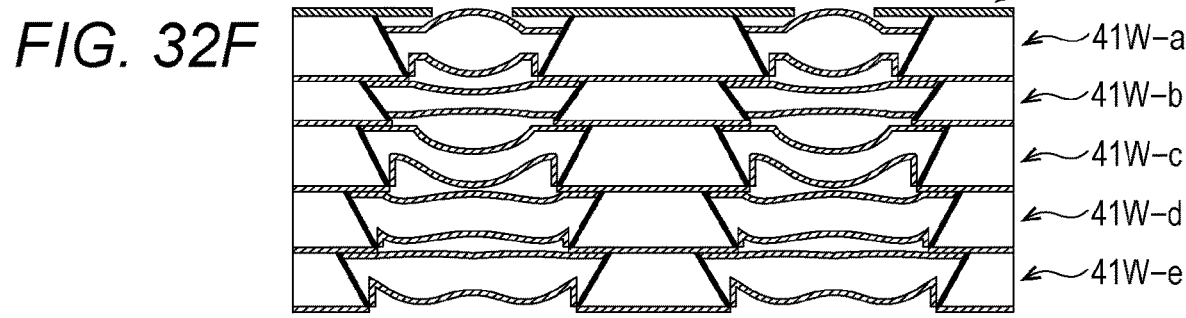

Finally, as illustrated in FIG. 32F, the diaphragm plate 51W located at the upper layer of the lens attached substrate 41a in the layered lens structure 11 is bonded onto the substrate-like lens attached substrate 41W-a.

As described above, it is possible to obtain the substrate-like layered lens structure 11W by sequentially laminating five lens attached substrates 41W-a to 41W-e provided in the form of a substrate in a direction from the lower lens attached substrate 41W of the layered lens structure 11 toward the upper lens attached substrate 41W thereof.

FIGS. 33A to 33F illustrate a second laminating method of laminating five lens attached substrates 41a to 41e corresponding to the layered lens structure 11 of FIG. 13 in the form of a substrate by using the method of bonding the substrate-like lens attached substrates 41W described by referring to FIGS. 31A and 31B.

Figure 33A:
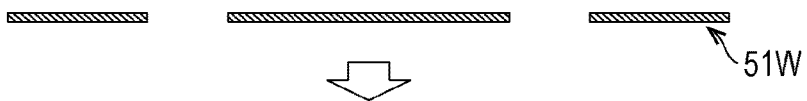
FIG. 33A-33F are diagrams illustrating a second laminating method of laminating five lens attached substrates in the form of a substrate.

First, as illustrated in FIG. 33A, the diaphragm plate 51W located at the upper layer of the lens attached substrate 41a in the layered lens structure 11 is prepared.

Figure 33B:
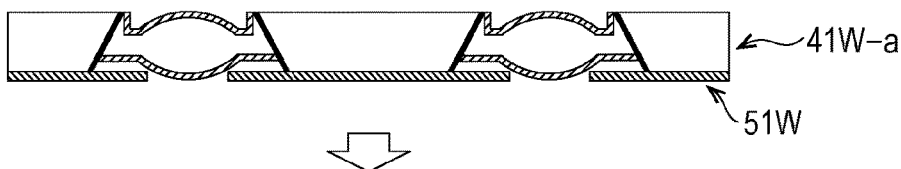

Next, as illustrated in FIG. 33B, the substrate-like lens attached substrate 41W-a located at the uppermost layer in the layered lens structure 11 is bonded onto the diaphragm plate 51W while being reversed upside down.

Figure 33C:
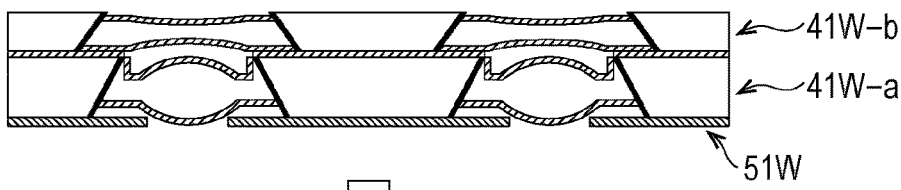

Next, as illustrated in FIG. 33C, the substrate-like lens attached substrate 41W-b located at the second layer position of the layered lens structure 11 from the upside is bonded onto the substrate-like lens attached substrate 41W-a while being reversed upside down.

Figure 33D:
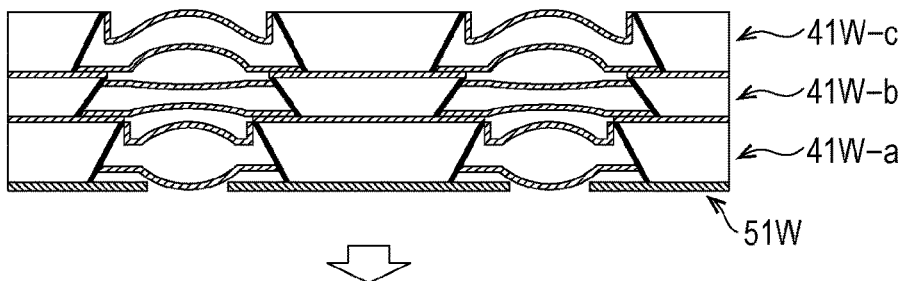

Next, as illustrated in FIG. 33D, the substrate-like lens attached substrate 41W-c located at the third layer position of the layered lens structure 11 from the upside is bonded onto the substrate-like lens attached substrate 41W-b while being reversed upside down.

Figure 33E:
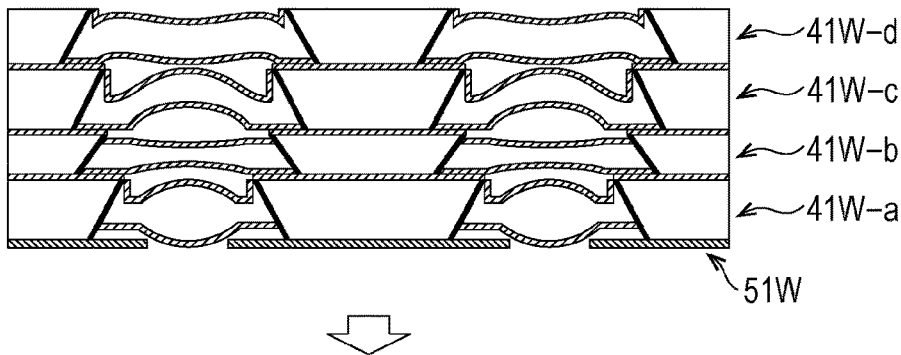

Next, as illustrated in FIG. 33E, the substrate-like lens attached substrate 41W-d located at the fourth layer position of the layered lens structure 11 from the upside is bonded onto the substrate-like lens attached substrate 41W-c while being reversed upside down.

Figure 33F:
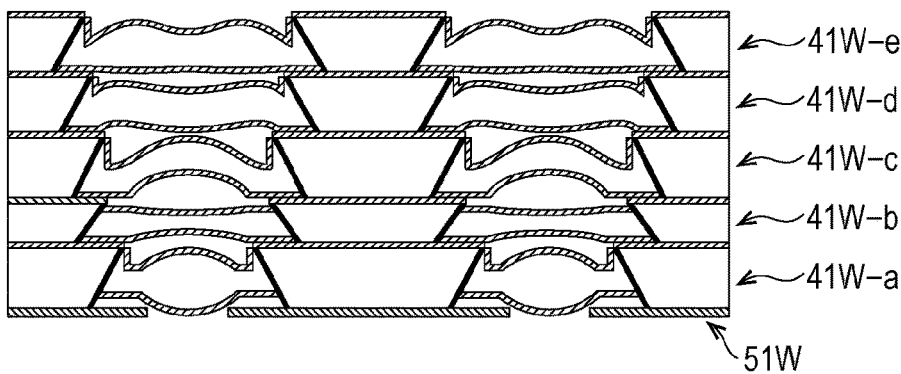

Finally, as illustrated in FIG. 33F, the substrate-like lens attached substrate 41W-e located at the fifth layer position of the layered lens structure 11 from the upside is bonded onto the substrate-like lens attached substrate 41W-d while being reversed upside down.

As described above, it is possible to obtain the substrate-like layered lens structure 11W by sequentially laminating five lens attached substrates 41W-a to 41W-e provided in the form of a substrate in a direction from the upper lens attached substrate 41W of the layered lens structure 11 toward the lower lens attached substrate 41W thereof.

Since five lens attached substrates 41W-a to 41W-e laminated by the laminating method described in FIG. 32A to 32F or 33A to 33F are divided into the unit of a module or a chip by the use of a blade or a laser, the layered lens structure 11 in which five lens attached substrates 41a to 41e are laminated is obtained.

12. Eighth and Ninth Embodiments of Camera Module

FIG. 34 is a diagram illustrating an eighth embodiment of a camera module that uses a layered lens structure according to an embodiment of the present technology.

Figure 35:
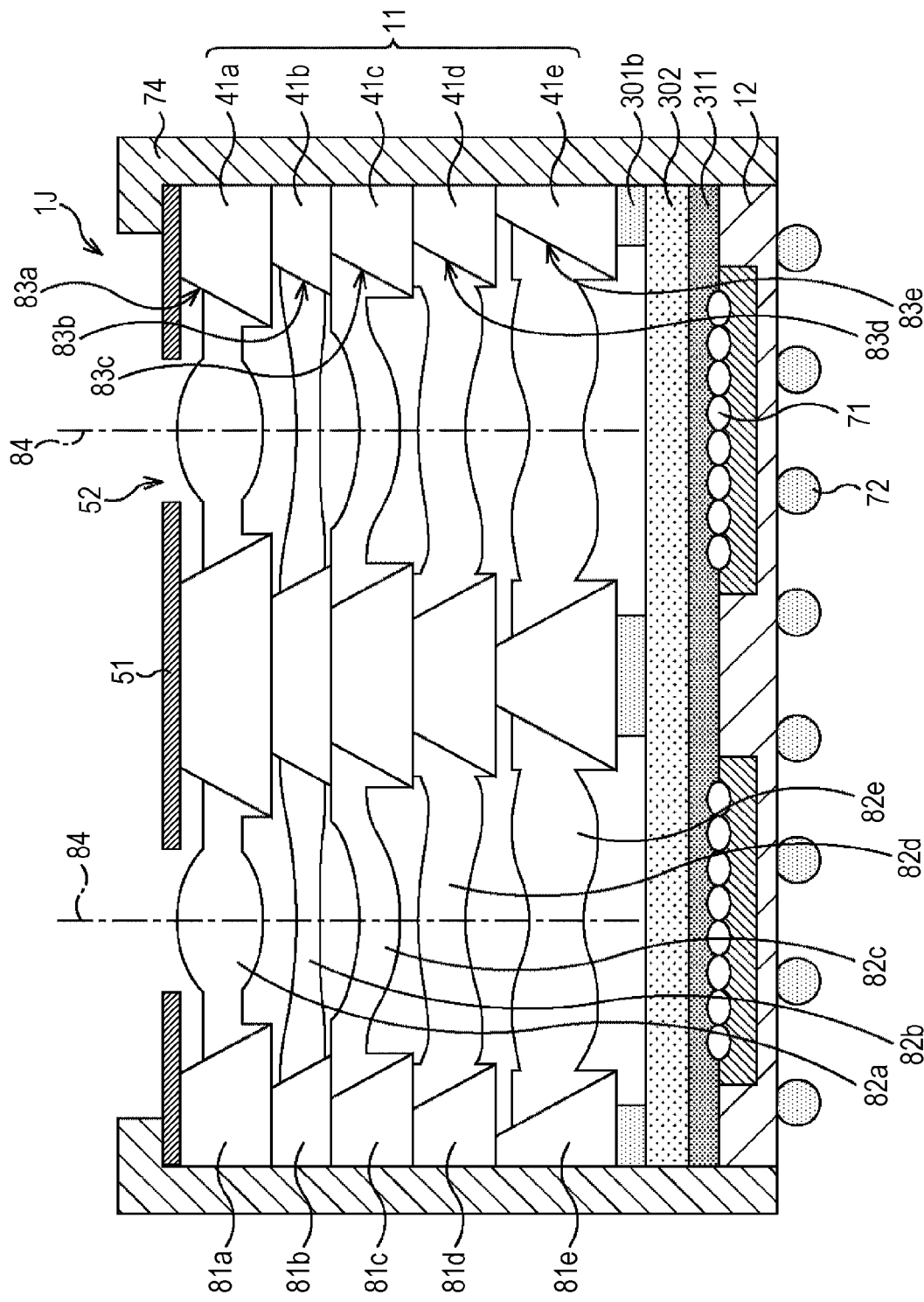
FIG. 35 is a diagram illustrating a ninth embodiment of a camera module that uses a layered lens structure according to an embodiment of the present technology.

FIG. 35 is a diagram illustrating a ninth embodiment of a camera module that uses a layered lens structure according to an embodiment of the present technology.

In the description of FIGS. 34 and 35, only the difference from the camera module E illustrated in FIG. 13 will be described.

A camera module 1H of FIG. 34 and a camera module 1J of FIG. 35 have a configuration in which the portion of the structure material 73 of the camera module E illustrated in FIG. 13 is replaced by a different portion.

In the camera module 1H of FIG. 34, the portion of the structure material 73 of the camera module 1J is replaced by structure materials 301a and 301b and an optical transparent substrate 302.

Specifically, a structure material 301a is disposed in a part of the upper side of the light receiving element 12. The light receiving element 12 and the optical transparent substrate 302 are fixed through the structure material 301a. The structure material 301a is, for example, an epoxy resin.

A structure material 301b is disposed at the upper side of the optical transparent substrate 302. The optical transparent substrate 302 and the layered lens structure 11 are fixed through the structure material 301b. The structure material 301b is, for example, an epoxy resin.

On the contrary, in the camera module 1J of FIG. 35, the portion of the structure material 301a of the camera module 1H of FIG. 34 is replaced by a resin layer 311 having an optical transparent property.

The resin layer 311 is disposed at the entire upper surface of the light receiving element 12. The light receiving element 12 and the optical transparent substrate 302 are fixed through the resin layer 311. The resin layer 311 disposed at the entire upper surface of the light receiving element 12 has an operation or effect in which a stress is distributed in the entire surface of the light receiving element 12 while the stress applied from the upper side of the optical transparent substrate 302 to the optical transparent substrate 302 is not intensively applied to a part of an area of the light receiving element 12.

The structure material 301b is disposed at the upper side of the optical transparent substrate 302. The optical transparent substrate 302 and the layered lens structure 11 are fixed through the structure material 301b.

The camera module 1H of FIG. 34 and the camera module 1J of FIG. 35 include the optical transparent substrate 302 at the upper side of the light receiving element 12. The optical transparent substrate 302 has an operation or effect in which the damage of the light receiving element 12 is suppressed during, for example, the manufacturing process of the camera module 1H or 1J.

13. Tenth Embodiment of Camera Module

Figure 36:
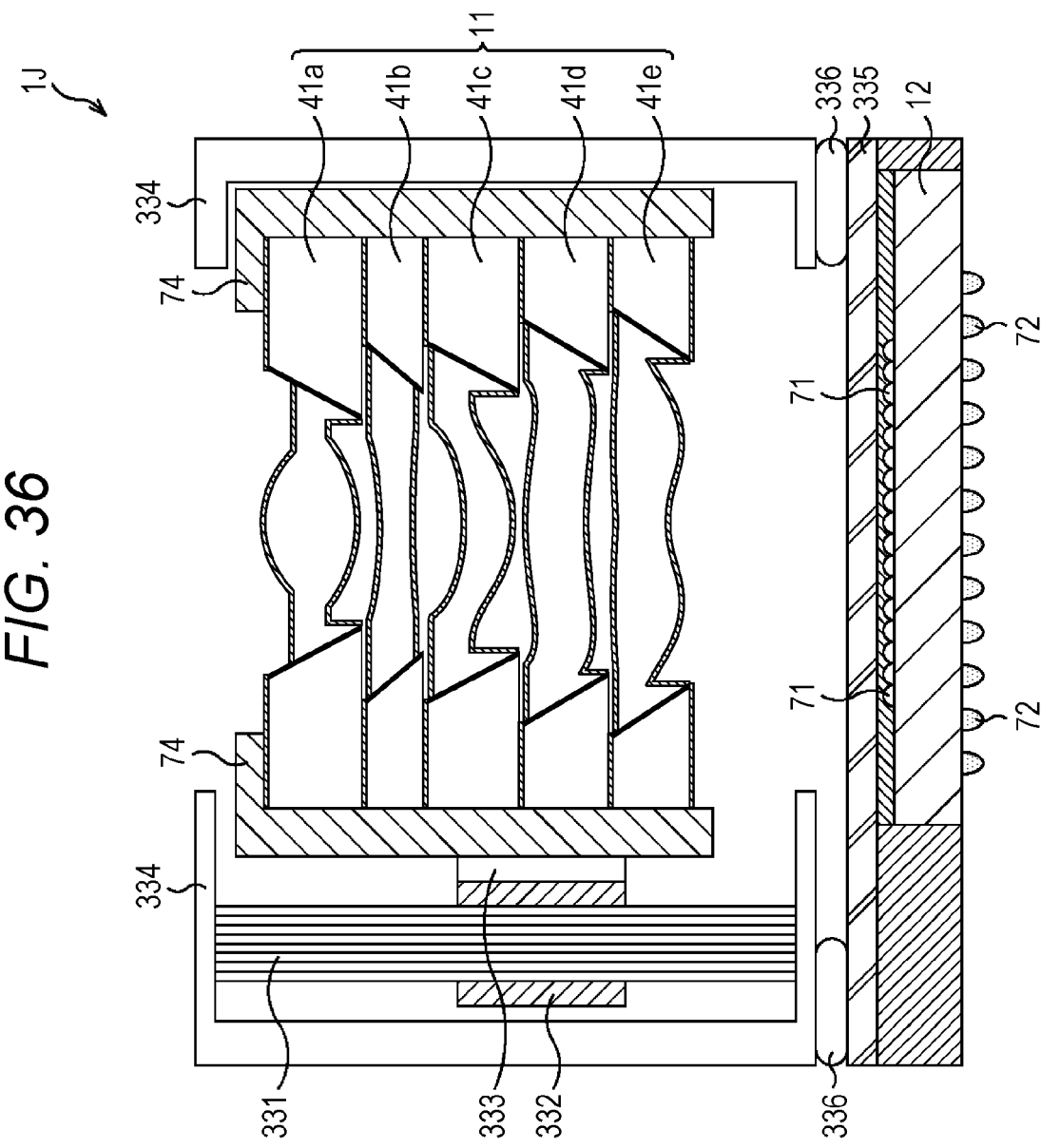
FIG. 36 is a diagram illustrating a tenth embodiment of a camera module that uses a layered lens structure according to an embodiment of the present technology.

FIG. 36 is a diagram illustrating a tenth embodiment of a camera module that uses a layered lens structure according to an embodiment of the present technology.

In the camera module 1J illustrated in FIG. 36, the layered lens structure 11 is received in a lens barrel 74. The lens barrel 74 is fixed to a moving member 332 moving along a shaft 331 by a fixed member 333. When the lens barrel 74 is moved in the axial direction of the shaft 331 by a driving motor (not illustrated), a distance from the layered lens structure 11 to the imaging surface of the light receiving element 12 is adjusted.

The lens barrel 74, the shaft 331, the moving member 332, and the fixed member 333 are received in a housing 334. A protection substrate 335 is disposed at the upper portion of the light receiving element 12 and the protection substrate 335 and the housing 334 are connected to each other by an adhesive 336.

A mechanism for moving the layered lens structure 11 has an operation or effect in which an auto focusing operation can be performed when a camera using the camera module 1J captures an image.

14. Eleventh Embodiment of Camera Module

Figure 37:
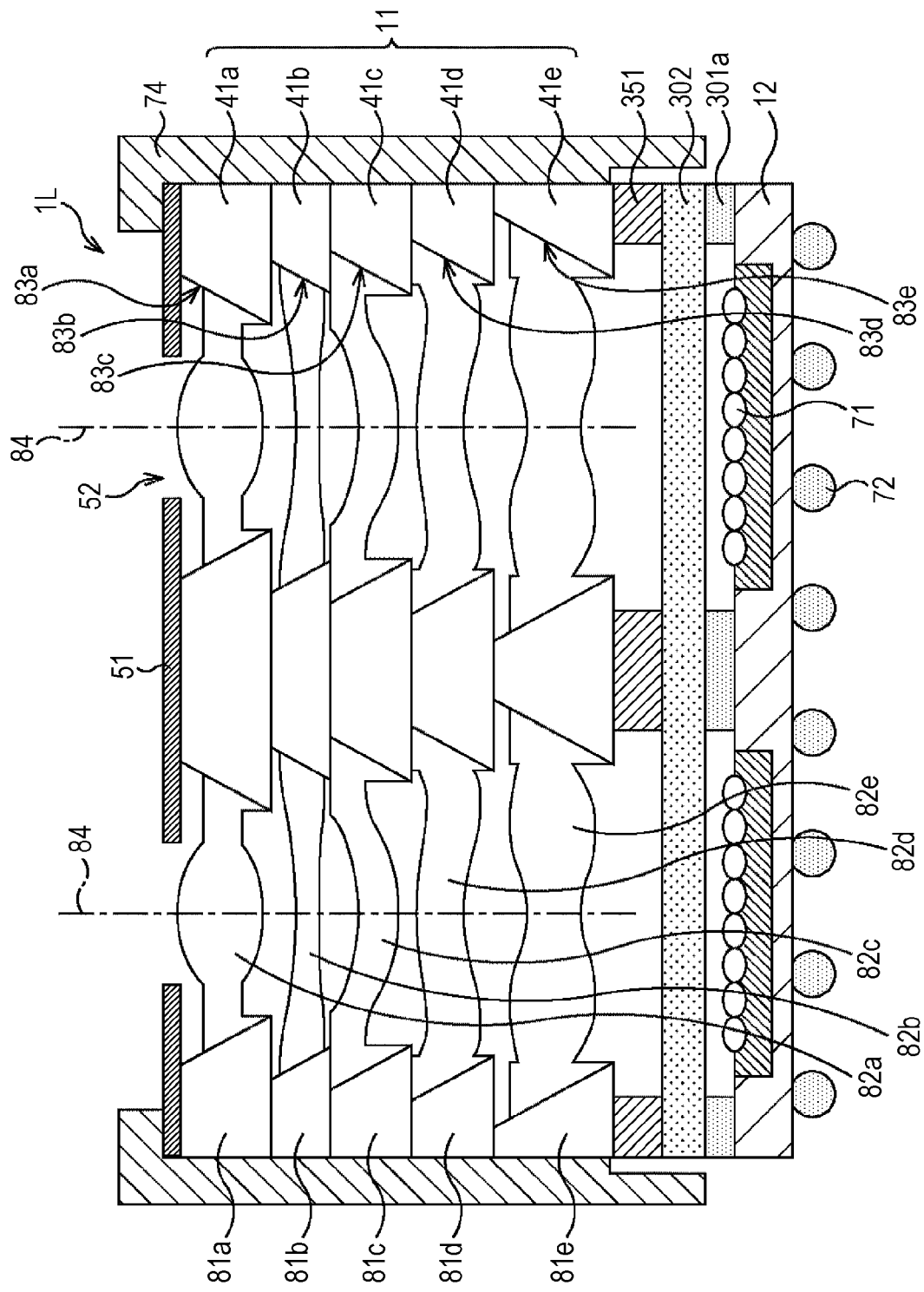
FIG. 37 is a diagram illustrating an eleventh embodiment of a camera module that uses a layered lens structure according to an embodiment of the present technology.

FIG. 37 is a diagram illustrating an eleventh embodiment of a camera module that uses a layered lens structure according to an embodiment of the present technology.

A camera module 1L of FIG. 37 is a camera module additionally including a focus adjustment mechanism configured as a piezoelectric element.

That is, in the camera module 1L, the structure material 301a is disposed in a part of the upper side of the light receiving element 12 similarly to the camera module 1H of FIG. 34. The light receiving element 12 and the optical transparent substrate 302 are fixed through the structure material 301a. The structure material 301a is, for example, an epoxy resin.

A piezoelectric element 351 is disposed at the upper side of the optical transparent substrate 302. The optical transparent substrate 302 and the layered lens structure 11 are fixed through the piezoelectric element 351.

In the camera module 1L, the layered lens structure 11 can be moved in the up and down direction in a manner such that a voltage is applied or not applied to the piezoelectric element 351 disposed at the lower side of the layered lens structure 11. The member of moving the layered lens structure 11 is not limited to the piezoelectric element 351 and the other device of which the shape changes in accordance with whether the voltage is applied or not. For example, a MEMS device can be used.

A mechanism moving the layered lens structure 11 has an operation or effect in which the auto focusing operation can be performed when a camera using the camera module 1L captures an image.

15. Effect of Present Structure Compared with Different Structure

The layered lens structure 11 is a structure (hereinafter, referred to as the present structure) fixing the lens attached substrates 41 to each other by direct bonding. The operation and the effect of the present structure will be described based on the comparison with the other structure of the lens attached substrate provided with the lens.

Comparative Structure Example 1

Figure 38:
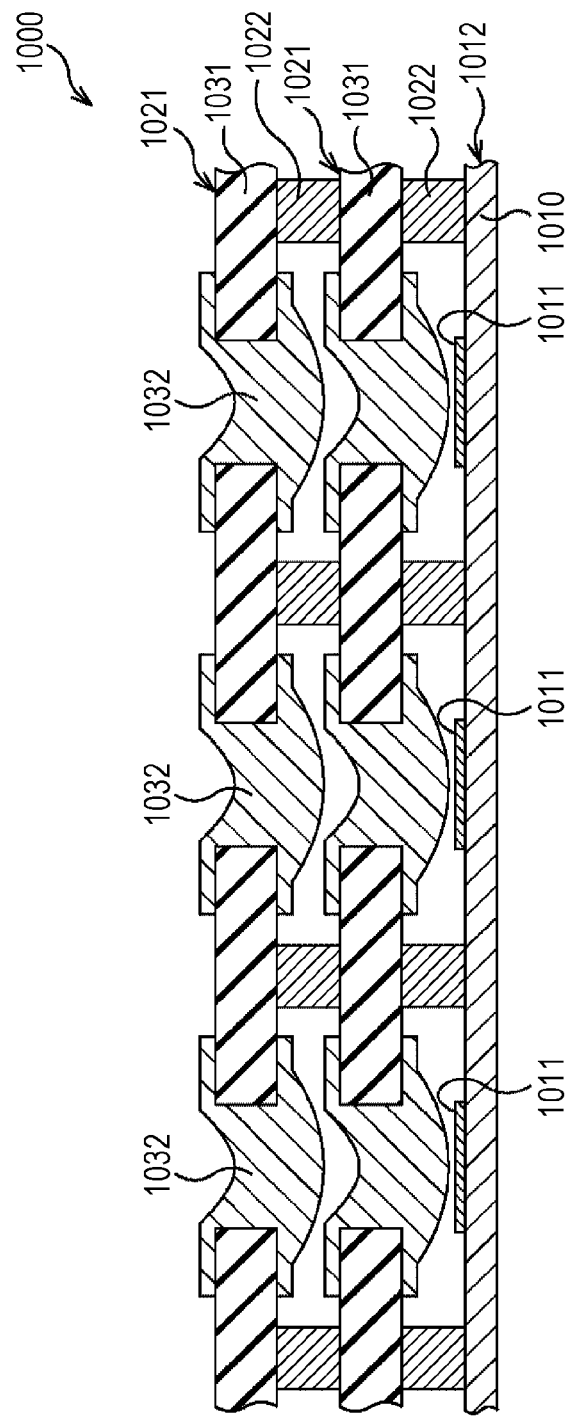
FIG. 38 is a cross-sectional view of a wafer level lamination structure as Comparative Structure Example 1.

FIG. 38 is a cross-sectional view of a wafer level lamination structure which is a first substrate structure (hereinafter, referred to as Comparative Structure Example 1) used to be compared with the present structure and is disclosed as FIG. 14B in JP 2011-138089 A (hereinafter, referred to as Comparative Literature 1).

A wafer level lamination structure 1000 illustrated in FIG. 38 has a structure in which two lens array substrates 1021 are laminated on a sensor array substrate 1012 in which a plurality of image sensors 1011 is disposed on a wafer substrate 1010 through a columnar spacer 1022. Each lens array substrate 1021 includes a lens attached substrate 1031 and a lens 1032 which is formed in a plurality of through-hole portions provided in the lens attached substrate 1031.

Comparative Structure Example 2

Figure 39:
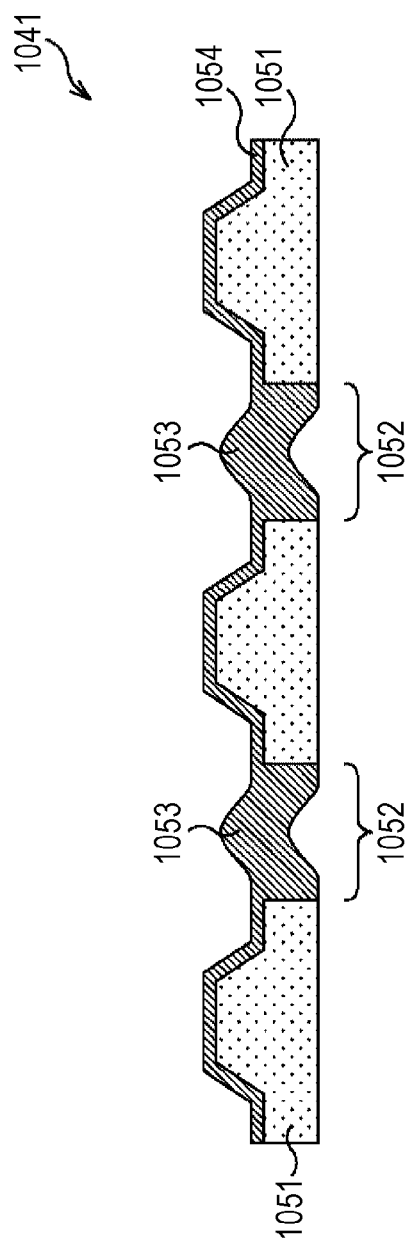
FIG. 39 is a cross-sectional view of a lens array substrate as Comparative Structure Example 2.

FIG. 39 is a cross-sectional view of a lens array substrate which is a second substrate structure (hereinafter, referred to as Comparative Structure Example 2) used to be compared with the present structure and is disclosed as FIG. 5A in JP 2009-279790 A (hereinafter, referred to as Comparative Literature 2).

In a lens array substrate 1041 illustrated in FIG. 39, a lens 1053 is provided in each of a plurality of through-holes 1052 provided in a plate-like substrate 1051. Each lens 1053 is formed of a resin (energy curable resin) 1054 and the resin 1054 is also formed on the upper surface of the substrate 1051.

Figure 40A:
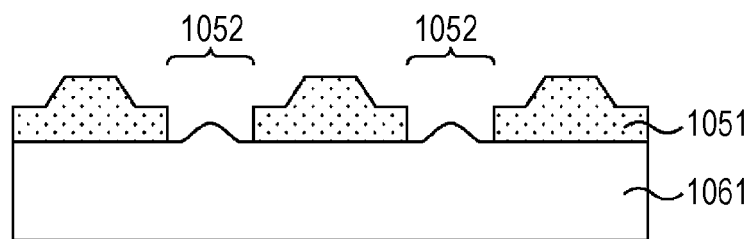
FIG. 40A-40C are diagrams illustrating a lens array substrate manufacturing method of FIG. 39.
Figure 40B:
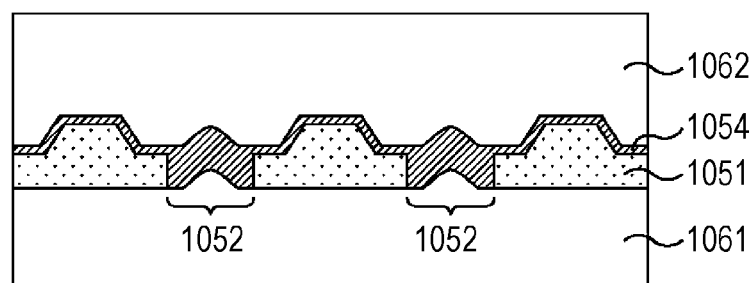
Figure 40C:
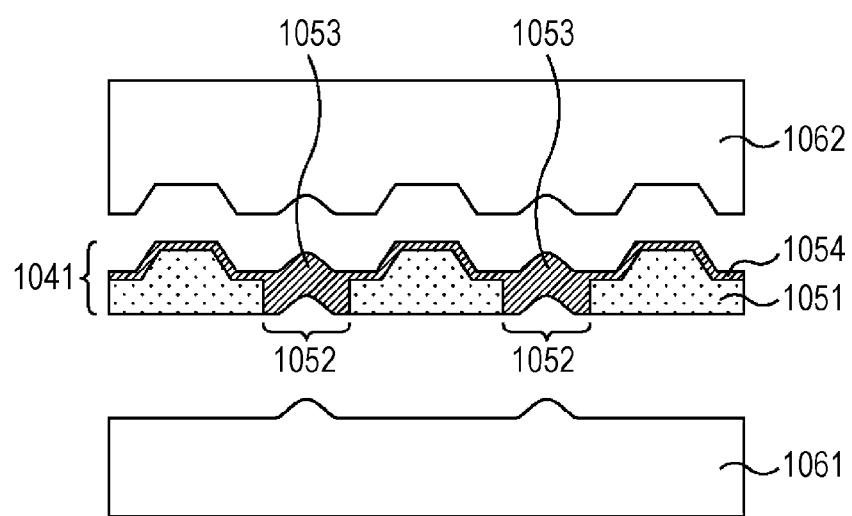

Referring to FIGS. 40A to 40C, a method of manufacturing the lens array substrate 1041 of FIG. 39 will be simply described.

FIG. 40A illustrates a state where the substrate 1051 provided with the plurality of through-holes 1052 is placed on a lower die 1061. The lower die 1061 is a mold that presses the resin 1054 in a direction from the downside toward the upside in the subsequent steps.

FIG. 40B illustrates a state where the resin 1054 is applied into the plurality of through-holes 1052 and onto the upper surface of the substrate 1051, an upper die 1062 is disposed on the substrate 1051, and the resin is press-molded by the upper die 1062 and the lower die 1061. The upper die 1062 is a mold that presses the resin 1054 in a direction from the upside toward the downside. In the state illustrated in FIG. 40B, the resin 1054 is cured.

FIG. 40C illustrates a state where the upper die 1062 and the lower die 1061 are separated from the cured resin 1054 and the lens array substrate 1041 is completed.

The lens array substrate 1041 has the following characteristic points.

(1) The resin 1054 formed at the position of the through-hole 1052 of the substrate 1051 is formed as the lens 1053 and the lens 1053 is formed at a plurality of positions of the substrate 1051.

(2) The resin 1054 is formed as a thin layer on the entire upper surface of the substrate 1051 located among the plurality of lenses 1053.

In the case of the structure in which the lens array substrates 1041 are laminated, there is an operation or effect in which a thin layer of the resin 1054 formed on the entire upper surface of the substrate 1051 serves as an adhesive used to bond the substrates to each other.

Further, in the case of the structure in which the lens array substrates 1041 are laminated, an area for bonding the substrates can be increased compared with the wafer level lamination structure 1000 of FIG. 38 as Comparative Structure Example 1 and hence the substrates can be bonded to each other by the stronger force.

Action of Resin of Comparative Structure Example 2

In Comparative Literature 2 in which the lens array substrate 1041 of FIG. 39 as Comparative Structure Example 2 is disclosed, the following actions of the resin 1054 as the lens 1053 are disclosed.

In Comparative Structure Example 2, an energy curable resin is used as the resin 1054. Then, a light curable resin is used as an example of the energy curable resin. When the light curable resin is used as the energy curable resin, the resin 1054 is cured when the resin 1054 is irradiated with UV light. Due to the curing operation, the resin 1054 is cured and shrunk.

However, according to the structure of the lens array substrate 1041 of FIG. 39, since the substrate 1051 is interposed between the plurality of lenses 1053 even when the resin 1054 is cured and shrunk, a change in distance between the lenses 1053 caused by the curable shrinkage of the resin 1054 can be broken. Accordingly, the curved state of the lens array substrate 1041 provided with the plurality of lenses 1053 can be suppressed.

Comparative Structure Example 3

Figure 41:
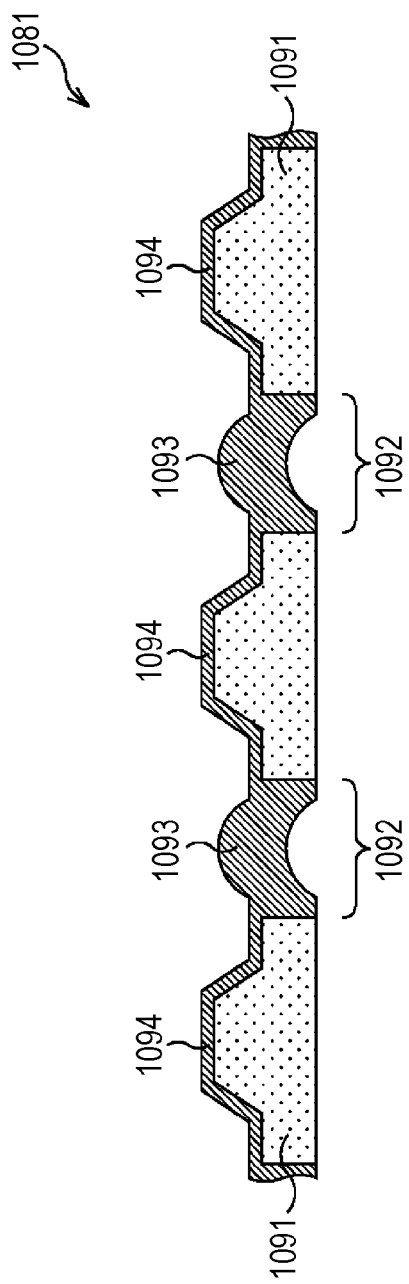
FIG. 41 is a cross-sectional view of a lens array substrate as Comparative Structure Example 3.

FIG. 41 is a cross-sectional view of a lens array substrate which is a third substrate structure (hereinafter, referred to as Comparative Structure Example 3) used to be compared with the present structure and is disclosed as FIG. 1 in JP 2010-256563 A (hereinafter, referred to as Comparative Literature 3).

In a lens array substrate 1081 illustrated in FIG. 41, a lens 1093 is provided in each of a plurality of through-holes 1092 provided in a plate-like substrate 1091. Each lens 1093 is formed of a resin (energy curable resin) 1094 and the resin 1094 is also formed on the upper surface of the substrate 1091 without the through-hole 1092.

Figure 42A:
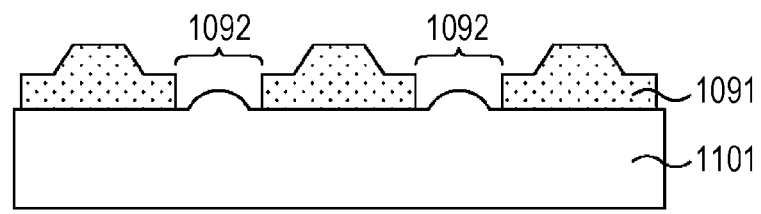
FIG. 42A-42C are diagrams illustrating a method of manufacturing the lens array substrate of FIG. 41.
Figure 42B:
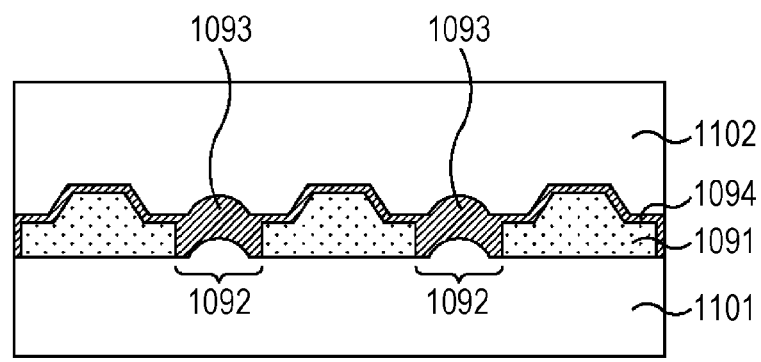
Figure 42C:
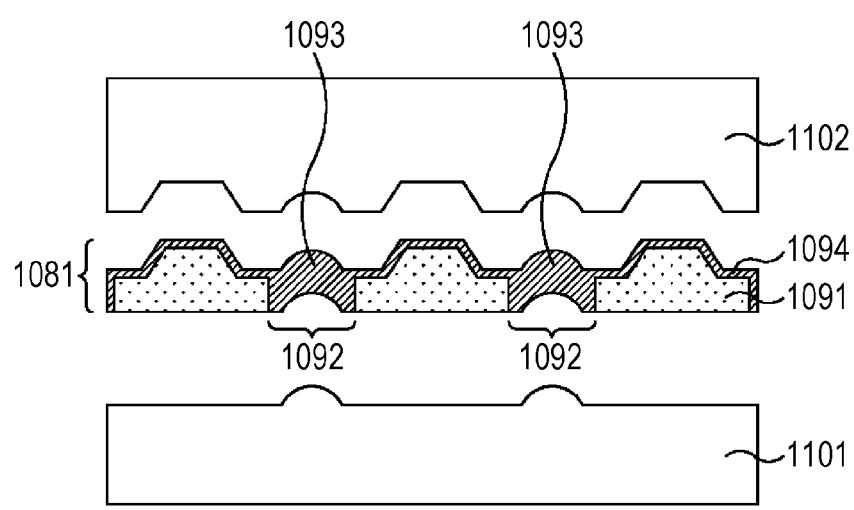

Referring to FIGS. 42A to 42C, a method of manufacturing the lens array substrate 1081 of FIG. 41 will be simply described.

FIG. 42A illustrates a state where the substrate 1091 provided with the plurality of through-holes 1092 is placed on a lower die 1101. The lower die 1101 is a mold that presses the resin 1094 in a direction from the downside toward the upside in the subsequent steps.

FIG. 42B illustrates a state where the resin 1094 is applied into the plurality of through-holes 1092 and onto the upper surface of the substrate 1091, an upper die 1102 is disposed on the substrate 1091, and the resin is press-molded by the use of the upper die 1102 and the lower die 1101. The upper die 1102 is a mold that presses the resin 1094 in a direction from the upside toward the downside. In the state illustrated in FIG. 42B, the resin 1094 is cured.

FIG. 42C illustrates a state where the upper die 1102 and the lower die 1101 are separated from the cured resin 1094 and the lens array substrate 1081 is completed.

The lens array substrate 1081 has the following characteristic points.

(1) The resin 1094 formed at the position of the through-hole 1092 of the substrate 1091 is formed as the lens 1093 and the lens 1093 is formed at a plurality of positions of the substrate 1091.

(2) The resin 1094 is formed as a thin layer on the entire upper surface of the substrate 1091 located among the plurality of lenses 1093.

Action of Resin of Comparative Structure Example 3

In Comparative Literature 3 in which the lens array substrate 1081 of FIG. 41 as Comparative Structure Example 3 is disclosed, the following actions of the resin 1094 as the lens 1093 are disclosed.

In Comparative Structure Example 3, an energy curable resin is used as the resin 1094. Then, a light curable resin is used as an example of the energy curable resin. When the light curable resin is used as the energy curable resin, the resin 1094 is cured when the resin 1094 is irradiated with UV light. Due to the curing operation, the resin 1094 is cured and shrunk.

However, according to the structure of the lens array substrate 1081 of FIG. 41, it is possible to break a change in distance between the lenses 1093 due to the curable shrinkage of the resin 1094 since the substrate 1091 is interposed among the plurality of lenses 1093 even when the resin 1094 is cured and shrunk. Accordingly, it is possible to suppress the curved state of the lens array substrate 1081 provided with the plurality of lenses 1093.

As described above, Comparative Literature 2 and 3 disclose the curable shrinkage occurring when the light curable resin is cured. Further, the curable shrinkage occurring when the light curable resin is cured is also disclosed in, for example, JP 2013-1091 A other than Comparative Literature 2 and 3.

Further, a problem in which the resin is cured and shrunk when the resin is molded in a lens shape and the molded resin is cured is not limited to the case of the light curable resin. For example, even in the case of the thermally curable resin as a kind of the energy curable resin, a problem arises in that the resin is cured and shrunk in the cured state similarly to the light curable resin. This problem is also disclosed in, for example, Comparative Literature 1 or 3 and JP 2010-204631 A.

Comparative Structure Example 4

Figure 43:
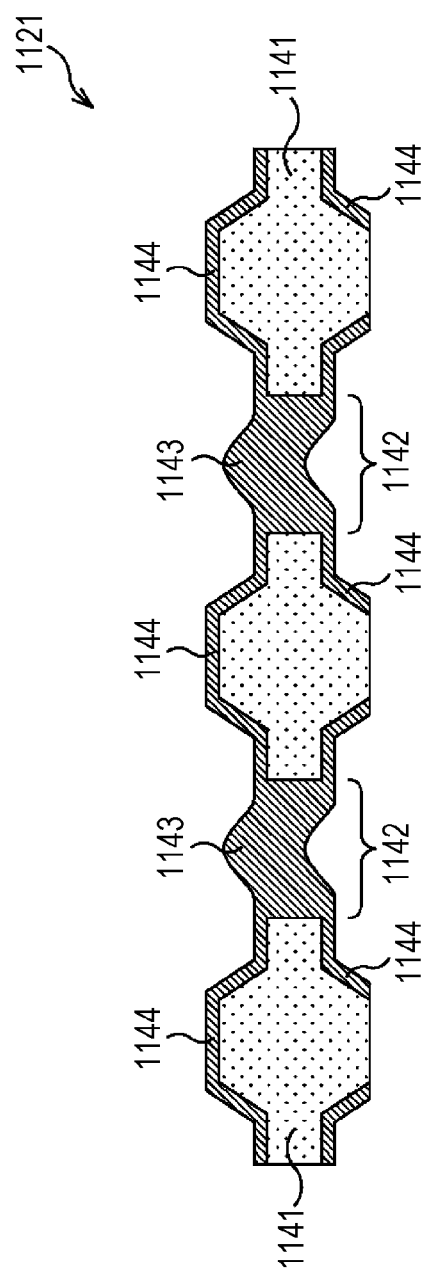
FIG. 43 is a cross-sectional view of a lens array substrate as Comparative Structure Example 4.

FIG. 43 is a cross-sectional view of a lens array substrate which is a fourth substrate structure (hereinafter, referred to as Comparative Structure Example 4) used to be compared with the present structure and is disclosed as FIG. 6 in Comparative Literature 2.

A lens array substrate 1121 of FIG. 43 is different from the lens array substrate 1041 illustrated in FIG. 39 in that the shape of the substrate 1141 other than the portion of the through-hole 1042 protrudes in both the upward and downward directions and resin 1144 is formed in a part of the lower surface of the substrate 1141. The other configuration of the lens array substrate 1121 is similar to that of the lens array substrate 1041 illustrated in FIG. 39.

Figure 44:
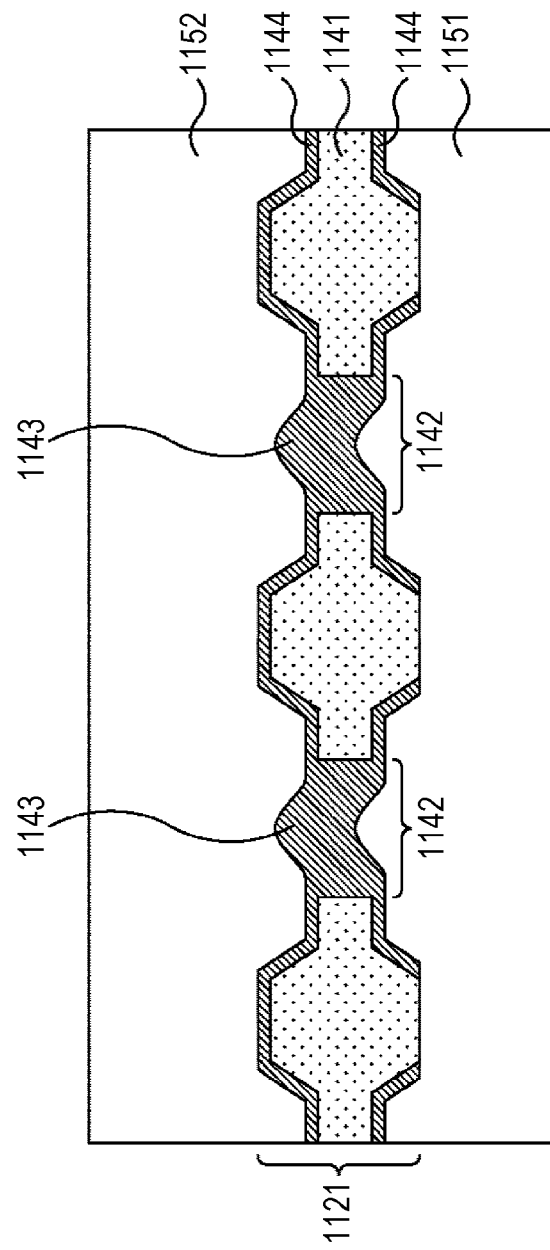
FIG. 44 is a diagram illustrating a method of manufacturing the lens array substrate of FIG. 43.

FIG. 44 is a diagram illustrating a method of manufacturing the lens array substrate 1121 of FIG. 43 and is a diagram corresponding to FIG. 40B.

FIG. 44 illustrates a state where the resin 1144 is applied into the plurality of through-holes 1142 and onto the upper surface of the substrate 1141 and is press-molded by the upper die 1152 and the lower die 1151. The resin 1144 is also injected between the lower surface of the substrate 1141 and the lower die 1151. In the state illustrated in FIG. 44, the resin 1144 is cured.

The lens array substrate 1121 has the following characteristic points.

(1) The resin 1144 formed at the position of the through-hole 1142 of the substrate 1141 is formed as a lens 1143 and the lens 1143 is formed at a plurality of positions of the substrate 1141.

(2) The resin 1144 is formed as a thin layer on a part of the lower surface of the substrate 1141 as well as the entire upper surface of the substrate 1141 located among the plurality of lenses 1143.

Action of Resin of Comparative Structure Example 4

In Comparative Literature 2 in which the lens array substrate 1121 of FIG. 43 as Comparative Structure Example 4 is disclosed, the following actions of the resin 1144 as the lens 1143 are disclosed.

Even in the lens array substrate 1121 of FIG. 43 as Comparative Structure Example 4, the light curable resin as an example of the energy curable resin is used as the resin 1144. Then, when the resin 1144 is irradiated with UV light, the resin 1144 is cured. Due to the curing operation, the resin 1144 is cured and shrunk similarly to Comparative Structure Examples 2 and 3.

However, in the lens array substrate 1121 of Comparative Structure Example 4, the resin 1144 is formed as a thin layer on a predetermined area of the lower surface of the substrate 1141 as well as the entire upper surface of the substrate 1141 located among the plurality of lenses 1143.

In this way, when the resin 1144 is formed on both upper and lower surfaces of the substrate 1141, the curved direction of the entire lens array substrate 1121 can be offset.

On the contrary, in the lens array substrate 1041 illustrated in FIG. 39 as Comparative Structure Example 2, the resin 1054 is formed as a thin layer on the entire upper surface of the substrate 1051 located among the plurality of lenses 1053, but a thin layer of the resin 1054 is not formed on the lower surface of the substrate 1051.

Thus, according to the lens array substrate 1121 of FIG. 43, it is possible to provide a lens array substrate of which the curved amount is smaller than that of the lens array substrate 1041 of FIG. 39.

Comparative Structure Example 5

Figure 45:
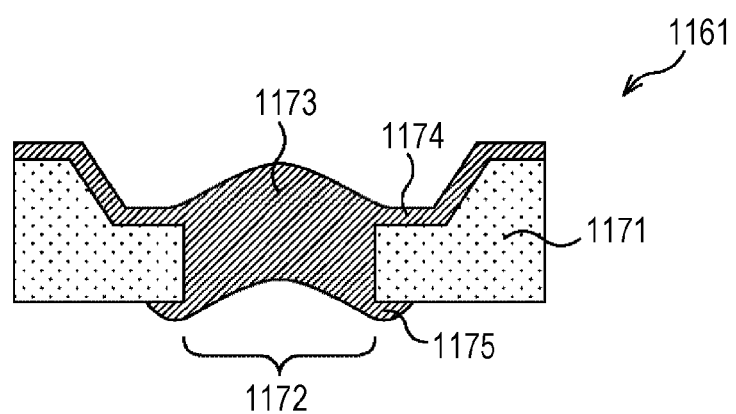
FIG. 45 is a cross-sectional view of a lens array substrate as Comparative Structure Example 5.

FIG. 45 is a cross-sectional view of a lens array substrate which is a fifth substrate structure (hereinafter, referred to as Comparative Structure Example 5) used to be compared with the present structure and is disclosed as FIG. 9 of Comparative Literature 2.

A lens array substrate 1161 of FIG. 45 is different from the lens array substrate 1041 illustrated in FIG. 39 in that the rear surface of the substrate in the vicinity of a through-hole 1172 provided in a substrate 1171 is provided with a resin visible area 1175. The other configuration of the lens array substrate 1161 is similar to that of the lens array substrate 1041 illustrated in FIG. 39.

In addition, the lens array substrate 1161 of FIG. 45 is divided.

The lens array substrate 1161 has the following characteristic points.

(1) Resin 1174 formed at the position of the through-hole 1172 of the substrate 1171 is formed as a lens 1173 and the lens 1173 is formed at a plurality of positions of the substrate 1171.

(2) The resin 1174 is formed as a thin layer on a part of the lower surface of the substrate 1171 as well as the entire upper surface of the substrate 1171 located among the plurality of lenses 1173.

Action of Resin of Comparative Structure Example 5

In Comparative Literature 2 in which the lens array substrate 1161 of FIG. 45 as Comparative Structure Example 5 is disclosed, the following actions of the resin 1174 as the lens 1173 are disclosed.

Even in the lens array substrate 1161 of FIG. 45 as Comparative Structure Example 5, the light curable resin as an example of the energy curable resin is used as the resin 1174. Then, when the resin 1174 is irradiated with UV light, the resin 1174 is cured. Due to the curing operation, the resin 1174 is cured and shrunk similarly to Comparative Structure Examples 2 and 3.

However, in the lens array substrate 1171 of Comparative Structure Example 5, the resin 1174 is formed as a thin layer (the resin visible area 1175) on a predetermined area of the lower surface of the substrate 1171 as well as the entire upper surface of the substrate 1171 located among the plurality of lenses 1173. Accordingly, it is possible to provide the lens array substrate in which the curved direction of the entire lens array substrate 1171 is offset and the curved amount is further decreased.

Comparison of Action of Resin of Comparative Structure Examples 2 to 5

In Comparative Structure Examples 2 to 5, the action of the resin is summarized as below.

(1) The substrate provided with the plurality of lenses is curved in the case of the structure in which the resin layer is disposed on the entire upper surface of the lens array substrate similarly to Comparative Structure Examples 2 and 3.

Figure 46A:
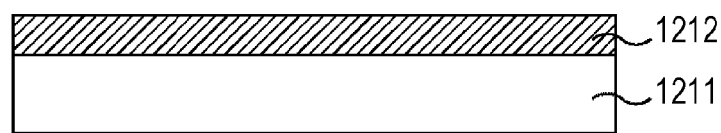
FIG. 46A-46C are diagrams illustrating the action of resin formed as a lens.
Figure 46B:
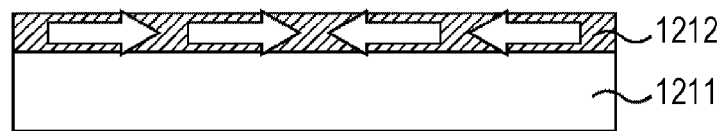
Figure 46C:
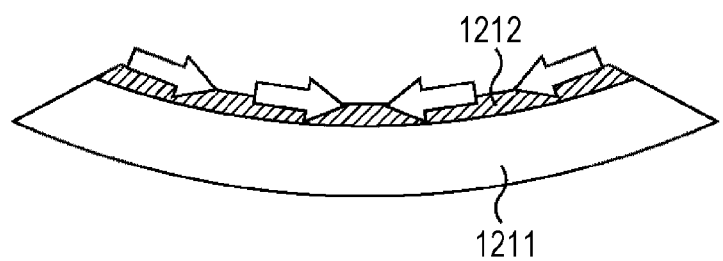

FIGS. 46A to 46C are diagrams schematically illustrating a structure in which a resin layer is disposed on the entire upper surface of the lens array substrate similarly to Comparative Structure Examples 2 and 3 and is a diagram illustrating the action of the resin as the lens.

As illustrated in FIGS. 46A and 46B, a curable shrinkage occurs due to the irradiation with UV light for a curing operation on the layer of a light curable resin 1212 disposed on an upper surface of a lens array substrate 1211 (where a lens and a through-hole are not illustrated). Accordingly, force in the shrinkage direction caused by the light curable resin 1212 occurs within the layer of the light curable resin 1212.

Meanwhile, the lens array substrate 1211 is not shrunk and expanded even when the substrate is irradiated with UV light. That is, a force caused by the substrate does not occur in the lens array substrate 1211. As a result, the lens array substrate 1211 is curved downward as illustrated in FIG. 46C.

(2) However, since the curved direction of the lens array substrate is offset in the case of the structure in which the resin layer is disposed on both upper and lower surfaces of the lens array substrate similarly to Comparative Structure Examples 4 and 5, the curved amount of the lens array substrate can be decreased compared with Comparative Structure Examples 2 and 3.

Figure 47A:
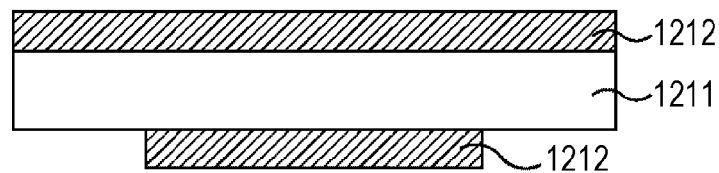
FIG. 47A-47C are diagrams illustrating the action of resin formed as a lens.
Figure 47B:
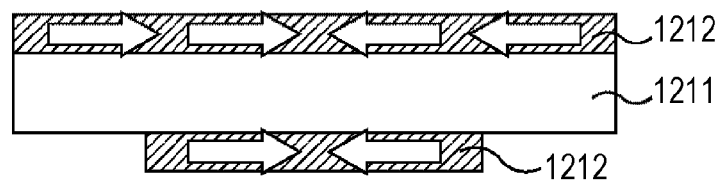
Figure 47C:
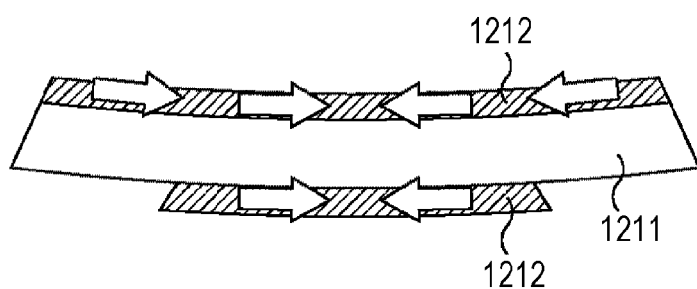

FIGS. 47A to 47C are diagrams schematically illustrating a structure in which a resin layer is disposed on both upper and lower surfaces of the lens array substrate similarly to Comparative Structure Examples 4 and 5 and is a diagram illustrating the action of the resin as the lens.

As illustrated in FIGS. 47A and 47B, a curable shrinkage occurs due to the irradiation with UV light for a curing operation on the layer of the light curable resin 1212 disposed on the upper surface of the lens array substrate 1211.

Accordingly, force in the shrinkage direction caused by the light curable resin 1212 occurs within the layer of the light curable resin 1212 disposed on the upper surface of the lens array substrate 1211. For this reason, a force of curving the lens array substrate 1211 downward in a convex shape is exerted on the upper surface side of the lens array substrate 1211.

On the contrary, the lens array substrate 1211 is not shrunk and expanded even when the substrate is irradiated with UV light. That is, a force caused by the substrate does not occur in the lens array substrate 1211.

Meanwhile, a curable shrinkage occurs due to the irradiation with UV light for a curing operation on the layer of the light curable resin 1212 disposed on the lower surface of the lens array substrate 1211. Accordingly, force in the shrinkage direction caused by the light curable resin 1212 occurs within the layer of the light curable resin 1212 disposed on the lower surface of the lens array substrate 1211. For this reason, a force of curving the lens array substrate 1211 upward in a convex shape is exerted at the lower surface side of the lens array substrate 1211.

A force of curving the lens array substrate 1211 downward in a convex shape at the upper surface side of the lens array substrate 1211 and a force of curving the lens array substrate 1211 upward in a convex shape at the lower surface side of the lens array substrate 1211 are exerted so as to be offset.

As a result, as illustrated in FIG. 47C, the curved amount of the lens array substrate 1211 of Comparative Structure Examples 4 and 5 becomes smaller than the curved amount of Comparative Structure Examples 2 and 3 illustrated in FIG. 46C.

As described above, the lens array substrate curving force and the lens array substrate curved amount are influenced by the relative relation between (1) the direction and the degree of the force acting on the lens array substrate at the upper surface of the lens array substrate, and (2) the direction and the degree of the force acting on the lens array substrate at the lower surface of the lens array substrate.

Comparative Structure Example 6

Figure 48A:
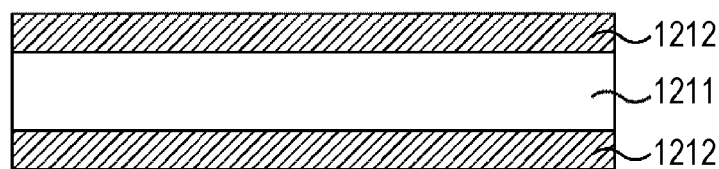
FIG. 48A-48C are diagrams illustrating a lens array substrate as Comparative Structure Example 6.

Here, for example, as illustrated in FIG. 48A, a lens array substrate structure is considered in which the layer and the area of the light curable resin 1212 disposed at the upper surface of the lens array substrate 1211 and the layer and the area of the light curable resin 1212 disposed at the lower surface of the lens array substrate 1211 are the same. The lens array substrate structure will be referred to as a sixth substrate structure (hereinafter, referred to as Comparative Structure Example 6) used to be compared with the present structure.

In Comparative Structure Example 6, force in the shrinkage direction caused by the light curable resin 1212 is exerted in the layer of the light curable resin 1212 disposed on the upper surface of the lens array substrate 1211. A force caused by the substrate does not occur in the lens array substrate 1211. For this reason, a force of curving the lens array substrate 1211 downward in a convex shape is exerted at the upper surface side of the lens array substrate 1211.

Meanwhile, force in the shrinkage direction caused by the light curable resin 1212 occurs in the layer of the light curable resin 1212 disposed on the lower surface of the lens array substrate 1211. A force caused by the substrate does not occur in the lens array substrate 1211. For this reason, a force of curving the lens array substrate 1211 upward in a convex shape is exerted at the lower surface side of the lens array substrate 1211.

Two forces of curving the lens array substrate 1211 are exerted in a direction in which the forces can be further offset compared with the structure illustrated in FIG. 47A. As a result, the force of curving the lens array substrate 1211 and the curved amount of the lens array substrate 1211 are further decreased compared with Comparative Structure Examples 4 and 5.

Comparative Structure Example 7

Incidentally, the lens attached substrates constituting the layered lens structure assembled to the camera module actually do not have the same shape. More specifically, there is a case in which the plurality of lens attached substrates constituting the layered lens structure may have, for example, a difference in the thickness of the lens attached substrate or the size of the through-hole or a difference in the thickness, the shape, or the volume of the lens formed in the through-hole. More specifically, there is also a case in which the film thickness or the like of the light curable resin formed on the upper and lower surfaces of the lens attached substrate may be different in each lens attached substrate.

Figure 48B:
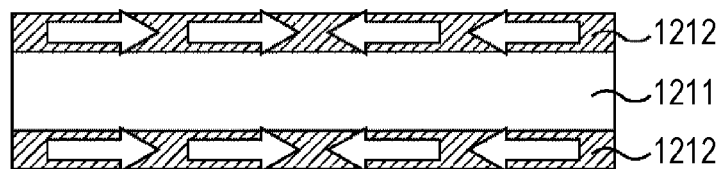
Figure 48C:
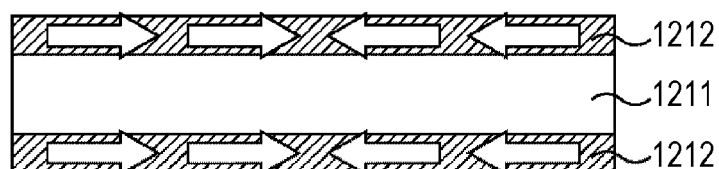
Figure 49:
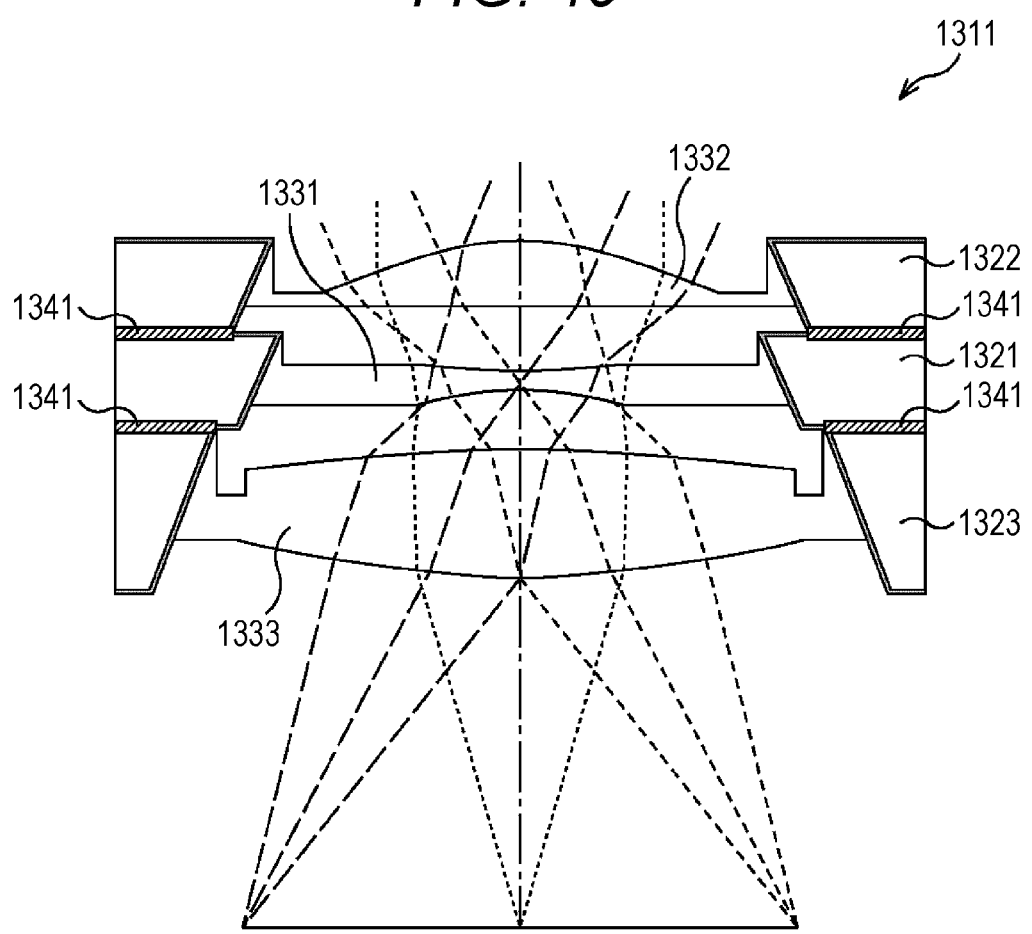
FIG. 49 is a cross-sectional view of a layered lens structure as Comparative Structure Example 7.

FIG. 49 is a cross-sectional view of a layered lens structure in which three lens attached substrates are laminated as a seventh substrate structure (hereinafter, referred to as Comparative Structure Example 7). In the layered lens structure, it is assumed that the layer and the area of the light curable resin disposed on the upper and lower surfaces of each lens attached substrate are the same similarly to Comparative Structure Example 6 illustrated in FIGS. 48A to 48C.

A layered lens structure 1311 illustrated in FIG. 49 includes three lens attached substrates 1321 to 1323.

In the description below, the middle lens attached substrate 1321 of three lens attached substrates 1321 to 1323 will be referred to as the first lens attached substrate 1321, the uppermost lens attached substrate 1322 will be referred to as the second lens attached substrate 1322, and the lowermost lens attached substrate 1323 will be referred to as the third lens attached substrate 1323.

The second lens attached substrate 1322 disposed at the uppermost layer and the third lens attached substrate 1323 disposed at the lowermost layer have a different substrate thickness and a different lens thickness.

More specifically, the thickness of the lens of the third lens attached substrate 1323 is larger than that of the second lens attached substrate 1322. Accordingly, the thickness of the substrate of the third lens attached substrate 1323 is larger than that of the second lens attached substrate 1322.

Resin 1341 is formed on the entire contact surface between the first lens attached substrate 1321 and the second lens attached substrate 1322 and the entire contact surface between the first lens attached substrate 1321 and the third lens attached substrate 1323.

The cross-sectional shape of the through-hole of each of three lens attached substrates 1321 to 1323 is a so-called downward widened shape in which the lower surface of the substrate is wider than the upper surface of the substrate.

Referring to FIGS. 50A to 50D, an effect obtained by three lens attached substrates 1321 to 1323 having different shapes will be described.

Figure 50A:
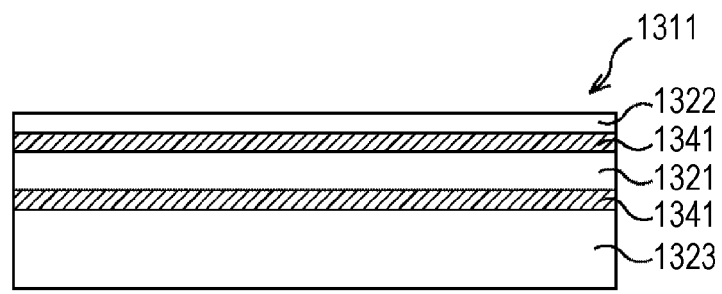
FIG. 50A-50D are diagrams illustrating the action of the layered lens structure of FIG. 49.
Figure 50B:
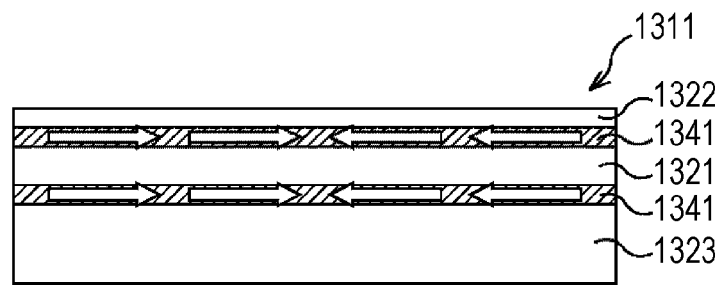
Figure 50C:
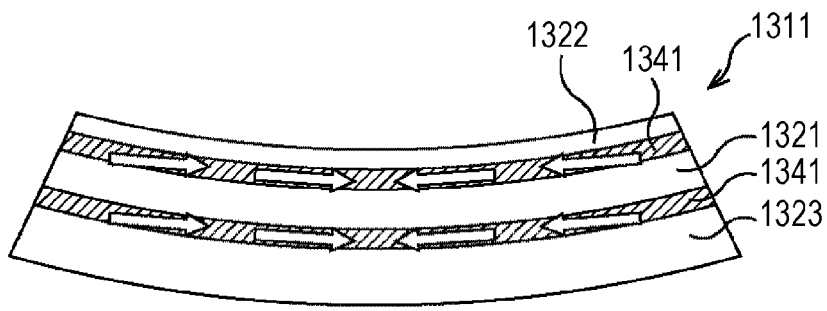

FIGS. 50A to 50C are diagrams schematically illustrating the layered lens structure 1311 illustrated in FIG. 49.

When the second lens attached substrate 1322 and the third lens attached substrate 1323 having a different substrate thickness are disposed on the upper and lower surfaces of the first lens attached substrate 1321 as in the layered lens structure 1311, the force of curving the layered lens structure 1311 and the curved amount of the layered lens structure 1311 are changed depending on the layer of the resin 1341 existing on the entire contact surfaces of three lens attached substrates 1321 to 1323 at any position of the layered lens structure 1311 in the thickness direction.

When the layers of the resin 1341 existing throughout the entire contact surfaces of three lens attached substrates 1321 to 1323 are not symmetrical to each other with respect to the line running in the substrate plane direction through the center line of the layered lens structure 1311, that is, the center point of the layered lens structure 1311 in the thickness direction, it is difficult to completely offset the action of the force generated by the curable shrinkage of the resin 1341 disposed on the upper and lower surfaces of the first lens attached substrate 1321 as illustrated in FIG. 48C. As a result, the layered lens structure 1311 is curved in any direction.

For example, when two layers of the resin 1341 are cured and shrunk in a case where two layers of the resin 1341 of the upper and lower surfaces of the first lens attached substrate 1321 are deviated upward in relation to the center line of the layered lens structure 1311 in the thickness direction, the layered lens structure 1311 is curved downward in a convex shape as illustrated in FIG. 50C.

In addition, when the cross-sectional shape of the through-hole of the thinner substrate of the second lens attached substrate 1322 and the third lens attached substrate 1323 increases in the direction of the first lens attached substrate 1321, a concern for the loss or the damage of the lens increases.

Figure 50D:
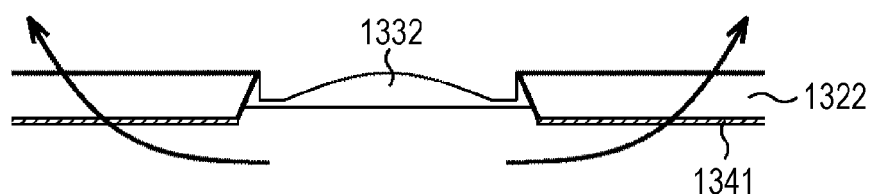

In the example illustrated in FIG. 49, the cross-sectional shape of the through-hole of the second lens attached substrate 1322 having a smaller thickness of the second lens attached substrate 1322 and the third lens attached substrate 1323 is a downward widened shape which increases in size toward the direction of the first lens attached substrate 1321. In such a shape, when two layers of the resin 1341 of the upper and lower surfaces of the first lens attached substrate 1321 are cured and shrunk, a downward curving force in a convex shape is applied to the layered lens structure 1311 as illustrated in FIG. 50C and hence this force is applied to the second lens attached substrate 1322 as a force of separating the lens and the substrate from each other as illustrated in FIG. 50D. Due to this action, a concern for the loss or the damage of the lens 1332 of the second lens attached substrate 1322 increases.

Next, a case will be considered in which the resin is thermally expanded.

Comparative Structure Example 8

Figure 51:
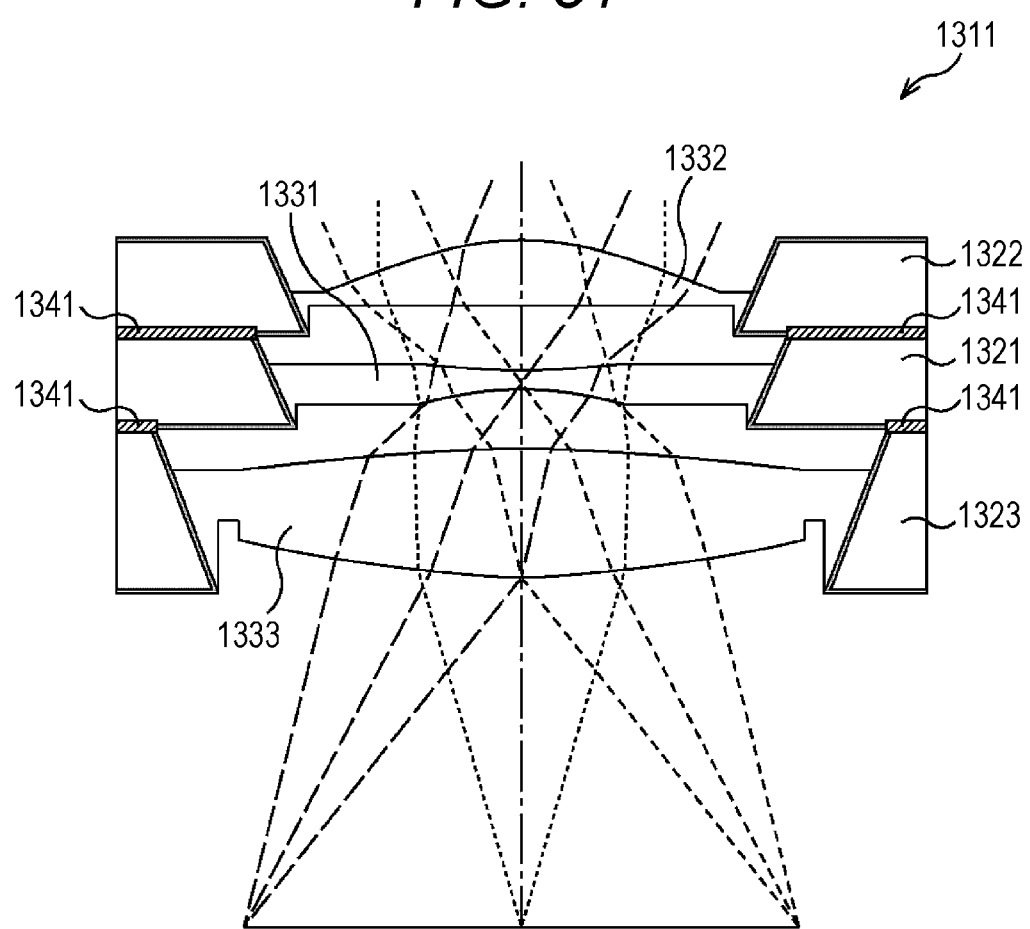
FIG. 51 is a cross-sectional view of a layered lens structure as Comparative Structure Example 8.

FIG. 51 is a cross-sectional view of a layered lens structure in which three lens attached substrates are laminated as an eighth substrate structure (hereinafter, referred to as Comparative Structure Example 8). In the layered lens structure, it is assumed that the layer and the area of the light curable resin disposed on the upper and lower surfaces of each lens attached substrate are the same similarly to Comparative Structure Example 6 illustrated in FIGS. 48A to 48C.

Comparative Structure Example 8 of FIG. 51 is different from Comparative Structure Example 7 of FIG. 49 in that the cross-sectional shape of the through-hole of each of three lens attached substrates 1321 to 1323 is a so-called downward narrowed shape in which the lower surface of the substrate is narrower than the upper surface of the substrate.

Figure 52A:
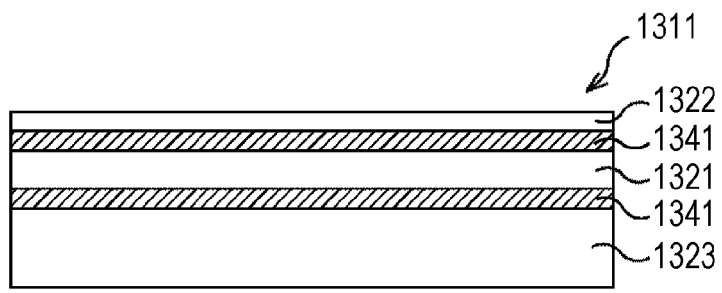
FIG. 52A-52D are diagrams illustrating the action of the layered lens structure of FIG. 51.
Figure 52B:
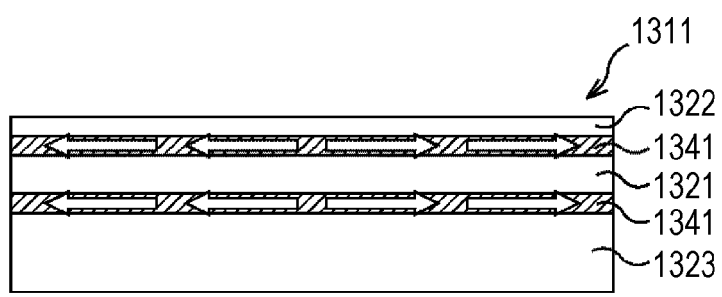
Figure 52C:
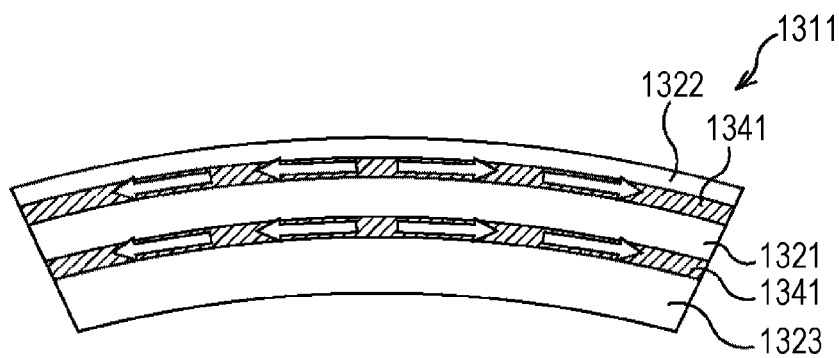

FIGS. 52A to 52C are diagrams schematically illustrating the layered lens structure 1311 illustrated in FIG. 51.

When a user uses the camera module for an actual purpose, the temperature inside the casing of the camera increases due to an increase in consuming power with the operation and hence the temperature of the camera module increases. Due to an increase in temperature, the resin 1341 disposed on the upper and lower surfaces of the first lens attached substrate 1321 in the layered lens structure 1311 of FIG. 51 is thermally expanded.

When the layers of the resin 1341 existing throughout the entire contact surfaces of three lens attached substrates 1321 to 1323 are not disposed so as to be symmetrical to each other with respect to the line traveling in the substrate plane direction while passing through the center line of the layered lens structure 1311, that is, the center point of the layered lens structure 1311 in the thickness direction even when the area and the thickness of the resin 1341 disposed on the upper and lower surfaces of the first lens attached substrate 1321 are the same as in FIG. 48A, it is difficult to completely offset the action of the force generated by the thermal expansion of the resin 1341 disposed on the upper and lower surfaces of the first lens attached substrate 1321 as illustrated in FIG. 48C. As a result, the layered lens structure 1311 is curved in any direction.

For example, when two layers of the resin 1341 are thermally expanded in a case where two layers of the resin 1341 of the upper and lower surfaces of the first lens attached substrate 1321 are disposed so as to be deviated upward with respect to the center line of the layered lens structure 1311 in the thickness direction, the layered lens structure 1311 is curved upward in a convex shape as illustrated in FIG. 52C.

Figure 52D:
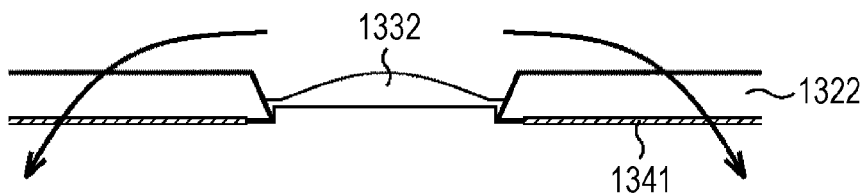

In addition, in the example illustrated in FIG. 51, the cross-sectional shape of the through-hole of the second lens attached substrate 1322 having a smaller thickness of the second lens attached substrate 1322 and the third lens attached substrate 1323 is a downward narrowed shape which decreases in size toward the direction of the first lens attached substrate 1321. In such a shape, when two layers of the resin 1341 of the upper and lower surfaces of the first lens attached substrate 1321 are thermally expanded, an upward curving force in a convex shape is applied to the layered lens structure 1311 and this force is applied to the second lens attached substrate 1322 in a direction so as to separate the lens and the substrate from each other as illustrated in FIG. 52D. Due to this action, a concern for the loss or the damage of the lens 1332 of the second lens attached substrate 1322 increases.

<Present Structure>

Figure 53A:
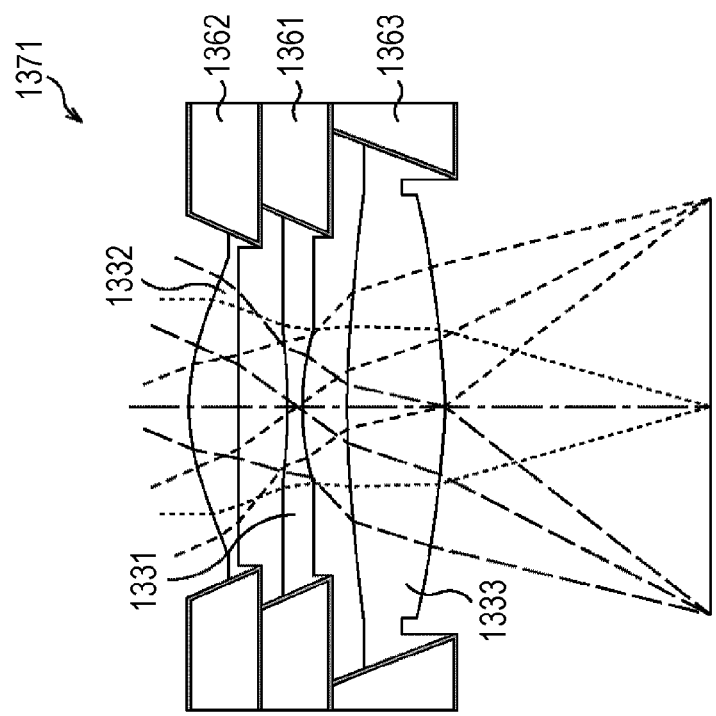
FIGS. 53A and 53B are cross-sectional views of a layered lens structure employing the present structure.
Figure 53B:
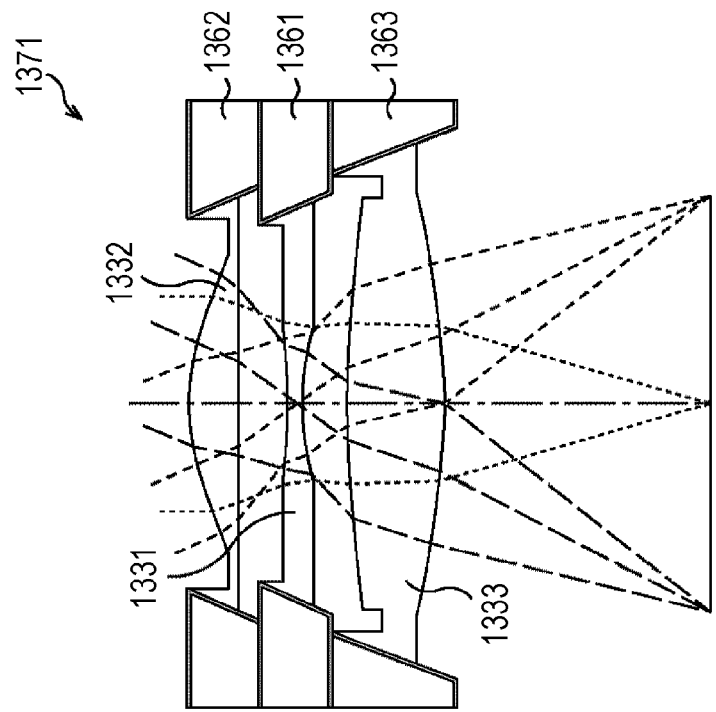

FIGS. 53A and 53B are diagrams illustrating a layered lens structure 1371 including three lens attached substrates 1361 to 1363 employing the present structure.

FIG. 53A illustrates a structure corresponding to the layered lens structure 1311 of FIG. 49 and illustrates a structure of which the cross-sectional shape of the through-hole is a so-called downward widened shape. Meanwhile, FIG. 53B illustrates a structure corresponding to the layered lens structure 1311 of FIG. 51 and illustrates a structure in which the cross-sectional shape of the through-hole is a so-called downward narrowed shape.

FIGS. 54A to 54C are schematic diagrams illustrating the layered lens structure 1371 of FIGS. 53A and 53B used to describe the effect of the present structure.

The layered lens structure 1371 has a structure in which the second lens attached substrate 1362 is disposed at the upper side of the first lens attached substrate 1361 at the middle position and the third lens attached substrate 1363 is disposed at the lower side of the first lens attached substrate 1361.

The second lens attached substrate 1362 disposed at the uppermost layer and the third lens attached substrate 1363 disposed at the lowermost layer have a different substrate thickness and a different lens thickness. More specifically, the lens thickness of the third lens attached substrate 1363 is larger than that of the second lens attached substrate 1362 and hence the substrate thickness of the third lens attached substrate 1363 is also larger than that of the second lens attached substrate 1362.

In the layered lens structure 1371 of the present structure, a method of directly bonding the substrates is used as a method of fixing the lens attached substrates to each other. In other words, a plasma activation process is performed on the lens attached substrates to be fixed and two lens attached substrates to be fixed to each other are subjected to the plasma bonding. In other words, a silicon oxide film is formed on each of the surfaces of two laminated lens attached substrates, a hydroxyl group is bound thereto, and hence two lens attached substrates are bonded to each other. Then, a dehydration condensation occurs with an increase in temperature. In this way, two lens attached substrates are directly bonded to each other by silicon-oxygen covalent binding.

Thus, in the layered lens structure 1371 of the present structure, a bonding method using resin is not used as a method of fixing the lens attached substrates to each other. For this reason, the lens forming resin or the substrate bonding resin is not disposed between the lens attached substrates. Further, since the resin is not disposed on the upper or lower surface of the lens attached substrate, the resin of the upper or lower surface of the lens attached substrate is not thermally expanded or cured and shrunk.

Thus, even when the second lens attached substrate 1362 and the third lens attached substrate 1363 having a different lens thickness and a different substrate thickness are disposed on the upper and lower layers of the first lens attached substrate 1351 in the layered lens structure 1371, it is possible to prevent a problem in which the substrate is curved due to the curable shrinkage and the substrate is curved due to the thermal expansion similarly to Comparative Structure Examples 1 to 8.

That is, the present structure in which the lens attached substrates are directly bonded to each other has an operation and effect in which the substrate curved state can be largely suppressed compared with Comparative Structure Examples 1 to 8 even when the lens attached substrates having a different lens thickness and a different substrate thickness are laminated on the upper and lower sides.

16. Other Embodiment 1

<Wafer Level Lens>

Incidentally, as the wafer level lens of the related art, there is known a hybrid type in which a lens is formed on a glass substrate or a monolithic type formed only by a resin material. On the contrary, PTL 1 proposes a method of forming a lens in a through-hole of a silicon substrate. Further, there is also proposed a method of forming unevenness by performing blasting on the surface of the side wall of the through-hole as a countermeasure for the ghost or flare.

However, in the case of this method, there is a possibility that the reflection of the light of the side wall of the through-hole is not sufficiently suppressed only by the blasting. Thus, even when the method of PTL 1 is used, there is a possibility that the ghost or flare is not sufficiently suppressed and the image quality is degraded.

Further, PTL 1 proposes a method of improving the lens holding stability. Here, fine unevenness is formed on the side wall surface or the cross-sectional shape of the opening is examined in a manner such that the contact area between the resin and the substrate is widened (other than a tapered shape). However, there is a case in which the contactability is poor in accordance with the lens material and the base material. In this method, in some cases, it was difficult to sufficiently maintain the shape. Alternatively, there is a possibility that the option of the base material is limited by the lens material.

Further, in the case of this method, it is desirable to widen the contact area between the substrate and the resin of the lens as much as possible. For that reason, there is a possibility that the resin thickness increases so that the lens portion becomes thicker than the substrate. For that reason, there is a need to bond the substrates with a spacer substrate interposed therebetween in the case of the laminated lens. Thus, the optical axis displacement in the lens module may become worse (so as to cause degradation in resolution) due to an increase in the number of times of the bonding or the flare may become worse due to an increase in the size of the reflection surface.

Here, the lens attached substrate includes a substrate in which a through-hole is formed and a light shielding film is formed on the side wall of the through-hole and a lens resin portion which is formed inside the through-hole of the substrate.

<Outline of Layered Lens Structure>

Figure 55:
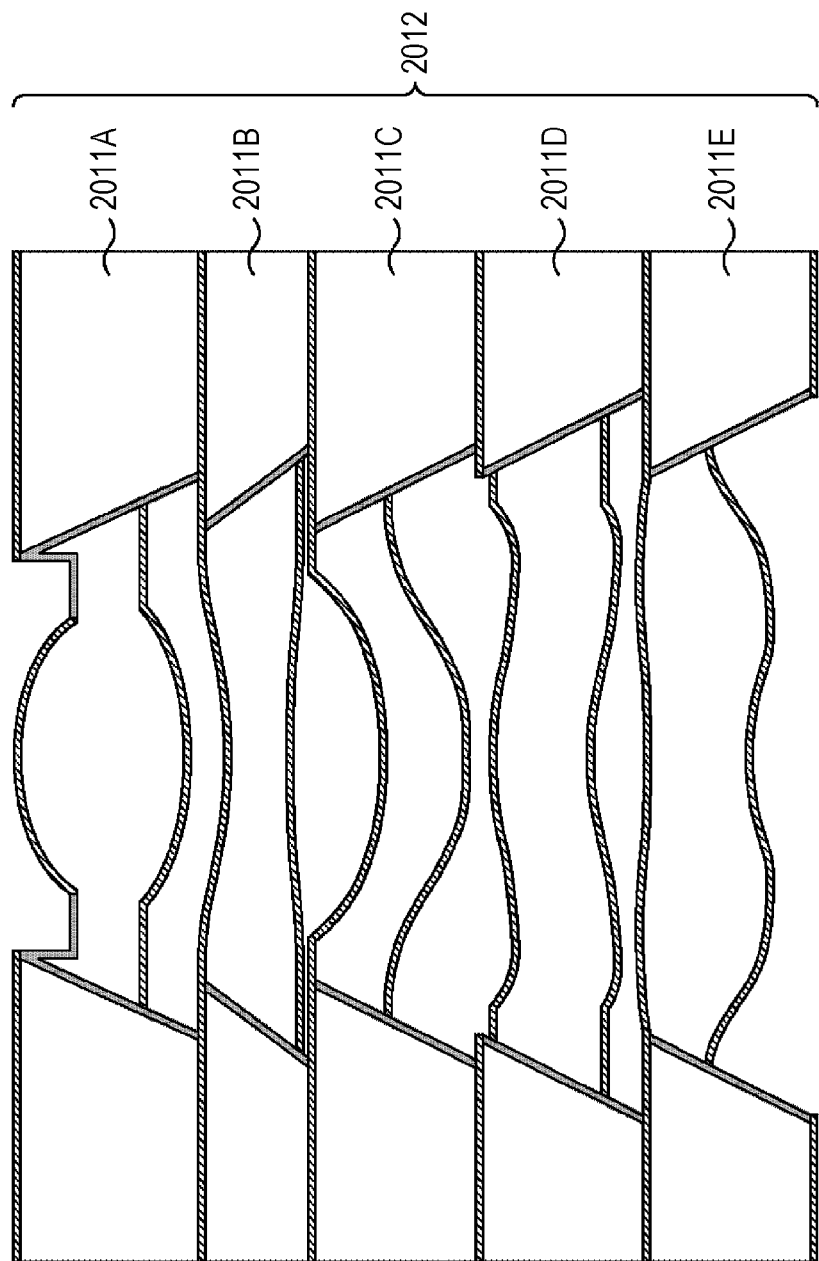
FIG. 55 is a cross-sectional view illustrating a main configuration example of a layered lens structure.

FIG. 55 is a schematic cross-sectional view illustrating a main configuration example of the layered lens structure. A layered lens structure 2012 illustrated in FIG. 55 corresponds to the layered lens structure 11 of the other embodiment. That is, the layered lens structure 2012 is the same device as the layered lens structure 11 and the description of the layered lens structure 11 can be basically applied to the layered lens structure 2012. For example, the layered lens structure 2012 is laminated on the light receiving element 12 and is used to constitute the camera module 1. The incident light (for example, the light from a subject) with respect to the light receiving element 12 passes through the layered lens structure 2012 in a direction from the upside toward the downside of the drawing.

As illustrated in FIG. 55, the layered lens structure 2012 includes a lens attached substrate 2011A to a lens attached substrate 2011E which are laminated one another. The lens attached substrate 2011A to the lens attached substrate 2011E respectively correspond to the lens attached substrate 41*a* to the lens attached substrate 41*e* of the other embodiment. In the description below, when there is no need to distinguish the lens attached substrate 2011A to the lens attached substrate 2011E, these lens attached substrates will be referred to as the lens attached substrate 2011. That is, the lens attached substrate 2011 is the same device as the lens attached substrate 41 and the description of the lens attached substrate 2011 can be also basically applied to the lens attached substrate 2011.

A light shielding film is formed on the side wall of the through-hole of each of the lens attached substrates 2011 of the layered lens structure 2012 of FIG. 55. The more detailed configuration of each lens attached substrate 2011 is illustrated in FIGS. 56A to 56C and 57A and 57B.

<Configuration of Lens Attached Substrate 2011A>

Figure 56A:
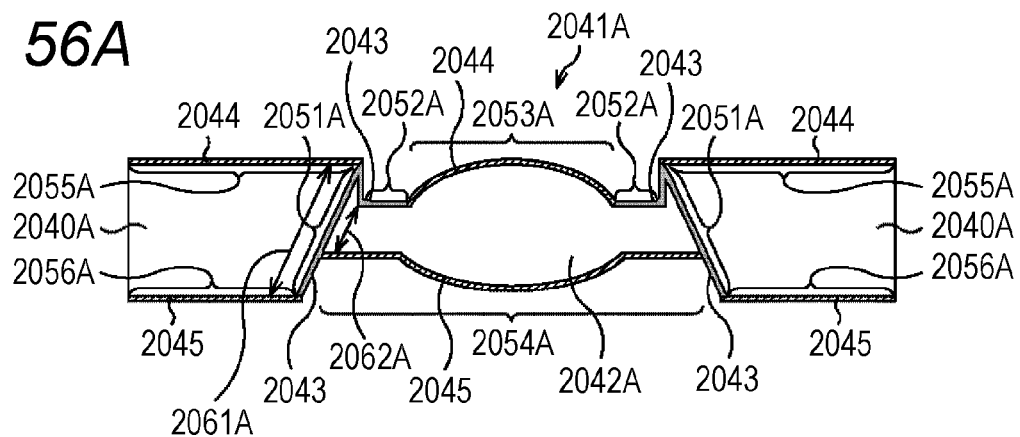
FIG. 56A-56C are cross-sectional views illustrating a main configuration example of a lens attached substrate.

FIG. 56A is a schematic cross-sectional view illustrating a main configuration example of the lens attached substrate 2011A. As illustrated in FIG. 56A, the lens attached substrate 2011A includes a carrier substrate 2040A and a lens resin portion 2042A. The carrier substrate 2040A corresponds to the carrier substrate 81*a* of the other embodiment. The lens resin portion 2042A corresponds to the lens resin portion 82*a* of the other embodiment. A through-hole 2041A is formed in the carrier substrate 2040A and the lens resin portion 2042A is formed inside the through-hole 2041A so as to contact a side wall 2051A of the through-hole 2041A.

The side wall 2051A of the through-hole 2041A is formed in a tapered shape which is widened from the light incident side (the upside of the drawing) toward the light emitting side (the downside of the drawing). A light shielding film 2043 is formed on the side wall 2051A. The light shielding film 2043 is used to absorb light and is a thin film which has a light shielding property and is formed of a material of suppressing the reflection of the light. The film thickness of the light shielding film 2043 may be arbitrarily set, but may be, for example, about 1 μm. For example, the light shielding film 2043 is formed of a black material. The black material may be arbitrarily set, but may be, for example, pigment of carbon black or titanium black. Further, the light shielding film 2043 may be, for example, a metal film formed of metal. The metal may be arbitrarily set, but may be, for example, tungsten (W) or chrome (Cr). Further, the light shielding film 2043 may be a CVD film which is formed by chemical vapor deposition (CVD). For example, the light shielding film may be a CVD film which is formed by a carbon nanotube or the like. Further, a plurality of materials may be laminated.

A method of forming the light shielding film 2043 may be arbitrarily set. For example, when a black material such as black pigment is used as the material of the light shielding film 2043, the film may be formed by spinning or spray coating. If necessary, lithography of patterning and removing a film may be performed. Further, the light shielding film 2043 may be formed by an inkjet. Further, for example, when metal such as tungsten (W) or chrome (Cr) is used as the material of the light shielding film 2043, a film may be formed by a physical vapor deposition (PVD) and a surface thereof may be polished. In addition, for example, when a carbon nanotube or the like is used as the material of the light shielding film 2043, a film may be formed by a CVD and a surface thereof may be polished.

When such a light shielding film 2043 is formed on the side wall 2051A of the through-hole 2041A, it is possible to suppress the reflection or the transmission of the light of the side wall 2051A and to suppress the ghost or flare thereof. That is, it is possible to suppress degradation in image quality caused by the lens attached substrate 2011A (the layered lens structure 2012).

Further, an adhesion promoting agent of improving the contactability between the side wall 2051A and the lens resin portion 2042A may be added to the light shielding film 2043. The material of the adhesion promoting agent may be arbitrarily set. For example, a material may be set in response to the (characteristic of) material of the lens resin portion 2042A. For example, when the lens resin portion 2042A is formed of a hydrophilic material (for example, a material having a large number of OH groups), a hydrophilic material may be used as the adhesion promoting agent to be added. Further, for example, when the lens resin portion 2042A is formed of a hydrophobic material, a hydrophobic material may be also used as an adhesion promoting agent to be added. For example, a silane coupling agent may be used as the adhesion promoting agent.

In this way, since the adhesion promoting agent is added to the material of the light shielding film 2043, it is possible to improve the contactability between the side wall 2051A and the lens resin portion 2042A. Accordingly, since the holding stability of the lens resin portion 2042A is improved, it is possible to obtain sufficient stability even when the contact area between the side wall 2051A and the lens resin portion 2042A is small. That is, it is possible to narrow (shorten) the "width of the contact portion between the side wall 2051A (the light shielding film 2043) and the lens resin portion 2042A" indicated by bidirectional arrows 2062A compared with the "length of the side wall 2051A (the width of the light shielding film 2043)" indicated by bidirectional arrows 2061A. Thus, it is possible to suppress an increase in the thickness of the lens resin portion 2042A and to decrease the thickness thereof so as to be smaller than, for example, the thickness of the carrier substrate 2040A. For that reason, the lens attached substrates 2011 can be laminated without a spacer substrate interposed therebetween when the lens attached substrates 2011 are laminated. Accordingly, since it is possible to suppress a problem in which the optical axis displacement becomes worse (so as to cause degradation in resolution) or the flare becomes worse, it is possible to suppress degradation in image quality.

In addition, since the material of the adhesion promoting agent can be set in response to the material of the lens resin portion 2042A as described above, it is possible to improve the contactability with respect to the lens resin portion 2042A formed of more various materials. Thus, it is possible to suppress the option of the material of the carrier substrate 2040A from being limited by the material of the lens resin portion 2042A.

Further, in the case of the lens attached substrate 2011A laminated at the most light incident side as illustrated in FIG. 56A, the light shielding film 2043 may be formed on a light incident surface (the upper surface of the drawing) 2052A of the carrying portion 92 of the lens resin portion 2042A. The light shielding film 2043 serves as a diaphragm.

In addition, an upper surface layer 2044 may be formed on a light incident surface 2053A of the lens portion 91 of the lens resin portion 2042A. The upper surface layer 2044 corresponds to the upper surface layer 122 of the other embodiment. The upper surface layer 2044 is formed as, for example, a reflection preventing film or the like.

Further, a lower surface layer 2045 may be formed on a light emitting surface (the lower surface of the drawing) 2054A of the lens resin portion 2042A. The lower surface layer 2045 corresponds to the lower surface layer 123 of the other embodiment. The lower surface layer 2045 is formed as, for example, a reflection preventing film or the like.

In addition, an upper surface layer 2044 may be formed on a light incident surface 2055A of the carrier substrate 2040A. Further, a lower surface layer 2045 may be formed on a light emitting surface 2056A of the carrier substrate 2040A.

<Configuration of Lens Attached Substrate 2011B>

Figure 56B:
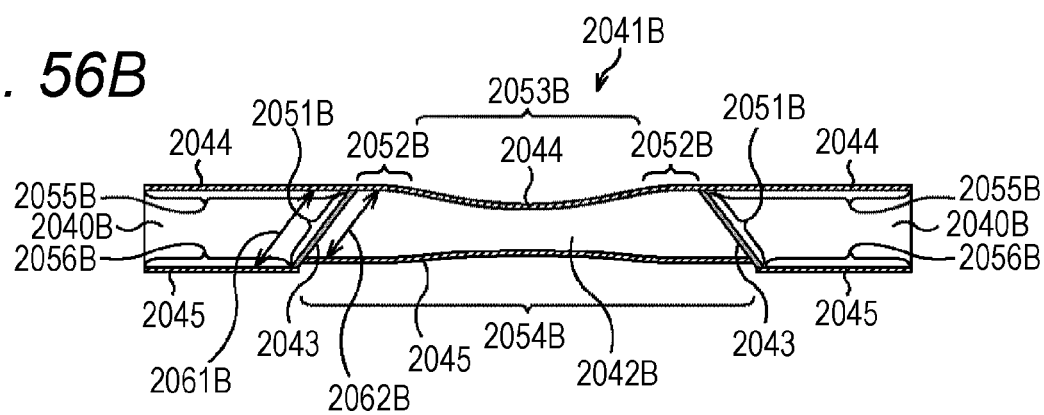

FIG. 56B is a schematic cross-sectional view illustrating a main configuration example of the lens attached substrate 2011B. The configuration of the lens attached substrate 2011B is basically similar to that of the lens attached substrate 2011A. As illustrated in FIG. 56B, the lens attached substrate 2011B includes a carrier substrate 2040B and a lens resin portion 2042B. The carrier substrate 2040B corresponds to the carrier substrate 81b of the other embodiment. The lens resin portion 2042B corresponds to the lens resin portion 82b of the other embodiment. A through-hole 2041B is formed in the carrier substrate 2040B and the lens resin portion 2042B is formed inside the through-hole 2041B so as to contact a side wall 2051B of the through-hole 2041B.

The side wall 2051B of the through-hole 2041B is formed in a tapered shape which is widened from the light incident side toward the light emitting side. The light shielding film 2043 is formed on the side wall 2051B. Accordingly, it is possible to suppress degradation in image quality caused by the lens attached substrate 2011B (the layered lens structure 2012) similarly to the case of the lens attached substrate 2011A.

Further, for example, an adhesion promoting agent such as a silane coupling agent for improving the contactability between the side wall 2051B and the lens resin portion 2042B may be added to the light shielding film 2043 similarly to the case of the lens attached substrate 2011A. Accordingly, it is possible to obtain sufficient stability even when the contact area between the side wall 2051B and the lens resin portion 2042B is small similarly to the case of the lens attached substrate 2011A. That is, it is possible to narrow (shorten) the "width of the contact portion between the side wall 2051B (the light shielding film 2043) and the lens resin portion 2042B" indicated by bidirectional arrows 2062B compared with the "length of the side wall 2051B (the width of the light shielding film 2043)" indicated by bidirectional arrows 2061B. Thus, it is possible to suppress an increase in the thickness of the lens resin portion 2042B and to decrease the thickness thereof so as to be smaller than, for example, the thickness of the carrier substrate 2040B. For that reason, since it is possible to suppress a problem in which the optical axis displacement becomes worse (so as to cause degradation in resolution) or the flare becomes worse in the layered lens structure 2012, it is possible to suppress degradation in image quality.

Then, since the material of the adhesion promoting agent can be set in response to the material of the lens resin portion 2042B similarly to the case of the lens attached substrate 2011A, it is possible to improve the contactability with respect to the lens resin portion 2042B formed of more various materials. Thus, it is possible to suppress the option of the material of the carrier substrate 2040B from being limited by the material of the lens resin portion 2042B.

Further, as illustrated in FIG. 56B, the upper surface layer 2044 may be formed on a light incident surface 2052B of the carrying portion 92 of the lens resin portion 2042B, a light incident surface 2053B of the lens portion 91 of the lens resin portion 2042B, and a light incident surface 2055B of the carrier substrate 2040B.

In addition, the lower surface layer 2045 may be formed on a light emitting surface 2054B of the lens resin portion 2042B and a light emitting surface 2056B of the carrier substrate 2040B.

<Configuration of Lens Attached Substrate 2011C>

Figure 56C:
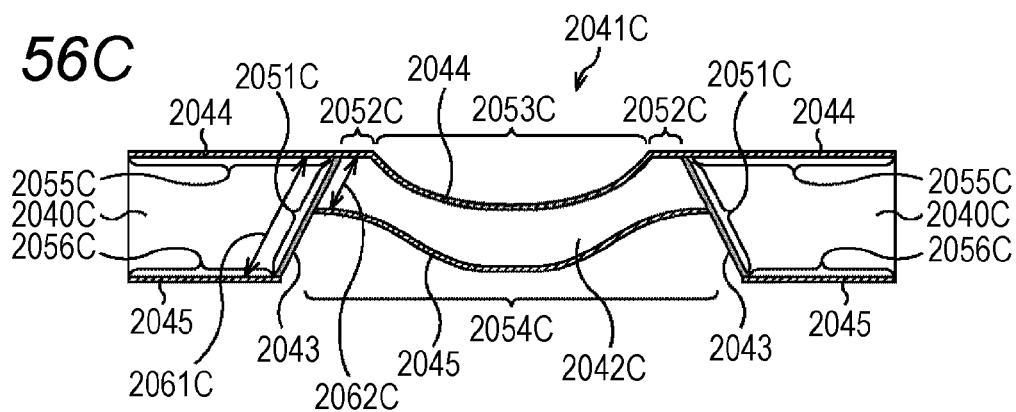

FIG. 56C is a schematic cross-sectional view illustrating a main configuration example of a lens attached substrate 2011C. The configuration of the lens attached substrate 2011C is basically similar to that of the lens attached substrate 2011A. As illustrated in FIG. 56C, the lens attached substrate 2011C includes a carrier substrate 2040C and a lens resin portion 2042C. The carrier substrate 2040C corresponds to the carrier substrate 81c of the other embodiment. The lens resin portion 2042C corresponds to the lens resin portion 82c of the other embodiment. A through-hole 2041C is formed in the carrier substrate 2040C and the lens resin portion 2042C is formed inside the through-hole 2041C so as to contact a side wall 2051C of the through-hole 2041C.

The side wall 2051C of the through-hole 2041C may be formed in a tapered shape which is widened from the light incident side toward the light emitting side. The light shielding film 2043 is formed on the side wall 2051C. Accordingly, it is possible to suppress degradation in image quality caused by the lens attached substrate 2011C (the layered lens structure 2012) similarly to the case of the lens attached substrate 2011A.

For example, an adhesion promoting agent such as a silane coupling agent for improving the contactability between the side wall 2051C and the lens resin portion 2042C may be added to the light shielding film 2043 similarly to the case of the lens attached substrate 2011A. Accordingly, it is possible to obtain sufficient stability even when the contact area between the side wall 2051C and the lens resin portion 2042C is small similarly to the case of the lens attached substrate 2011A. That is, it is possible to narrow (shorten) the "width of the contact portion between the side wall 2051C (the light shielding film 2043) and the lens resin portion 2042C" indicated by bidirectional arrows 2062C compared with the "length of the side wall 2051C (the width of the light shielding film 2043)" indicated by bidirectional arrows 2061C. Thus, it is possible to suppress an increase in the thickness of the lens resin portion 2042C and to decrease the thickness thereof so as to be smaller than, for example, the thickness of the carrier substrate 2040C. For that reason, since it is possible to suppress a problem in which the optical axis displacement becomes worse (so as to cause degradation in resolution) or the flare becomes worse in the layered lens structure 2012, it is possible to suppress degradation in image quality.

Then, since the material of the adhesion promoting agent can be set in response to the material of the lens resin portion 2042C similarly to the case of the lens attached substrate 2011A, it is possible to improve the contactability with respect to the lens resin portion 2042C formed of more various materials. Thus, it is possible to suppress the option of the material of the carrier substrate 2040C from being limited by the material of the lens resin portion 2042C.

Further, as illustrated in FIG. 56C, the upper surface layer 2044 may be formed on a light incident surface 2052C of the carrying portion 92 of the lens resin portion 2042C, a light incident surface 2053C of the lens portion 91 of the lens resin portion 2042C, and a light incident surface 2055C of the carrier substrate 2040C.

In addition, the lower surface layer 2045 may be formed on a light emitting surface 2054C of the lens resin portion 2042C and a light emitting surface 2056C of the carrier substrate 2040C.

<Configuration of Lens Attached Substrate 2011D>

Figure 57A:
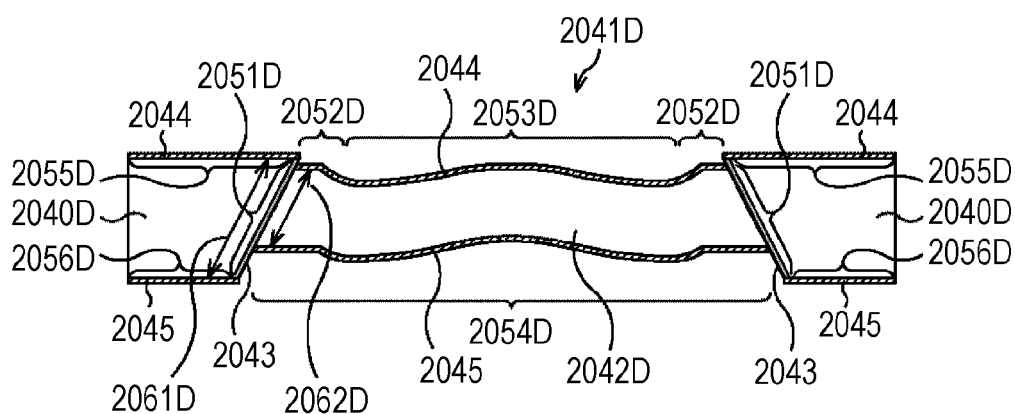
FIGS. 57A and 57B are cross-sectional views illustrating a main configuration example of a lens attached substrate.

FIG. 57A is a schematic cross-sectional view illustrating a main configuration example of a lens attached substrate 2011D. The configuration of the lens attached substrate 2011D is basically similar to that of the lens attached substrate 2011A. As illustrated in FIG. 57A, the lens attached substrate 2011D includes a carrier substrate 2040D and a lens resin portion 2042D. The carrier substrate 2040D corresponds to the carrier substrate 81d of the other embodiment. The lens resin portion 2042D corresponds to the lens resin portion 82d of the other embodiment. A through-hole 2041D is formed in the carrier substrate 2040D and the lens resin portion 2042D is formed inside the through-hole 2041D so as to contact a side wall 2051D of the through-hole 2041D.

The side wall 2051D of the through-hole 2041D is formed in a tapered shape which is widened from the light incident side toward the light emitting side. The light shielding film 2043 is formed on the side wall 2051D. Accordingly, it is possible to suppress degradation in image quality caused by the lens attached substrate 2011D (the layered lens structure 2012) similarly to the case of the lens attached substrate 2011A.

For example, an adhesion promoting agent such as a silane coupling agent for improving the contactability between the side wall 2051D and the lens resin portion 2042D may be added to the light shielding film 2043 similarly to the case of the lens attached substrate 2011A. Accordingly, it is possible to obtain sufficient stability even when the contact area between the side wall 2051D and the lens resin portion 2042D is small similarly to the case of the lens attached substrate 2011A. That is, it is possible to narrow (shorten) the "width of the contact portion between the side wall 2051D (the light shielding film 2043) and the lens resin portion 2042D" indicated by bidirectional arrows 2062D compared with the "length of the side wall 2051D (the width of the light shielding film 2043)" indicated by bidirectional arrows 2061D. Thus, it is possible to suppress an increase in the thickness of the lens resin portion 2042D and to decrease the thickness thereof so as to be smaller than, for example, the thickness of the carrier substrate 2040D. For that reason, since it is possible to suppress a problem in which the optical axis displacement becomes worse (so as to cause degradation in resolution) or the flare becomes worse in the layered lens structure 2012, it is possible to suppress degradation in image quality.

Then, since the material of the adhesion promoting agent can be set in response to the material of the lens resin portion 2042D similarly to the case of the lens attached substrate 2011A, it is possible to improve the contactability with respect to the lens resin portion 2042D formed of more various materials. Thus, it is possible to suppress the option of the material of the carrier substrate 2040D from being limited by the material of the lens resin portion 2042D.

Further, as illustrated in FIG. 57A, the upper surface layer 2044 may be formed on a light incident surface 2052D of the carrying portion 92 of the lens resin portion 2042D, a light incident surface 2053D of the lens portion 91 of the lens resin portion 2042D, and a light incident surface 2055D of the carrier substrate 2040D.

In addition, the lower surface layer 2045 may be formed on a light emitting surface 2054D of the lens resin portion 2042D and a light emitting surface 2056D of the carrier substrate 2040D.

<Configuration of Lens Attached Substrate 2011E>

Figure 57B:
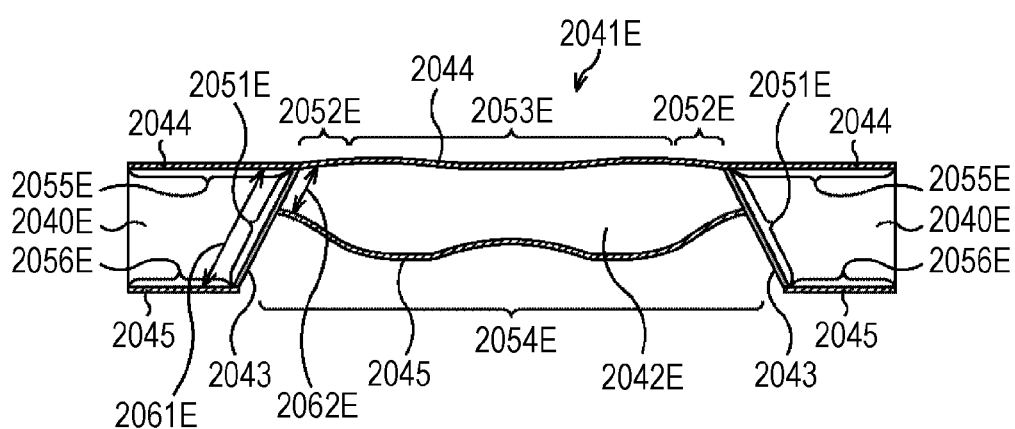

FIG. 57B is a schematic cross-sectional view illustrating a main configuration example of a lens attached substrate 2011E. The configuration of the lens attached substrate 2011E is basically similar to that of the lens attached substrate 2011A. As illustrated in FIG. 57B, the lens attached substrate 2011E includes a carrier substrate 2040E and a lens resin portion 2042E. The carrier substrate 2040E corresponds to the carrier substrate 81e of the other embodiment. The lens resin portion 2042E corresponds to the lens resin portion 82e of the other embodiment. A through-hole 2041E is formed in the carrier substrate 2040E and the lens resin portion 2042E is formed inside the through-hole 2041E so as to contact a side wall 2051E of the through-hole 2041E.

The side wall 2051E of the through-hole 2041E is formed in a tapered shape which is widened from the light incident side toward the light emitting side. The light shielding film 2043 is formed on the side wall 2051E. Accordingly, it is possible to suppress degradation in image quality caused by the lens attached substrate 2011E (the layered lens structure 2012) similarly to the case of the lens attached substrate 2011A.

For example, an adhesion promoting agent such as a silane coupling agent for improving the contactability between the side wall 2051E and the lens resin portion 2042E may be added to the light shielding film 2043 similarly to the case of the lens attached substrate 2011A. Accordingly, it is possible to obtain sufficient stability even when the contact area between the side wall 2051E and the lens resin portion 2042E is small similarly to the case of the lens attached substrate 2011A. That is, it is possible to narrow (shorten) the "width of the contact portion between the side wall 2051E (the light shielding film 2043) and the lens resin portion 2042E" indicated by bidirectional arrows 2062E compared with the "length of the side wall 2051E (the width of the light shielding film 2043)" indicated by bidirectional arrows 2061E. Thus, it is possible to suppress an increase in the thickness of the lens resin portion 2042E and to decrease the thickness thereof so as to be smaller than, for example, the thickness of the carrier substrate 2040E. For that reason, since it is possible to suppress a problem in which the optical axis displacement becomes worse (so as to cause degradation in resolution) or the flare becomes worse in the layered lens structure 2012, it is possible to suppress degradation in image quality.

Then, since the material of the adhesion promoting agent can be set in response to the material of the lens resin portion 2042E similarly to the case of the lens attached substrate 2011A, it is possible to improve the contactability with respect to the lens resin portion 2042E formed of more various materials. Thus, it is possible to suppress the option of the material of the carrier substrate 2040E from being limited by the material of the lens resin portion 2042E.

Further, as illustrated in FIG. 57B, the upper surface layer 2044 may be formed on a light incident surface 2052E of the carrying portion 92 of the lens resin portion 2042E, a light incident surface 2053E of the lens portion 91 of the lens resin portion 2042E, and a light incident surface 2055E of the carrier substrate 2040E.

In addition, the lower surface layer 2045 may be formed on a light emitting surface 2054E of the lens resin portion 2042E and a light emitting surface 2056E of the carrier substrate 2040E.

In the description below, when there is no need to distinguish the carrier substrate 2040A to the carrier substrate 2040E, the carrier substrates will be referred to as the carrier substrate 2040. Further, when there is no need to distinguish the through-hole 2041A to the through-hole 2041E, the through-holes will be referred to as the through-hole 2041. In addition, when there is no need to distinguish the lens resin portion 2042A to the lens resin portion 2042E, the lens resin portions will be referred to as the lens resin portion 2042. Further, when there is no need to distinguish the side wall 2051A to the side wall 2051E, the side walls will be referred to as the side wall 2051. Furthermore, when there is no need to distinguish the light incident surface 2052A to the light incident surface 2052E, the light incident surfaces will be referred to as the light incident surface 2052. Further, when there is no need to distinguish the light incident surface 2053A to the light incident surface 2053E, the light incident surfaces will be referred to as the light incident surface 2053. When there is no need to distinguish the light emitting surface 2054A to the light emitting surface 2054E, the light emitting surfaces will be referred to as the light emitting surface 2054. Further, when there is no need to distinguish the light incident surface 2055A to the light incident surface 2055E, the light incident surfaces will be referred to as the light incident surface 2055. When there is no need to distinguish the light emitting surface 2056A to the light emitting surface 2056E, the light emitting surfaces will be referred to as the light emitting surface 2056. Further, when there is no need to distinguish bidirectional arrows 2061A to bidirectional arrows 2061E, bidirectional arrows will be referred to as bidirectional arrows 2061. When there is no need to distinguish bidirectional arrows 2062A to bidirectional arrows 2062E, bidirectional arrows will be referred to as bidirectional arrows 2062.

<Configuration of Layered Lens Structure>

The lens attached substrates 2011A to the lens attached substrate 2011E with the above-described configuration are laminated and bonded so as to form the layered lens structure 2012 of FIG. 55. A method of bonding the lens attached substrates 2011 to each other is arbitrarily set. For example, the lens attached substrates 2011 may be bonded to each other by plasma bonding and the lens attached substrates 2011 may be bonded to each other by an adhesive.

When the lens attached substrate 2011 having the configuration illustrated in FIGS. 56A to 56C and 57A and 57B is used, the layered lens structure 2012 can obtain the same effect as the lens attached substrate 2011.

For example, since the layered lens structure 2012 can suppress the occurrence of the reflection of the light inside the through-hole 2041, it is possible to sufficiently suppress the occurrence of the ghost or flare and hence to suppress degradation in image quality. Further, for example, the layered lens structure 2012 can improve the holding stability of the lens resin portion 2042. In addition, since the lens attached substrates can be bonded to each other without using a spacer substrate or the like, it is possible to suppress a problem in which the optical axis displacement becomes worse (so as to cause degradation in resolution) or the flare becomes worse and hence to suppress degradation in image quality. Further, more various materials can be used as the carrier substrate 204 or the lens resin portion 2042.

In addition, the number (the number of layers) of the lens attached substrates 2011 constituting the layered lens structure 2012 may be arbitrarily set. Further, only a part of the lens attached substrates 2011 constituting the layered lens structure 2012 may have the configuration described by referring to FIG. 56A to 56C or 57A and 57B. That is, the layered lens structure may be obtained by laminating a plurality of lens attached substrates with a lens attached substrate including a substrate in which a through-hole is formed and a light shielding film is formed on a side wall of the through-hole and a lens resin portion which is formed inside the through-hole of the substrate.

<Example of Shape of Side Wall>

In addition, since it is possible to improve the holding stability of the lens resin portion 2042, the lens attached substrate 2011 (the layered lens structure 2012) can form the side wall 2051 as a shape other than the tapered shape.

Figure 58:
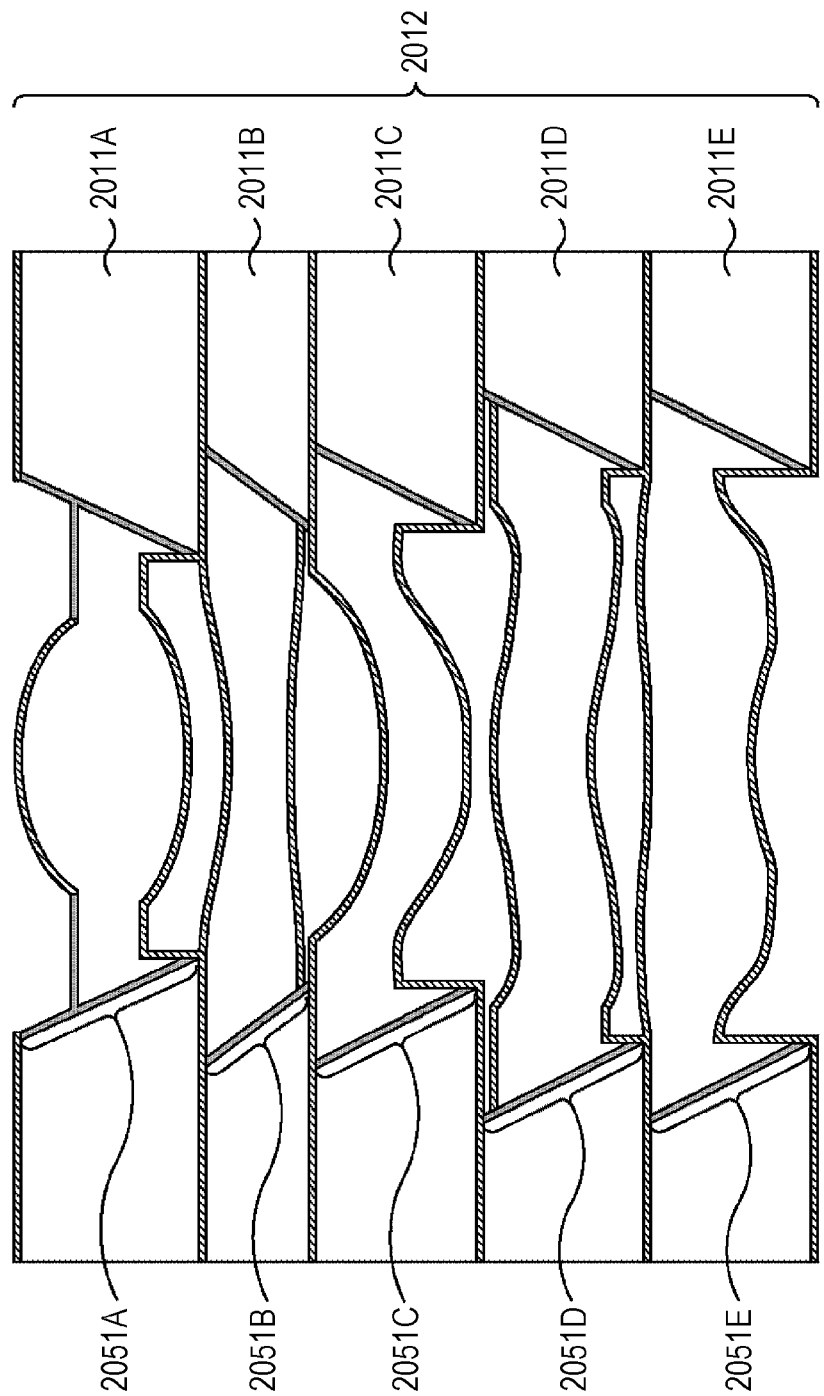
FIG. 58 is a cross-sectional view illustrating a main configuration example of a layered lens structure.
Figure 59:
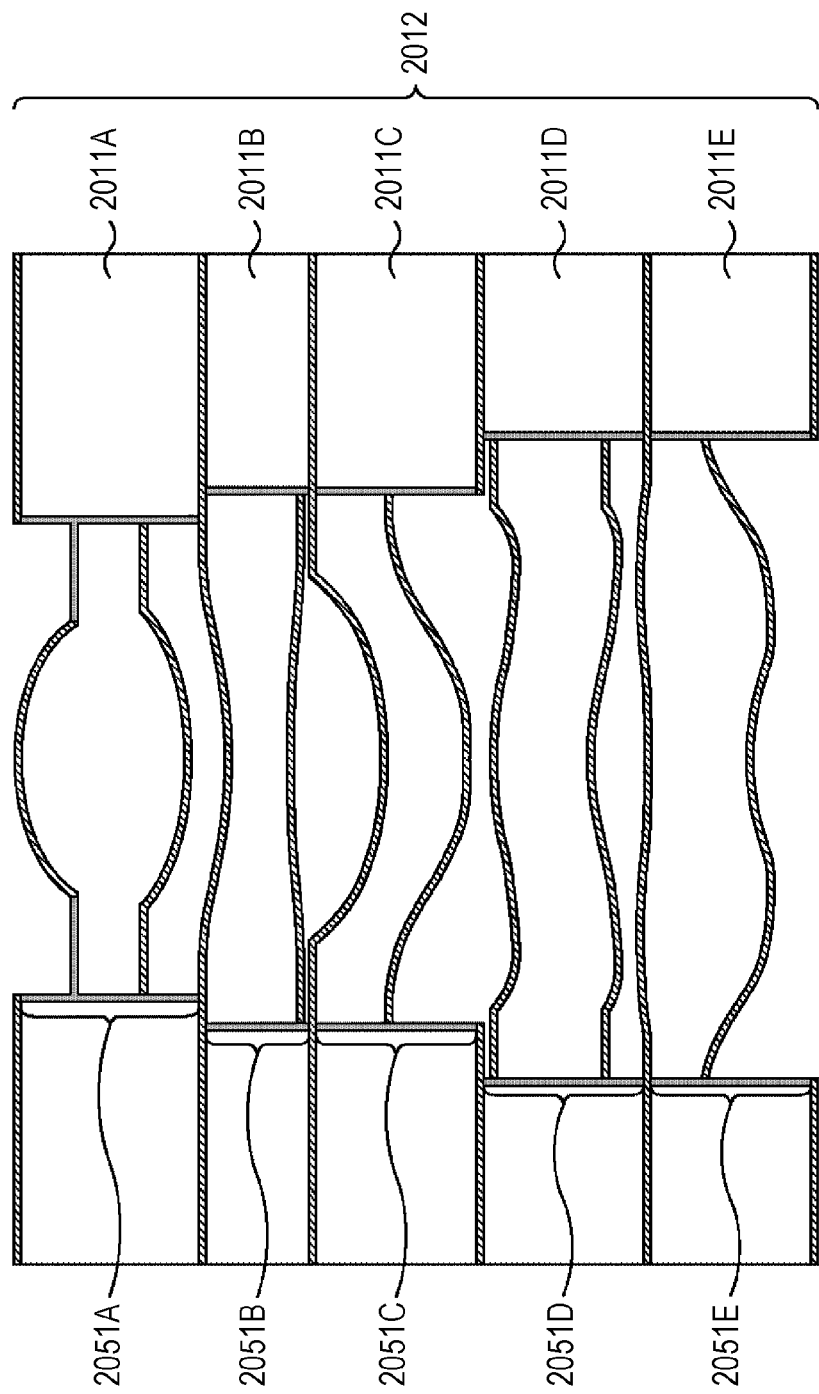
FIG. 59 is a cross-sectional view illustrating a main configuration example of a layered lens structure.

For example, as illustrated in FIG. 58, the side wall 2051 of the through-hole 2041 of each lens attached substrate 2011 may be formed in an inverse tapered shape which is widened from the light emitting side toward the light incident side. Further, for example, as illustrated in FIG. 59, the side wall 2051 of the through-hole 2041 of each lens attached substrate 2011 may be formed in a perpendicular shape which is perpendicular from the light emitting side to the light incident side.

Figure 60:
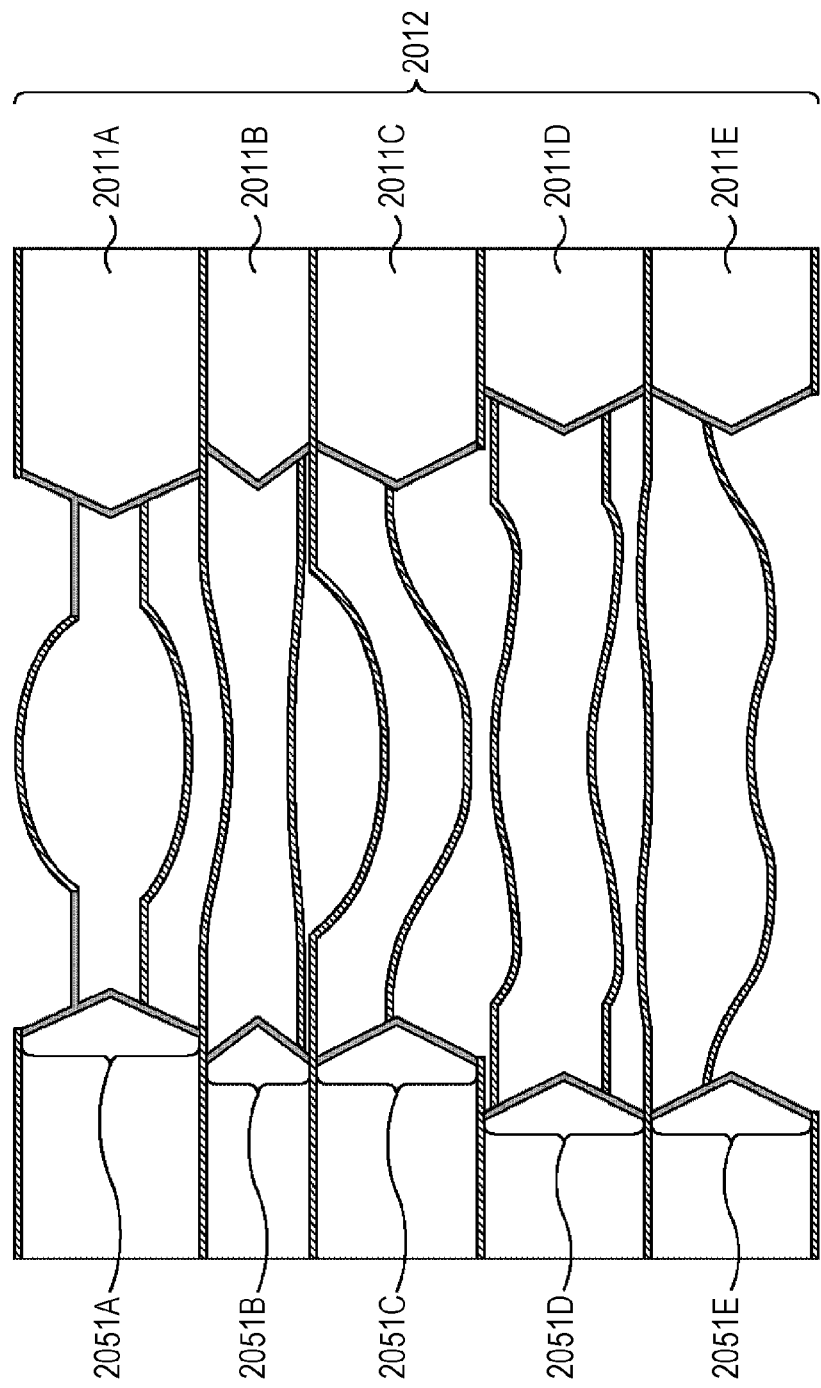
FIG. 60 is a cross-sectional view illustrating a main configuration example of a layered lens structure.

Further, for example, as illustrated in FIG. 60, the side wall 2051 of the through-hole 2041 of each lens attached substrate 2011 may be formed in a double tapered shape which is widened from the center portion of the through-hole 2041 toward both the light emitting side and the light incident side. In this way, when the shape of the side wall 2051 is set to the double tapered shape, it is possible to more easily form the light shielding film 2043. Further, in this case, since the contact portion between the side wall 2051 and the lens resin portion 2042 has a protrusion shape, it is possible to improve the holding stability of the lens resin portion 2042. Further, in this case, since the through-hole 2041 is formed while both surfaces of the carrier substrate 2040 are etched, it is possible to shorten the etching time compared with the case where the side wall 2051 has the other shape.

Figure 61:
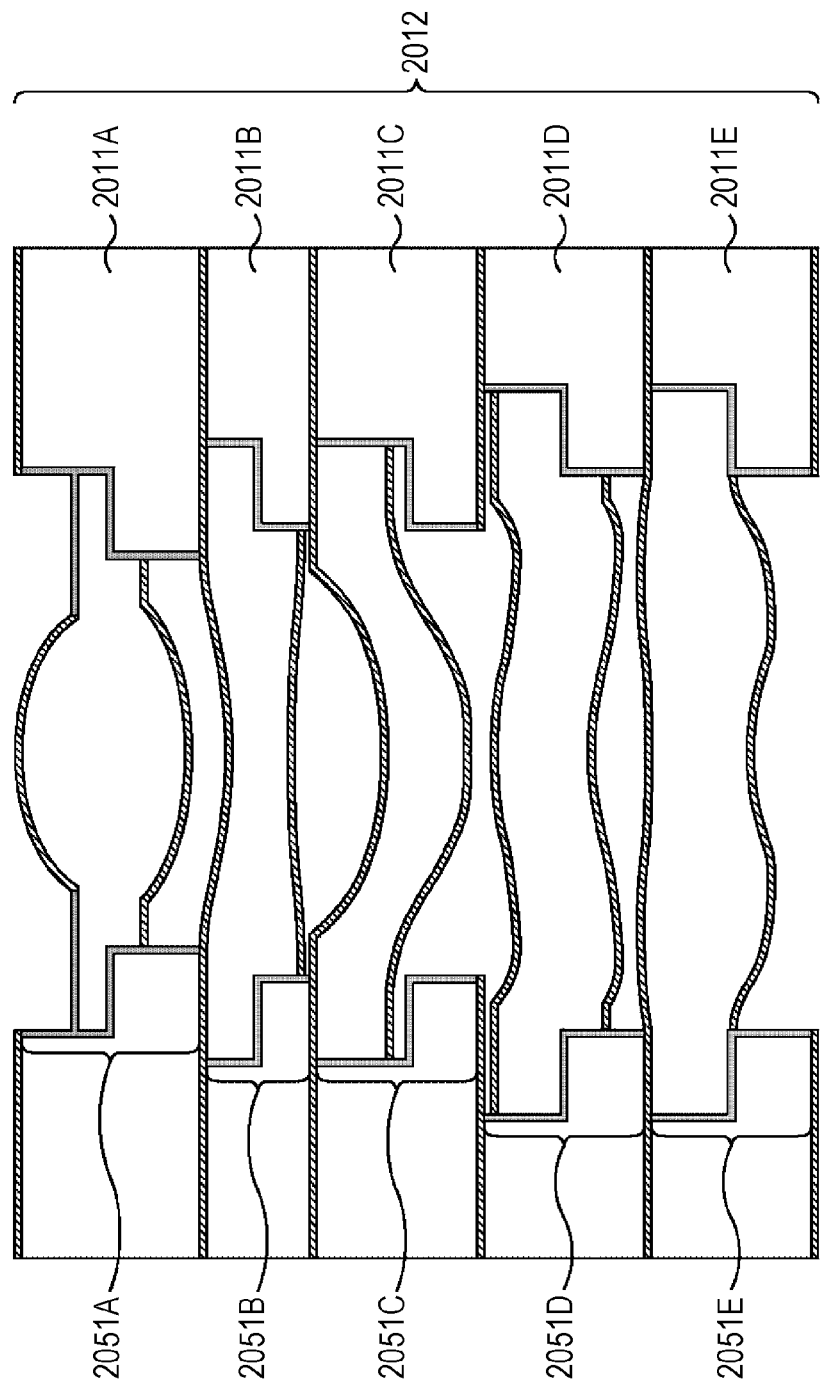
FIG. 61 is a cross-sectional view illustrating a main configuration example of a layered lens structure.

Further, for example, as illustrated in FIG. 61, the side wall 2051 of the through-hole 2041 of each lens attached substrate 2011 may be formed in a step shape in which a step is formed in the course of the through-hole 2041.

Figure 62:
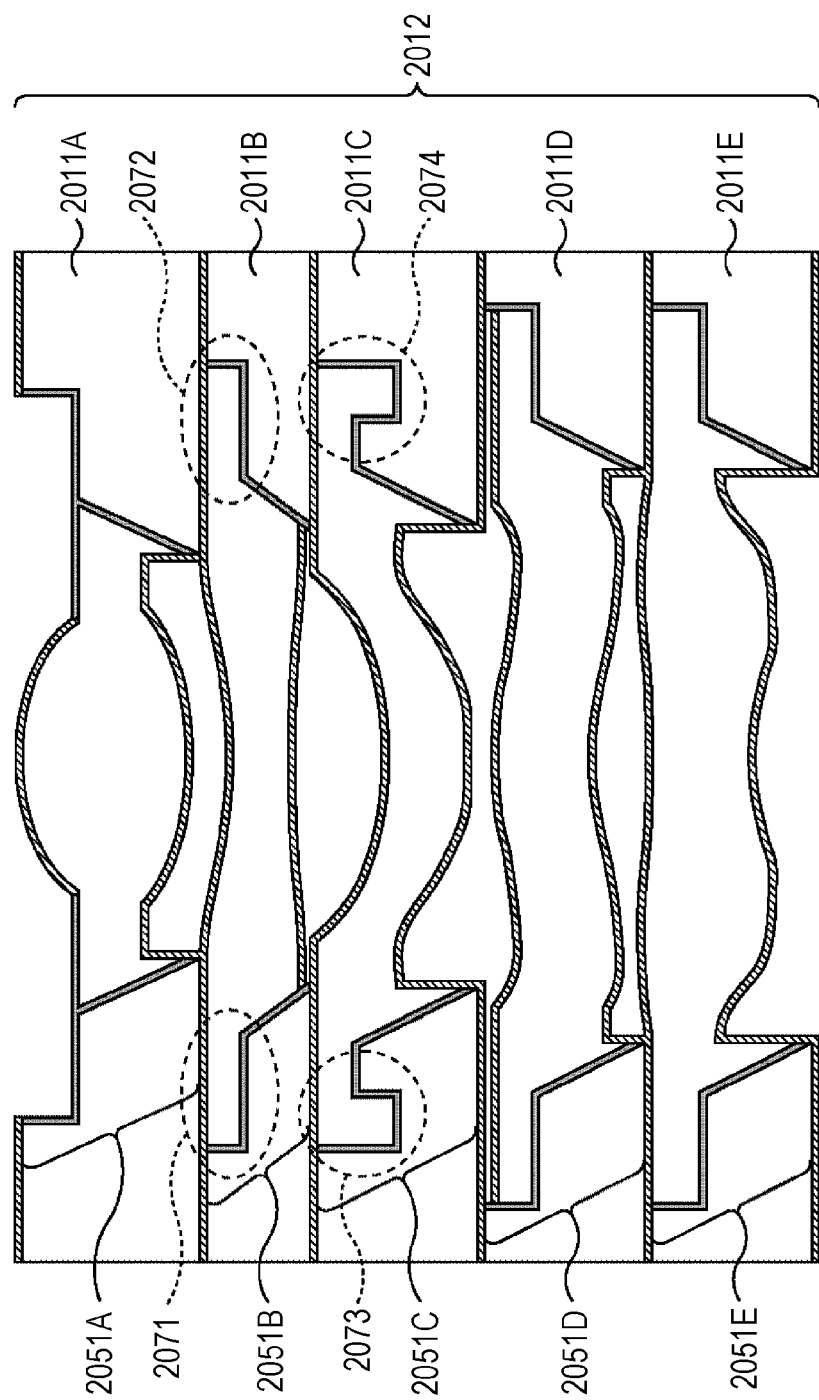
FIG. 62 is a cross-sectional view illustrating a main configuration example of a layered lens structure.

Of course, the shape of the side wall 2051 may be arbitrarily set and is not limited to these examples. For example, as illustrated in a dotted circle 2071 to a dotted circle 2074 of FIG. 62, a space used as a space for retracting the extra material (resin) of the lens resin portion 2042 formed when the lens resin portion 2042 is molded may be provided in the side wall 2051. The space has an arbitrary shape. Further, the space may be provided in all lens attached substrates 2011 constituting the layered lens structure 2012 or only a part of the lens attached substrates 2011.

The method (and the material) of forming the light shielding film 2043 may be selected in response to the shape of the side wall 2051. For example, for example, when the side wall 2051 is formed in a perpendicular shape, it is difficult to apply resist in spinning or spray coating. For this reason, CVD may be employed.

Further, for example, the layered lens structure 2012 may have the lens attached substrate 2011 in which the side wall 2051 has a different shape. That is, the side walls 2051 may not have the same shape in all lens attached substrates 2011 constituting the layered lens structure 2012. For example, the lens attached substrate 2011 with the tapered side wall 2051 and the lens attached substrate with the inverse tapered side wall 2051 may be laminated.

<Configuration of Camera Module>

The camera module 1 may include the layered lens structure 2012 with the above-described configuration. That is, the camera module may be obtained by laminating a layered lens structure, obtained by laminating a plurality of lens attached substrates with a lens attached substrate including a substrate having a through-hole formed therein and a light shielding film formed on a side wall of the through-hole and a lens resin portion formed inside the through-hole of the substrate, and a sensor substrate in which an optical sensor is formed on a substrate.

With such a configuration, the camera module 1 can obtain the same effect as the lens attached substrate 2011 or the layered lens structure 2012.

In addition, an example has been described in which one optical unit 13 is provided, but the present technology can be applied to a case where a plurality of the optical units 13 is provided.

<Manufacturing of Lens Attached Substrate>

Figure 63:
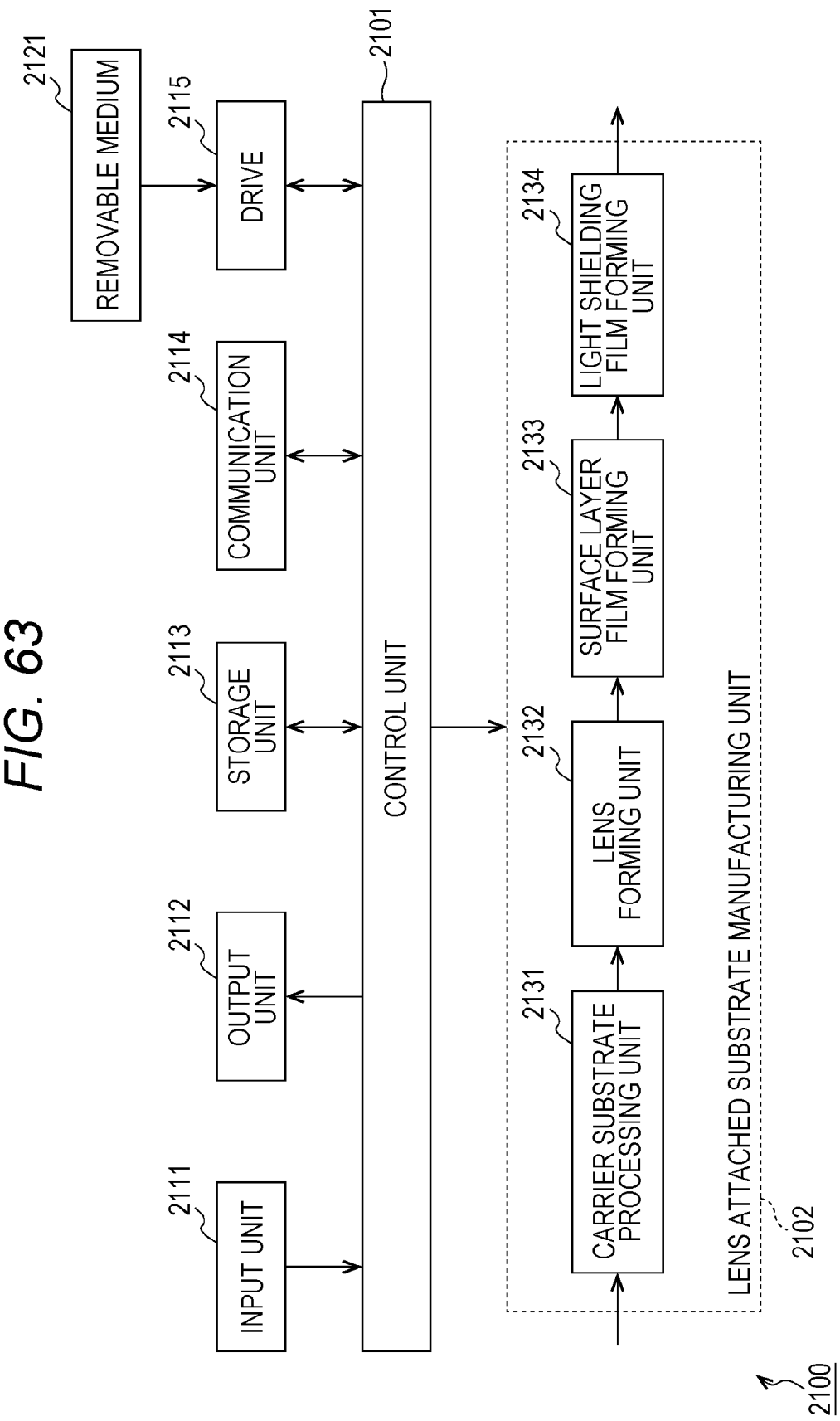
FIG. 63 is a block diagram illustrating a main configuration example of a manufacturing apparatus.

Next, the manufacturing of the lens attached substrate 2011 will be described. FIG. 63 is a block diagram illustrating a main configuration example of a manufacturing apparatus that manufactures a lens attached substrate as an embodiment of a manufacturing apparatus employing the present technology. A manufacturing apparatus 2100 illustrated in FIG. 63 includes a control unit 2101 and a lens attached substrate manufacturing unit 2102.

The control unit 2101 includes, for example, a central processing unit (CPU), a read only memory (ROM), and a random access memory (RAM) and controls the components of the lens attached substrate manufacturing unit 2102 while performing a control process involved with the manufacturing of the lens attached substrate. For example, the CPU of the control unit 2101 performs various processes according to a program stored on the ROM. Further, the CPU performs various processes according to the program loaded from a storage unit 2113 onto the RAM. The RAM appropriately stores data necessary for performing various processes by the CPU.

The lens attached substrate manufacturing unit 2102 is controlled by the control unit 2101 and performs a process involved with the manufacturing of the lens attached substrate. The lens attached substrate manufacturing unit 2102 includes a carrier substrate processing unit 2131, a lens forming unit 2132, a surface layer film forming unit 2133, and a light shielding film forming unit 2134.

The carrier substrate processing unit 2131 performs a process involved with the processing of the carrier substrate 2040. The lens forming unit 2132 performs a process involved with the forming of the lens resin portion 2042. The surface layer film forming unit 2133 performs a process involved with the forming of the upper surface layer 2044 or the lower surface layer 2045. The light shielding film forming unit 2134 performs a process involved with the forming of the light shielding film 2043. These process units are controlled by the control unit 2101 so as to perform the processes thereof.

Further, the manufacturing apparatus 2100 includes an input unit 2111, an output unit 2112, a storage unit 2113, a communication unit 2114, and a drive 2115.

The input unit 2111 is configured as, for example, a keyboard, a mouse, a touch panel, or an external input terminal and is used to receive an input of external information or a command of a user and to supply the input to the control unit 2101. The output unit 2112 is configured as, for example, a display such as a cathode ray tube (CRT) display, or a liquid crystal display (LCD), a speaker, or an external output terminal and is used to output various information supplied from the control unit 2101 as an image, a voice, an analog signal, or a digital data.

The storage unit 2113 includes, for example, an arbitrary storage medium such as a flash memory, a solid state drive (SSD), and a hard disk and is used to store information supplied from the control unit 2101 or supply the stored information by reading the stored information in accordance with the request from the control unit 2101. The communication unit 2114 is configured as, for example, an interface such as a wired local area network (LAN) and a wireless LAN or a modem and is used to perform a communication process with an external device through a network including the Internet. For example, the communication unit 2114 transmits information supplied from the control unit 2101 to a communication opponent or supplies information received from a communication opponent to the control unit 2101.

The drive 2115 is connected to a control unit 401 if necessary. Then, for example, a removable medium 2121 such as a magnetic disk, an optical disc, an optical magnetic disk, or a semiconductor memory is appropriately installed in the drive 2115. Then, a computer program which is read from the removable medium 2121 through the drive 2115 is installed in the storage unit 2113 if necessary.

Figure 64:
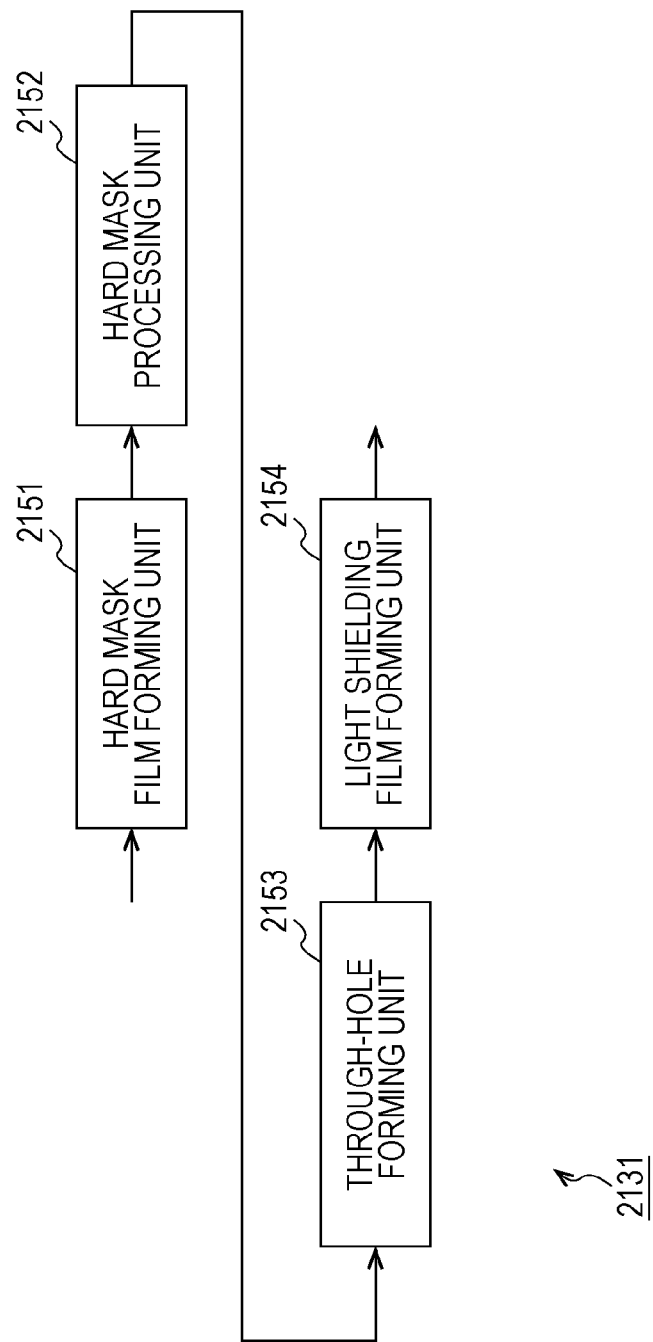
FIG. 64 is a block diagram illustrating a main configuration example of a carrier substrate processing unit.

FIG. 64 is a block diagram illustrating a main configuration example of the carrier substrate processing unit 2131. As illustrated in FIG. 64, the carrier substrate processing unit 2131 includes a hard mask film forming unit 2151, a hard mask processing unit 2152, a through-hole forming unit 2153, and a light shielding film forming unit 2154.

The hard mask film forming unit 2151 performs a process involved with the forming of the hard mask. The hard mask processing unit 2152 performs a process involved with the processing of the hard mask. The through-hole forming unit 2153 performs a process involved with the forming of the through-hole. The light shielding film forming unit 2154 performs a process involved with the forming of the light shielding film. These process units are controlled by the control unit 2101 so as to perform the processes thereof.

The manufacturing apparatus 2100 with the above-described configuration manufactures a lens attached substrate by performing a lens attached substrate manufacturing process. An example of the procedure of the lens attached substrate manufacturing process will be described with reference to the flowchart of FIG. 65. If necessary, a description will be made with reference to FIGS. 66A and 66B.

When the lens attached substrate manufacturing process is started, in step S2001, the carrier substrate processing unit 2131 performs a through-hole light shielding film forming process, forms the through-hole 2041 in an undivided carrier substrate 2161 supplied from the outside of the manufacturing apparatus 2100, and forms the light shielding film 2043 on the side wall 2051 of the through-hole 2041. The detailed description of this process will be made later.

The subsequent processes are basically performed in the same way as the above-described method of referring to FIGS. 23A to 23G of "10. Lens Attached Substrate Manufacturing Method".

In step S2002, the lens forming unit 2132 disposes the carrier substrate 2161 on the lower die 181. In step S2003, the lens forming unit 2132 charges, for example, the energy curable resin 191 as the material of the lens resin portion 2042 to the through-hole 2041 formed in the carrier substrate 2161. In step S2004, the lens forming unit 2132 disposes the upper die 201 on the carrier substrate 2161. In step S2005, the lens forming unit 2132 cures the energy curable resin 191. In step S2006, the lens forming unit 2132 separates the upper die 201 and the lower die 181 from the carrier substrate 2161.

For example, the lens forming unit 2132 may form the lens resin portion 2042 so that the width of the contact portion between the side wall 2051 (the light shielding film 2043) and the lens resin portion 2042 becomes narrower (shorter) than the length of the side wall 2051 (the width of the light shielding film 2043).

In step S2007, the surface layer film forming unit 2133 forms the upper surface layer 2044 on the light incident surface of the carrier substrate 2161 and the lens resin portion 2042 formed in the carrier substrate 2161 and forms the lower surface layer 2045 on the light emitting surface similarly to the example illustrated in FIG. 66A. The upper surface layer 2044 and the lower surface layer 2045 are formed of oxides, for example, SiOx, nitrides, for example, SiNx, or other insulation materials, for example, divinyltetramethylsiloxane-bisbenzocyclobutene (DVS-bisBCB).

In step S2008, when the lens attached substrate 2011 is manufactured so as to be laminated at the most light incident side of the layered lens structure 2012, the light shielding film forming unit 2134 forms the light shielding film 2043 on the light incident surface 2052 of the carrying portion 92 of the lens resin portion 2042 similarly to the example illustrated in FIG. 66B. When the lens attached substrate 2011 used as the other layer of the layered lens structure 2012 is manufactured, the light shielding film forming unit 2134 does not perform this process.

When the process of step S2008 is ended, the lens attached substrate manufacturing process is ended. When the lens attached substrate manufactured in this way is divided, the lens attached substrate 2011 is manufactured.

Figure 67:
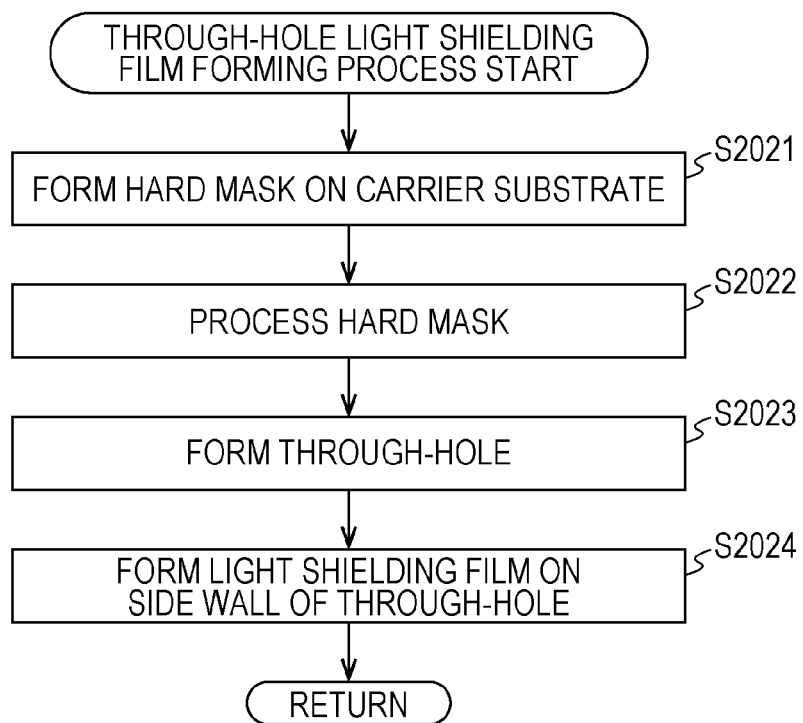
FIG. 67 is a flowchart illustrating an example of a procedure of a through-hole light shielding film forming process.

Next, an example of a sequence of the through-hole light shielding film forming process performed in step S2001 of FIG. 65 will be described with reference to the flowchart of FIG. 67. If necessary, a description will be made with reference to FIGS. 68A to 68E.

Figure 68A:
FIG. 68A-68E are cross-sectional views illustrating an example of a through-hole forming state and a light shielding film forming state.
Figure 68B:
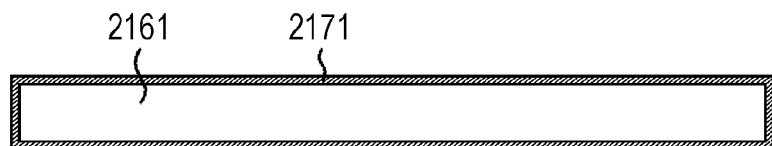
Figure 68C:
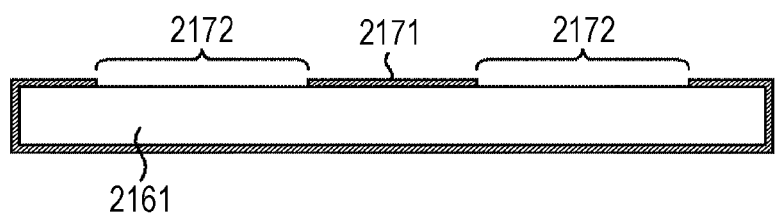
Figure 68D:
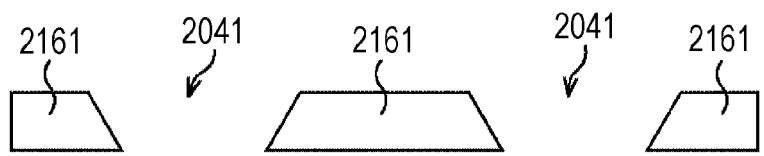

When the through-hole light shielding film forming process is started, in step S2021, the hard mask film forming unit 2151 forms a hard mask 2171 on the undivided carrier substrate 2161 illustrated in FIG. 68A as in FIG. 68B. The hard mask 2171 corresponds to the hard mask 242 of the other embodiment. In step S2022, the hard mask processing unit 2152 removes the hard mask 2171 of a predetermined portion 2172 by processing the hard mask 2171 as in FIG. 68C.

In step S2023, the through-hole forming unit 2153 forms the through-hole 2041 in the predetermined portion 2172 from which the hard mask 2171 is removed so that the side wall 2051 is formed in a predetermined shape (for example, a tapered shape or the like) by performing wet etching on the carrier substrate 2161 having the hard mask 2171 formed thereon. When the through-hole 2041 is formed, the through-hole forming unit 2153 removes the hard mask 2171 as in FIG. 68D.

Figure 68E:
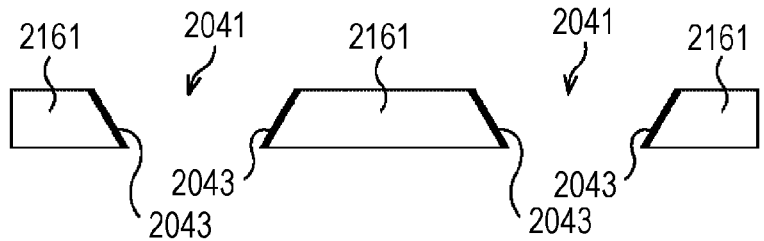

In step S2024, the light shielding film forming unit 2154 forms the light shielding film 2043 described with reference to FIGS. 56A to 56C or 57A and 57B on the side wall 2051 of the through-hole 2041 as in FIG. 68E.

For example, the light shielding film forming unit 2154 may form the light shielding film 2043 by using a black material. Further, the light shielding film forming unit 2154 may use, for example, a pigment of carbon black or titanium black as the black material. Further, for example, the light shielding film forming unit 2154 may form the light shielding film 2043 by using a metal film. The light shielding film forming unit 2154 may use, for example, tungsten (W) or chrome (Cr) as the metal film. For example, the light shielding film forming unit 2154 may form the light shielding film 2043 by using a CVD film. The light shielding film forming unit 2154 may use, for example, a carbon nanotube as the CVD film.

Further, for example, the light shielding film forming unit 2154 may form the light shielding film 2043 by using an adhesion promoting agent for improving the contactability between the lens resin portion 2042 and the side wall 2051 of the through-hole 2041. The light shielding film forming unit 2154 may use, for example, a silane coupling agent as the adhesion promoting agent.

Figure 65:
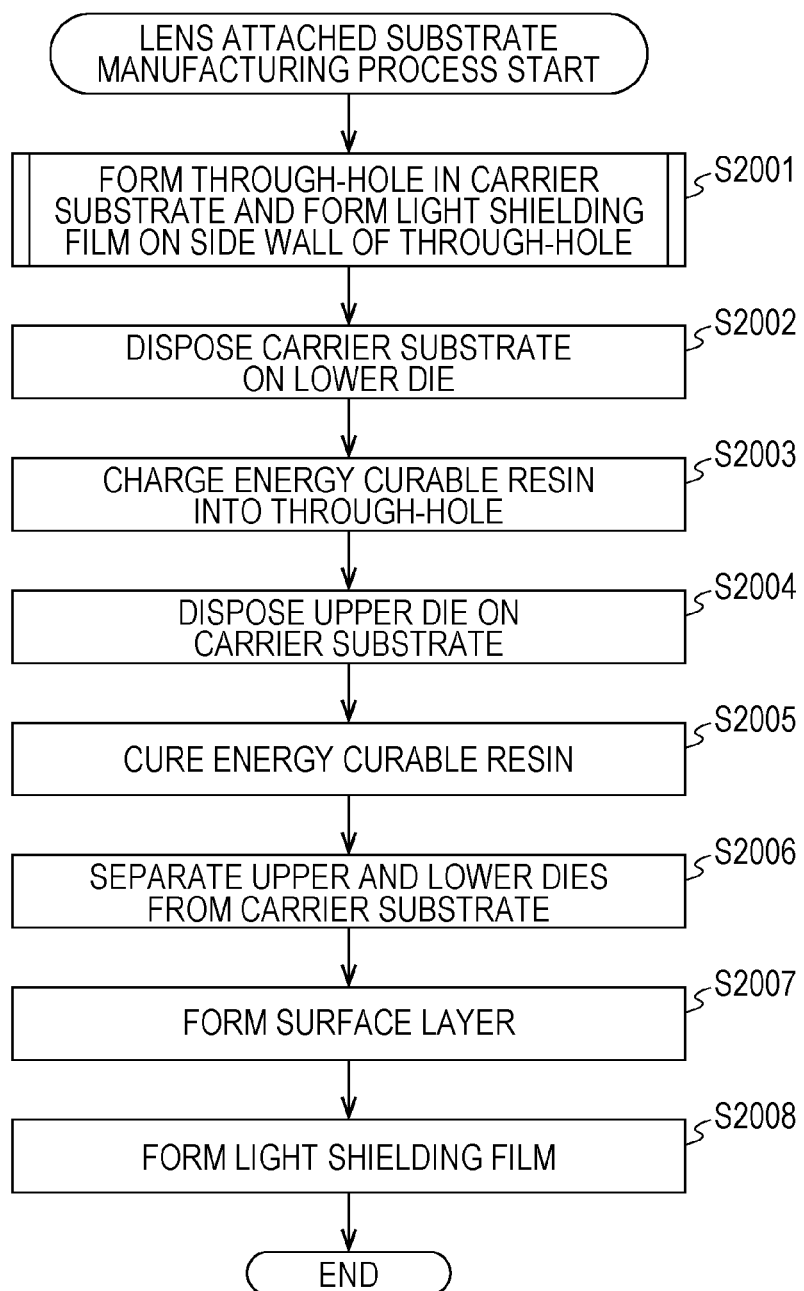
FIG. 65 is a flowchart illustrating an example of a procedure of a lens attached substrate manufacturing process.

When the process of step S2024 is ended, the through-hole light shielding film forming process is ended and the process is returned to FIG. 65.

When the lens attached substrate is manufactured as described above, the lens attached substrate having the above-described effect can be manufactured.

Other Example of Carrier Substrate Processing

In addition, the method of processing the carrier substrate 2161 is not limited to the above-described example. For example, when the carrier substrate 2161 is processed, the other substrate (the support substrate) may be bonded to the carrier substrate 2161.

FIG. 69 is a block diagram illustrating a main configuration example of the carrier substrate processing unit 2131 in that case. As illustrated in FIG. 69, the carrier substrate processing unit 2131 in this case includes a support substrate bonding unit 2181 and a support substrate separating unit 2182 in addition to the configuration (the hard mask film forming unit 2151 to the light shielding film forming unit 2154) illustrated in FIG. 64.

The support substrate bonding unit 2181 performs a process involved with the bonding of the support substrate and the carrier substrate. The support substrate separating unit 2182 performs a process involved with the separating of the support substrate and the carrier substrate.

Figure 70:
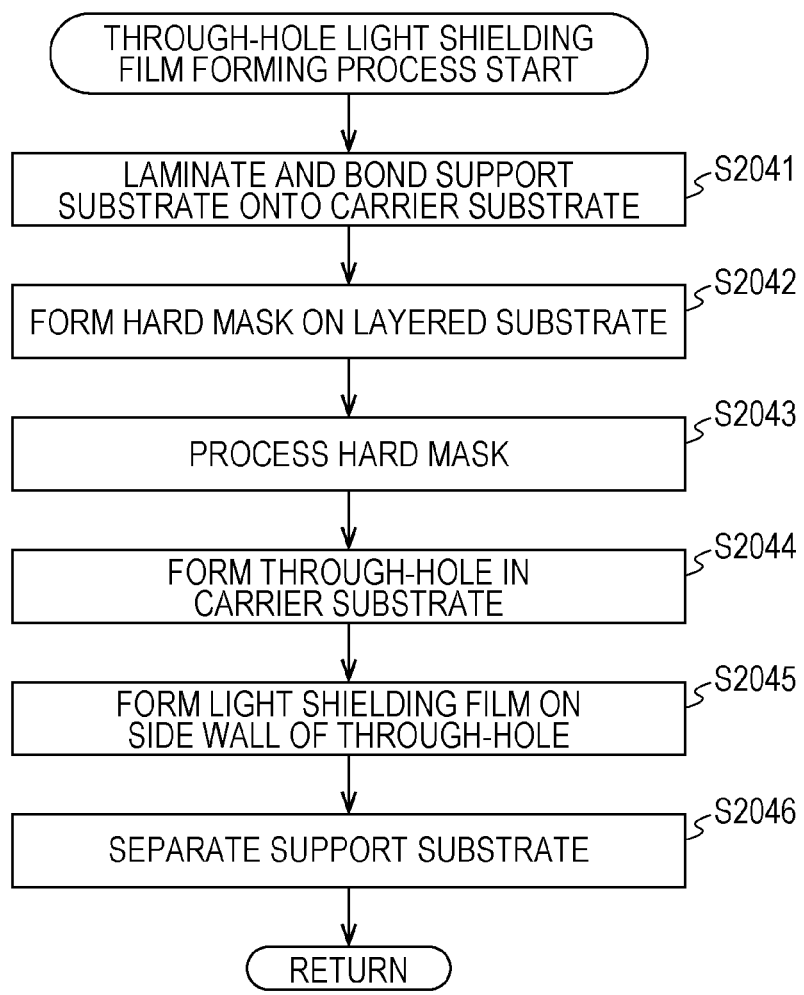
FIG. 70 is a flowchart illustrating an example of a procedure of a through-hole light shielding film forming process.

An example of a sequence of a through-hole light shielding film forming process performed in step S2001 of FIG. 65 in this case will be described with reference to the flowchart of FIG. 70. If necessary, a description will be made with reference to FIGS. 71A to 71F.

Figure 71A:
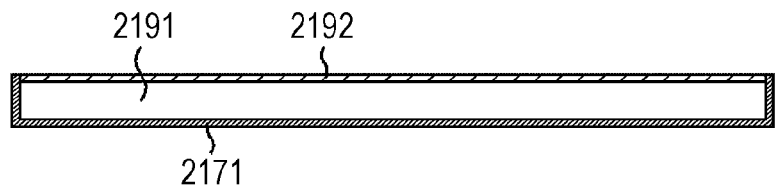
FIG. 71A-71F are cross-sectional views illustrating an example of a through-hole forming state and a light shielding film forming state.

As illustrated in FIG. 71A, an etching stop film 2192 is formed on a surface of a support substrate 2191 used in this case. When the through-hole light shielding film forming process is started, in step S2041, the support substrate bonding unit 2181 laminates and bonds the undivided carrier substrate 2161 on the surface of the support substrate 2191 provided with the etching stop film 2192. The bonding method may be arbitrarily set. For example, the support substrate bonding unit 2181 may bond the carrier substrate 2161 and the support substrate 2191 to each other by plasma bonding or an adhesive. As will be described later, in order to separate the support substrate 2191 from the carrier substrate 2161 later, the support substrate bonding unit 2181 may bond the carrier substrate 2161 and the support substrate 2191 to each other by an easily separating method.

Figure 71B:
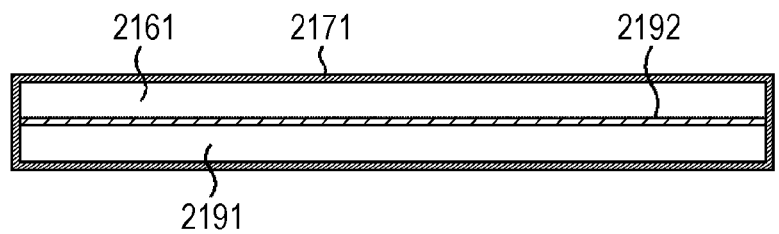
Figure 71C:
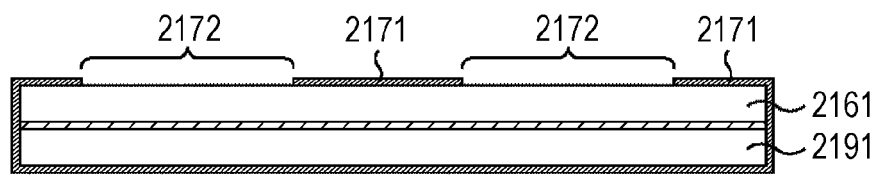
Figure 71D:
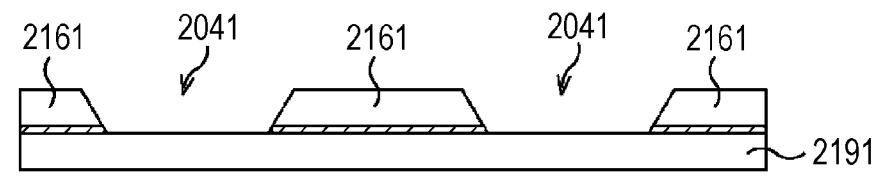

In step S2042, the hard mask film forming unit 2151 forms the hard mask 2171 on the layered substrate in which the carrier substrate 2161 and the support substrate 2191 are laminated as in FIG. 71B. In step S2043, the hard mask processing unit 2152 removes the hard mask 2171 of the predetermined portion 2172 by processing the hard mask 2171 as in FIG. 71C.

In step S2044, the through-hole forming unit 2153 forms the through-hole 2041 in the predetermined portion 2172 from which the hard mask 2171 of the carrier substrate 2161 is removed so that the side wall 2051 is formed in a predetermined shape (for example, a tapered shape or the like) by performing wet etching on the layered substrate having the hard mask 2171 formed thereon. Since the etching stop film 2192 is formed between the carrier substrate 2161 and the support substrate 2191, only the carrier substrate 2161 is etched. When the through-hole 2041 is formed, the through-hole forming unit 2153 removes the hard mask 2171 from the layered substrate as in FIG. 71D.

Figure 71E:
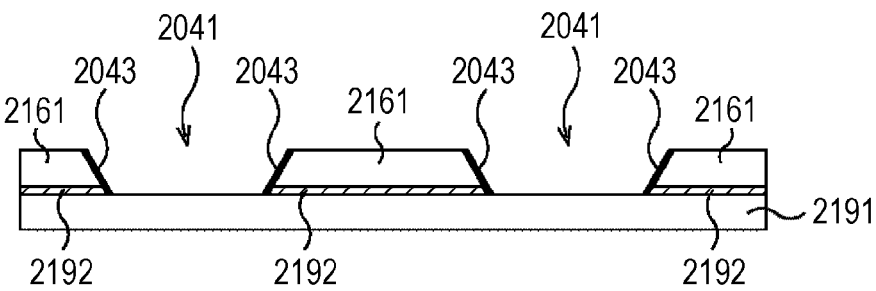
Figure 71F:
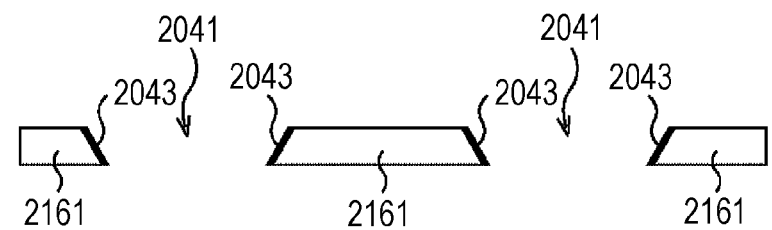

In step S2045, the light shielding film forming unit 2154 forms the light shielding film 2043 described above with reference to FIGS. 56A to 56C or 57A and 57B on the side wall 2051 of the through-hole 2041 as in FIG. 71E. That is, the light shielding film forming unit 2154 forms the light shielding film 2043 as in the case described with reference to the flowchart of FIG. 67.

In step S2046, the support substrate separating unit 2182 separates the support substrate 2191 (and the etching stop film 2192) from the carrier substrate 2161.

When the process of step S2046 is ended, the through-hole light shielding film forming process is ended and the process is returned to FIG. 65.

When the lens attached substrate is manufactured as described above, it is possible to manufacture the lens attached substrate capable of obtaining the above-described effect.

<Manufacturing of Layered Lens Structure>

Figure 72:
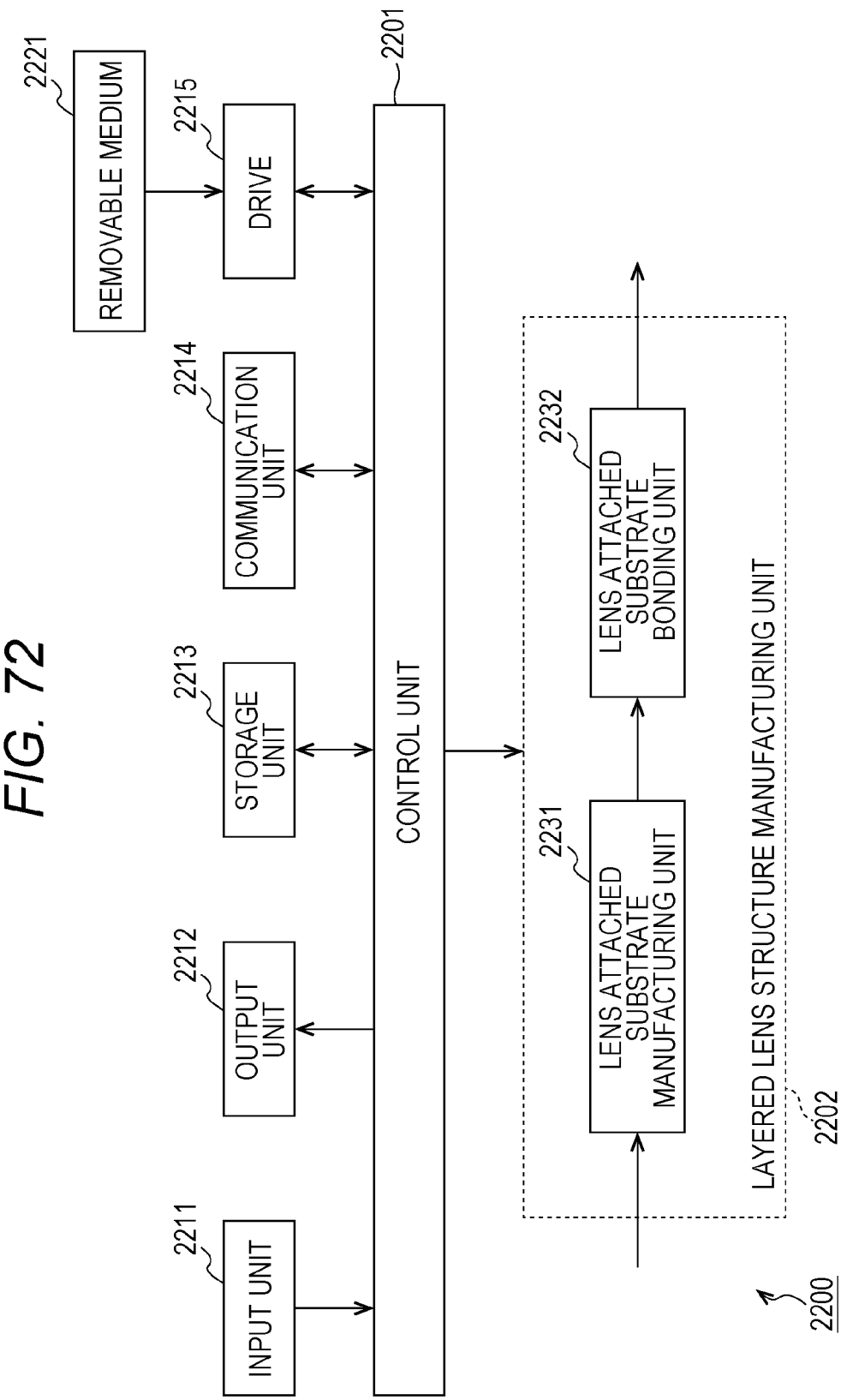
FIG. 72 is a block diagram illustrating a main configuration example of a manufacturing apparatus.

Next, the manufacturing of the layered lens structure 2012 will be described. FIG. 72 is a block diagram illustrating a main configuration example of a manufacturing apparatus manufacturing a layered lens structure as an embodiment of a manufacturing apparatus employing the present technology. A manufacturing apparatus 2200 illustrated in FIG. 72 includes a control unit 2201 and a layered lens structure manufacturing unit 2202.

The control unit 2201 includes, for example, a CPU, a ROM, and a RAM and controls the components of the layered lens structure manufacturing unit 2202 while performing a control process involved with the manufacturing of the layered lens structure. For example, the CPU of the control unit 2201 performs various processes in accordance with a program stored on the ROM. Further, the CPU performs various processes in accordance with a program loaded from the storage unit 2213 onto the RAM. The RAM appropriately stores data necessary for performing various processes by the CPU.

The layered lens structure manufacturing unit 2202 is controlled by the control unit 2201 and performs a process involved with the manufacturing of the layered lens structure. The layered lens structure manufacturing unit 2202 includes a lens attached substrate manufacturing unit 2231 and a lens attached substrate bonding unit 2232.

The lens attached substrate manufacturing unit 2231 performs a process involved with the manufacturing of the lens attached substrate. The lens attached substrate manufacturing unit 2231 has the same function as the lens attached substrate manufacturing unit 2102 (FIG. 63) of the manufacturing apparatus 2100. That is, the lens attached substrate manufacturing unit 2231 includes the process units of the carrier substrate processing unit 2131 to the light shielding film forming unit 2134 and performs the same process as the lens attached substrate manufacturing unit 2102.

The lens attached substrate bonding unit 2232 performs a process of bonding the lens attached substrates to each other. The lens attached substrate manufacturing unit 2231 and the lens attached substrate bonding unit 2232 are controlled by the control unit 2201 so as to perform the processes thereof.

Further, the manufacturing apparatus 2200 includes an input unit 2211, an output unit 2212, a storage unit 2213, a communication unit 2214, and a drive 2215. A removable medium 2221 is appropriately mounted onto the drive 2215. The input unit 2211 to the drive 2215 are the same process units as the input unit 2111 to the drive 2115 of the manufacturing apparatus 2100 of FIG. 63 and have the same functions. Further, the removable medium 2221 is the same storage medium as the removable medium 2121 and stores a computer program and the like.

Figure 73:
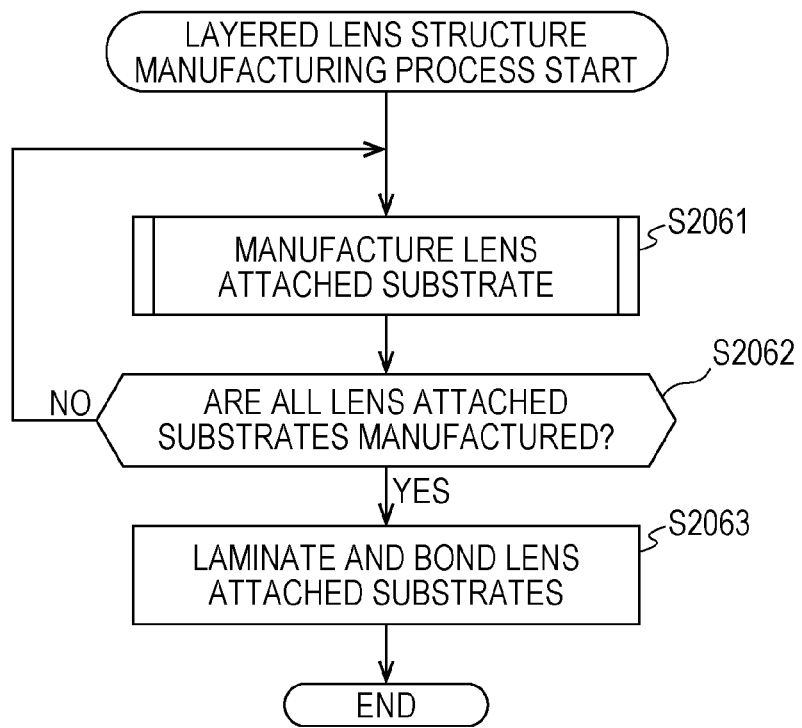
FIG. 73 is a flowchart illustrating an example of a procedure of a layered lens structure manufacturing process.

The manufacturing apparatus 2200 with the above-described configuration manufactures a layered lens structure by performing a layered lens structure manufacturing process. An example of a sequence of the layered lens structure manufacturing process will be described with reference to the flowchart of FIG. 73.

When the layered lens structure manufacturing process is started, the lens attached substrate manufacturing unit 2231 manufactures the lens attached substrate as described above with reference to FIGS. 63 to 71A to 71F in step S2061. In step S2062, the lens attached substrate manufacturing unit 2231 determines whether all lens attached substrates constituting the layered lens structure are manufactured and repeats the process of step S2061 until all lens attached substrates are manufactured. That is, the lens attached substrate manufacturing unit 2231 manufactures all lens attached substrates constituting the layered lens structure by repeating the lens attached substrate manufacturing process (FIG. 65).

When all lens attached substrates are manufactured, the process proceeds to step S2063. In step S2063, the lens attached substrate bonding unit 2232 laminates and bonds the lens attached substrates manufactured by the lens attached substrate manufacturing unit 2231. The bonding method may be arbitrarily set. For example, the lens attached substrate bonding unit 2232 may bond the lens attached substrates to each other by plasma bonding or may bond the lens attached substrates to each other by using an adhesive.

When the process of step S2063 is ended, the layered lens structure manufacturing process is ended. When the manufactured layered lens structure is divided in this way, the layered lens structure 2012 is manufactured.

When the layered lens structure is manufactured in this way, it is possible to manufacture the layered lens structure capable of obtaining the above-described effect.

<Manufacturing of Camera Module>

Figure 74:
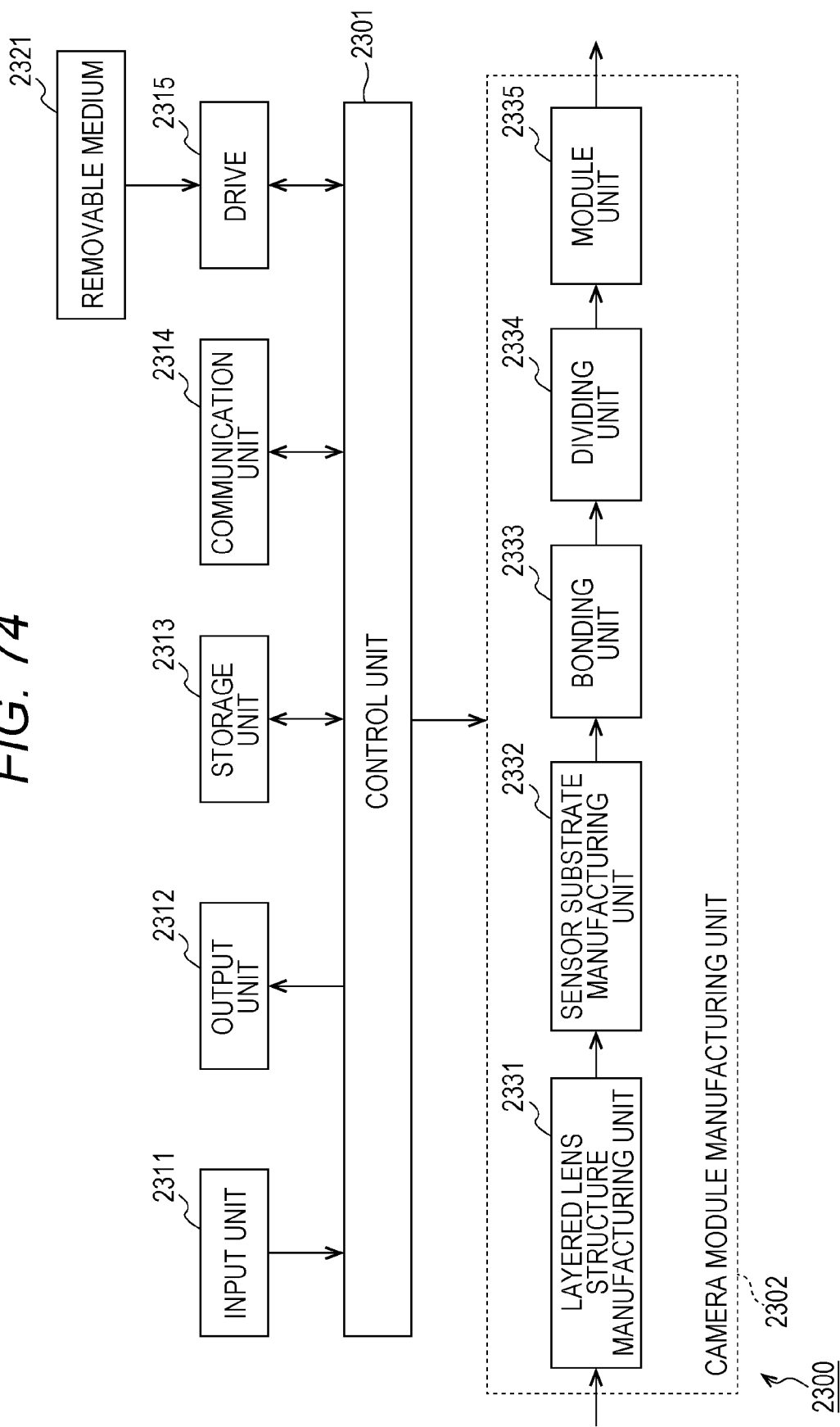
FIG. 74 is a block diagram illustrating a main configuration example of a manufacturing apparatus.

Next, the manufacturing of the camera module 1 will be described. FIG. 74 is a block diagram illustrating a main configuration example of a manufacturing apparatus that manufactures the camera module 1 as an embodiment of the manufacturing apparatus of the present technology. A manufacturing apparatus 2300 illustrated in FIG. 74 includes a control unit 2301 and a camera module manufacturing unit 2302.

The control unit 2301 includes, for example, a CPU, a ROM, and a RAM and controls the components of the camera module manufacturing unit 2302 while performing a control process involved with the manufacturing of the camera module 1. For example, the CPU of the control unit 2301 performs various processes in accordance with a program stored on the ROM. Further, the CPU performs various processes in accordance with a program loaded from the storage unit 2313 onto the RAM. The RAM appropriately stores data necessary for performing various processes by the CPU.

The camera module manufacturing unit 2302 is controlled by the control unit 2301 so as to perform a process involved with the manufacturing of the camera module 1. The camera module manufacturing unit 2302 includes a layered lens structure manufacturing unit 2331, a sensor substrate manufacturing unit 2332, a bonding unit 2333, a dividing unit 2334, and a module unit 2335.

The layered lens structure manufacturing unit 2331 performs a process involved with the manufacturing of the layered lens structure. The layered lens structure manufacturing unit 2331 has the same function as the layered lens structure manufacturing unit 2202 (FIG. 72) of the manufacturing apparatus 2200. That is, the layered lens structure manufacturing unit 2331 includes the lens attached substrate manufacturing unit 2231 and the lens attached substrate bonding unit 2232 and performs the same process as the layered lens structure manufacturing unit 2202.

The sensor substrate manufacturing unit 2332 performs a process involved with the manufacturing of the sensor substrate 43W. The bonding unit 2333 performs a process involved with the bonding of the layered lens structure and the sensor substrate. The dividing unit 2334 performs a process involved with the dividing of the layered substrate obtained by bonding the layered lens structure and the sensor substrate to each other. The module unit 2335 performs a process involved with the module of the divided layered substrate. These process units are controlled by the control unit 2301 so as to perform the processes thereof.

Further, the manufacturing apparatus 2300 includes an input unit 2311, an output unit 2312, a storage unit 2313, a communication unit 2314, and a drive 2315. A removable medium 2321 is appropriately mounted onto the drive 2315.

The input unit 2311 to the drive 2315 are the same process units as the input unit 2111 to the drive 2115 of the manufacturing apparatus 2100 of FIG. 63 and have the same functions. Further, the removable medium 2321 is the same storage medium as the removable medium 2121 and stores a computer program and the like.

Figure 75:
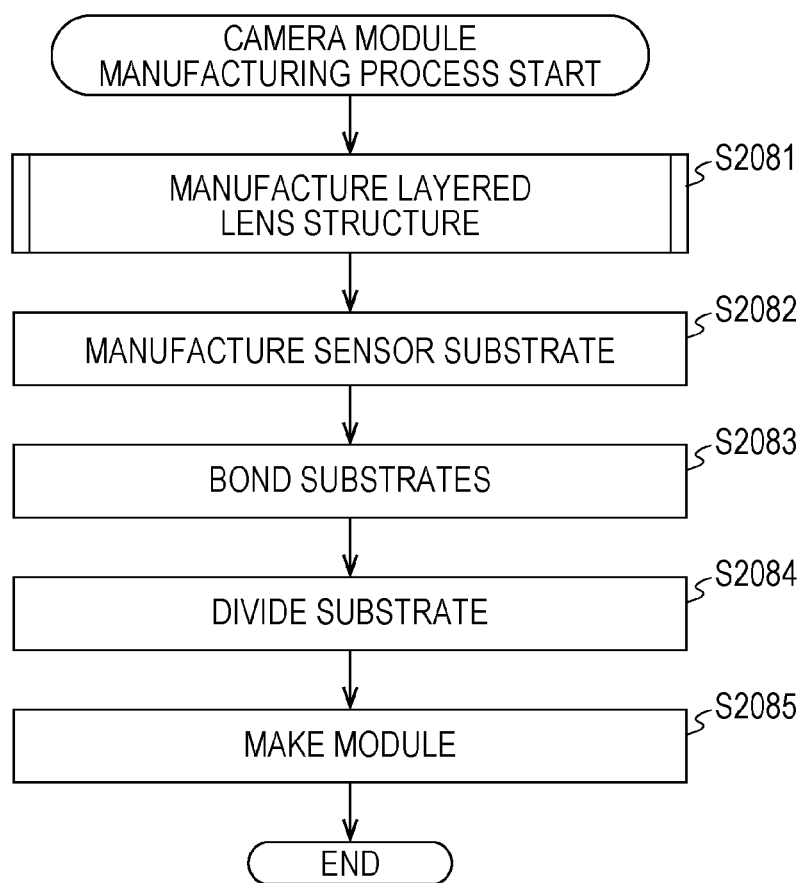
FIG. 75 is a flowchart illustrating an example of a procedure of a camera module manufacturing process.

When the manufacturing apparatus 2300 with the above-described configuration performs a camera module manufacturing process, the camera module 1 is manufactured. An example of a sequence of the camera module manufacturing process will be described with reference to the flowchart of FIG. 75.

When the camera module manufacturing process is started, the layered lens structure manufacturing unit 2331 manufactures the layered lens structure as described above with reference to FIGS. 63 to 73 in step S2081. In step S2082, the sensor substrate manufacturing unit 2332 manufactures the sensor substrate 43W provided with a sensor such as a light receiving element. For example, the configuration of the sensor like the sensor formed on the sensor substrate 43W may be arbitrarily set. Further, the method of manufacturing the sensor substrate 43W may be also arbitrarily set.

In step S2083, the bonding unit 2333 bonds the manufactured layered lens structure and the sensor substrate 43W to each other. The bonding method may be arbitrarily set. For example, the bonding unit 2333 may bond the layered lens structure and the sensor substrate 43W to each other by plasma bonding or may bond the layered lens structure and the sensor substrate 43W to each other by using an adhesive.

In step S2084, the dividing unit 2334 divides the layered substrate obtained by laminating and bonding the layered lens structure and the sensor substrate 43W.

In step S2085, the module unit 2335 makes the module of the divided layered substrate by providing the diaphragm plate 51 or the lens barrel 74 in, for example, the divided layered substrate so as to manufacture the camera module 1. A process involved with the module may be arbitrarily set.

When the process of step S2085 is ended, the camera module manufacturing process is ended.

When the camera module 1 is manufactured as described above, it is possible to manufacture the camera module 1 capable of obtaining the above-described effect.

17. Other Embodiment 2

<Wafer Level Lens>

Incidentally, as described above, in a method of blasting the surface of the side wall of the through-hole as in PTL 1, there is a possibility that the reflection of the light of the side wall of the through-hole is not sufficiently suppressed. Even when the method of PTL 1 is used, there is a possibility that the occurrence of the ghost or flare is not sufficiently suppressed and the image quality is degraded.

Here, the lens attached substrate includes a substrate in which a through-hole is formed and a light shielding film is formed on a light incident surface or a light emitting surface and a lens resin portion which is formed inside the through-hole of the substrate.

<Configuration of Lens Attached Substrate>

Figure 76:
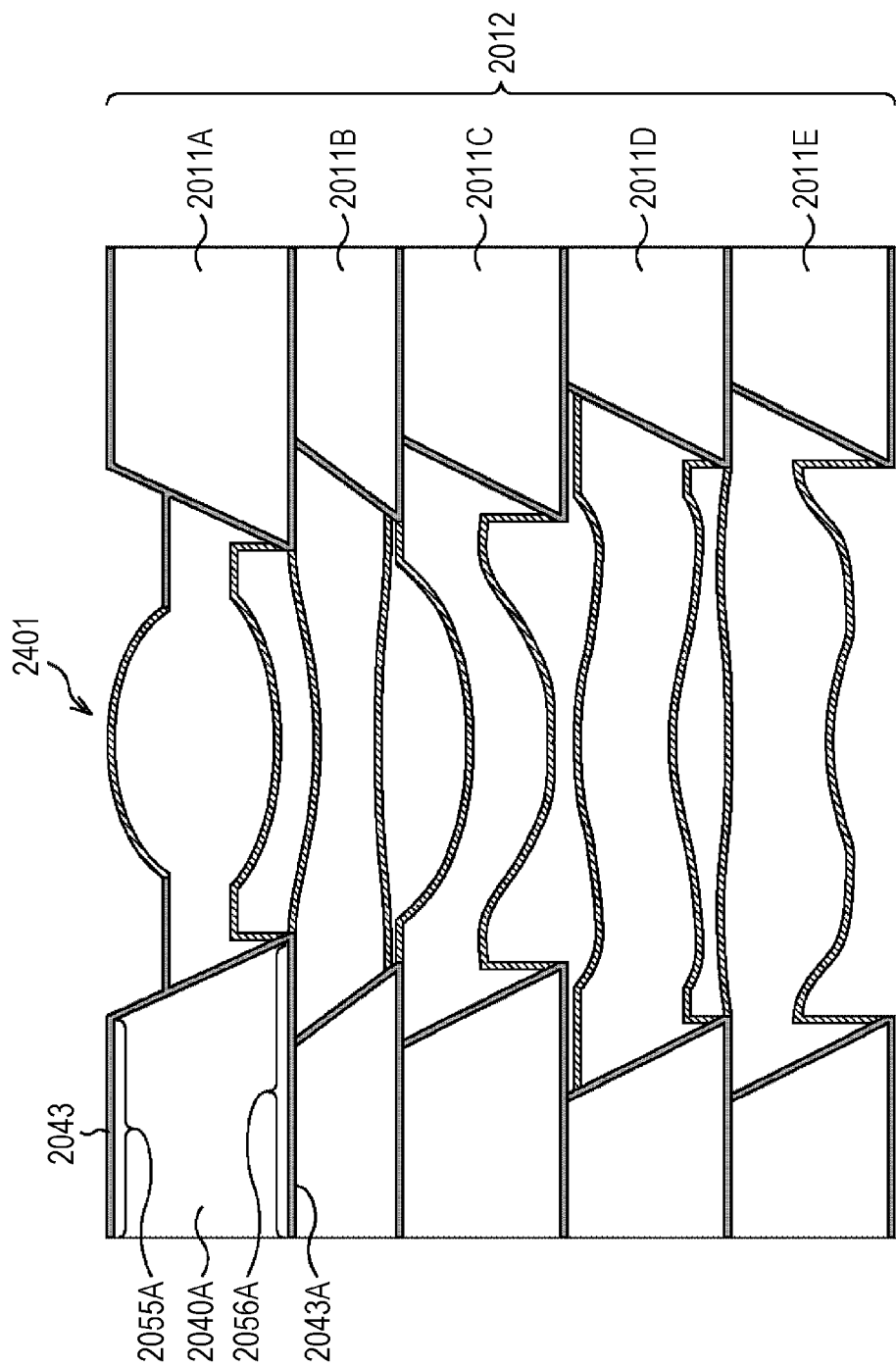
FIG. 76 is a cross-sectional view illustrating a main configuration example of a layered lens structure.

FIG. 76 is a schematic cross-sectional view illustrating a main configuration example of the layered lens structure 2012 in this case. As illustrated in FIG. 76, in this case, the light shielding film 2043 is formed on the entire surface of the light incident surface 2055A of the carrier substrate 2040A of the lens attached substrate 2011A. Further, the light shielding film 2043 is also formed on the entire surface of the light emitting surface 2056A. The lens attached substrate 2011B to the lens attached substrate 2011E also have the same configuration. That is, the light shielding film 2043 is formed on the entire surfaces of the light incident surface 2055 and the light emitting surface 2056 of the carrier substrate 2040 in the lens attached substrate 2011.

The material of the light shielding film 2043 may be set as described above. Further, the film thickness of the light shielding film 2043 may be arbitrarily set. For example, 1 µm or so is desirable.

Since the light shielding film 2043 is formed in this way, it is possible to suppress the reflection or the transmission of the light in this portion and to suppress the occurrence of the ghost or flare. Accordingly, it is possible to suppress degradation in image quality caused by the lens attached substrate 2011 (the layered lens structure 2012).

For example, when the material of the carrier substrate 2040 is quartz, light is transmitted therethrough. For that reason, the ghost or flare occurs easily while the light passes through the carrier substrate 2040. On the contrary, as described above, when the light shielding film 2043 is formed on the entire surfaces of the light incident surface 2055 and the light emitting surface 2056 of the carrier substrate 2040, the lens attached substrate 2011 can suppress the occurrence of the ghost or flare by suppressing the reflection or the transmission of the light and hence suppress degradation in image quality.

For example, in the case of FIG. 76, in a state where the lens attached substrates 2011 are laminated as in the layered lens structure 2012, the through-holes 2041 of the lens attached substrates 2011 forming the optical unit 13 are connected so that one through-hole 2401 is formed from the light incident surface of the layered lens structure 2012 (that is, the light incident surface of the lens attached substrate 2011A) to the light emitting surface (that is, the light emitting surface of the lens attached substrate 2011E). The light receiving element of the sensor substrate receives the incident light emitted from a subject and passing through the through-hole 2401 of the layered lens structure 2012.

In such a lamination state, one of or both the light incident surface 2055 and the light emitting surface 2056 of the carrier substrate 2040 of the lens attached substrate 2011 are exposed to the through-hole 2401 in accordance with the shape of the through-hole 2041 of the lens attached substrate 2011 (the shape of the side wall 2051). For example, in the case of FIG. 76, the side wall 2051 of the through-hole 2041 of each lens attached substrate 2011 is formed in an inverse tapered shape. For that reason, a part of the light emitting surface 2056 of the carrier substrate 2040 of each lens attached substrate 2011 is exposed to the through-hole 2401.

As described above, when the light shielding film 2043 is formed on the entire surfaces of the light incident surface 2055 and the light emitting surface 2056 of the carrier substrate 2040, the light shielding film 2043 is formed on a portion exposed to the through-hole 2401 of the light emitting surface 2056 of the carrier substrate 2040 in each lens attached substrate 2011. Thus, the lens attached substrate 2011 can suppress the reflection or the transmission of the light passing through the through-hole 2401 in a lamination state. That is, it is possible to suppress degradation in image quality.

In the case of the example of FIG. 76, the light shielding film 2043 is also formed on the side wall 2051 of the through-hole 2041 of each lens attached substrate 2011. Thus, the lens attached substrate 2011 can further suppress the reflection or the transmission of the light passing through the through-hole 2401 in the lamination state. That is, it is possible to further suppress degradation in image quality by further suppressing the occurrence of the ghost or flare.

In addition, the light shielding film may be formed on the front surface of only one of the light incident surface 2055 and the light emitting surface 2056 of the carrier substrate 2040. A state where the light incident surface 2055 of the carrier substrate 2040 is exposed to the through-hole 2401 or the light emitting surface 2056 of the carrier substrate 2040 is exposed to the through-hole 2401 while the plurality of lens attached substrates is laminated is dependent on the shape of the side wall 2051 or the size of the through-hole 2041 of each lens attached substrate. The light shielding film 2043 may be formed on a surface in which at least a part of the light incident surface 2055 and the light emitting surface 2056 of the carrier substrate 2040 is exposed to the through-hole 2401.

In addition, the light shielding film 2043 may be formed on the entire surface of one of or both the light incident surface 2055 and the light emitting surface 2056 of the carrier substrate 2040 only in a part of the lens attached substrate 2011 in the plurality of laminated lens attached substrates 2011.

Further, at least two kinds or more of the lens attached substrates 2011 may be mixed and laminated among the lens attached substrate 2011 in which the light shielding film 2043 is formed on the light incident surface 2055 of the carrier substrate 2040, the lens attached substrate 2011 in which the light shielding film 2043 is formed on the light emitting surface 2056 of the carrier substrate 2040, the lens attached substrate 2011 in which the light shielding film 2043 is formed on both the light incident surface 2055 and the light emitting surface 2056 of the carrier substrate 2040, and the lens attached substrate 2011 in which the light shielding film 2043 is not formed on both the light incident surface 2055 and the light emitting surface 2056 of the carrier substrate 2040. That is, a surface provided with the light shielding film 2043 may not be uniform in the plurality of laminated lens attached substrates 2011.

However, in general, it is possible to further suppress the reflection or the transmission of the light as the range of the light shielding film 2043 is widened. Further, it is possible to further suppress the reflection or the transmission of the light as the number of the light shielding films 2043 increases.

<Configuration of Layered Lens Structure>

As illustrated in FIG. 76, the layered lens structure 2012 can be obtained by laminating the plurality of lens attached substrates 2011 including the lens attached substrate 2011 with such a configuration. With such a configuration, it is possible to obtain the same effect as the lens attached substrate 2011 and hence to suppress degradation in image quality.

<Configuration of Camera Module>

Further, the camera module 1 can be obtained by laminating the layered lens structure 2012 obtained by laminating the plurality of lens attached substrates 2011 including the lens attached substrate 2011 with such a configuration and the sensor substrate. With such a configuration, it is possible to obtain the same effect as the lens attached substrate 2011 and hence to suppress degradation in image quality.

<Manufacturing of Lens Attached Substrate>

When the lens attached substrate 2011 in such a case is manufactured, the manufacturing apparatus 2100 (FIGS. 63, 64, and 69) may perform the light shielding film forming process of step S2008 as below when the lens attached substrate manufacturing process (FIG. 65) is performed.

Figure 77:
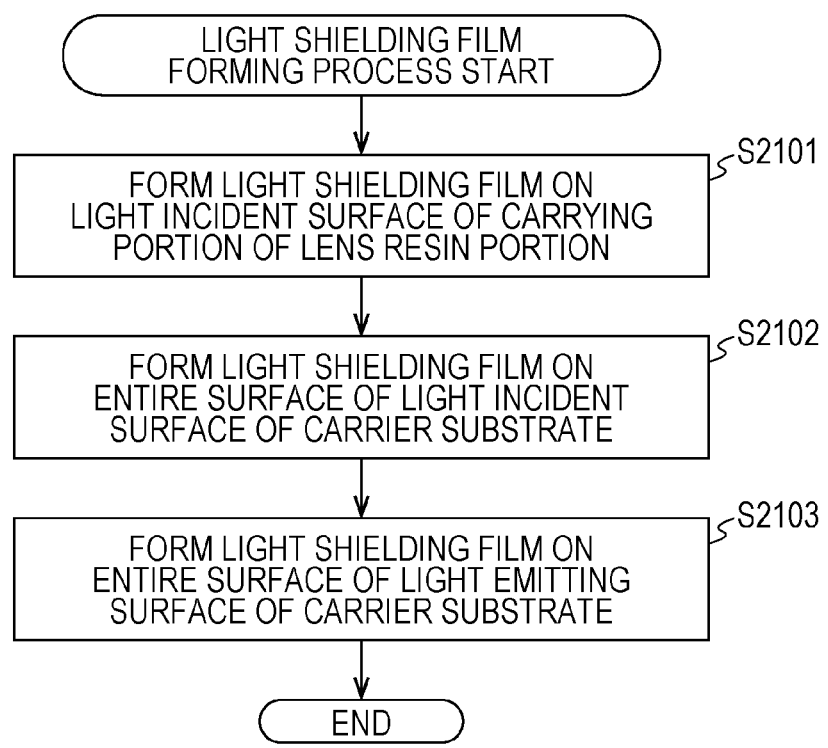
FIG. 77 is a flowchart illustrating an example of a procedure of a light shielding film forming process.

An example of a sequence of the light shielding film forming process performed by the manufacturing apparatus 2100 in step S2008 of this case will be described with reference to the flowchart of FIG. 77.

When the light shielding film forming process is started, in step S2101, the light shielding film forming unit 2134 forms the light shielding film on the light incident surface 2052 of the carrying portion 92 of the lens resin portion 2042. In addition, this process may be performed only when the lens attached substrate 2011 laminated at the most light incident side is manufactured and may be omitted when the other lens attached substrate is manufactured.

In step S2102, the light shielding film forming unit 2134 forms the light shielding film 2043 on the entire surface of the light incident surface 2055 of the carrier substrate 2161. When the process of step S2101 is performed, the process of step S2101 and the process of step S2102 may be performed as one process.

In step S2103, the light shielding film forming unit 2134 forms the light shielding film 2043 on the entire surface of the light emitting surface 2056 of the carrier substrate 2161.

When the light shielding film 2043 is formed on the entire surfaces of the light incident surface 2055 and the light emitting surface 2056 of the carrier substrate 2161, the light shielding film forming process is ended. With such a configuration, it is possible to manufacture the lens attached substrate capable of obtaining the above-described effect.

In addition, when the light shielding film 2043 is not formed on the light incident surface 2055 of the carrier substrate 2161, the light shielding film forming unit 2134 may not perform the process of step S2102. Further, when the light shielding film 2043 is not formed on the light emitting surface 2056 of the carrier substrate 2161, the light shielding film forming unit 2134 may not perform the process of step S2103.

<Manufacturing of Layered Lens Structure>

The manufacturing apparatus 2200 (FIG. 72) can manufacture the layered lens structure 2012 capable of obtaining the same effect as the lens attached substrate 2011 (that is, suppressing degradation in image quality) by using the manufactured lens attached substrate 2011 in this way similarly to the case of "16. Other Embodiment 1". Thus, the description will be omitted.

<Manufacturing of Camera Module>

The manufacturing apparatus 2300 (FIG. 74) can manufacture the camera module 1 capable of obtaining the same effect as the lens attached substrate 2011 (that is, suppressing degradation in image quality) by using the manufactured lens attached substrate 2011 in this way similarly to the case of "16. Other Embodiment 1". Thus, the description will be omitted.

<Other Configuration of Lens Attached Substrate>

In addition, in the lens attached substrate 2011, the light shielding film 2043 may be formed on a portion exposed to the through-hole 2401 in one of or both the light incident surface 2055 and the light emitting surface 2056 of the carrier substrate 2040 while the plurality of lens attached substrates is laminated.

In other words, in the lens attached substrate 2011, the light shielding film 2043 may not be formed on a portion not exposed to the through-hole 2401 in one of or both the light incident surface 2055 and the light emitting surface 2056 of the carrier substrate 2040 while the plurality of lens attached substrates is laminated.

For example, when the material of the carrier substrate 2040 is silicon, the light is not transmitted therethrough. For this reason, the light shielding film 2043 of a portion not exposed to the through-hole 2401 is not necessary and can be omitted. With such a configuration, it is possible to suppress the influence of the light shielding film 2043 when the lens attached substrates 2011 are bonded to each other by plasma bonding and hence to suppress degradation in bonding strength.

Then, even in the lens attached substrate 2011 of this case, it is possible to suppress the reflection or the transmission in a portion (a portion exposed to the through-hole 2401 of one of or both the light incident surface 2055 and the light emitting surface 2056 of the carrier substrate 2040 while the plurality of lens attached substrates is laminated) with respect to the light passing through the through-hole 2401 in the lamination state similarly to the case (the case of the example of FIG. 76) where the light shielding film 2043 is formed on the entire surface of one of or both the light incident surface 2055 and the light emitting surface 2056 of the carrier substrate 2040. That is, it is possible to suppress degradation in image quality.

Figure 78:
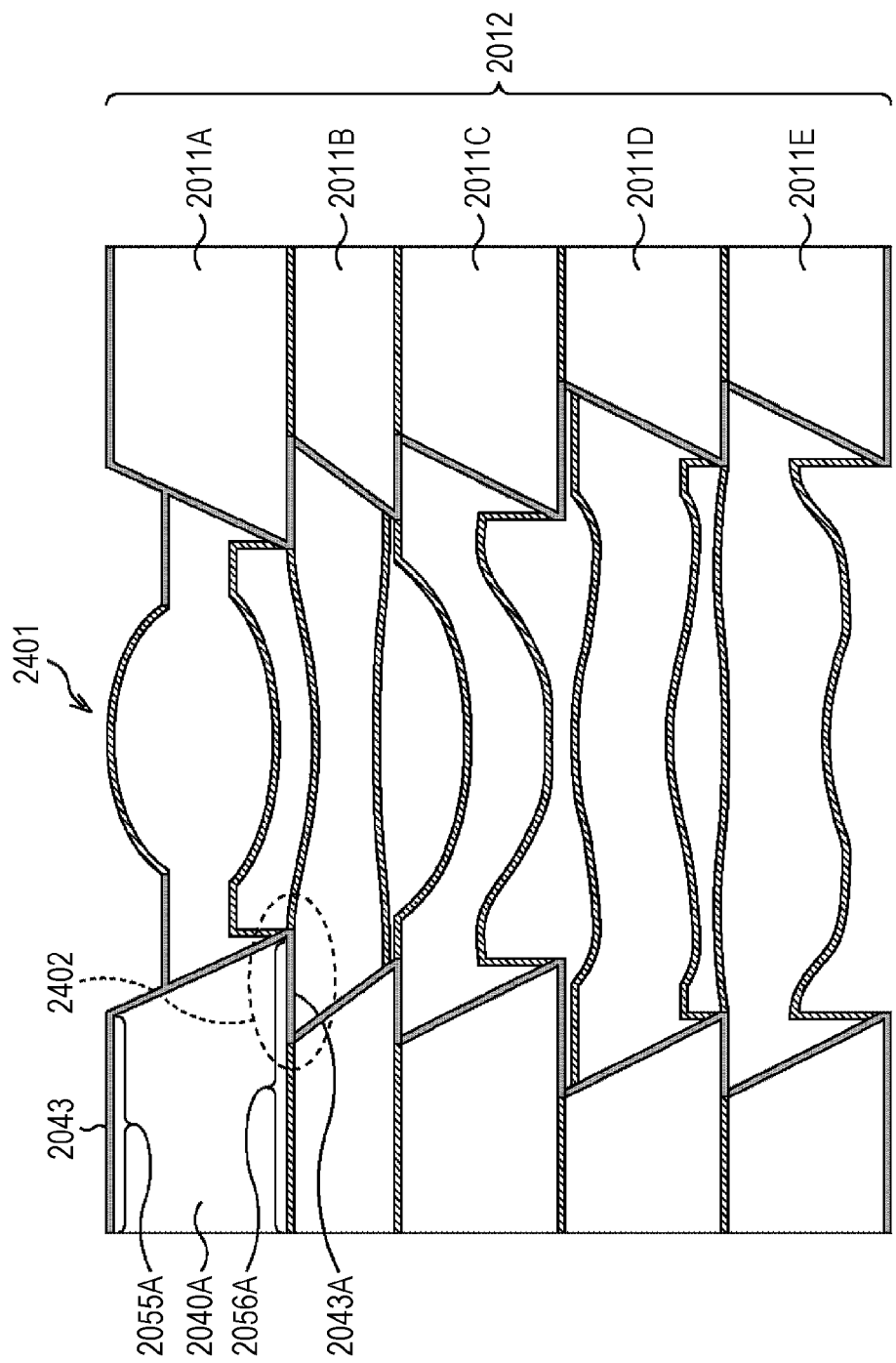
FIG. 78 is a cross-sectional view illustrating a main configuration example of a layered lens structure.

For example, in the case of FIG. 78, the side wall 2051 of the through-hole 2041 of each lens attached substrate 2011 is formed in an inverse tapered shape. Thus, in this case, a part (a portion surrounded by a dotted circle 2402) of the light emitting surface 2056 of the carrier substrate 2040 of each lens attached substrate 2011 is exposed to the through-hole 2401 while the plurality of lens attached substrates is laminated and the light shielding film 2043 is formed on this portion. Then, the light shielding film 2043 is not formed on the light incident surface 2055 of the carrier substrate 2040 of each lens attached substrate 2011 or a portion (a portion contacting the other lens attached substrate 2011) not exposed to the through-hole 2401 in the light emitting surface 2056.

With such a configuration, it is possible to suppress degradation in the bonding strength between the lens attached substrates 2011 by the light shielding film 2043 and to suppress the reflection or the transmission of the light passing through the through-hole 2401 in a part (a portion surrounded by a dotted circle 2402) of the light emitting surface 2056 of the carrier substrate 2040 of each lens attached substrate 2011. Thus, it is possible to suppress degradation in image quality.

In addition, even in this case, the light shielding film 2043 may be formed on the light incident surface 2055 of the carrier substrate 2040 of the lens attached substrate 2011 laminated at the most light incident side and the light emitting surface 2056 of the carrier substrate 2040 of the lens attached substrate 2011 laminated at the most light emitting side while the plurality of lens attached substrates 2011 is laminated as in the layered lens structure 2012. For example, even when the material of the carrier substrate 2040 is silicon through which the light is not transmitted, there is a possibility that the light reflected by the surface may reach the light receiving element and hence the image quality may be degraded. With such a configuration, it is possible to suppress the unnecessary reflection of the light and to suppress degradation in image quality.

Further, even in the lens attached substrate 2011 of this case, the light shielding film 2043 may be also formed on the side wall 2051 of the through-hole 2041 similarly to the case (the case of the example of FIG. 76) where the light shielding film 2043 is formed on one of or both the light incident surface 2055 and the light emitting surface 2056 of the carrier substrate 2040. With such a configuration, the lens attached substrate 2011 can further suppress the reflection or the transmission of the light passing through the through-hole 2401 in the lamination state. That is, it is possible to further suppress the occurrence of the ghost or flare and hence to further suppress degradation in image quality.

In addition, a state where the light incident surface 2055 of the carrier substrate 2040 is exposed to the through-hole 2401 or the light emitting surface 2056 of the carrier substrate 2040 is exposed to the through-hole 2401 while the plurality of lens attached substrates is laminated is dependent on the shape of the side wall 2051 or the size of the through-hole 2041 of each lens attached substrate. Thus, a portion on which the light shielding film 2043 is formed is determined in response to the shape of the side wall 2051 or the size of the through-hole 2041 of each lens attached substrate.

In addition, the light shielding film 2043 may be formed on a part of the plurality of laminated lens attached substrates 2011 as described above. Further, in the plurality of laminated lens attached substrates 2011, a surface or a portion provided with the light shielding film 2043 may not be uniform.

However, in general, it is possible to further suppress the reflection or the transmission of the light as the range of the light shielding film 2043 is widened. Further, it is possible to further suppress the reflection or the transmission of the light as the number of the light shielding films 2043 increases.

<Configuration of Layered Lens Structure>

As illustrated in FIG. 78, the layered lens structure 2012 can be obtained by laminating the plurality of lens attached substrates 2011 including the lens attached substrate 2011 with such a configuration. With such a configuration, it is possible to obtain the same effect as the lens attached substrate 2011 and hence to suppress degradation in image quality.

<Configuration of Camera Module>

Further, the camera module 1 can be obtained by laminating the layered lens structure 2012 obtained by laminating the plurality of lens attached substrates 2011 including the lens attached substrate 2011 with such a configuration and a sensor substrate. With such a configuration, it is possible to obtain the same effect as the lens attached substrate 2011 and hence to suppress degradation in image quality.

<Manufacturing of Lens Attached Substrate>

When the lens attached substrate 2011 in such a case is manufactured, the manufacturing apparatus 2100 (FIGS. 63, 64, and 69) may perform the light shielding film forming process of step S2008 as below when the lens attached substrate manufacturing process (FIG. 65) is performed.

Figure 79:
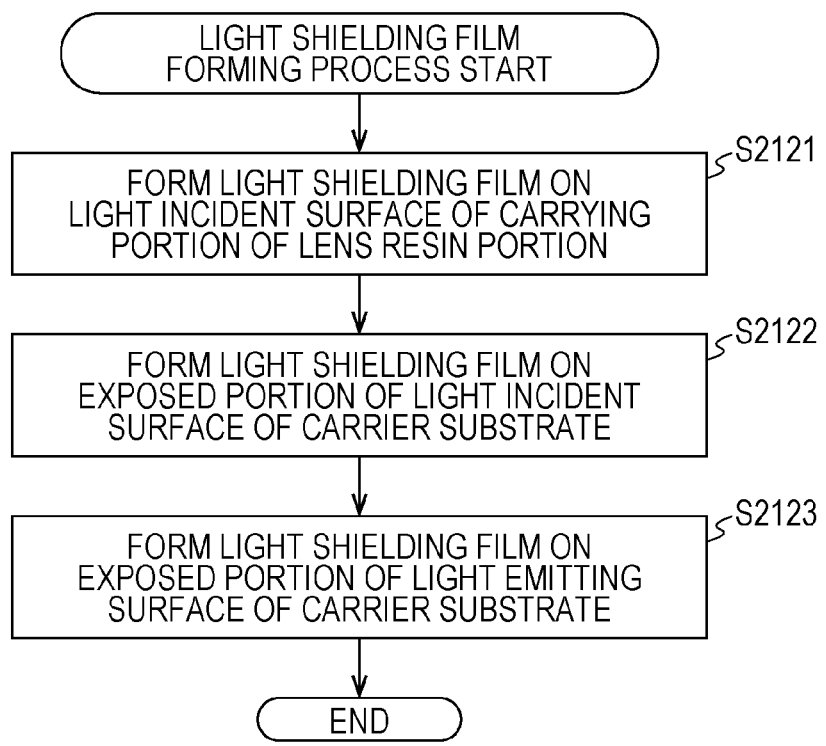
FIG. 79 is a flowchart illustrating an example of a procedure of a light shielding film forming process.

An example of a sequence of the light shielding film forming process performed by the manufacturing apparatus 2100 in step S2008 of this case will be described with reference to the flowchart of FIG. 79.

When the light shielding film forming process is started, in step S2121, the light shielding film forming unit 2134 forms the light shielding film on the light incident surface 2052 of the carrying portion 92 of the lens resin portion 2042. Further, this process may be performed only when the lens attached substrate 2011 laminated at the most light incident side is manufactured and may be omitted when the other lens attached substrate is manufactured.

In step S2122, the light shielding film forming unit 2134 forms the light shielding film 2043 on a portion exposed to the through-hole 2401 in the light incident surface 2055 of the carrier substrate 2161. When a portion exposed to the light incident surface 2055 does not exist, this process is omitted. Further, when both the process of step S2121 and the process of step S2122 are performed, the process of step S2121 and the process of step S2102 may be performed as one process.

In step S2123, the light shielding film forming unit 2134 forms the light shielding film 2043 on a portion exposed to the through-hole 2401 in the light emitting surface 2056 of the carrier substrate 2161. Further, when a portion exposed to the light emitting surface 2056 does not exist, this process is omitted.

When the light shielding film 2043 is formed on a portion exposed to the through-hole 2401 of one of or both the light incident surface 2055 and the light emitting surface 2056 of the carrier substrate 2161, the light shielding film forming process is ended. With such a configuration, it is possible to manufacture the lens attached substrate capable of obtaining the above-described effect.

<Manufacturing of Layered Lens Structure>

The manufacturing apparatus 2200 (FIG. 72) can manufacture the layered lens structure 2012 capable of obtaining the same effect as the lens attached substrate 2011 (that is, suppressing degradation in image quality) by using the manufactured lens attached substrate 2011 in this way similarly to the case of "16. Other Embodiment 1". Thus, the description will be omitted.

<Manufacturing of Camera Module>

The manufacturing apparatus 2300 (FIG. 74) can manufacture the camera module 1 capable of obtaining the same effect as the lens attached substrate 2011 (that is, suppressing degradation in image quality) by using the manufactured lens attached substrate 2011 in this way similarly to the case of "16. Other Embodiment 1". Thus, the description will be omitted.

<Other Configuration of Lens Attached Substrate>

In addition, when the light shielding film 2043 is formed on a portion exposed to the through-hole 2401 of one of or both the light incident surface 2055 and the light emitting surface 2056 of the carrier substrate 2040 while the plurality of lens attached substrates is laminated in the lens attached substrate 2011, the light incident surface 2055 or the light emitting surface 2056 of the carrier substrate 2040 may be provided with a step higher than the film thickness of the light shielding film 2043 by a portion exposed to the through-hole 2401 and a portion not exposed to the through-hole 2401.

Figure 80:
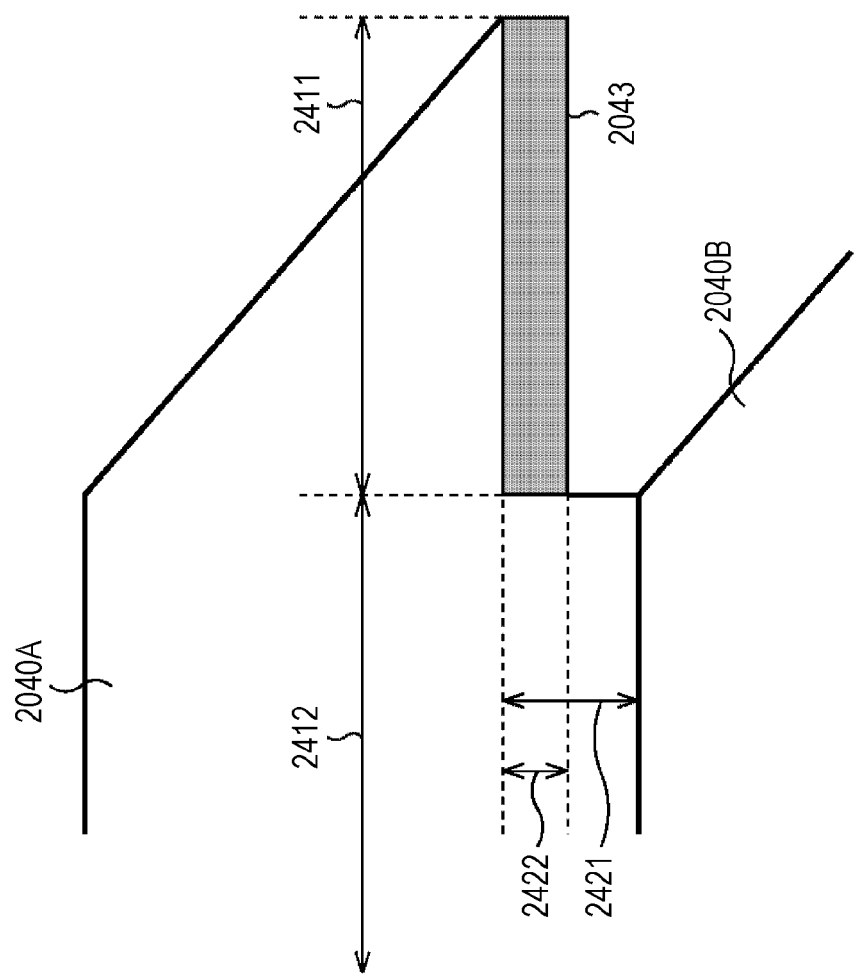
FIG. 80 is a cross-sectional view illustrating an example of a carrier substrate shape.

FIG. 80 is an enlarged view illustrating an example in which a portion surrounded by the dotted circle 2402 of FIG. 78 is formed in this way.

In the case of the example of FIG. 80, a part (a ranged indicated by bidirectional arrows 2411) of the light emitting surface 2056 of the carrier substrate 2040A is exposed to the through-hole 2401 and the other portion (a range indicated by bidirectional arrows 2412) is bonded to the carrier substrate 2040B (so as not to be exposed to the through-hole 2401). Further, the light shielding film 2043 is formed on a portion (a range indicated by bidirectional arrows 2411) exposed to the through-hole 2401.

Then, a portion (a range indicated by bidirectional arrows 2411) exposed to the through-hole 2401 in the light emitting surface 2056 of the carrier substrate 2040A is cut so as to be lower than the other portion (a range indicated by bidirectional arrows 2412) (the upside of the drawing). That is, a step is formed by a portion (a range indicated by bidirectional arrows 2411) exposed to the through-hole 2401 and the other portion (a range indicated by bidirectional arrows 2412).

Then, the height of the step indicated by bidirectional arrows 2421 is higher than the film thickness of the light shielding film 2043 indicated by bidirectional arrows 2422.

With such a configuration, it is possible to suppress the light shielding film 2043 from being formed on a portion (a range indicated by bidirectional arrows 2412) not exposed to the through-hole 2401 when the light shielding film 2043 is formed on the light emitting surface 2056 of the carrier substrate 2040A. That is, it is possible to more easily form the light shielding film 2043 only on a portion (a range indicated by bidirectional arrows 2411) exposed to the through-hole 2401. Accordingly, it is possible to suppress degradation in the bonding strength between the lens attached substrates 2011 when the light shielding film 2043 is formed on the bonding surface between the lens attached substrates.

Further, when the height of the step is set to be higher than the film thickness of the light shielding film 2043, the light shielding film 2043 does not protrude from a portion (a range indicated by bidirectional arrows 2412) not exposed to the through-hole 2401 of the light emitting surface 2056 (where the light shielding film 2043 does not protrude toward the downside of the drawing). For that reason, it is possible to suppress the light shielding film 2043 from contacting an installation bed during the transportation in the manufacturing step of the lens attached substrate 2011. Thus, it is possible to suppress the loss of the light shielding film 2043.

In addition, in the description above, a case has been described in which the light emitting surface 2056 of the carrier substrate 2040 is exposed to the through-hole 2401. However, when the light incident surface 2055 of the carrier substrate 2040 is exposed to the through-hole 2401, the light incident surface 2055 may be provided with the same step. Similarly, when both the light incident surface 2055 and the light emitting surface 2056 of the carrier substrate 2040 are exposed to the through-hole 2401, the light incident surface 2055 and the light emitting surface 2056 may be provided with the same step.

<Configuration of Layered Lens Structure>

The layered lens structure 2012 can be obtained by laminating the plurality of lens attached substrates 2011 including the lens attached substrate 2011 with such a configuration. With such a configuration, it is possible to obtain the same effect as the lens attached substrate 2011 and hence to suppress degradation in image quality.

<Configuration of Camera Module>

Further, the camera module 1 can be obtained by laminating the layered lens structure 2012 obtained by laminating the plurality of lens attached substrates 2011 including the lens attached substrate 2011 with such a configuration and a sensor substrate. With such a configuration, it is possible to obtain the same effect as the lens attached substrate 2011 and hence to suppress degradation in image quality.

<Manufacturing of Lens Attached Substrate>

When the lens attached substrate 2011 is manufactured in which a portion (a range indicated by bidirectional arrows 2411) exposed to the through-hole 2401 in the light emitting surface 2056 of the carrier substrate 2040A, the manufacturing apparatus 2100 (FIGS. 63, 64, and 69) may perform the through-hole forming process of step S2023 or step S2044 as below when the through-hole light shielding film forming process (FIGS. 67 and 70) is performed.

Figure 81:
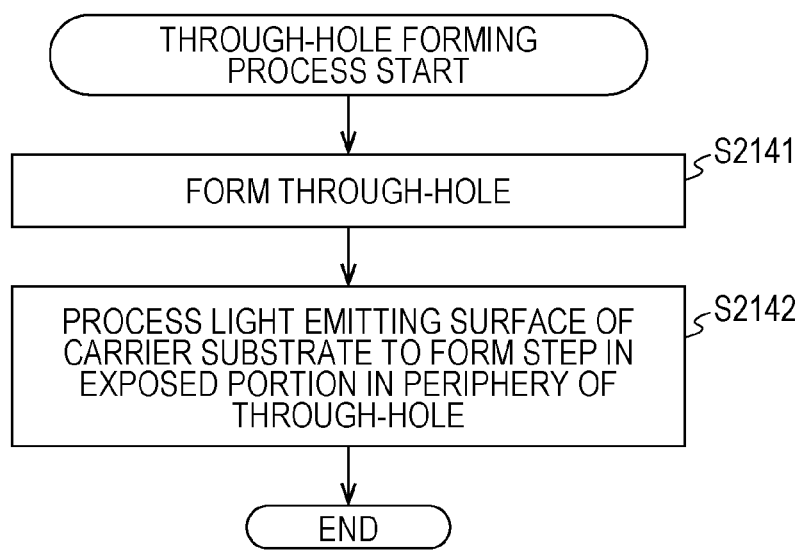
FIG. 81 is a flowchart illustrating an example of a procedure of a through-hole forming process.

An example of a sequence of the through-hole forming process performed by the manufacturing apparatus 2100 in step S2023 or step S2044 of this case will be described with reference to the flowchart of FIG. 81.

When the through-hole forming process is started, the through-hole forming unit 2153 forms a through-hole in the carrier substrate 2161 by etching or the like in step S2141. In step S2142, the through-hole forming unit 2153 processes the light emitting surface 2056 of the carrier substrate 2161 and cuts a portion exposed to the through-hole 2401 in the periphery of the through-hole 2041 while the plurality of lens attached substrates is laminated so as to form a step with respect to the other portion.

When the process of step S2142 is ended, the through-hole forming process is ended. With such a configuration, it is possible to manufacture the lens attached substrate capable of obtaining the above-described effect.

In addition, in the description above, a case has been described in which the light emitting surface 2056 of the carrier substrate 2040 is exposed to the through-hole 2401. However, when the light incident surface 2055 of the carrier substrate 2040 is exposed to the through-hole 2401, the light incident surface 2055 may be provided with the same step. Similarly, when both the light incident surface 2055 and the light emitting surface 2056 of the carrier substrate 2040 are exposed to the through-hole 2401, the light incident surface 2055 and the light emitting surface 2056 may be provided with the same step.

<Manufacturing of Layered Lens Structure>

The manufacturing apparatus 2200 (FIG. 72) can manufacture the layered lens structure 2012 capable of obtaining the same effect as the lens attached substrate 2011 (that is, suppressing degradation in image quality) by using the manufactured lens attached substrate 2011 in this way similarly to the case of "16. Other Embodiment 1". Thus, the description will be omitted.

<Manufacturing of Camera Module>

The manufacturing apparatus 2300 (FIG. 74) can manufacture the camera module 1 capable of obtaining the same effect as the lens attached substrate 2011 (that is, suppressing degradation in image quality) by using the manufactured lens attached substrate 2011 in this way similarly to the case of "16. Other Embodiment 1". Thus, the description will be omitted.

<Forming of Light Shielding Film>

Figure 82B:
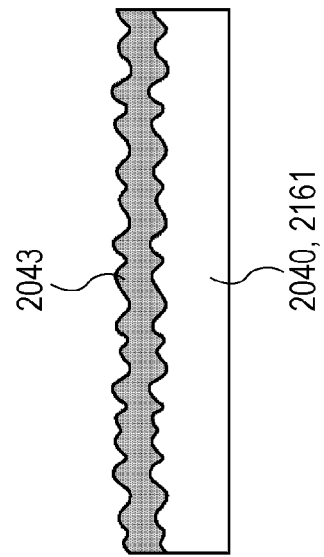
FIG. 82A-82D are cross-sectional views illustrating surface shapes of a light shielding film and a carrier substrate.
Figure 82D:
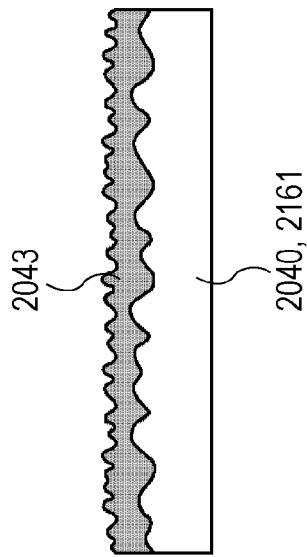
Figure 82A:
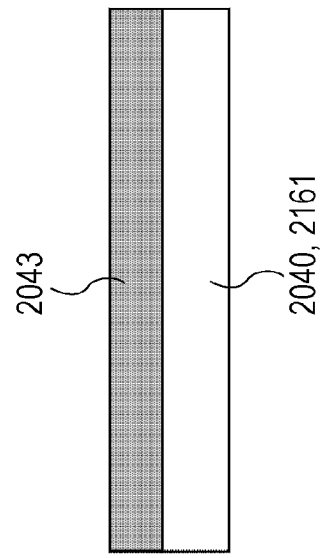

Further, as illustrated in FIG. 82A, when the light shielding film 2043 is formed on the carrier substrate 2040 (the carrier substrate 2161), the surface of the light shielding film 2043 may be formed as a rough surface (with unevenness) instead of a plane illustrated in the example of FIG. 82A.

In this way, when the surface of the light shielding film 2043 is formed as the rough surface, the lens attached substrate 2011 can diffuse the reflected light on the surface of the light shielding film 2043 and hence can suppress the occurrence of the ghost or flare. That is, it is possible to suppress degradation in image quality.

Further, when the surface of the light shielding film 2043 is formed as the rough surface, the surface area of the light shielding film 2043 increases. Thus, when the surface of the light shielding film 2043 formed on the side wall 2051 is formed as the rough surface, it is possible to improve the bonding strength with respect to the lens resin portion 2042 and to improve the holding stability of the lens resin portion 2042. When the lens attached substrates 2011 are bonded to each other by an adhesive, the bonding strength can be improved in a manner such that the light shielding film 2043 formed on the bonding surface is formed as the rough surface.

A method of forming the surface of the light shielding film 2043 as the rough surface may be arbitrarily set. For example, the surface of the light shielding film 2043 may be formed as the rough surface in a manner such that the light shielding film 2043 is formed on the surface (for example, the side wall 2051, the light incident surface 2055, the light emitting surface 2056, or the like) as the rough surface of the carrier substrate 2040 as in FIG. 82B. For example, the light shielding film forming unit 2134 (FIG. 63) or the light shielding film forming unit 2154 (FIGS. 64 and 69) may perform a process including etching or moth-eye processing on a portion provided with the light shielding film 2043 on the surface of the carrier substrate 2161 so as to form the surface as the rough surface and may form the light shielding film 2043 on the rough surface portion.

Figure 82C:
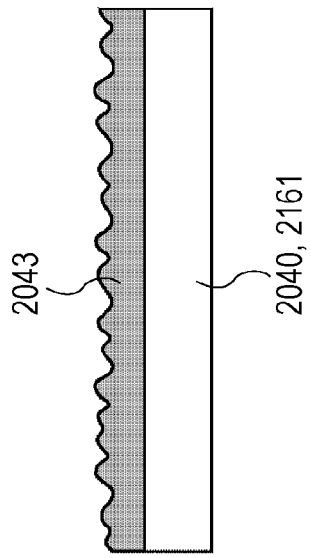

Further, for example, the surface of the formed light shielding film 2043 may be processed as the rough surface as in FIG. 82C. For example, the light shielding film forming unit 2134 or the light shielding film forming unit 2154 may form the light shielding film 2043 on the surface of the carrier substrate 2040 and may process the surface of the formed light shielding film 2043 by etching or the like so that the surface becomes the rough surface.

In addition, the surface of the light shielding film 2043 may be formed as the rough surface by the aggregation of the material of the light shielding film 2043. For example, the light shielding film forming unit 2134 or the light shielding film forming unit 2154 may form the light shielding film 2043 on the surface of the carrier substrate 2040 by using an aggregated material and may form unevenness on the surface of the light shielding film 2043 by the aggregation of the material.

Further, the surface of the light shielding film 2043 may be formed as the rough surface by a solid element included in the material of the light shielding film 2043. For example, the light shielding film forming unit 2134 or the light shielding film forming unit 2154 may form the light shielding film 2043 on the surface of the carrier substrate 2040 by using a material including a solid element and may form unevenness on the surface of the light shielding film 2043 by the solid element.

In addition, these examples may be combined with each other. For example, as in FIG. 82D, the light shielding film forming unit 2134 or the light shielding film forming unit 2154 may form the light shielding film 2043 on the surface of the carrier substrate 2040 as the rough surface and may further process the surface of the light shielding film 2043 so as to further roughen the surface. Further, for example, the light shielding film forming unit 2134 or the light shielding film forming unit 2154 may form the light shielding film 2043 on the surface of the carrier substrate 2040 as the rough surface by using an aggregated material and may further form unevenness on the surface of the light shielding film 2043 by the aggregation of the material. For example, the light shielding film forming unit 2134 or the light shielding film forming unit 2154 may form the light shielding film 2043 on the surface of the carrier substrate 2040 as the rough surface by using a material including a solid element and may further form unevenness on the surface of the light shielding film 2043 by the solid element.

18. Other Embodiment 3

<Light Shielding Film of Side Wall>

Incidentally, an example of the through-hole light shielding film forming process described with reference to the flowchart of FIG. 69 will be described again with reference to FIGS. 83A to 83D.

Figure 83A:
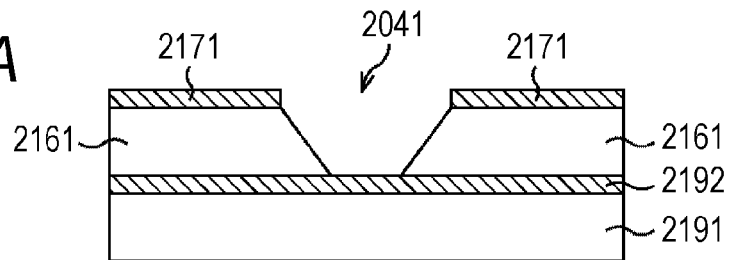
FIG. 83A-83D are cross-sectional views illustrating an example of a light shielding film forming state.

In the layered substrate in which the carrier substrate 2161 is bonded to a surface provided with the etching stop film 2192 of the support substrate 2191, the through-hole 2041 is formed in the carrier substrate 2161 by performing alkali etching as in FIG. 83A after the hard mask 2171 is formed and processed.

Figure 83B:
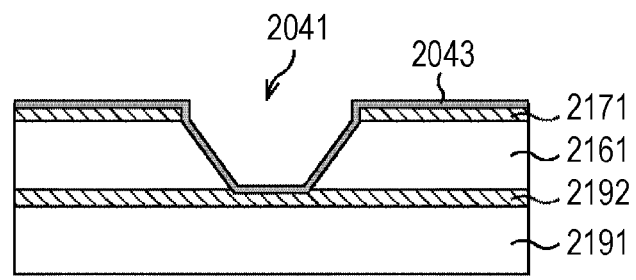
Figure 83C:
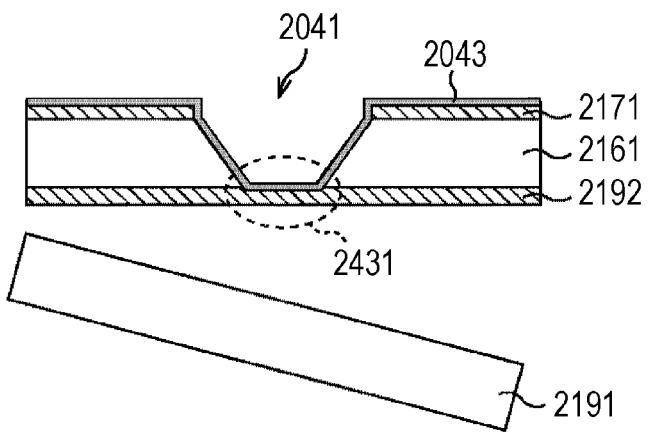

Then, as in FIG. 83B, the light shielding film 2043 is formed on the layered substrate provided with the through-hole 2041. When the hard mask 2171 or the light shielding film 2043 formed on the hard mask 2171 is not necessary, the hard mask or the light shielding film may be removed. Further, the hard mask 2171 may be removed before the light shielding film 2043 is formed.

Then, the support substrate separating unit 2182 separates the support substrate 2191 or the etching stop film 2192 from the carrier substrate 2161. At that time, for example, as in FIG. 83C, there is a case in which the etching stop film 2192 is still bonded to the carrier substrate 2161 after the separation in the boundary surface between the etching stop film 2192 and the support substrate 2191.

Originally, the light shielding film 2043 of the bottom portion (inside the dotted circle 2431 of FIG. 83C) of the through-hole 2041 is not necessary and hence is separated from the carrier substrate 2161 along with the etching stop film 2192 when the support substrate 2191 is separated.

However, when the etching stop film 2192 is not separated from the carrier substrate 2161 as described above, there is a possibility that the light shielding film 2043 of the bottom portion of the through-hole 2041 may be also left along with the etching stop film 2192.

Figure 83D:
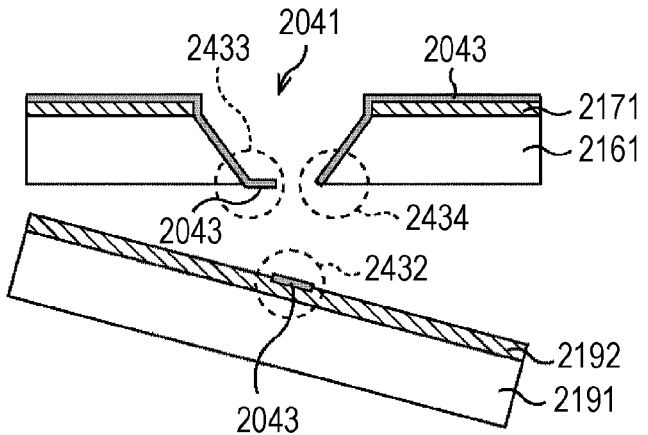

Further, as in FIG. 83D, even when the etching stop film 2192 is separated successfully due to the separation in the boundary face between the carrier substrate 2161 and the etching stop film 2192 when the support substrate 2191 is separated, there is a possibility that a part of the light shielding film 2043 of the bottom portion of the through-hole 2041 may be left in the carrier substrate 2161 due to a so-called "tearing-off state" in the light shielding film 2043 of the bottom portion of the through-hole 2041 as indicated by a dotted circle 2432 and a dotted circle 2433.

In addition, there is a possibility that a part of the light shielding film 2043 of the side wall 2051 of the through-hole 2041 may be separated from the carrier substrate 2161 along with the light shielding film 2043 of the bottom portion of the through-hole 2041 due to a so-called "taking-away state" as indicated by a dotted circle 2434.

In addition, when the through-hole is formed in an inverse tapered shape as in the example of FIGS. 83A to 83D, an acute shape is formed in the light emitting side end of the side wall 2051 of the through-hole 2041. For that reason, the possibility of chipping (fragment) in this portion is higher than the other portion during the transportation or the subsequent processes.

Accordingly, there is a possibility that the forming accuracy of the light shielding film 2043 or the side wall 2051 in the periphery of the bottom portion of the through-hole 2041 may be degraded. Then, since the forming accuracy decreases, there is a possibility that the yield of the lens attached substrate 2011 may decrease.

Here, the lens attached substrate may include a substrate in which a through-hole is formed and a notch shape (a recess) is formed in a light emitting side end of the side wall of the through-hole and a lens resin portion which is formed inside the through-hole of the substrate.

<Manufacturing of Lens Attached Substrate>

Figure 84:
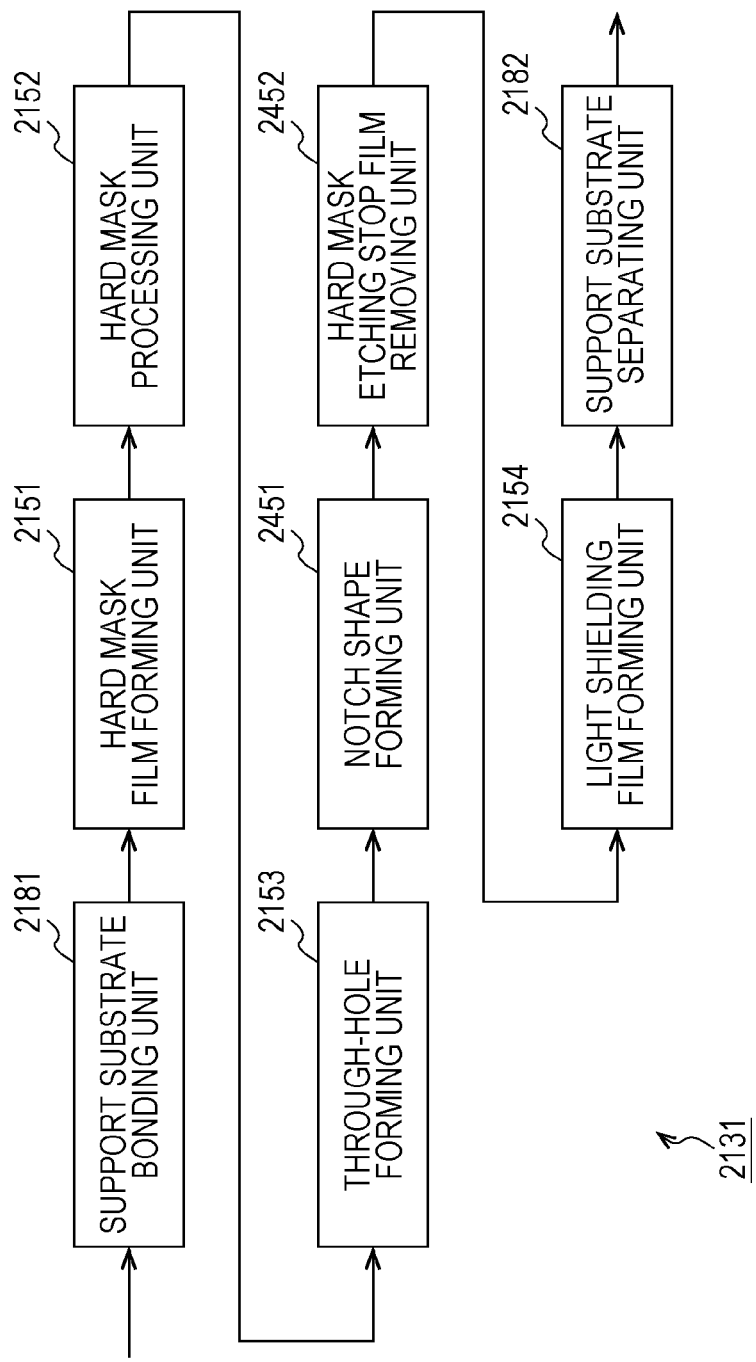
FIG. 84 is a block diagram illustrating a main configuration example of a carrier substrate processing unit.

Even in this case, the lens attached substrate 2011 can be manufactured by the manufacturing apparatus 2100. A main configuration example of the carrier substrate processing unit 2131 in this case is illustrated in FIG. 84. As illustrated in FIG. 84, in this case, the carrier substrate processing unit 2131 further includes a notch shape forming unit 2451 and a hard mask etching stop film removing unit 2452 other than the hard mask film forming unit 2151 to the light shielding film forming unit 2154, the support substrate bonding unit 2181, and the support substrate separating unit 2182.

The notch shape forming unit 2451 performs a process involved with the forming of the notch shape. Further, the hard mask etching stop film removing unit 2452 performs a process involved with the removing of the hard mask or the etching stop film.

The process units perform the processes controlled by the control unit 2101.

Figure 85:
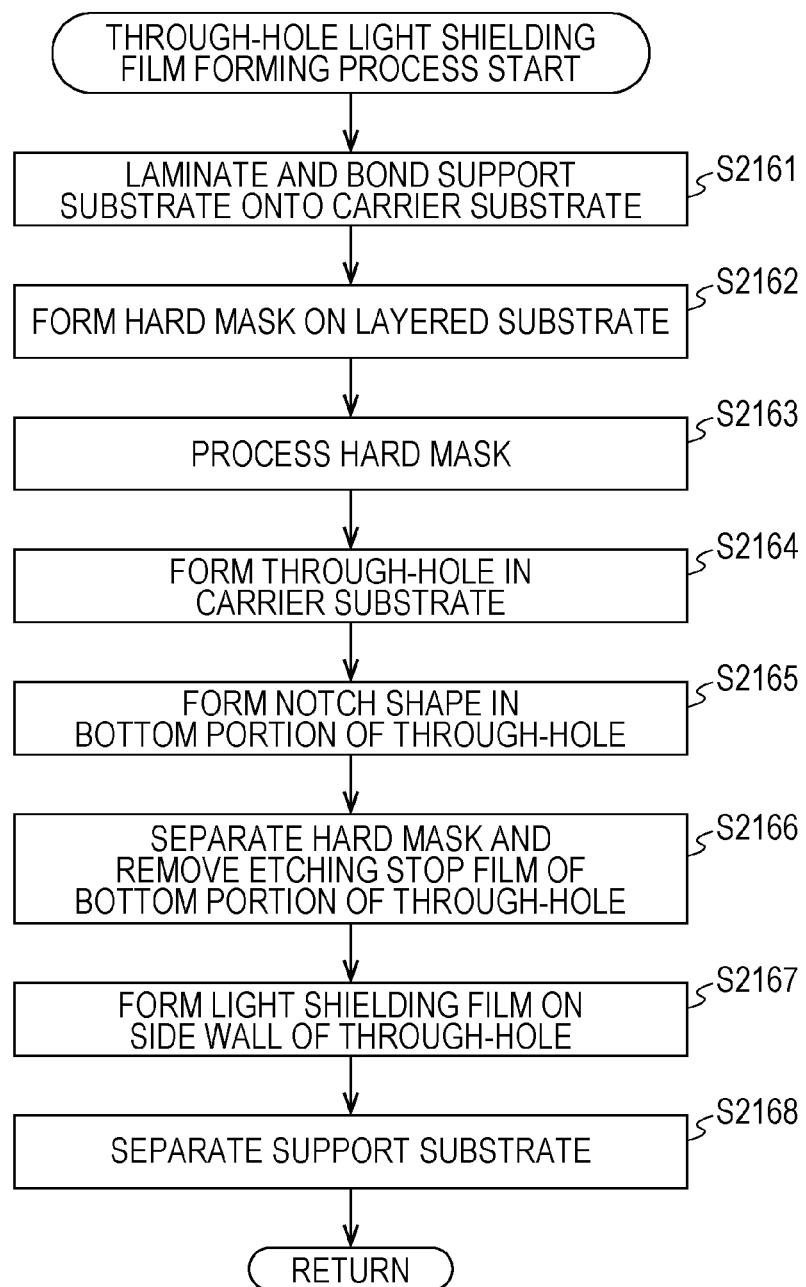
FIG. 85 is a flowchart illustrating an example of a procedure of a through-hole light shielding film forming process.

An example of a sequence of the through-hole light shielding film forming process in this case will be described with reference to the flowchart of FIG. 85. If necessary, a description will be made with reference to FIGS. 86A to 85C and 87A to 87C.

When the through-hole light shielding film forming process is started, in step S2161, the support substrate bonding unit 2181 laminates and bonds the undivided carrier substrate 2161 to a surface provided with the etching stop film 2192 in the support substrate 2191. The bonding method may be arbitrarily set. For example, the support substrate bonding unit 2181 may bond the carrier substrate 2161 and the support substrate 2191 to each other by plasma bonding or an adhesive. As will be described later, in order to separate the support substrate 2191 from the carrier substrate 2161 later, the support substrate bonding unit 2181 may bond the carrier substrate 2161 and the support substrate 2191 to each other by an easily separating method.

In addition, the etching stop film 2192 is formed of, for example, nitride silicon (SiN) and is formed on the support substrate 2091 by, for example, low-pressure CVD or the like.

In step S2162, the hard mask film forming unit 2151 forms the hard mask 2171 on the layered substrate obtained by laminating the carrier substrate 2161 and the support substrate 2191. The hard mask 2171 is formed of, for example, nitride silicon (SiN) and is formed on the layered substrate by, for example, low-pressure CVD.

In step S2163, the hard mask processing unit 2152 processes the hard mask 2171 and removes the hard mask 2171 of the predetermined portion 2172.

Figure 86A:
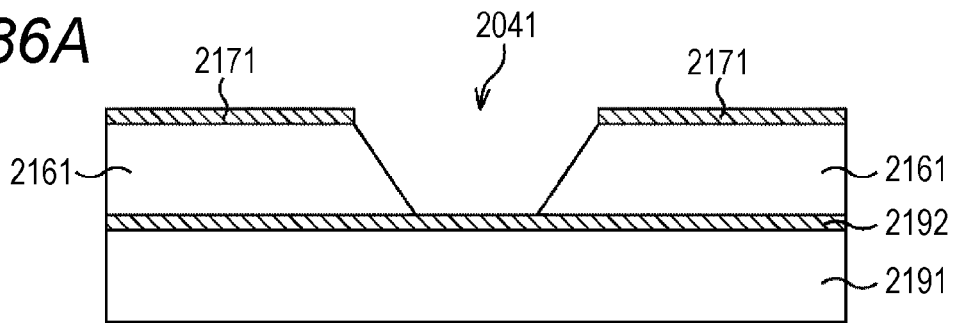
FIG. 86A-86C are cross-sectional views illustrating an example of a through-hole forming state and a light shielding film forming state.

In step S2164, as illustrated in FIG. 86A, the through-hole forming unit 2153 performs alkali etching on the layered substrate having the hard mask 2171 so as to obtain a surface (111) and forms the through-hole 2041 in the predetermined portion 2172 from which the hard mask 2171 of the carrier substrate 2161 is removed. Accordingly, the side wall 2051 is formed so as to have, for example, an angle of about 54° to 55°. Further, the through-hole forming unit 2153 may form the through-hole 2041 by dry etching.

Figure 86B:
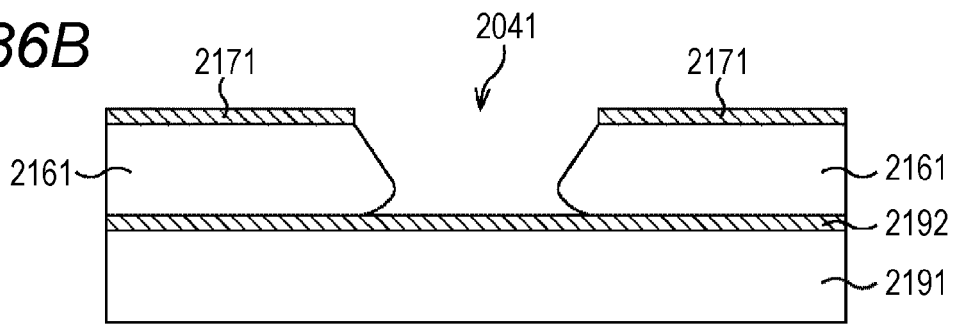

In step S2165, the notch shape forming unit 2451 performs dry etching on the through-hole 2041 as illustrated in FIG. 86B so as to form a notch shape (a recess) in the vicinity (in other words, the side wall 2051 in the periphery of the bottom portion of the through-hole 2041) of the light emitting side end of the side wall 2051 of the through-hole 2041.

When dry etching is further performed on the through-hole 2041 of which the side wall 2051 is formed in an inverse tapered shape, the inclined surface of the side wall 2051 becomes deeper on the whole. On the contrary, the plasma moving target does not exist due to the etching stop film 2192 in the bottom portion of the through-hole 2041 and hence the side wall 2051 is cut in the horizontal direction so as to be formed in a notch shape. The size of the notch shape may be arbitrarily set. For example, when the thickness of the carrier substrate 2161 is about 200 μm to 725 μm, the size of the notch shape may be set to about 1 μm.

Figure 86C:
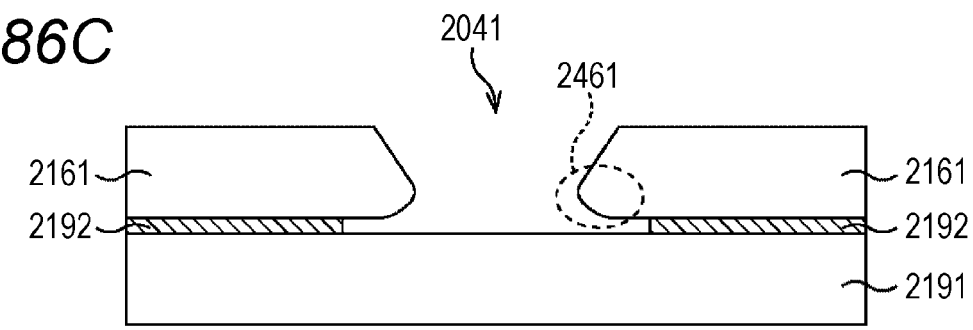

In step S2166, the hard mask etching stop film removing unit 2452 removes the unnecessary hard mask 2171 as illustrated in FIG. 86C. Further, the hard mask etching stop film removing unit 2452 removes the etching stop film 2192 in the vicinity of the bottom portion of the through-hole 2041. At that time, the hard mask etching stop film removing unit 2452 performs side etching so as to remove the etching stop film 2192 in a range wider than the bottom portion of the through-hole 2041.

When the notch shape is formed in this way, the light emitting side end of the side wall 2051 of the through-hole 2041 is not formed in an acute shape as illustrated in a dotted circle 2461 of FIG. 86C. For that reason, the occurrence of the above-described chipping can be suppressed.

Figure 87A:
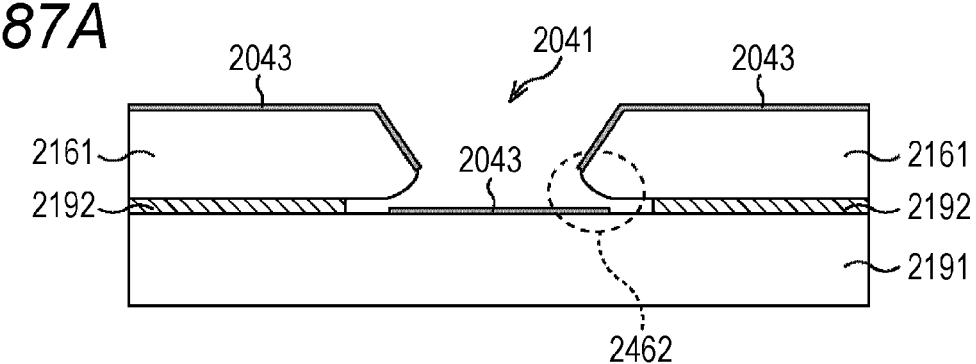
FIG. 87A-87C are cross-sectional views illustrating an example of a through-hole forming state and a light shielding film forming state.
Figure 87B:
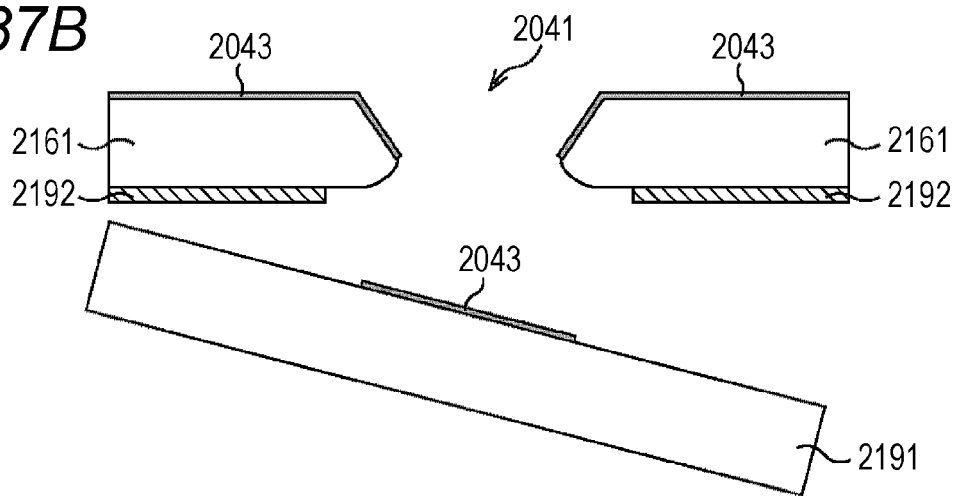

In step S2167, the light shielding film forming unit 2154 forms the light shielding film 2043 as in FIG. 87A. As illustrated in FIG. 87A, since the notch-shaped portion of the side wall 2051 is a surface inclined by a minus degree (a surface facing the downside of the drawing), the light shielding film 2043 is not formed. That is, the light shielding film 2043 is formed on a portion other than the notch-shaped portion of the side wall 2051 of the through-hole 2041.

At this time, as illustrated in a dotted circle 2462 of FIG. 87A, a so-called "cutting" occurs between the light shielding film 2043 formed on the side wall 2051 and the light shielding film 2043 formed on the bottom portion (that is, the support substrate 2191) of the through-hole 2041 so that the light shielding films are separated from each other.

In step S2168, the support substrate separating unit 2182 separates the support substrate 2191 from the carrier substrate 2161. As described above, since the "cutting" occurs in the light shielding film 2043, it is possible to suppress the occurrence of "tearing-off" or "taking-away" even when a separation occurs in the boundary face between the support substrate 2191 and the etching stop film 2192 as in the example of FIG. 87B.

Figure 87C:
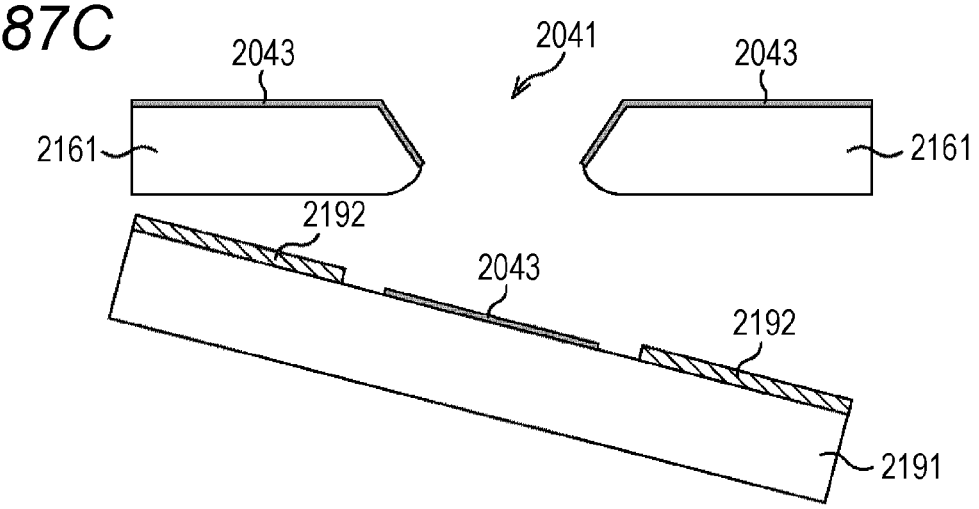

Further, even when a separation occurs in the boundary face between the carrier substrate 2161 and the etching stop film 2192 as in the example of FIG. 87C, it is possible to suppress the occurrence of "tearing-off" or "taking-away" in the same way.

When the process of step S2168 is ended, the through-hole light shielding film forming process is ended and the process is returned to FIG. 65.

As described above, since the notch shape is formed in the side wall 2051 in the periphery of the bottom portion of the through-hole 2041, it is possible to suppress the occurrence of "chipping", "tearing-off", and "taking-away". Accordingly, it is possible to improve the forming accuracy of the light shielding film 2043 or the side wall 2051 in the periphery of the bottom portion of the through-hole 2041. Accordingly, it is possible to suppress a decrease in yield of the lens attached substrate 2011.

<Layered Lens Structure>

When the plurality of lens attached substrates 2011 including the lens attached substrate 2011 with such a configuration is laminated, the layered lens structure 2012 can obtain the same effect as the lens attached substrate 2011 and hence suppress degradation in image quality.

Further, the manufacturing apparatus 2200 (FIG. 72) can manufacture the layered lens structure 2012 capable of obtaining the same effect as the lens attached substrate 2011 (that is, suppressing degradation in image quality) by using the manufactured lens attached substrate 2011 as described above similarly to the case of "16. Other Embodiment 1".

<Camera Module>

Further, when the layered lens structure 2012 obtained by laminating the plurality of lens attached substrates 2011 including the lens attached substrate 2011 with such a configuration and a sensor substrate are laminated, the camera module 1 can obtain the same effect as the lens attached substrate 2011 and hence suppress degradation in image quality.

Further, the manufacturing apparatus 2300 (FIG. 74) can manufacture the camera module 1 capable of obtaining the same effect as the lens attached substrate 2011 (that is, suppressing degradation in image quality) by using the manufactured lens attached substrate 2011 as described above similarly to the case of "16. Other Embodiment 1".

19. Other Embodiment 4

<Method of Removing Light Shielding Film of Through-Hole Bottom Portion>

In addition, as another method of removing the light shielding film 2043 of the bottom portion of the through-hole 2041, for example, a method may be used in which the transparent support substrate allowing the transmission of the light is bonded to the carrier substrate 2161 and UV light is emitted from the transparent support substrate toward the light shielding film 2043 of the bottom portion of the through-hole 2041 so as to remove the light shielding film.

<Manufacturing of Lens Attached Substrate>

Figure 88:
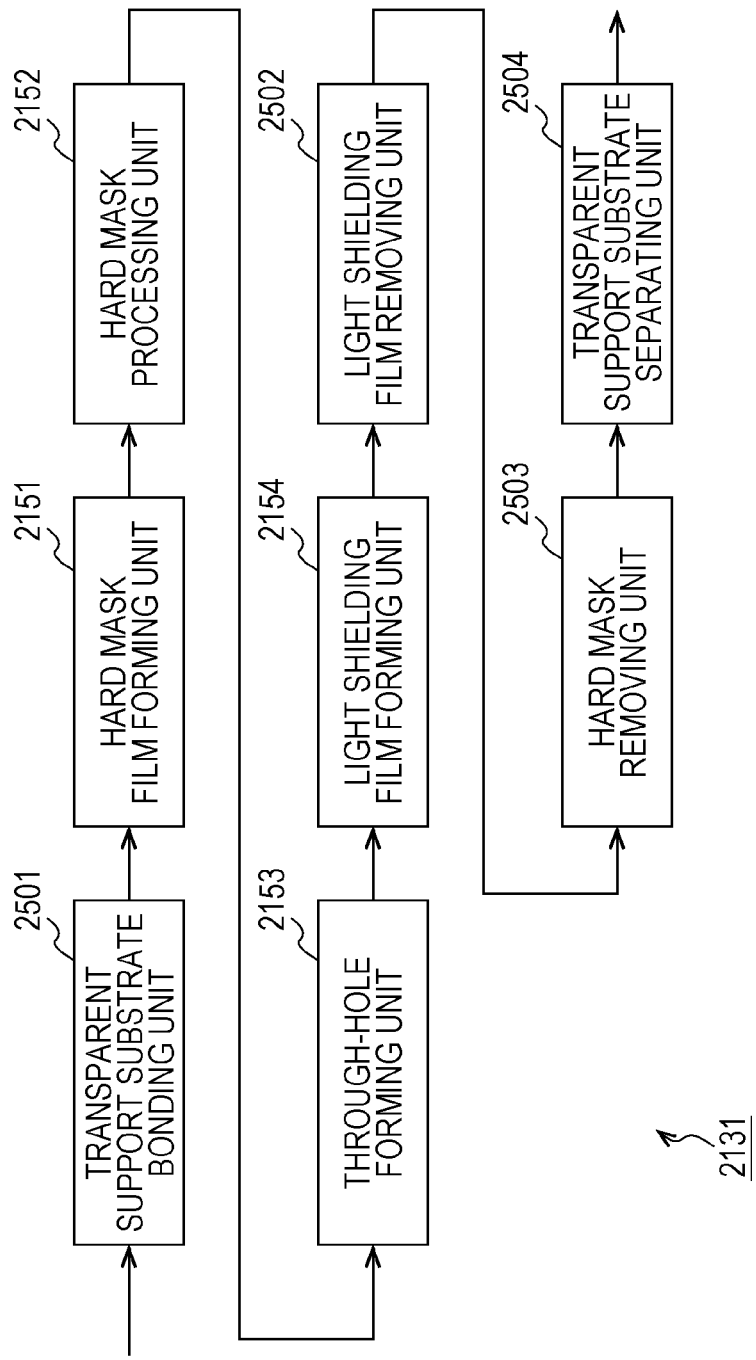
FIG. 88 is a block diagram illustrating a main configuration example of a carrier substrate processing unit.

Even in this case, the lens attached substrate 2011 can be manufactured by the manufacturing apparatus 2100. A main configuration example of the carrier substrate processing unit 2131 in this case is illustrated in FIG. 88. As illustrated in FIG. 88, in this case, the carrier substrate processing unit 2131 further includes a transparent support substrate bonding unit 2501, a light shielding film removing unit 2502, a hard mask removing unit 2503, and a transparent support substrate separating unit 2504 other than the hard mask film forming unit 2151 to the light shielding film forming unit 2154.

The transparent support substrate bonding unit 2501 performs a process involved with the bonding of the transparent support substrate and the carrier substrate. The light shielding film removing unit 2502 performs a process involved with the removing of the light shielding film 2043 formed on the bottom portion of the through-hole. The hard mask removing unit 2503 performs a process involved with the removing of the hard mask 2171. The transparent support substrate separating unit 2504 performs a process involved with the separating of the transparent support substrate from the carrier substrate.

The process units perform the processes controlled by the control unit 2101.

Figure 89:
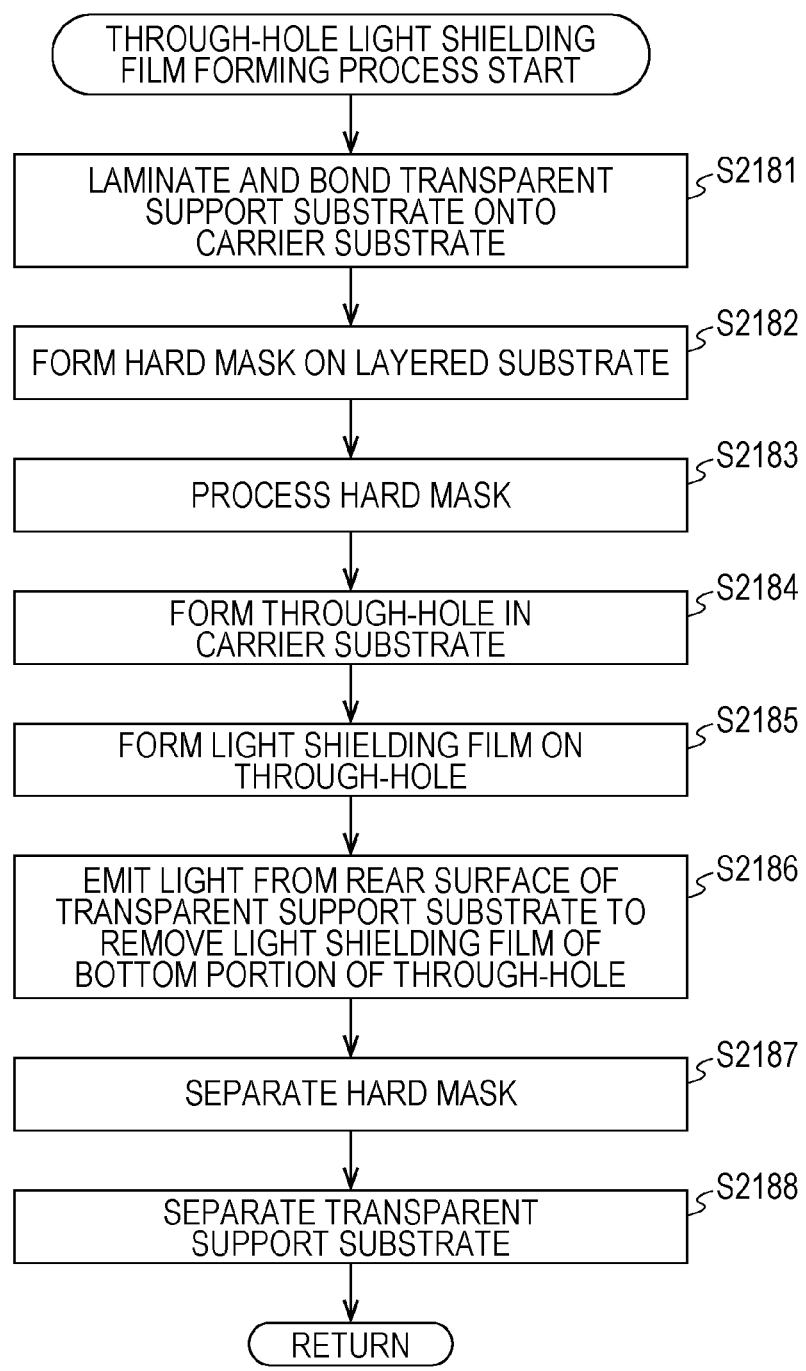
FIG. 89 is a flowchart illustrating an example of a procedure of a through-hole light shielding film forming process.

An example of the through-hole light shielding film forming process in this case will be described with reference to the flowchart of FIG. 89. If necessary, a description will be made with reference to FIGS. 90A to 90C and 91A to 91C.

Figure 90A:
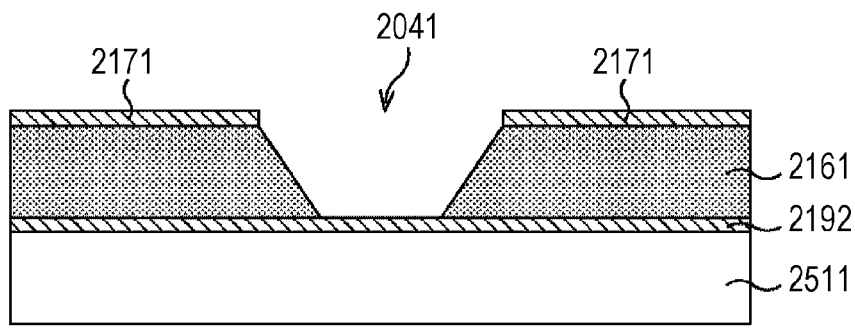
FIG. 90A-90C are cross-sectional views illustrating an example of a through-hole forming state and a light shielding film forming state.

When the through-hole light shielding film forming process is started, in step S2181, the transparent support substrate bonding unit 2501 laminates and bonds the undivided carrier substrate 2161 onto a surface provided with the etching stop film 2192 in the transparent support substrate 2511 (FIG. 90A). The bonding method may be arbitrarily set. For example, the transparent support substrate bonding unit 2501 may bond the carrier substrate 2161 and the transparent support substrate 2511 by plasma bonding or an adhesive. As will be described later, in order to separate the transparent support substrate 2511 from the carrier substrate 2161 later, the transparent support substrate bonding unit 2501 may bond the carrier substrate 2161 and the transparent support substrate 2511 to each other by an easily separating method.

In addition, in this case, the carrier substrate 2161 is formed of a material that does not allow the transmission of UV light. For example, the carrier substrate 2161 is formed by using silicon.

In step S2182, the hard mask film forming unit 2151 forms the hard mask 2171 on the layered substrate obtained by laminating the carrier substrate 2161 and the transparent support substrate 2511 (FIG. 90A). In step S2183, the hard mask processing unit 2152 processes the hard mask 2171 and removes the hard mask 2171 of the predetermined portion. In step S2184, as illustrated in FIG. 90A, the through-hole forming unit 2153 forms the through-hole 2041 in a portion from which the hard mask 2171 is removed in the carrier substrate 2161. In step S2185, the light shielding film forming unit 2154 forms the light shielding film 2043 as in FIG. 90B.

Figure 90B:
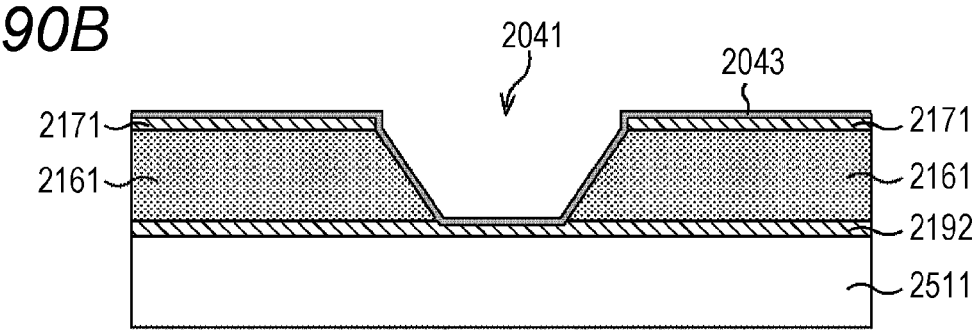
Figure 90C:
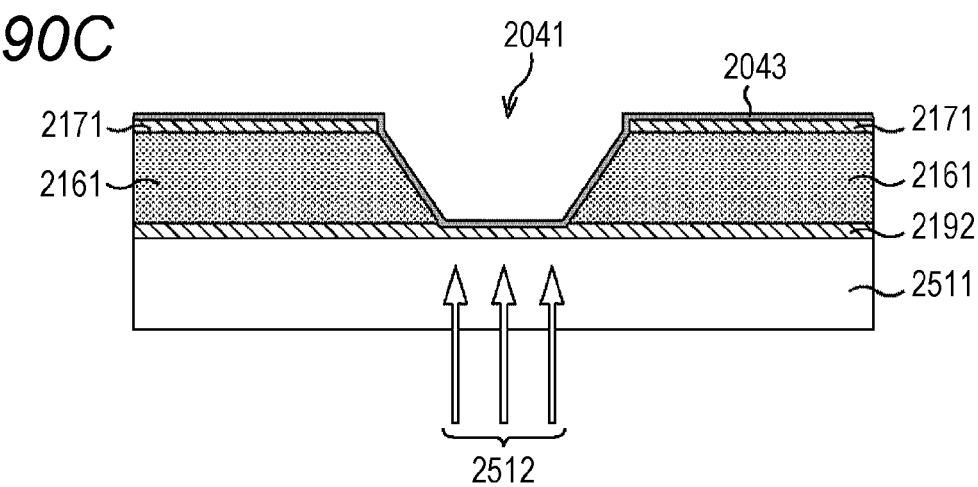

In step S2186, the light shielding film removing unit 2502 emits the UV light 2512 from the rear surface (the lower side of FIGS. 90A to 90C) of the transparent support substrate 2511 as in FIG. 90C. That is, the light shielding film removing unit 2502 irradiates the light shielding film 2043 formed on the bottom portion of the through-hole 2041 with the UV light 2512 through the transparent support substrate 2511. When the UV light is emitted, the light shielding film 2043 is deteriorated due to the UV light 2512 and hence is easily dissolved by a solvent.

The light shielding film removing unit 2502 causes a predetermined solvent to flow into the through-hole 2041 after the irradiation with the UV light 2512. The light shielding film 2043 of the bottom portion of the through-hole 2041 is removed while being dissolved by the solvent. On the contrary, since the carrier substrate 2161 does not allow the transmission of the UV light 2512, the light shielding film 2043 formed on a portion other than the bottom portion of the through-hole 2041 is not dissolved by the solvent.

Figure 91A:
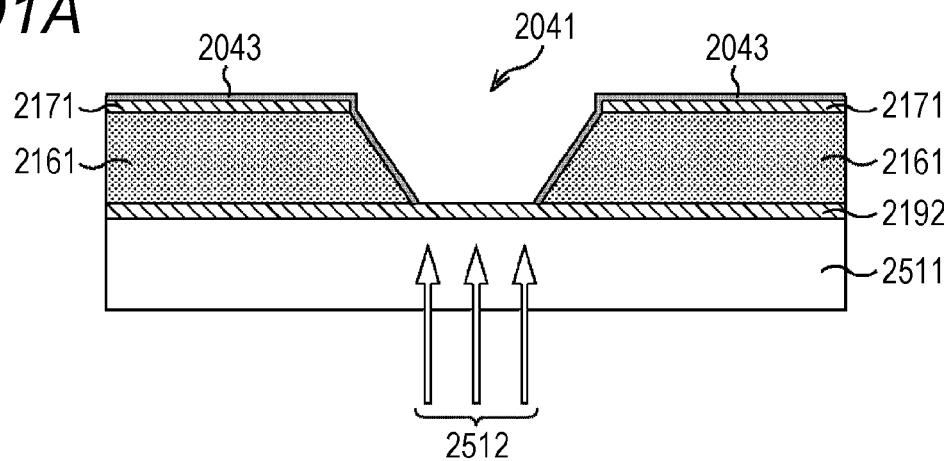
FIG. 91A-91C are cross-sectional views illustrating an example of a through-hole forming state and a light shielding film forming state.
Figure 91B:
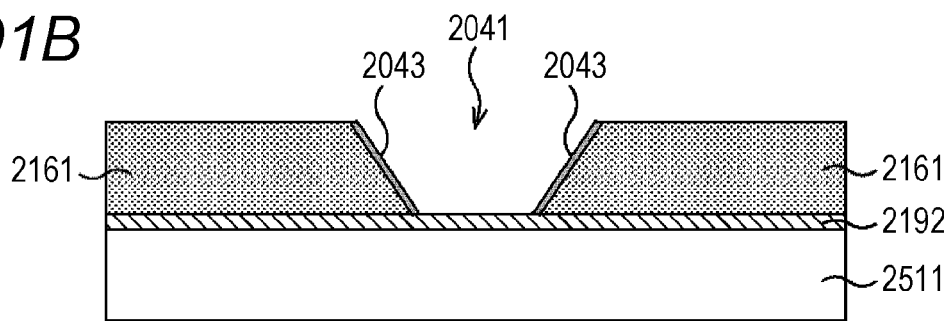
Figure 91C:
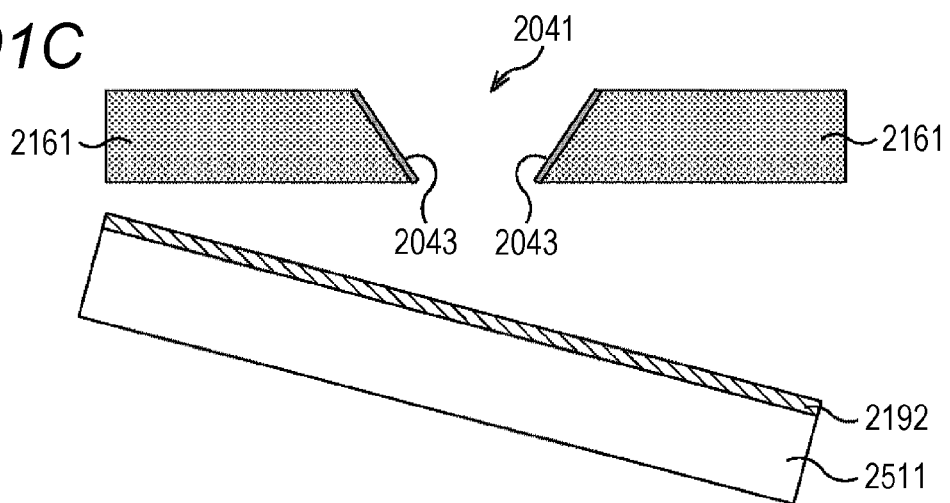

Thus, the light shielding film removing unit 2502 can remove only the light shielding film 2043 of the bottom portion of the through-hole 2041 as illustrated in FIG. 91A.

In step S2187, the hard mask removing unit 2503 removes the unnecessary hard mask 2171 as illustrated in FIG. 90B. At that time, the unnecessary light shielding film 2043 formed on a portion other than the through-hole 2041 is also removed.

In step S2188, the transparent support substrate separating unit 2504 separates the transparent support substrate 2511 from the carrier substrate 2161 as illustrated in FIG. 90C. As described above, since the light shielding film 2043 of the bottom portion of the through-hole 2041 is removed already, it is possible to suppress the occurrence of the "tearing-off" or the "taking-away" of the light shielding film 2043 when the transparent support substrate 2511 is separated.

When the process of step S2188 is ended, the through-hole light shielding film forming process is ended and the process is returned to FIG. 65.

When the light shielding film 2043 of the bottom portion of the through-hole 2041 is removed as described above, it is possible to suppress the occurrence of "tearing-off" and "taking-away". Accordingly, it is possible to improve the forming accuracy of the light shielding film 2043 or the side wall 2051 in the periphery of the bottom portion of the through-hole 2041. Accordingly, it is possible to suppress a decrease in yield of the lens attached substrate 2011.

<Layered Lens Structure>

When the plurality of lens attached substrates 2011 including the lens attached substrate 2011 with such a configuration is laminated, the layered lens structure 2012 can obtain the same effect as the lens attached substrate 2011 and hence suppress degradation in image quality.

Further, the manufacturing apparatus 2200 (FIG. 72) can manufacture the layered lens structure 2012 capable of obtaining the same effect as the lens attached substrate 2011 (that is, suppressing degradation in image quality) by using the manufactured lens attached substrate 2011 as described above similarly to the case of "16. Other Embodiment 1".

<Camera Module>

Further, when the layered lens structure 2012 obtained by laminating the plurality of lens attached substrates 2011 including the lens attached substrate 2011 with such a configuration and a sensor substrate are laminated, the camera module 1 can obtain the same effect as the lens attached substrate 2011 and hence suppress degradation in image quality.

Further, the manufacturing apparatus 2300 (FIG. 74) can manufacture the camera module 1 capable of obtaining the same effect as the lens attached substrate 2011 (that is, suppressing degradation in image quality) by using the manufactured lens attached substrate 2011 as described above similarly to the case of "16. Other Embodiment 1".

20. Application Example to Electronic Device

The camera module 1 can be used while being assembled to an electronic device using a solid state image capturing device in an image pickup unit (a photoelectric conversion unit) like an image capturing device such as a digital still camera or a video camera, a portable device having an image capturing function, or a copying machine using a solid-state image capturing device in an image reading unit.

Figure 92:
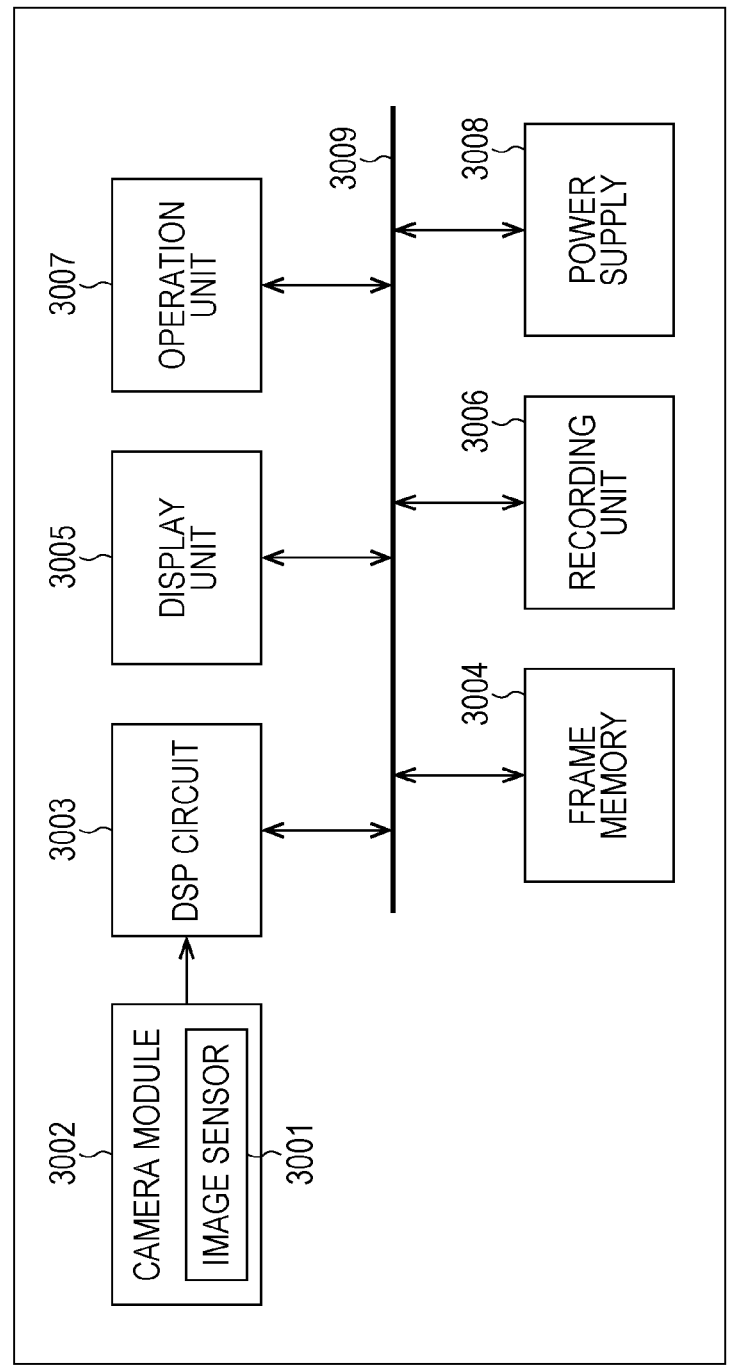
FIG. 92 is a block diagram illustrating a configuration example of an image capturing device as an electronic device according to an embodiment of the present technology.

FIG. 92 is a block diagram illustrating a configuration example of the image capturing device as an electronic device employing the present technology.

An image capturing device 3000 of FIG. 92 includes a camera module 3002 and a digital signal processor (DSP) circuit 3003 as a camera signal processing circuit. Further, the image capturing device 3000 also includes a frame memory 3004, a display unit 3005, a recording unit 3006, an operation unit 3007, and a power supply 3008. The DSP circuit 3003, the frame memory 3004, the display unit 3005, the recording unit 3006, the operation unit 3007 and the power supply 3008 are connected to one another via a bus line 3009.

An image sensor 3001 in the camera module 3002 receives incident light (image light) from a subject, converts the amount of the incident light formed on an imaging surface into an electric signal by the unit of a pixel, and outputs the result as a pixel signal. The camera module 1 is employed as the camera module 3002 and the image sensor 3001 corresponds to the light receiving element 12.

The display unit 3005 is configured as, for example, a panel type display device such as a liquid crystal panel or an organic electro luminescence (EL) panel and displays a moving image or a still image captured by the image sensor 3001. The recording unit 3006 records a moving image or a still image captured by the image sensor 3001 on a recording medium such as a hard disk or a semiconductor memory.

The operation unit 3007 issues an operation instruction for various functions of the image capturing device 3000 by the operation of the user. The power supply 3008 appropriately supplies power used for operating the DSP circuit 3003, the frame memory 3004, the display unit 3005, the recording unit 3006, and the operation unit 3007 to the supply target thereof.

As described above, when the camera module 1 equipped with the layered lens structure 11 bonded (laminated) with positioning high accuracy is used as the camera module 3002, an increase in image quality and a decrease in size can be realized. Thus, even in the image capturing device 3000 such as a video camera, a digital still camera, and a mobile camera module for a cellular phone, a decrease in size of a semiconductor package and an increase in image quality of a captured image can be obtained at the same time.

21. Usage Example of Image Sensor

Figure 93:
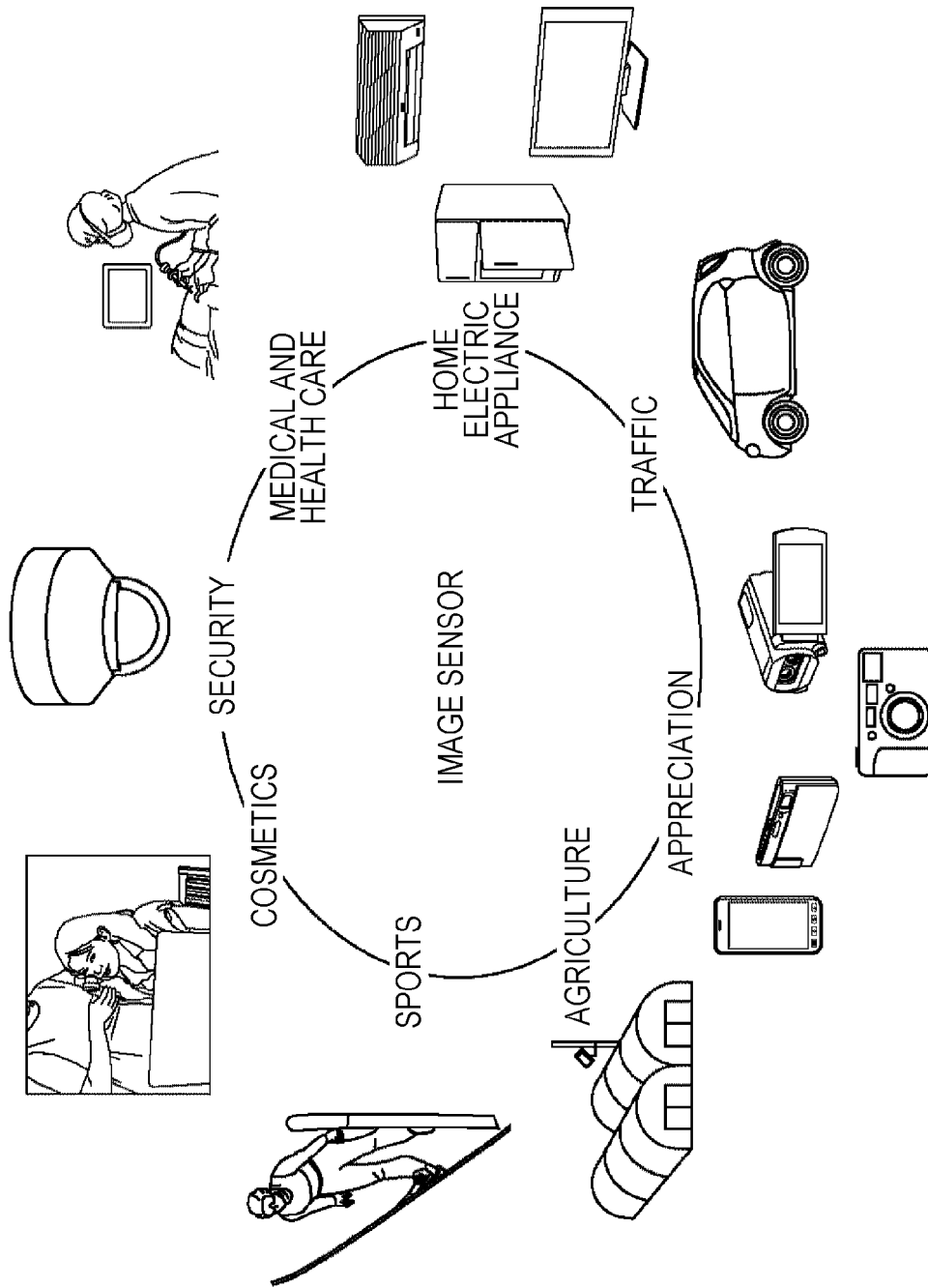
FIG. 93 is a diagram illustrating a usage example of an image sensor.

FIG. 93 is a diagram illustrating a usage example in which the camera module 1 is used as an image sensor.

An image sensor configured as the camera module 1 can be used in, for example, various cases that sense visible light, infrared light, UV light, and X-ray.

The image sensor can be applied to a device for capturing an appreciation image such as a digital camera or a portable device having a camera function.

The image sensor can be applied to a traffic monitoring device such as a vehicle installed sensor for capturing an image at a front position, a rear position, a peripheral position, or an interior position of a vehicle in order to check a safe driving mode such as an automatic stop or recognize a driver status, a monitoring camera for monitoring a traveling vehicle or a road, and a distance measuring sensor for measuring a vehicle-to-vehicle distance.

The image sensor can be applied to a device provided in a home electric appliance such as a TV, a refrigerator, and an air conditioner in order to capture the gesture of a user and perform an operation in accordance with the gesture.

The image sensor can be applied to a medical or health care device such as an endoscope or a device capturing a blood vessel by receiving infrared light.

The image sensor can be applied to a security device such as a crime prevention monitoring camera or a face verifying camera.

The image sensor can be applied to a cosmetic device such as a skin measuring unit capturing a skin or a microscope capturing a scalp.

The image sensor can be applied to a sports device such as an action camera or a wearable camera used in sports.

The image sensor can be applied to an agricultural device such as a camera for monitoring conditions of fields and crops.

The embodiment of the present technology is not limited to the above-described embodiment, and various modifications can be made without departing from the spirit of the present technology.

For example, the present technology is not limited to the application of the solid state image capturing device which detects the distribution of the incident light amount of the visible light and captures the result as an image. For example, the present technology can be applied to a solid state image capturing device which captures an input distribution of infrared light, X-ray, or particles as an image or a solid state image capturing device (a physical amount distribution detecting device) such as a finger print detecting sensor which detects other physical amount distribution of a pressure or a capacitance to capture the distribution as an image in a broad sense of meaning.

22. Software

A series of the above-described processes can be performed by hardware or software. When a series of the above-described processes are performed by the software, a program constituting the software is installed from a network or a recording medium.

For example, in the case of the manufacturing apparatus 2100 of FIG. 63, the recording medium is configured as the removable medium 2121 that records a program, the removable medium being distributed to deliver the program to a user, in addition to the apparatus body. The removable medium 2121 includes a magnetic disk (including a flexible disk) or an optical disc (including a CD-ROM or a DVD). Further, the removable medium also includes an optical magnetic disk (including a mini disc (MD)) or a semiconductor memory. In that case, for example, when the removable medium 2121 is mounted onto the drive 2115, the program stored on the removable medium 2121 can be read and installed onto the storage unit 2113.

For example, in the case of the manufacturing apparatus 2200 of FIG. 72, the recording medium is configured as the removable medium 2221 that records a program, the removable medium being distributed to deliver the program to a user, in addition to the apparatus body. The removable medium 2221 includes a magnetic disk or an optical disc. Further, the removable medium includes an optical magnetic disk or a semiconductor memory. In that case, for example, when the removable medium 2221 is mounted onto the drive 2215, the program stored on the removable medium 2221 can be read and installed onto the storage unit 2213.

For example, in the case of the manufacturing apparatus 2300 of FIG. 74, the recording medium is configured as the removable medium 2321 that records a program, the removable medium being distributed to deliver the program to a user, in addition to the apparatus body. The removable medium 2321 includes a magnetic disk or an optical disc. The removable medium further includes an optical magnetic disk or a semiconductor memory. In that case, for example, when the removable medium 2321 is mounted onto the drive 2315, the program stored on the removable medium 2321 can be read and installed onto the storage unit 2313.

Further, the program can be provided through a wired or wireless transmission medium such as a local area network, the Internet, and digital satellite broadcasting. For example, in the case of the manufacturing apparatus 2100 of FIG. 63, a program can be received by the communication unit 2114 and be installed onto the storage unit 2113. For example, in the case of the manufacturing apparatus 2200 of FIG. 72, a program can be received by the communication unit 2214 and be installed onto the storage unit 2213. For example, in the case of the manufacturing apparatus 2300 of FIG. 74, a program can be received by the communication unit 2314 and be installed onto the storage unit 2313.

In addition, the program can be installed onto a storage unit or a ROM in advance. For example, in the case of the manufacturing apparatus 2100 of FIG. 63, a program can be installed onto the storage unit 2113 or the ROM provided in the control unit 2101 in advance. Further, for example, in the case of the manufacturing apparatus 2200 of FIG. 72, a program can be installed onto the storage unit 2213 or the ROM provided in the control unit 2201 in advance. For example, in the case of the manufacturing apparatus 2300 of FIG. 74, a program can be installed onto the storage unit 2313 or the ROM provided in the control unit 2301 in advance.

In addition, a program performed by a computer may be a program which is performed in time series according to the sequence described in the present specification or a program which is performed in parallel or performed at a necessary timing in the event of a call.

Further, in the present specification, the step describing a program recorded on a recording medium includes not only a process performed in time series according to the described procedure but also a process performed in parallel or performed at an individual timing instead of the time-series process.

Further, the processes of the above-described steps can be performed by the above-described devices or an arbitrary device other than the above-described devices. In that case, a device for performing the process may have a function (a functional block or the like) necessary to perform the above-described processes. Further, information necessary for the process may be appropriately transmitted to the device.

The technology according to an embodiment of the present disclosure may be applied to various products. For example, the technology according to an embodiment of the present disclosure may be applied to an internal information acquisition system for a patient, which uses an endoscopic capsule.

Figure 94:
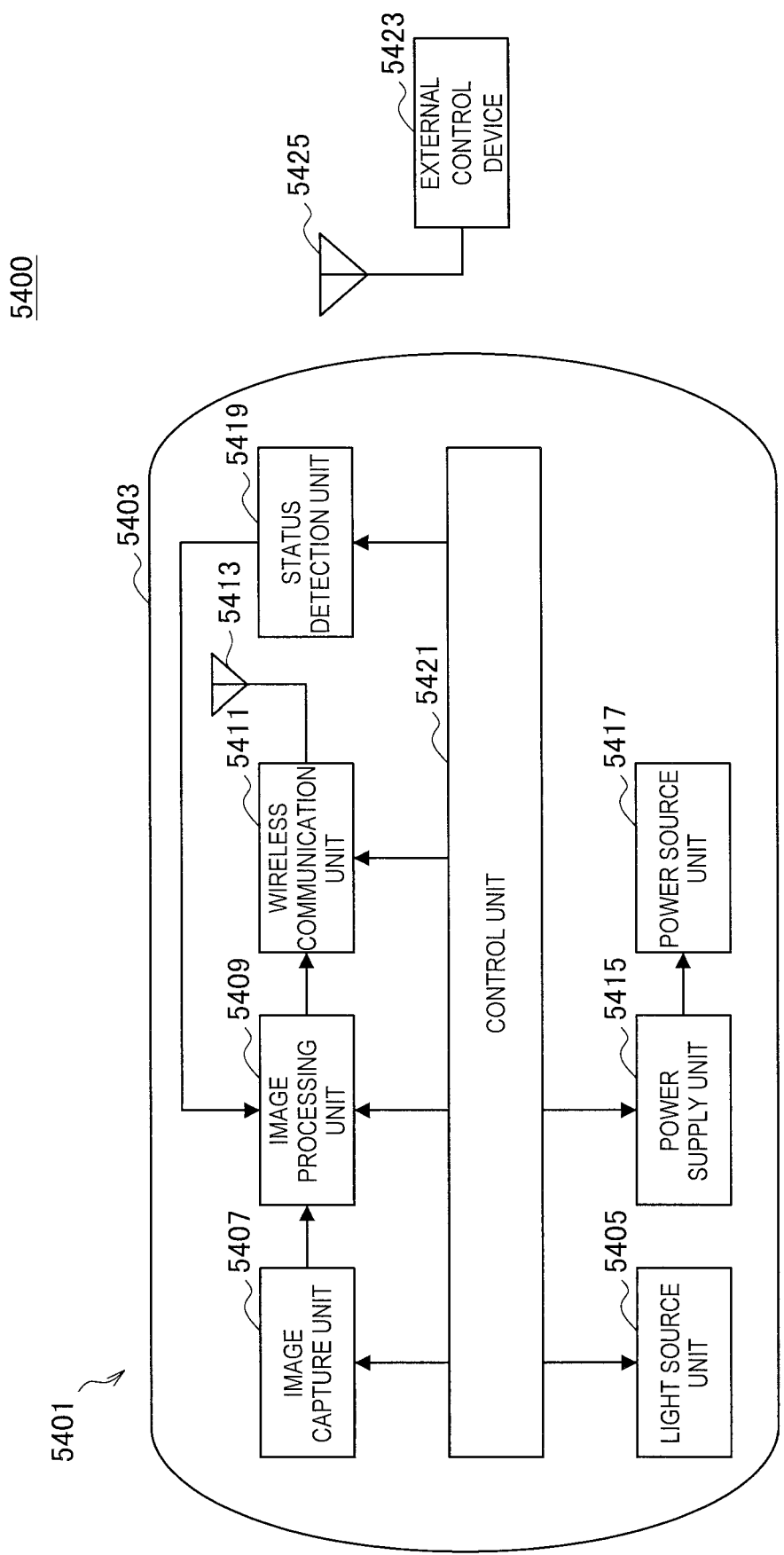
FIG. 94 is a block diagram illustrating an example of a schematic configuration of an internal information acquisition system.

FIG. 94 is a diagram illustrating an example of a schematic configuration of an internal information acquisition system 5400 to which the technology according to an embodiment of the present disclosure may be applied. Referring to FIG. 94, the internal information acquisition system 5400 includes an endoscopic capsule 5401, and an external control device 5423 that centrally controls the operation of the internal information acquisition system 5400. The endoscopic capsule 5401 is swallowed by a patient in an examination. The endoscopic capsule 5401 has an image capture function and a wireless communication function. The endoscopic capsule 5401 moves through the interior of organs such as the stomach and the intestines by peristaltic movement or the like until being excreted naturally from the patient, while also successively capturing images (hereinafter also called internal images) of the interior of the relevant organs at predetermined intervals, and successively wirelessly transmitting information about the internal images to the external control device 5423 outside the body. Based on the received information about the internal images, the external control device 5423 generates image data for displaying the internal images on a display device (not illustrated). In this way, with the internal information acquisition system 5400, images depicting the patient's internal conditions can be obtained continually from the time the endoscopic capsule 5401 is swallowed to the time the endoscopic capsule 5401 is excreted.

The configurations and functions of the endoscopic capsule 5401 and the external control device 5423 will be described in further detail. As illustrated in FIG. 94, the endoscopic capsule 5401 has the functions of a light source unit 5405, an image capture unit 5407, an image processing unit 5409, a wireless communication unit 5411, a power supply unit 5415, a power source unit 5417, a status detection unit 5419, and a control unit 5421 built in a capsule-shaped housing 5403.

The light source unit 5405 includes a light source such as a light-emitting diode (LED), for example, and irradiates the imaging field of the image capture unit 5407 with light.

The image capture unit 5407 includes an image sensor, and an optical system made up of multiple lenses provided in front of the image sensor. Reflected light (hereinafter called observation light) from the light used to irradiate a body tissue which is the object of observation is condensed by the optical system and incident on the image sensor. The image sensor receives and photoelectrically converts the observation light to thereby generate an electrical signal corresponding to the observation light, or in other words, an image signal corresponding to the observed image. The image signal generated by the image capture unit 5407 is provided to the image processing unit 5409. Note that various known image sensors such as a complementary metal-oxide-semiconductor (CMOS) image sensor or a charge-coupled device (CCD) image sensor may be used as the image sensor of the image capture unit 5407.

The image processing unit 5409 includes a processor such as a central processing unit (CPU) or a graphics processing unit (GPU), and performs various types of signal processing on the image signal generated by the image capture unit 5407. This signal processing may be a minimal level of processing (such as image data compression, frame rate conversion, data rate conversion, and/or format conversion, for example) for transmitting the image signal to the external control device 5423. Configuring the image processing unit 5409 to perform only a minimal necessary level of processing makes it possible to realize the image processing unit 5409 in a more compact form with lower power consumption, which is preferable for the endoscopic capsule 5401. However, if there is extra space or available power inside the housing 5403, additional signal processing (such as a noise removal process or other image quality-improving processes, for example) may also be performed by the image processing unit 5409. The image processing unit 5409 provides the image signal subjected to the signal processing to the wireless communication unit 5411 as raw data. Note that if information about the status (such as movement or orientation) of the endoscopic capsule 5401 is acquired by the status detection unit 5419, the image processing unit 5409 may also provide the image signal to the wireless communication unit 5411 in association with the information. This makes it possible to associate the position inside the body where an image is captured, the direction in which the image is captured and the like with the captured image.

The wireless communication unit 5411 includes a communication device capable of transmitting and receiving various types of information to and from the external control device 5423. This communication device includes, for example, an antenna 5413 and a processing circuit that performs processing such as modulation processing for transmitting and receiving signals. The wireless communication unit 5411 performs predetermined processing such as modulation processing on the image signal that was subjected to the signal processing by the image processing unit 5409, and transmits the image signal to the external control device 5423 via the antenna 5413. In addition, the wireless communication unit 5411 receives, from the external control device 5423 via the antenna 5413, a control signal related to driving control of the endoscopic capsule 5401. The wireless communication unit 5411 provides the received control signal to the control unit 5421.

The power supply unit 5415 includes, for example, an antenna coil for receiving power, a power regeneration circuit for regenerating power from a current produced in the antenna coil, and a voltage step-up circuit. In the power supply unit 5415, the principle of what is called contactless or wireless charging is used to generate power. Specifically, an external magnetic field (electromagnetic wave) of a predetermined frequency provided to the antenna coil of the power supply unit 5415 produces an induced electromotive force in the antenna coil. This electromagnetic wave may be a carrier wave transmitted from the external control device 5423 via an antenna 5425, for example. Power is regenerated from the induced electromotive force by the power regeneration circuit, and the electric potential of the power is suitably adjusted in the voltage step-up circuit, thereby generating power for power storage. The power generated by the power supply unit 5415 is stored in the power source unit 5417.

The power source unit 5417 includes a secondary battery, and stores power generated by the power supply unit 5415. FIG. 94 omits arrows or the like indicating the recipients of power from the power source unit 5417 for brevity, but power stored in the power source unit 5417 is supplied to the light source unit 5405, the image capture unit 5407, the image processing unit 5409, the wireless communication unit 5411, the status detection unit 5419, and the control unit 5421, and may be used to drive these components.

The status detection unit 5419 includes a sensor such as an acceleration sensor and/or a gyro sensor for detecting the status of the endoscopic capsule 5401. The status detection unit 5419 can acquire information about the status of the endoscopic capsule 5401 from detection results from the sensor. The status detection unit 5419 provides the acquired information about the status of the endoscopic capsule 5401 to the image processing unit 5409. As discussed earlier, in the image processing unit 5409, the information about the status of the endoscopic capsule 5401 may be associated with the image signal.

The control unit 5421 includes a processor such as a CPU, and centrally controls the operation of the endoscopic capsule 5401 by operating in accordance with a predetermined program. The control unit 5421 appropriately controls the driving of the light source unit 5405, the image capture unit 5407, the image processing unit 5409, the wireless communication unit 5411, the power supply unit 5415, the power source unit 5417, and the status detection unit 5419 in accordance with a control signal transmitted from the external control device 5423, thereby realizing the function of each component as described above.

The external control device 5423 may be a processor such as a CPU or GPU, or a device such as a microcontroller or a control board on which a processor and a storage element such as memory are mounted. The external control device 5423 includes the antenna 5425, and is capable of transmitting and receiving various types of information to and from the endoscopic capsule 5401 via the antenna 5425. Specifically, the external control device 5423 controls the operation of the endoscopic capsule 5401 by transmitting a control signal to the control unit 5421 of the endoscopic capsule 5401. For example, a light irradiation condition under which the light source unit 5405 irradiates a target of observation with light may be changed by a control signal from the external control device 5423. In addition, an image capture condition (such as the frame rate and the exposure level in the image capture unit 5407, for example) may be changed by a control signal from the external control device 5423. In addition, the content of processing in the image processing unit 5409 and a condition (such as the transmission interval and the number of images to transmit, for example) under which the wireless communication unit 5411 transmits the image signal may be changed by a control signal from the external control device 5423.

In addition, the external control device 5423 performs various types of image processing on the image signal transmitted from the endoscopic capsule 5401, and generates image data for displaying a captured internal image on a display device. For the image processing, various known signal processing, such as a development process (demosaicing process), an image quality-improving process (such as a band enhancement process, a super-resolution process, a noise reduction (NR) process, and/or a shake correction process), and/or an enlargement process (electronic zoom process), may be performed. The external control device 5423 controls the driving of a display device (not illustrated), and causes the display device to display a captured internal image on the basis of the generated image data. Alternatively, the external control device 5423 may also cause a recording device (not illustrated) to record the generated image data, or cause a printing device (not illustrated) to make a printout of the generated image data.

The above describes an example of the internal information acquisition system 5400 to which the technology according to an embodiment of the present disclosure may be applied. Among the configurations described in the foregoing, the technology according to an embodiment of the present disclosure may be applied favorably to an endoscopic capsule. Specifically, this invention is effective for downsizing an imaging device and reducing the burden on patients applying technology according to an embodiment of the present.

23. Others

Further, in the present specification, the system indicates a group of a plurality of components (devices and modules (parts)) and all components may not be provided in the same casing. Thus, a plurality of devices received in separate casings and connected to one another via a network and a device having a plurality of modules received in one casing all correspond to a system.

Further, in the description above, a configuration described as one device (or one process unit) may be divided into a plurality of devices (or process units). On the contrary, a plurality of devices (or process units) described above may be integrated as one device (or one process unit). Further, a configuration other than the above-described configuration may be added to the configuration of each device (or each process unit). Further, when the configuration or the operation is substantially the same in the entire system, a part of the configuration of a certain device (or a certain process unit) may be included in the configuration of the other device (or the other process unit).

While preferred embodiments of the present disclosure have been described with reference to the accompanying drawings, the technical scope of the present disclosure is not limited to the example. It is apparent that various modifications or corrections can be made without departing from the spirit of the claims by the person having a general knowledge in the technical field of the present disclosure.

Then, these modifications or corrections are also included in the technical scope of the present disclosure.

For example, the present technology can be a cloud computing technology in which one function is distributed and shared by a plurality of devices via a network.

Further, the steps of the flowchart can be shared and performed by a plurality of devices instead of being performed by one device.

In addition, when a plurality of processes is included in one step, the plurality of processes included in one step can be shared and performed by a plurality of devices instead of being performed by one device.

Further, the present technology is not limited thereto. For example, the present technology can be performed by all configurations of these devices or the devices constituting the system, for example, a processor such as a system large scale integration (LSI), a module using a plurality of processors, a unit using a plurality of modules, and a set (that is, a configuration of a part of the device) having the other functions added to the unit.

Further, the present technology can be realized by the combination of a part or the entirety of the above-described embodiments.

In addition, the effect of the present specification is merely an example and is not limited. Further, an effect other than the effect of the present specification may be used.

In addition, the present technology can have the following configurations.

(1) A lens attached substrate including:
a substrate in which a through-hole is formed and a light shielding film is formed on a side wall of the through-hole; and
a lens resin portion which is formed inside the through-hole of the substrate.

(2) The lens attached substrate according to (1),
wherein the light shielding film is formed of a black material.

(3) The lens attached substrate according to (2),
wherein the black material is a pigment of carbon black or titanium black.

(4) The lens attached substrate according to (1),
wherein the light shielding film is a metal film.

(5) The lens attached substrate according to (4),
wherein the metal film is tungsten or chrome.

(6) The lens attached substrate according to (1),
wherein the light shielding film is a chemical vapor deposition (CVD) film.

(7) The lens attached substrate according to (6),
wherein the CVD film is a carbon nanotube.

(8) The lens attached substrate according to any one of (1) to (7),
wherein an adhesion promoting agent for improving the contactability between the lens resin portion and the side wall of the through-hole is added to the light shielding film.

(9) The lens attached substrate according to (8),
wherein the adhesion promoting agent is a silane coupling agent.

(10) The lens attached substrate according to (8) or (9),
wherein a contact width between the light shielding film and the lens resin portion is narrower than a width of the light shielding film.

(11) The lens attached substrate according to any one of (1) to (10),
wherein the lens resin portion is formed so that the light shielding film is formed on a light incident surface of a carrying portion as a portion other than a lens portion.

(12) A layered lens structure obtained by laminating a plurality of lens attached substrates including a lens attached substrate including a substrate in which a through-hole is formed and a light shielding film is formed on a side wall of the through-hole and a lens resin portion which is formed inside the through-hole of the substrate.

(13) A camera module obtained by laminating a layered lens structure, which is obtained by laminating a plurality of lens attached substrates with a lens attached substrate including a substrate having a through-hole formed therein and a light shielding film formed on a side wall of the through-hole and a lens resin portion formed inside the through-hole of the substrate, and a sensor substrate in which an optical sensor is formed on a substrate.

(14) A manufacturing apparatus including:
a first film forming unit which forms a light shielding film on a side wall of a through-hole formed in a substrate; and
a lens forming unit which forms a lens resin portion contacting the side wall of the through-hole having the light shielding film formed by the first film forming unit at the inside of the through-hole.

(15) The manufacturing apparatus according to (14),
wherein the first film forming unit forms the light shielding film by using a black material.

(16) The manufacturing apparatus according to (15),
wherein the first film forming unit uses a pigment of carbon black or titanium black as the black material.

(17) The manufacturing apparatus according to (14),
wherein the first film forming unit forms the light shielding film by using a metal film.

(18) The manufacturing apparatus according to (17),
wherein the first film forming unit uses tungsten or chrome as the metal film.

(19) The manufacturing apparatus according to (14),
wherein the first film forming unit forms the light shielding film by using a chemical vapor deposition (CVD) film.

(20) The manufacturing apparatus according to (19),
wherein the first film forming unit uses a carbon nanotube as the CVD film.

(21) The manufacturing apparatus according to any one of (14) to (20),
wherein the first film forming unit forms the light shielding film by using a material including an adhesion promoting agent for improving the contactability between the lens resin portion and the side wall of the through-hole.

(22) The manufacturing apparatus according to (21),
wherein the first film forming unit uses a silane coupling agent as the adhesion promoting agent.

(23) The manufacturing apparatus according to (21) or (22),
wherein the lens forming unit forms the lens resin portion so that a contact width between the light shielding film and the lens resin portion is narrower than a width of the light shielding film.

(24) The manufacturing apparatus according to any one of (14) to (23), further including:
a second film forming unit which forms a light shielding film on a light incident surface of a carrying portion as a portion other than a lens portion of the lens resin portion.

(25) The manufacturing apparatus according to any one of (14) to (24), further including:
a through-hole forming unit which forms the through-hole in the substrate.

(26) The manufacturing apparatus according to (25),
wherein the through-hole forming unit forms a hard mask on the substrate, removes the hard mask of a portion provided with the through-hole formed by processing the formed hard mask, and forms the through-hole in the substrate.

(27) The manufacturing apparatus according to (25),
wherein the through-hole forming unit laminates a support substrate having an etching stop film formed on the substrate, forms a hard mask on a layered substrate obtained by laminating the substrate and the support substrate, removes the hard mask of a portion provided with the through-hole formed by processing the formed hard mask, and forms the through-hole in the substrate.

(28) A manufacturing method including:
forming a light shielding film on a side wall of a through-hole formed in a substrate; and
forming a lens resin portion contacting the side wall of the through-hole having the light shielding film formed thereon at the inside of the through-hole.

(29) A manufacturing apparatus including:
a lens attached substrate manufacturing unit which includes:
a film forming unit forming a light shielding film on a side wall of a through-hole formed in a substrate, and
a lens forming unit forming a lens resin portion contacting the side wall of the through-hole having the light shielding film formed by the film forming unit at the inside of the through-hole; and
a bonding unit which laminates and bonds a plurality of lens attached substrates with a lens attached substrate manufactured by the lens attached substrate manufacturing unit.

(30) A manufacturing method including:
manufacturing a lens attached substrate by forming a light shielding film on a side wall of a through-hole formed in a substrate and forming a lens resin portion contacting the side wall of the through-hole having the light shielding film formed thereon at the inside of the through-hole; and
laminating and bonding a plurality of lens attached substrates including the manufactured lens attached substrate.

(31) A manufacturing apparatus including:
a layered lens structure manufacturing unit which includes:
a lens attached substrate manufacturing unit including a film forming unit forming
a light shielding film on a side wall of a through-hole formed in a substrate and a lens forming unit forming a lens resin portion contacting the side wall of the through-hole having the light shielding film formed by the film forming unit at the inside of the through-hole, and
a first bonding unit laminating and bonding a plurality of lens attached substrates with a lens attached substrate manufactured by the lens attached substrate manufacturing unit; and
a second bonding unit which laminates and bonds a layered lens structure manufactured by the layered lens structure manufacturing unit and a sensor substrate having an optical sensor formed on a substrate.

(32) A manufacturing method including:
manufacturing a lens attached substrate by forming a light shielding film on a side wall of a through-hole formed in a substrate and forming a lens resin portion contacting the side wall of the through-hole having the light shielding film formed thereon at the inside of the through-hole,
manufacturing a layered lens structure by laminating and bonding a plurality of lens attached substrates with the manufactured lens attached substrate, and laminating and bonding the manufactured layered lens structure and a sensor substrate having an optical sensor formed on a substrate.

(33) A lens attached substrate including:
a substrate in which a through-hole is formed and a light shielding film is formed on a light incident surface or a light emitting surface, and
a lens resin portion which is formed inside the through-hole of the substrate.

(34) The lens attached substrate according to (33),
wherein the light shielding film is formed of a black material.

(35) The lens attached substrate according to (33) or (34),
wherein the light shielding film is formed on the entire surface of the light incident surface or the light emitting surface of the substrate.

(36) The lens attached substrate according to (33) or (34),
wherein the light shielding film is formed on a portion exposed to the through-hole of the light incident surface or the light emitting surface of the substrate while a plurality of the lens attached substrates is laminated.

(37) The lens attached substrate according to (36),
wherein the light incident surface or the light emitting surface of the substrate is provided with a step higher than a film thickness of the light shielding film by a portion exposed to the through-hole and a portion not exposed to the through-hole.

(38) The lens attached substrate according to any one of (33) to (37),
wherein the light shielding film has a rough surface.

(39) The lens attached substrate according to (38),
wherein the light shielding film is processed in a film formed state so that a surface becomes a rough surface.

(40) The lens attached substrate according to (38) or (39),
wherein the light shielding film has a rough surface formed by the aggregation of a material.

(41) The lens attached substrate according to any one of (38) to (40),
wherein the light shielding film has a rough surface formed by a solid element included in a material.

(42) The lens attached substrate according to any one of (38) to (41),
wherein the light shielding film is formed on the light incident surface or the light emitting surface as the rough surface of the substrate so that a surface becomes a rough surface.

(43) The lens attached substrate according to any one of (33) to (42), wherein the substrate further has the light shielding film formed on the side wall of the through-hole.

(44) A layered lens structure obtained by laminating a plurality of lens attached substrates with a lens attached substrate including a substrate in which a through-hole is formed and a light shielding film is formed on a light incident surface or a light emitting surface and a lens resin portion which is formed inside the through-hole of the substrate.

(45) A camera module obtained by laminating a layered lens structure, which is obtained by laminating a plurality of lens attached substrates with a lens attached substrate including a substrate having a through-hole formed therein and a light shielding film formed on a light incident surface or a light emitting surface and a lens resin portion formed inside the through-hole of the substrate, and a sensor substrate in which an optical sensor is formed on a substrate.

(46) A manufacturing apparatus including:
a film forming unit which forms a light shielding film on a light incident surface or a light emitting surface of a substrate provided with a through-hole; and
a lens forming unit which forms a lens resin portion at the inside of the through-hole of the substrate.

(47) The manufacturing apparatus according to (46),
wherein the film forming unit forms the light shielding film by using a black material.

(48) The manufacturing apparatus according to (46) or (47),
wherein the film forming unit forms the light shielding film on the entire surface of the light incident surface or the light emitting surface of the substrate.

(49) The manufacturing apparatus according to (46) or (47), wherein the film forming unit forms the light shielding film on a portion exposed to the through-hole of the light incident surface or the light emitting surface of the substrate while a plurality of the lens attached substrates is laminated.

(50) The manufacturing apparatus according to (49), further including:

a processing unit which processes the light incident surface or the light emitting surface of the substrate so as to form a step higher than a film thickness of the light shielding film by a portion exposed to the through-hole and a portion not exposed to the through-hole.

(51) The manufacturing apparatus according to any one of (46) to (50), wherein the film forming unit processes a surface of the formed light shielding film so that the surface becomes a rough surface.

(52) The manufacturing apparatus according to any one of (46) to (51), wherein the film forming unit forms the light shielding film by using an aggregated material.

(53) The manufacturing apparatus according to any one of (46) to (52), wherein the film forming unit forms the light shielding film by using a material including a solid element.

(54) The manufacturing apparatus according to any one of (46) to (53), further including:

a rough surface forming unit which performs a process including etching or moth-eye processing on a portion having the light shielding film formed by the film forming unit in the light incident surface or the light emitting surface of the substrate so that the portion has a rough surface, wherein the film forming unit forms the light shielding film on the light incident surface or the light emitting surface formed as the rough surface by the rough surface forming unit.

(55) The manufacturing apparatus according to any one of (46) to (54), wherein the film forming unit further forms the light shielding film on the side wall of the through-hole of the substrate.

(56) A manufacturing method including:

forming a light shielding film on a light incident surface or a light emitting surface of a substrate provided with a through-hole; and forming a lens resin portion inside the through-hole of the substrate.

(57) A manufacturing apparatus including:

a lens attached substrate manufacturing unit which includes a film forming unit forming a light shielding film on a light incident surface or a light emitting surface of a substrate provided with a through-hole and a lens forming unit forming a lens resin portion inside the through-hole of the substrate; and a bonding unit which laminates and bonds a plurality of lens attached substrates with the lens attached substrate manufactured by the lens attached substrate manufacturing unit.

(58) A manufacturing method including:

manufacturing a lens attached substrate by forming a light shielding film on a light incident surface or a light emitting surface of a substrate provided with a through-hole and forming a lens resin portion inside the through-hole of the substrate; and laminating and bonding a plurality of lens attached substrates with the manufactured lens attached substrate.

(59) A manufacturing apparatus including:

a layered lens structure manufacturing unit which includes:

a lens attached substrate manufacturing unit including a film forming unit forming a light shielding film on a light incident surface or a light emitting surface of a substrate provided with a through-hole and a lens forming unit forming a lens resin portion inside the through-hole of the substrate, and a first bonding unit laminating and bonding a plurality of lens attached substrates with a lens attached substrate manufactured by the lens attached substrate manufacturing unit, and a second bonding unit which laminates and bonds a layered lens structure manufactured by the layered lens structure manufacturing unit and a sensor substrate having an optical sensor formed on a substrate.

(60) A manufacturing method including:

manufacturing a lens attached substrate by forming a light shielding film on a light incident surface or a light emitting surface of a substrate provided with a through-hole and forming a lens resin portion inside the through-hole of the substrate;

manufacturing a layered lens structure by bonding and laminating a plurality of lens attached substrates with the manufactured lens attached substrate; and laminating and bonding the manufactured layered lens structure and a sensor substrate in which an optical sensor is formed on a substrate.

(61) A lens attached substrate including:

a substrate in which a through-hole is formed and a notch shape is formed in a light emitting side end of a side wall of the through-hole; and a lens resin portion which is formed inside the through-hole of the substrate.

(62) The lens attached substrate according to (61), wherein a light shielding film is formed on a portion other than the notch-shaped portion of the side wall of the through-hole.

(63) A layered lens structure obtained by laminating a plurality of lens attached substrates with a lens attached substrate including a substrate in which a through-hole is formed and a notch shape is formed in a light emitting side end of a side wall of the through-hole and a lens resin portion which is formed inside the through-hole of the substrate.

(64) A camera module obtained by laminating a layered lens structure, which is obtained by laminating a plurality of lens attached substrates with a lens attached substrate including a substrate having a through-hole formed therein and a notch shape formed in a light emitting side end of a side wall of the through-hole and a lens resin portion formed inside the through-hole of the substrate, and a sensor substrate in which an optical sensor is formed on a substrate.

(65) A manufacturing apparatus including:

a bonding unit which bonds a support substrate to a substrate;

a through-hole forming unit which forms a through-hole in the substrate having the support substrate bonded thereto by the bonding unit;

a notch shape forming unit which forms a notch shape in a light emitting side end of a side wall of the through-hole formed in the substrate by the through-hole forming unit;

a film forming unit which forms a light shielding film inside the through-hole having the notch shape formed on the side wall by the notch shape forming unit; and a separating unit which separates the support substrate from the substrate having the light shielding film formed on a portion other than the notch-shaped portion of the side wall of the through-hole by the film forming unit.

(66) The manufacturing apparatus according to (65), wherein the notch shape forming unit forms the notch shape by dry etching.

(67) The manufacturing apparatus according to (65) or (66),
wherein the bonding unit bonds the support substrate having an etching stop film formed on a surface thereof to the substrate,
the through-hole forming unit forms the through-hole by etching the substrate to the etching stop film, and
the notch shape forming unit forms the notch shape in the vicinity of the etching stop film of the side wall of the through-hole.

(68) The manufacturing apparatus according to (67), further including:
an etching stop film removing unit which removes the etching stop film of a bottom portion of the through-hole and the periphery of the bottom portion after the notch shape is formed by the notch shape forming unit.

(69) The manufacturing apparatus according to any one of (65) to (68),
wherein the bonding unit bonds the support substrate to the substrate through plasma bonding.

(70) A manufacturing method including:
bonding a support substrate to a substrate;
forming a through-hole in the substrate to which the support substrate is bonded; forming a notch shape in a light emitting side end of a side wall of the through-hole formed in the substrate;
forming a light shielding film inside the through-hole having the notch shape formed in the side wall; and
separating the support substrate from the substrate in which the light shielding film is formed on a portion other than the notch-shaped portion of the side wall of the through-hole.

(71) A manufacturing apparatus including:
a lens attached substrate manufacturing unit which includes:
a bonding unit which bonds a support substrate to a substrate,
a through-hole forming unit which forms a through-hole in the substrate to which the support substrate is bonded by the bonding unit,
a notch shape forming unit which forms a notch shape in a light emitting side end of a side wall of the through-hole formed in the substrate by the through-hole forming unit,
a film forming unit which forms a light shielding film inside the through-hole having the notch shape formed in the side wall by the notch shape forming unit, and
a separating unit which separates the support substrate from the substrate in which the light shielding film is formed on a portion other than the notch-shaped portion of the side wall of the through-hole by the film forming unit; and
a bonding unit which laminates and bonds a plurality of lens attached substrates including a lens attached substrate manufactured by the lens attached substrate manufacturing unit.

(72) A manufacturing method including:
manufacturing a lens attached substrate by bonding a support substrate to a substrate, forming a through-hole in the substrate to which the support substrate is bonded, forming a notch shape in a light emitting side end of a side wall of the through-hole formed in the substrate, forming a light shielding film inside the through-hole having the notch shape formed in the side wall, and separating the support substrate from the substrate in which the light shielding film is formed on a portion other than the notch-shaped portion of the side wall of the through-hole; and
laminating and bonding a plurality of lens attached substrates including the manufactured lens attached substrate.

(73) A manufacturing apparatus including:
a layered lens structure manufacturing unit which includes:
a lens attached substrate manufacturing unit including:
a first bonding unit bonding a support substrate to a substrate,
a through-hole forming unit forming a through-hole in the substrate to which the support substrate is bonded by the bonding unit,
a notch shape forming unit forming a notch shape in a light emitting side end of a side wall of the through-hole formed in the substrate by the through-hole forming unit,
a film forming unit forming a light shielding film inside the through-hole having the notch shape formed in the side wall by the notch shape forming unit, and a separating unit separating the support substrate from the substrate in which the light shielding film is formed on a portion other than the notch-shaped portion of the side wall of the through-hole by the film forming unit, and
a second bonding unit laminating and bonding a plurality of lens attached substrates including the lens attached substrate manufactured by the lens attached substrate manufacturing unit; and
a third bonding unit which laminates and bonds the layered lens structure manufactured by the layered lens structure manufacturing unit and a sensor substrate having an optical sensor formed on a substrate.

(74) A manufacturing method including:
manufacturing a lens attached substrate by bonding a support substrate to a substrate, forming a through-hole in the substrate to which the support substrate is bonded, forming a notch shape in a light emitting side end of a side wall of the through-hole formed in the substrate, forming a light shielding film inside the through-hole having the notch shape formed in the side wall, and separating the support substrate from the substrate in which the light shielding film is formed on a portion other than the notch-shaped portion of the side wall of the through-hole; manufacturing a layered lens structure by laminating and bonding a plurality of lens attached substrates including the manufactured lens attached substrate; and laminating and bonding the manufactured layered lens structure and a sensor substrate having an optical sensor formed on a substrate.

(75) A manufacturing apparatus including:
a bonding unit which bonds a transparent support substrate allowing the transmission of light to a substrate;
a through-hole forming unit which forms a through-hole in the substrate to which the transparent support substrate is bonded by the bonding unit;
a film forming unit which forms a light shielding film inside the through-hole formed in the substrate by the through-hole forming unit;
a light shielding film removing unit which removes the light shielding film formed on a bottom portion of the through-hole by irradiating the bottom portion of the through-hole with light through the transparent support substrate; and
a separating unit which separates the transparent support substrate from the substrate in which the light shielding film of the bottom portion of the through-hole is removed by the light shielding film removing unit.

(76) The manufacturing apparatus according to (75), wherein the light shielding film removing unit emits UV light.

(77) The manufacturing apparatus according to (75) or (76), wherein the bonding unit bonds the transparent support substrate to the substrate through plasma bonding.

(78) A manufacturing method including:
bonding a transparent support substrate allowing the transmission of light to a substrate;
forming a through-hole in the substrate to which the transparent support substrate is bonded;
forming a light shielding film inside the through-hole formed in the substrate; removing the light shielding film formed on a bottom portion of the through-hole by irradiating the bottom portion of the through-hole with light through the transparent support substrate; and
separating the transparent support substrate from the substrate in which the light shielding film of the bottom portion of the through-hole is removed.

(79) A manufacturing apparatus including:
a lens attached substrate manufacturing unit which includes:
a bonding unit bonding a transparent support substrate allowing the transmission of light to a substrate,
a through-hole forming unit forming a through-hole in the substrate to which the transparent support substrate is bonded by the bonding unit,
a film forming unit forming a light shielding film inside the through-hole formed in the substrate by the through-hole forming unit,
a light shielding film removing unit removing the light shielding film formed on a bottom portion of the through-hole by irradiating the bottom portion of the through-hole with light through the transparent support substrate, and
a separating unit separating the transparent support substrate from the substrate in which the light shielding film of the bottom portion of the through-hole is removed by the light shielding film removing unit; and
a bonding unit which laminates and bonds a plurality of lens attached substrates including the lens attached substrate manufactured by the lens attached substrate manufacturing unit.

(80) A manufacturing method including:
manufacturing a lens attached substrate by bonding a transparent support substrate allowing the transmission of light to a substrate, forming a through-hole in the substrate to which the transparent support substrate is bonded, forming a light shielding film inside the through-hole formed in the substrate, removing the light shielding film formed on a bottom portion of the through-hole by irradiating the bottom portion of the through-hole with light through the transparent support substrate, and separating the transparent support substrate from the substrate in which the light shielding film of the bottom portion of the through-hole is removed; and
laminating and bonding a plurality of lens attached substrates including the manufactured lens attached substrate.

(81) A manufacturing apparatus including:
a layered lens structure manufacturing unit which includes:
a lens attached substrate manufacturing unit including:
a first bonding unit bonding a transparent support substrate allowing the transmission of light to a substrate,
a through-hole forming unit forming a through-hole in the substrate to which the transparent support substrate is bonded by the bonding unit,
a film forming unit forming a light shielding film inside the through-hole formed in the substrate by the through-hole forming unit,
a light shielding film removing unit removing the light shielding film formed on a bottom portion of the through-hole by irradiating the bottom portion of the through-hole with light through the transparent support substrate, and
a separating unit separating the transparent support substrate from the substrate in which the light shielding film of the bottom portion of the through-hole is removed by the light shielding film removing unit, and
a second bonding unit laminating and bonding a plurality of lens attached substrates including the lens attached substrate manufactured by the lens attached substrate manufacturing unit; and
a third bonding unit which laminates and bonds the layered lens structure manufactured by the layered lens structure manufacturing unit and a sensor substrate having an optical sensor formed on a substrate.

(82) A manufacturing method including:
manufacturing a lens attached substrate by bonding a transparent support substrate allowing the transmission of light to a substrate, forming a through-hole in the substrate to which the transparent support substrate is bonded, forming a light shielding film inside the through-hole formed in the substrate, removing the light shielding film formed on a bottom portion of the through-hole by irradiating the bottom portion of the through-hole with light through the transparent support substrate, and separating the transparent support substrate from the substrate in which the light shielding film of the bottom portion of the through-hole is removed;
manufacturing a layered lens structure by laminating and bonding a plurality of lens attached substrates including the manufactured lens attached substrate; and laminating and bonding the manufactured layered lens structure and a sensor substrate having an optical sensor formed on a substrate.

(83) A lens substrate including:
a substrate including a through-hole;
a light-shielding film disposed on a side wall of the through-hole; and
a lens portion disposed inside the through-hole of the substrate.

(84) The lens substrate according to (83), wherein the light-shielding film includes a black material, wherein the black material includes at least one of carbon black or titanium black.

(85) The lens substrate according to any one of (83) to (84), wherein the light-shielding film is a metal film including at least one of tungsten or chrome.

(86) The lens substrate according to any one of (83) to (85), wherein the light-shielding film is a chemical vapor deposition (CVD) film including a plurality of carbon nanotubes.

(87) The lens substrate according to any one of (83) to (86), wherein the light-shielding film includes an adhesion promoting agent.

(88) The lens substrate according to (87), wherein the adhesion promoting agent includes a silane coupling agent.

(89) The lens substrate according to any one of (83) to (88), wherein a width of a cross-section of the light shielding film contacting the lens portion is less than a depth of the through-hole portion that includes the light-shielding film.

(90) The lens substrate according to any one of (83) to (89), further comprising: a carrying portion provided between the lens portion and the sidewall of the through-hole, wherein the light-shielding film is disposed on a light-incident surface of the carrying portion.

(91) The lens substrate according to any one of (83) to (90), wherein the lens substrate is a first lens substrate, and a stacked plurality of lens substrates including the first lens substrate is included in a layered lens structure.

(92) The lens substrate according to (91), wherein the layered lens substrate is integrated in a camera module having a sensor substrate that includes an optical sensor.

(93) The lens substrate according to any one of (83) to (92), wherein the light-shielding film is disposed on at least one of a light-incident surface of the substrate or a light-emitting surface of the substrate.

(94) The lens substrate according to (93), further comprising: a second lens substrate laminated on the lens substrate, wherein the light-shielding film is formed on a portion of at least one of the light-incident surface of the substrate or the light-emitting surface of the substrate above or below a through-hole in the second substrate.

(95) The lens substrate according to (94), wherein at least one of the light-incident surface of the substrate or the light-emitting surface of the substrate includes a step portion that includes a portion exposed to the through-hole and a portion not exposed to the through-hole, wherein a height of the step portion is greater than a thickness of the light-shielding film.

(96) The lens substrate according to any one of (83) to (95), wherein a surface of the light-shielding film is a rough surface.

(97) The lens substrate according to (96), wherein the rough surface of the light-shielding film is imparted on the light-shielding film after the light-shielding film has been disposed on the substrate.

(98) The lens substrate according to (96), wherein the surface of the light-shielding film includes an aggregation of a material that causes the surface to be uneven.

(99) The lens substrate according to (99), wherein a solid element included in a material causes the surface of the light-shielding film to be rough.

(100) The lens substrate according to (99), wherein a surface of the substrate on which the light-shielding film is formed is a rough surface causing the surface of the light-shielding film to be rough.

(101) The lens substrate according to any one of (83) to (100), wherein the substrate includes a notched portion at a light-emitting end of the sidewall of the through-hole.

(102) The lens substrate according to (101), wherein the light-shielding film is disposed on a portion of the through-hole other than the notched portion of the sidewall of the through-hole.

(103) A method of manufacturing a lens substrate, the method comprising: forming a through-hole in a substrate; forming a light-shielding film on a sidewall of the through-hole; and forming a lens portion within the through-hole such that the lens portion contacts the light-shielding film formed on the sidewall of the through-hole.

(104) An electronic apparatus comprising:
a plurality of lens substrates, each lens substrate of the plurality of substrates including:
a substrate including a through-hole,
a light-shielding film disposed on a sidewall of the through-hole, and
a lens portion disposed inside the through-hole of the substrate; and
a sensor substrate that includes an optical sensor.

REFERENCE SIGNS LIST

1 Camera module
11 Layered lens structure
12 Light receiving element
13 Optical unit
21 Lens
41 (41a to 41e) Lens attached substrate
43 Sensor substrate
51 Diaphragm plate
52 Opening portion
81 Carrier substrate
82 Lens resin portion
83 Through-hole
121 Light shielding film
122 Upper surface layer
123 Lower surface layer
141 Etching mask
142 Protection film
2011 Lens attached substrate
2012 Layered lens structure
2040 Carrier substrate
2041 Through-hole
2042 Lens resin portion
2043 Light shielding film
2044 Upper surface layer
2045 Lower surface layer
2100 Manufacturing apparatus
2101 Control unit
2102 Lens attached substrate manufacturing unit
2131 Carrier substrate processing unit
2132 Lens forming unit
2133 Surface layer film forming unit
2134 Light shielding film forming unit
2151 Hard mask film forming unit
2152 Hard mask processing unit
2153 Through-hole forming unit
2154 Light shielding film forming unit
2161 Carrier substrate
2171 Hard mask
2181 Support substrate bonding unit
2182 Support substrate separating unit
2191 Support substrate
2192 Etching stop film
2200 Manufacturing apparatus
2201 Control unit
2202 Layered lens structure manufacturing unit
2231 Lens attached substrate manufacturing unit
2232 Lens attached substrate bonding unit
2300 Manufacturing apparatus
2301 Control unit
2302 Camera module manufacturing unit
2331 Layered lens structure manufacturing unit
2332 Sensor substrate manufacturing unit
2333 Bonding unit
2334 Dividing unit
2335 Module unit
2451 Notch shape forming unit
2452 Hard mask etching stop film removing unit
2501 Transparent support substrate bonding unit
2502 Light shielding film removing unit
2503 Hard mask removing unit
2504 Transparent support substrate separating unit
2511 Transparent support substrate
2512 UV light
3000 Image capturing device
3001 Image sensor
3002 Camera module

The invention claimed is:

1. A layered lens structure obtained by
laminating a plurality of lens attached substrates, wherein the plurality of lens attached substrates includes three or more lens attached substrates, and wherein each lens attached substrate includes:
   a carrier substrate;
   a through-hole formed in the carrier substrate; and
   a lens portion formed only inside the through-hole of the carrier substrate; and
laminating the plurality of lens attached substrates to a sensor substrate that includes an optical sensor.

2. The layered lens structure of claim 1, wherein each lens attached substrate further includes:
   a light-shielding film disposed on an inner side wall of the through-hole.

3. A camera module with a layered lens structure obtained by:
   laminating a plurality of lens attached substrates to a sensor substrate that includes an optical sensor, wherein the plurality of lens attached substrates includes three or more lens attached substrates, and wherein each lens attached substrate of the plurality of lens attached substrates includes:
      a carrier substrate in which a through-hole is formed; and
      a lens portion formed only inside the through-hole of the substrate.

4. The camera module of claim 3, wherein each lens attached substrate further includes:
   a light-shielding film disposed on an inner side wall of the through-hole.

5. A method of manufacturing a layered lens structure, the method comprising:
   laminating a plurality of lens attached substrates, wherein the plurality of lens attached substrates includes three or more lens attached substrates, and wherein each lens attached substrate includes:
      a carrier substrate;
      a through-hole formed in the carrier substrate; and
      a lens portion formed only inside the through-hole of the carrier substrate; and
   laminating the plurality of lens attached substrates to a sensor substrate that includes an optical sensor.

6. The method of claim 5, wherein each lens attached substrate further includes:
   a light-shielding film disposed on an inner side wall of the through-hole.

7. A manufacturing apparatus including:
   a layered lens structure manufacturing unit which includes:
      a lens attached substrate manufacturing unit including a through-hole forming unit forming a through-hole in a carrier substrate and a lens forming unit forming a lens only in the through-hole;
      a first bonding unit laminating and bonding a plurality of lens attached substrates manufactured by the lens attached substrate manufacturing unit, wherein the plurality of lens attached substrates includes three or more lens attached substrates; and
      a second bonding unit which laminates and bonds a layered lens structure manufactured by the first bonding unit and a sensor substrate having an optical sensor formed on the sensor substrate.

8. The manufacturing apparatus of claim 7, wherein a film forming unit forms a light shielding film on an inner side wall of the through-hole.

* * * * *